United States Patent
Fujisaki

(10) Patent No.: US 8,744,720 B1
(45) Date of Patent: Jun. 3, 2014

(54) INTER-VEHICLE MIDDLE POINT MAINTAINING IMPLEMENTER

(71) Applicant: Iwao Fujisaki, Tokyo (JP)

(72) Inventor: Iwao Fujisaki, Tokyo (JP)

( * ) Notice: Subject to any disclaimer, the term of this patent is extended or adjusted under 35 U.S.C. 154(b) by 0 days.

(21) Appl. No.: 13/749,712

(22) Filed: Jan. 25, 2013

Related U.S. Application Data

(63) Continuation of application No. 12/168,089, filed on Jul. 4, 2008, now abandoned, which is a continuation of application No. 11/964,990, filed on Dec. 27, 2007, now abandoned.

(51) Int. Cl.
*B60T 7/12* (2006.01)
*B61C 17/12* (2006.01)

(52) U.S. Cl.
USPC .............................. 701/96; 701/98; 246/182 R

(58) Field of Classification Search
USPC ...................... 701/96, 98; 246/182 R, 182 C
See application file for complete search history.

(56) References Cited

U.S. PATENT DOCUMENTS

| | | | | |
|---|---|---|---|---|
| 5,173,881 A | * | 12/1992 | Sindle | 367/101 |
| 7,418,346 B2 | * | 8/2008 | Breed et al. | 701/301 |
| 2010/0079267 A1 | * | 4/2010 | Lin | 340/435 |
| 2012/0059545 A1 | * | 3/2012 | Furuno et al. | 701/26 |

* cited by examiner

*Primary Examiner* — Christopher M Brandt

(57) ABSTRACT

The vehicle comprising a rear vehicle speed dependent ideal distance maintaining implementer, a front vehicle speed dependent ideal distance maintaining implementer, an inter-vehicle middle point maintaining implementer, a front vehicle activity notifying implementer, and a past accident occurred spot auto speed decreasing implementer.

3 Claims, 1 Drawing Sheet

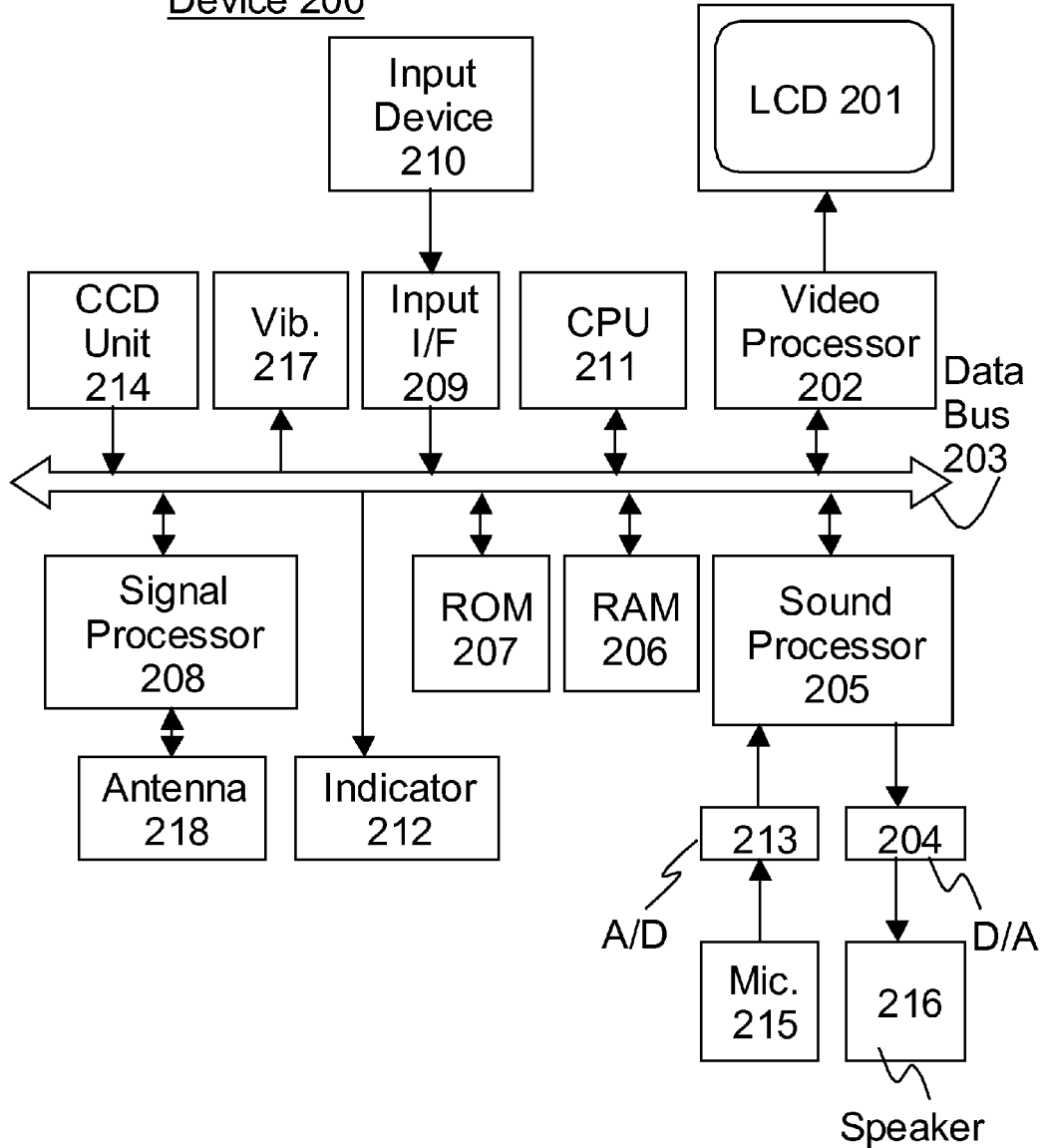

INTER-VEHICLE MIDDLE POINT MAINTAINING IMPLEMENTER

CROSS REFERENCE TO RELATED APPLICATIONS

This application is a continuation of U.S. Ser. No. 12/168,089 filed 2008 Jul. 4, which is a continuation of U.S. Ser. No. 11/964,990 filed 2007 Dec. 27, all of which are hereby incorporated herein by reference in their entirety.

BACKGROUND OF INVENTION

The invention relates to communication device and more particularly to the communication device which is capable to communicate with another communication device in a wireless fashion.

U.S. Pat. No. 6,327,471 is introduced as prior art of the present invention of which the summary is the following: "A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off." However, this prior art does not disclose the vehicle comprising a rear vehicle speed dependent ideal distance maintaining implementer, a front vehicle speed dependent ideal distance maintaining implementer, an inter-vehicle middle point maintaining implementer, a front vehicle activity notifying implementer, and a past accident occurred spot auto speed decreasing implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

The present invention introduces the vehicle comprising a rear vehicle speed dependent ideal distance maintaining implementer, a front vehicle speed dependent ideal distance maintaining implementer, an inter-vehicle middle point maintaining implementer, a front vehicle activity notifying implementer, and a past accident occurred spot auto speed decreasing implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Brain Wave Color Selecting Function>>

The following paragraphs illustrate the brain wave color selecting function, wherein a current brain wave data which indicates the current brain wave of the user of said communication device is identified, a specific color corresponding to said current brain wave data is identified and displayed on said display, a color notice data indicating that said specific color is selected and displayed is output from said communication device, and a current location data which indicates the current geographic location of said communication device and a specific color selected location data which indicates the geographic location at which said specific color is selected are indicated on said display.

This paragraph illustrates the major element included in Communication Device 200 utilized to implement the present function. In the present embodiment, Brain Wave Retrieving Device BWRD697 is connected to Data Bus 203 (FIG. 1). Brain Wave Retrieving Device BWRD697 is the device utilized to retrieve the current brain wave of the user of Communication Device 200.

This paragraph illustrates the storage area included in Host H. In the present embodiment, Host H includes Brain Wave Color Selecting Info Storage Area H697a of which the data and the software program(s) stored therein are described hereinafter.

This paragraph illustrates the storage area(s) included in Brain Wave Color Selecting Info Storage Area H697a. In the present embodiment, Brain Wave Color Selecting Info Storage Area H697a includes Brain Wave Color Selecting Data Storage Area H697b and Brain Wave Color Selecting Software Storage Area H697c. Brain Wave Color Selecting Data Storage Area H697b stores the data necessary to implement the present function on the side of Host H, such as the one(s) described hereinafter. Brain Wave Color Selecting Software Storage Area H697c stores the software program(s) necessary to implement the present function on the side of Host H, such as the one(s) described hereinafter.

This paragraph illustrates the storage area(s) included in Brain Wave Color Selecting Data Storage Area H697b. In the present embodiment, Brain Wave Color Selecting Data Storage Area H697b includes Current Brain Wave Data Storage Area H697b1, Brain Wave Pattern Data Storage Area H697b2, Brain Wave Color Data Storage Area H697b3, Color Notice Data Storage Area H697b4, Entire Location Data Storage Area H697b5, Map Data Storage Area H697b6, Entire Location Icon Data Storage Area H697b7, and Work Area H697b8. Current Brain Wave Data Storage Area H697b1 stores the current brain wave data which indicates the current brain wave retrieved from Brain Wave Retrieving Device BWRD697. Brain Wave Pattern Data Storage Area H697b2 stores the data described hereinafter. Brain Wave Color Data Storage Area H697b3 stores the data described hereinafter. Color Notice Data Storage Area H697b4 stores the data described hereinafter. Entire Location Data Storage Area H697b5 stores the data described hereinafter. Map Data Storage Area H697b6 stores the map data which is the image data indicating a map. Entire Location Icon Data Storage Area H697b7 stores the data described hereinafter. Work Area H697b8 is utilized as a work area to perform calculation and temporarily store data to implement the present function.

This paragraph illustrates the data stored in Brain Wave Pattern Data Storage Area H697b2. In the present embodiment, Brain Wave Pattern Data Storage Area H697b2 comprises two columns, i.e., 'Brain Wave Pattern ID' and 'Brain Wave Pattern Data'. Column 'Brain Wave Pattern ID' stores the brain wave pattern IDs, and each brain wave pattern ID is an identification of the corresponding brain wave pattern data stored in column 'Brain Wave Pattern Data'. Column 'Brain Wave Pattern Data' stores the brain wave pattern data, and each brain wave pattern data indicates a specific pattern of brain wave. In the present embodiment, Brain Wave Pattern Data Storage Area H697b2 stores the following data: 'Brain Wave Pattern#1' and the corresponding 'Brain Wave Pattern Data#1; 'Brain Wave Pattern#2' and the corresponding Brain Wave Pattern Data#2'; 'Brain Wave Pattern#3' and the corresponding 'Brain Wave Pattern Data#3'; and 'Brain Wave Pattern#4' and the corresponding 'Brain Wave Pattern Data#4'.

This paragraph illustrates the data stored in Brain Wave Color Data Storage Area H697b3. In the present embodiment, Brain Wave Color Data Storage Area H697b3 comprises two columns, i.e., 'Brain Wave Pattern ID' and 'Brain Wave Color Data'. Column 'Brain Wave Pattern ID' stores the brain wave pattern IDs, and each brain wave pattern ID is an identification of the corresponding brain wave color data stored in column 'Brain Wave Color Data'. The brain wave pattern IDs stored in the present column are identical to the ones described in the previous paragraph. Column 'Brain Wave Color Data' stores the brain wave color data, and each brain wave color data indicates a specific color (e.g., red, green, blue, or yellow). In the present embodiment, Brain Wave Color Data Storage Area H697b3 stores the following data: 'Brain Wave Pattern#1' and the corresponding 'Brain Wave Color Data#1'; 'Brain Wave Pattern#2' and the corresponding 'Brain Wave Color Data#2'; 'Brain Wave Pattern#3' and the corresponding 'Brain Wave Color Data#3'; and 'Brain Wave Pattern#4' and the corresponding 'Brain Wave Color Data#4'.

This paragraph illustrates the data stored in Color Notice Data Storage Area H697b4. In the present embodiment, Color Notice Data Storage Area H697b4 comprises two columns, i.e., 'Brain Wave Pattern ID' and 'Color Notice Data'. Column 'Brain Wave Pattern ID' stores the brain wave pattern IDs, and each brain wave pattern ID is an identification of the corresponding color notice data stored in column 'Color Notice Data'. The brain wave pattern IDs stored in the present column are identical to the ones described in the previous two paragraphs. Column 'Color Notice Data' stores the color notice data, and each color notice data is the audiovisual data indicating that the corresponding brain wave color data is selected and displayed. In the present embodiment, Color Notice Data Storage Area H697b4 stores the following data: 'Brain Wave Pattern#1' and the corresponding 'Color Notice Data#1'; 'Brain Wave Pattern#2' and the corresponding 'Color Notice Data#2'; 'Brain Wave Pattern#3' and the corresponding 'Color Notice Data#3'; and 'Brain Wave Pattern#4' and the corresponding 'Color Notice Data#4'.

This paragraph illustrates the storage area(s) included in Entire Location Data Storage Area H697b5. In the present embodiment, Entire Location Data Storage Area H697b5 includes Current Location Data Storage Area H697b5a, Brain Wave Color Data#1 Selected Location Data Storage Area H697b5b, Brain Wave Color Data#2 Selected Location Data Storage Area H697b5c, Brain Wave Color Data#3 Selected Location Data Storage Area H697b5d, and Brain Wave Color Data#4 Selected Location Data Storage Area H697b5e. Current Location Data Storage Area H697b5a stores the current location data which indicates the current geographic location of Communication Device 200 is (x,y,z) format. Brain Wave Color Data#1 Selected Location Data Storage Area H697b5b stores the brain wave color data#1 selected location data which indicates the geographic location of Communication Device 200 at which Brain Wave Color Data#1 is selected by utilizing the brain wave of the user. Brain Wave Color Data#2 Selected Location Data Storage Area H697b5c stores the brain wave color data#2 selected location data which indicates the geographic location of Communication Device 200 at which Brain Wave Color Data#2 is selected by utilizing the brain wave of the user. Brain Wave Color Data#3 Selected Location Data Storage Area H697b5d stores the brain wave color data#3 selected location data which indicates the geographic location of Communication Device 200 at which Brain Wave Color Data#3 is selected by utilizing the brain wave of the user. Brain Wave Color Data#4 Selected Location Data Storage Area H697b5e stores the brain wave color data#4 selected location data which indicates the geographic location of Communication Device 200 at which Brain Wave Color Data#4 is selected by utilizing the brain wave of the user.

This paragraph illustrates the storage area(s) included in Entire Location Icon Data Storage Area H697b7. In the present embodiment, Entire Location Icon Data Storage Area H697b7 includes Current Location Icon Data Storage Area H697b7a, Brain Wave Color Data#1 Selected Location Icon Data Storage Area H697b7b, Brain Wave Color Data#2 Selected Location Icon Data Storage Area H697b7c, Brain Wave Color Data#3 Selected Location Icon Data Storage Area H697b7d, and Brain Wave Color Data#4 Selected Location Icon Data Storage Area H697b7e. Current Location Icon Data Storage Area H697b7a stores the current location icon data which is the image of the icon utilized to indicate the current location data on the map data. Brain Wave Color Data#1 Selected Location Icon Data Storage Area H697b7b stores the brain wave color data#1 selected location icon data which is the image of the icon utilized to indicate the brain wave color data#1 selected location data on the map data. Brain Wave Color Data#2 Selected Location Icon Data Storage Area H697b7c stores the brain wave color data#2 selected location icon data which is the image of the icon utilized to indicate the brain wave color data#2 selected location data on the map data. Brain Wave Color Data#3 Selected Location Icon Data Storage Area H697b7d stores the brain wave color data#3 selected location icon data which is the image of the icon utilized to indicate the brain wave color data#3 selected location data on the map data. Brain Wave Color Data#4 Selected Location Icon Data Storage Area H697b7e stores the brain wave color data#4 selected location icon data which is the image of the icon utilized to indicate the brain wave color data#4 selected location data on the map data.

This paragraph illustrates the software program(s) stored in Brain Wave Color Selecting Software Storage Area H697c. In the present embodiment, Brain Wave Color Selecting Software Storage Area H697c stores Current Location Data Producing Software H697c1, Current Brain Wave Data Producing Software H697c2, Brain Wave Color Data#1 Selecting Software H697c3, Brain Wave Color Data#2 Selecting Software H697c4, Brain Wave Color Data#3 Selecting Software H697c5, Brain Wave Color Data#4 Selecting Software H697c6, and Entire Location Log Displaying Software H697c7. Current Location Data Producing Software H697c1 is the software program described hereinafter. Current Brain Wave Data Producing Software H697c2 is the software program described hereinafter. Brain Wave Color Data#1 Selecting Software H697c3 is the software program described hereinafter. Brain Wave Color Data#2 Selecting Software H697c4 is the software program described hereinafter. Brain Wave Color Data#3 Selecting Software H697c5 is the software program described hereinafter. Brain Wave Color Data#4 Selecting Software H697c6 is the software program described hereinafter. Entire Location Log Displaying Software H697c7 is the software program described hereinafter.

This paragraph illustrates the storage area included in RAM 206 (FIG. 1) of Communication Device 200. In the present embodiment, RAM 206 includes Brain Wave Color Selecting Info Storage Area 206697a of which the data and the software program(s) stored therein are described hereinafter.

The data and/or the software program(s) necessary to implement the present function may be downloaded from Host H to Communication Device 200.

This paragraph illustrates the storage area(s) included in Brain Wave Color Selecting Info Storage Area 206697a. In the present embodiment, Brain Wave Color Selecting Info Storage Area 206697a includes Brain Wave Color Selecting Data Storage Area 206697b and Brain Wave Color Selecting Software Storage Area 206697c. Brain Wave Color Selecting Data Storage Area 206697b stores the data necessary to implement the present function on the side of Communication Device 200, such as the one(s) described hereinafter. Brain Wave Color Selecting Software Storage Area 206697c stores the software program(s) necessary to implement the present function on the side of Communication Device 200, such as the one(s) described hereinafter.

This paragraph illustrates the storage area(s) included in Brain Wave Color Selecting Data Storage Area 206697b. In the present embodiment, Brain Wave Color Selecting Data Storage Area 206697b includes Current Brain Wave Data Storage Area 206697b1, Brain Wave Pattern Data Storage Area 206697b2, Brain Wave Color Data Storage Area 206697b3, Color Notice Data Storage Area 206697b4, Entire Location Data Storage Area 206697b5, Map Data Storage Area 206697b6, Entire Location Icon Data Storage Area 206697b7, and Work Area 206697b8. Current Brain Wave Data Storage Area 206697b1 stores the current brain wave data which indicates the current brain wave retrieved from Brain Wave Retrieving Device BWRD697. Brain Wave Pattern Data Storage Area 206697b2 stores the data described hereinafter. Brain Wave Color Data Storage Area 206697b3 stores the data described hereinafter. Color Notice Data Storage Area 206697b4 stores the data described hereinafter. Entire Location Data Storage Area 206697b5 stores the data described hereinafter. Map Data Storage Area 206697b6 stores the map data which is the image data indicating a map. Entire Location Icon Data Storage Area 206697b7 stores the data described hereinafter. Work Area 206697b8 is utilized as a work area to perform calculation and temporarily store data to implement the present function.

This paragraph illustrates the data stored in Brain Wave Pattern Data Storage Area 206697b2. In the present embodiment, Brain Wave Pattern Data Storage Area 206697b2 comprises two columns, i.e., 'Brain Wave Pattern ID' and 'Brain Wave Pattern Data'. Column 'Brain Wave Pattern ID' stores the brain wave pattern IDs, and each brain wave pattern ID is an identification of the corresponding brain wave pattern data stored in column 'Brain Wave Pattern Data'. Column 'Brain Wave Pattern Data' stores the brain wave pattern data, and each brain wave pattern data indicates a specific pattern of brain wave. In the present embodiment, Brain Wave Pattern Data Storage Area 206697b2 stores the following data: 'Brain Wave Pattern#1' and the corresponding 'Brain Wave Pattern Data#1'; 'Brain Wave Pattern#2' and the corresponding Brain Wave Pattern Data#2; 'Brain Wave Pattern#3' and the corresponding 'Brain Wave Pattern Data#3'; and 'Brain Wave Pattern#4' and the corresponding 'Brain Wave Pattern Data#4'.

This paragraph illustrates the data stored in Brain Wave Color Data Storage Area 206697b3. In the present embodiment, Brain Wave Color Data Storage Area 206697b3 comprises two columns, i.e., 'Brain Wave Pattern ID' and 'Brain Wave Color Data'. Column 'Brain Wave Pattern ID' stores the brain wave pattern IDs, and each brain wave pattern ID is an identification of the corresponding brain wave color data stored in column 'Brain Wave Color Data'. The brain wave pattern IDs stored in the present column are identical to the ones described in the previous paragraph. Column 'Brain Wave Color Data' stores the brain wave color data, and each brain wave color data indicates a specific color (e.g., red, green, blue, or yellow). In the present embodiment, Brain Wave Color Data Storage Area 206697b3 stores the following data: 'Brain Wave Pattern#1' and the corresponding 'Brain Wave Color Data#1'; 'Brain Wave Pattern#2' and the corresponding 'Brain Wave Color Data#2'; 'Brain Wave Pattern#3' and the corresponding 'Brain Wave Color Data#3'; and 'Brain Wave Pattern#4' and the corresponding 'Brain Wave Color Data#4'.

This paragraph illustrates the data stored in Color Notice Data Storage Area 206697b4. In the present embodiment, Color Notice Data Storage Area 206697b4 comprises two columns, i.e., 'Brain Wave Pattern ID' and 'Color Notice Data'. Column 'Brain Wave Pattern ID' stores the brain wave pattern IDs, and each brain wave pattern ID is an identification of the corresponding color notice data stored in column 'Color Notice Data'. The brain wave pattern IDs stored in the present column are identical to the ones described in the previous two paragraphs. Column 'Color Notice Data' stores the color notice data, and each color notice data is the audiovisual data indicating that the corresponding brain wave color data is selected and displayed. In the present embodiment, Color Notice Data Storage Area 206697b4 stores the following data: 'Brain Wave Pattern#1' and the corresponding 'Color Notice Data#1'; 'Brain Wave Pattern#2' and the corresponding 'Color Notice Data#2'; 'Brain Wave Pattern#3' and the corresponding 'Color Notice Data#3'; and 'Brain Wave Pattern#4' and the corresponding 'Color Notice Data#4'.

This paragraph illustrates the storage area(s) included in Entire Location Data Storage Area 206697b5. In the present embodiment, Entire Location Data Storage Area 206697b5 includes Current Location Data Storage Area 206697b5a, Brain Wave Color Data#1 Selected Location Data Storage Area 206697b5b, Brain Wave Color Data#2 Selected Location Data Storage Area 206697b5c, Brain Wave Color Data#3 Selected Location Data Storage Area 206697b5d, and Brain Wave Color Data#4 Selected Location Data Storage Area 206697b5e. Current Location Data Storage Area 206697b5a stores the current location data which indicates the current geographic location of Communication Device 200 is (x,y,z) format. Brain Wave Color Data#1 Selected Location Data Storage Area 206697b5b stores the brain wave color data#1 selected location data which indicates the geographic location of Communication Device 200 at which Brain Wave Color Data#1 is selected by utilizing the brain wave of the user. Brain Wave Color Data#2 Selected Location Data Storage Area 206697b5c stores the brain wave color data#2 selected location data which indicates the geographic location of Communication Device 200 at which Brain Wave Color Data#2 is selected by utilizing the brain wave of the user. Brain Wave Color Data#3 Selected Location Data Storage Area 206697b5d stores the brain wave color data#3 selected location data which indicates the geographic location of Communication Device 200 at which Brain Wave Color Data#3 is selected by utilizing the brain wave of the user. Brain Wave Color Data#4 Selected Location Data Storage Area 206697b5e stores the brain wave color data#4 selected location data which indicates the geographic location of Communication Device 200 at which Brain Wave Color Data#4 is selected by utilizing the brain wave of the user.

This paragraph illustrates the storage area(s) included in Entire Location Icon Data Storage Area 206697b7. In the present embodiment, Entire Location Icon Data Storage Area 206697b7 includes Current Location Icon Data Storage Area 206697b7a, Brain Wave Color Data#1 Selected Location Icon Data Storage Area 206697b7b, Brain Wave Color Data#2 Selected Location Icon Data Storage Area 206697b7c, Brain Wave Color Data#3 Selected Location Icon Data Storage Area 206697b7d, and Brain Wave Color Data#4 Selected Location Icon Data Storage Area 206697b7e. Current Location Icon Data Storage Area 206697b7a stores the current location icon data which is the image of the icon utilized to indicate the current location data on the map data. Brain Wave Color Data#1 Selected Location Icon Data Storage Area 206697b7b stores the brain wave color data#1 selected location icon data which is the image of the icon utilized to indicate the brain wave color data#1 selected location data on the map data. Brain Wave Color Data#2 Selected Location Icon Data Storage Area 206697b7c stores the brain wave color data#2 selected location icon data which is the image of the icon utilized to indicate the brain wave color data#2 selected location data on the map data. Brain Wave Color Data#3 Selected Location Icon Data Storage Area 206697b7d stores the brain wave color data#3 selected location icon data which is the image of the icon utilized to indicate the brain wave color data#3 selected location data on the map data. Brain Wave Color Data#4 Selected Location Icon Data Storage Area 206697b7e stores the brain wave color data#4 selected location icon data which is the image of the icon utilized to indicate the brain wave color data#4 selected location data on the map data.

This paragraph illustrates the software program(s) stored in Brain Wave Color Selecting Software Storage Area 206697c. In the present embodiment, Brain Wave Color Selecting Software Storage Area 206697c stores Current Location Data Producing Software 206697c1, Current Brain Wave Data Producing Software 206697c2, Brain Wave Color Data#1 Selecting Software 206697c3, Brain Wave Color Data#2 Selecting Software 206697c4, Brain Wave Color Data#3 Selecting Software 206697c5, Brain Wave Color Data#4 Selecting Software 206697c6, and Entire Location Log Displaying Software 206697c7. Current Location Data Producing Software 206697c1 is the software program described hereinafter. Current Brain Wave Data Producing Software 206697c2 is the software program described hereinafter. Brain Wave Color Data#1 Selecting Software 206697c3 is the software program described hereinafter. Brain Wave Color Data#2 Selecting Software 206697c4 is the software program described hereinafter. Brain Wave Color Data#3 Selecting Software 206697c5 is the software program described hereinafter. Brain Wave Color Data#4 Selecting Software 206697c6 is the software program described hereinafter. Entire Location Log Displaying Software 206697c7 is the software program described in hereinafter.

This paragraph illustrate(s) Current Location Data Producing Software H697c1 of Host H and Current Location Data Producing Software 206697c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H697b5a (S3). The foregoing sequence is repeated periodically.

This paragraph illustrate(s) Current Brain Wave Data Producing Software H697c2 of Host H and Current Brain Wave Data Producing Software 206697c2 of Communication Device 200, which produce(s) the current brain wave data. In the present embodiment, CPU 211 (FIG. 1) retrieves the brain wave via Brain Wave Retrieving Device BWRD697 (S1). CPU 211 (FIG. 1) produces the current brain wave data by referring to the brain wave retrieved in the previous step and sends the data to Host H in a wireless fashion (S2). Host H receives the current brain wave data from Communication Device 200 and stores the data in Current Brain Wave Data Storage Area H697b1 (S3). The foregoing sequence is repeated periodically.

This paragraph illustrate(s) Brain Wave Color Data#1 Selecting Software H697c3 of Host H and Brain Wave Color Data#1 Selecting Software 206697c3 of Communication Device 200, which select(s) the brain wave color data#1. In the present embodiment, Host H retrieves the current brain wave data from Current Brain Wave Data Storage Area H697b1 (S1). Host H retrieves the brain wave pattern data#1 from Brain Wave Pattern Data Storage Area H697b2 (S2). If the current brain wave data retrieved in S1 matches with the brain wave pattern data#1 retrieved in the previous step, Host H proceeds to the next step (S3). Host H retrieves the brain wave color data#1 from Brain Wave Color Data Storage Area H697b3 and sends the data to Communication Device 200 (S4). CPU 211 (FIG. 1) receives the brain wave color data#1 from Host H in a wireless fashion (S5). CPU 211 (FIG. 1) displays the color (e.g., red) indicated by the brain wave color data#1 received in the previous step on LCD 201 (FIG. 1) (S6). Host H retrieves the color notice data#1 from Color Notice Data Storage Area H697b4 and sends the data to Communication Device 200 (S7). CPU 211 (FIG. 1) receives the color notice data#1 from Host H in a wireless fashion and outputs the data from Speaker 216 (FIG. 1) and LCD 201 (FIG. 1) (S8). Host H retrieves the current location data from Current Location Data Storage Area H697b5a (S9). Host H stores the current location data retrieved in the previous step as the brain wave color data#1 selected location data in Brain Wave Color Data#1 Selected Location Data Storage Area H697b5b (S10). Host H retrieves the map data from Map Data Storage Area H697b6 and sends the data to Communication Device 200 (S11). CPU 211 (FIG. 1) receives the map data from Host H in a wireless fashion and displays the data on LCD 201 (FIG. 1) (S12). Host H retrieves the current location data from Current Location Data Storage Area H697b5a and sends the data to Communication Device 200 (S13). CPU 211 (FIG. 1) receives the current location data from Host H in a wireless fashion (S14). Host H retrieves the current location icon data from Current Location Icon Data Storage Area H697b7a and sends the data to Communication Device 200 (S15). CPU 211 (FIG. 1) receives the current location icon data from Host H in a wireless fashion (S16). CPU 211 (FIG. 1) displays the current location icon data received in the previous step at the location corresponding to the current location data received in S14 on the map data displayed in S12 (S17). The foregoing sequence is repeated periodically.

This paragraph illustrate(s) Brain Wave Color Data#2 Selecting Software H697c4 of Host H and Brain Wave Color Data#2 Selecting Software 206697c4 of Communication Device 200, which select(s) the brain wave color data#2. In the present embodiment, Host H retrieves the current brain wave data from Current Brain Wave Data Storage Area H697b1 (S1). Host H retrieves the brain wave pattern data#2 from Brain Wave Pattern Data Storage Area H697b2 (S2). If the current brain wave data retrieved in S1 matches with the brain wave pattern data#2 retrieved in the previous step, Host H proceeds to the next step (S3). Host H retrieves the brain wave color data#2 from Brain Wave Color Data Storage Area H697b3 and sends the data to Communication Device 200 (S4). CPU 211 (FIG. 1) receives the brain wave color data#2 from Host H in a wireless fashion (S5). CPU 211 (FIG. 1) displays the color (e.g., green) indicated by the brain wave color data#2 received in the previous step on LCD 201 (FIG. 1) (S6). Host H retrieves the color notice data#2 from Color Notice Data Storage Area H697b4 and sends the data to Communication Device 200 (S7). CPU 211 (FIG. 1) receives the color notice data#2 from Host H in a wireless fashion and outputs the data from Speaker 216 (FIG. 1) and LCD 201 (FIG. 1) (S8). Host H retrieves the current location data from Current Location Data Storage Area H697b5a (S9). Host H stores the current location data retrieved in the previous step as the brain wave color data#2 selected location data in Brain Wave Color Data#2 Selected Location Data Storage Area H697b5c (S10). Host H retrieves the map data from Map Data Storage Area H697b6 and sends the data to Communication Device 200 (S11). CPU 211 (FIG. 1) receives the map data from Host H in a wireless fashion and displays the data on LCD 201 (FIG. 1) (S12). Host H retrieves the current location data from Current Location Data Storage Area H697b5a and sends the data to Communication Device 200 (S13). CPU 211 (FIG. 1) receives the current location data from Host H in a wireless fashion (S14). Host H retrieves the current location icon data from Current Location Icon Data Storage Area H697b7a and sends the data to Communication Device 200 (S15). CPU 211 (FIG. 1) receives the current location icon data from Host H in a wireless fashion (S16). CPU 211 (FIG. 1) displays the current location icon data received in the previous step at the location corresponding to the current location data received in S14 on the map data displayed in S12 (S17). The foregoing sequence is repeated periodically.

This paragraph illustrate(s) Brain Wave Color Data#3 Selecting Software H697c5 of Host H and Brain Wave Color Data#3 Selecting Software 206697c5 of Communication Device 200, which select(s) the brain wave color data#3. In the present embodiment, Host H retrieves the current brain wave data from Current Brain Wave Data Storage Area H697b1 (S1). Host H retrieves the brain wave pattern data#3 from Brain Wave Pattern Data Storage Area H697b2 (S2). If the current brain wave data retrieved in S1 matches with the brain wave pattern data#3 retrieved in the previous step, Host H proceeds to the next step (S3). Host H retrieves the brain wave color data#3 from Brain Wave Color Data Storage Area H697b3 and sends the data to Communication Device 200 (S4). CPU 211 (FIG. 1) receives the brain wave color data#3 from Host H in a wireless fashion (S5). CPU 211 (FIG. 1) displays the color (e.g., blue) indicated by the brain wave color data#3 received in the previous step on LCD 201 (FIG. 1) (S6). Host H retrieves the color notice data#3 from Color Notice Data Storage Area H697b4 and sends the data to Communication Device 200 (S7). CPU 211 (FIG. 1) receives the color notice data#3 from Host H in a wireless fashion and outputs the data from Speaker 216 (FIG. 1) and LCD 201 (FIG. 1) (S8). Host H retrieves the current location data from Current Location Data Storage Area H697b5a (S9). Host H stores the current location data retrieved in the previous step as the brain wave color data#3 selected location data in Brain Wave Color Data#3 Selected Location Data Storage Area H697b5d (S10). Host H retrieves the map data from Map Data Storage Area H697b6 and sends the data to Communication Device 200 (S11). CPU 211 (FIG. 1) receives the map data from Host H in a wireless fashion and displays the data on LCD 201 (FIG. 1) (S12). Host H retrieves the current location data from Current Location Data Storage Area H697b5a and sends the data to Communication Device 200 (S13). CPU 211 (FIG. 1) receives the current location data from Host H in a wireless fashion (S14). Host H retrieves the current location icon data from Current Location Icon Data Storage Area H697b7a and sends the data to Communication Device 200 (S15). CPU 211 (FIG. 1) receives the current location icon data from Host H in a wireless fashion (S16). CPU 211 (FIG. 1) displays the current location icon data received in the previous step at the location corresponding to the current location data received in S14 on the map data displayed in S12 (S17). The foregoing sequence is repeated periodically.

This paragraph illustrate(s) Brain Wave Color Data#4 Selecting Software H697c6 of Host H and Brain Wave Color Data#4 Selecting Software 206697c6 of Communication Device 200, which select(s) the brain wave color data#4. In the present embodiment, Host H retrieves the current brain wave data from Current Brain Wave Data Storage Area H697b1 (S1). Host H retrieves the brain wave pattern data#4 from Brain Wave Pattern Data Storage Area H697b2 (S2). If the current brain wave data retrieved in S1 matches with the brain wave pattern data#4 retrieved in the previous step, Host H proceeds to the next step (S3). Host H retrieves the brain wave color data#4 from Brain Wave Color Data Storage Area H697b3 and sends the data to Communication Device 200 (S4). CPU 211 (FIG. 1) receives the brain wave color data#4 from Host H in a wireless fashion (S5). CPU 211 (FIG. 1) displays the color (e.g., yellow) indicated by the brain wave color data#4 received in the previous step on LCD 201 (FIG. 1) (S6). Host H retrieves the color notice data#4 from Color Notice Data Storage Area H697b4 and sends the data to Communication Device 200 (S7). CPU 211 (FIG. 1) receives the color notice data#4 from Host H in a wireless fashion and outputs the data from Speaker 216 (FIG. 1) and LCD 201 (FIG. 1) (S8). Host H retrieves the current location data from Current Location Data Storage Area H697b5a (S9). Host H stores the current location data retrieved in the previous step as the brain wave color data#4 selected location data in Brain Wave Color Data#4 Selected Location Data Storage Area H697b5e (S10). Host H retrieves the map data from Map Data Storage Area H697b6 and sends the data to Communication Device 200 (S11). CPU 211 (FIG. 1) receives the map data from Host H in a wireless fashion and displays the data on LCD 201 (FIG. 1) (S12). Host H retrieves the current location data from Current Location Data Storage Area H697b5a and sends the data to Communication Device 200 (S13). CPU 211 (FIG. 1) receives the current location data from Host H in a wireless fashion (S14). Host H retrieves the current location icon data from Current Location Icon Data Storage Area H697b7a and sends the data to Communication Device 200 (S15). CPU 211 (FIG. 1) receives the current location icon data from Host H in a wireless fashion (S16). CPU 211 (FIG. 1) displays the current location icon data received in the previous step at the location corresponding to the current location data received in S14 on the map data displayed in S12 (S17). The foregoing sequence is repeated periodically.

This paragraph illustrate(s) Entire Location Log Displaying Software H697c7 of Host H and Entire Location Log Displaying Software 206697c7 of Communication Device 200, which display(s) the entire location log. In the present embodiment, Host H retrieves the map data from Map Data Storage Area H697b6 and sends the data to Communication Device 200 (S1). CPU 211 (FIG. 1) receives the map data from Host H in a wireless fashion and displays the data on LCD 201 (FIG. 1) (S2). Host H retrieves the current location data from Current Location Data Storage Area H697b5a and sends the data to Communication Device 200 (S3). CPU 211 (FIG. 1) receives the current location data from Host H in a wireless fashion (S4). Host H retrieves the current location icon data from Current Location Icon Data Storage Area H697b7a and sends the data to Communication Device 200 (S5). CPU 211 (FIG. 1) receives the current location icon data from Host H in a wireless fashion (S6). CPU 211 (FIG. 1) displays the current location icon data received in the previous step at the location corresponding to the current location data received in S4 on the map data displayed in S2 (S7). Host H retrieves the brain wave color data#1 selected location data from Brain Wave Color Data#1 Selected Location Data Storage Area H697b5b and sends the data to Communication Device 200 (S8). CPU 211 (FIG. 1) receives the brain wave color data#1 selected location data from Host H in a wireless fashion (S9). Host H retrieves the brain wave color data#1 selected location icon data from Brain Wave Color Data#1 Selected Location Icon Data Storage Area H697b7b and sends the data to Communication Device 200 (S10). CPU 211 (FIG. 1) receives the brain wave color data#1 selected location icon data from Host H in a wireless fashion (S11). CPU 211 (FIG. 1) displays the brain wave color data#1 selected location icon data received in the previous step at the location corresponding to the brain wave color data#1 selected location data received in S9 on the map data displayed in S2 (S12). Host H retrieves the brain wave color data#2 selected location data from Brain Wave Color Data#2 Selected Location Data Storage Area H697b5c and sends the data to Communication Device 200 (S13). CPU 211 (FIG. 1) receives the brain wave color data#2 selected location data from Host H in a wireless fashion (S14). Host H retrieves the brain wave color data#2 selected location icon data from Brain Wave Color Data#2 Selected Location Icon Data Storage Area H697b7c and sends the data to Communication Device 200 (S15). CPU 211 (FIG. 1) receives the brain wave color data#2 selected location icon data from Host H in a wireless fashion (S16). CPU 211 (FIG. 1) displays the brain wave color data#2 selected location icon data received in the previous step at the location corresponding to the brain wave color data#2 selected location data received in S14 on the map data displayed in S2 (S17). Host H retrieves the brain wave color data#3 selected location data from Brain Wave Color Data#3 Selected Location Data Storage Area H697b5d and sends the data to Communication Device 200 (S18). CPU 211 (FIG. 1) receives the brain wave color data#3 selected location data from Host H in a wireless fashion (S19). Host H retrieves the brain wave color data#3 selected location icon data from Brain Wave Color Data#3 Selected Location Icon Data Storage Area H697b7d and sends the data to Communication Device 200 (S20). CPU 211 (FIG. 1) receives the brain wave color data#3 selected location icon data from Host H in a wireless fashion (S21). CPU 211 (FIG. 1) displays the brain wave color data#3 selected location icon data received in the previous step at the location corresponding to the brain wave color data#3 selected location data received in S19 on the map data displayed in S2 (S22). Host H retrieves the brain wave color data#4 selected location data from Brain Wave Color Data#4 Selected Location Data Storage Area H697b5e and sends the data to Communication Device 200 (S23). CPU 211 (FIG. 1) receives the brain wave color data#4 selected location data from Host H in a wireless fashion (S24). Host H retrieves the brain wave color data#4 selected location icon data from Brain Wave Color Data#4 Selected Location Icon Data Storage Area H697b7e and sends the data to Communication Device 200 (S25). CPU 211 (FIG. 1) receives the brain wave color data#4 selected location icon data from Host H in a wireless fashion (S26). CPU 211 (FIG. 1) displays the brain wave color data#4 selected location icon data received in the previous step at the location corresponding to the brain wave color data#4 selected location data received in S24 on the map data displayed in S2 (S27). The foregoing sequence is repeated periodically.

The following paragraphs illustrate another embodiment wherein Communication Device 200 plays the major role in implementing the present function.

This paragraph illustrate(s) Current Location Data Producing Software 206697c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206697b5a (S3). The foregoing sequence is repeated periodically.

This paragraph illustrate(s) Current Brain Wave Data Producing Software 206697c2 of Communication Device 200, which produce(s) the current brain wave data. In the present embodiment, CPU 211 (FIG. 1) retrieves the brain wave via Brain Wave Retrieving Device BWRD697 (S1). CPU 211 (FIG. 1) produces the current brain wave data by referring to the brain wave retrieved in the previous step (S2). CPU 211 (FIG. 1) stores the current brain wave data produced in the previous step in Current Brain Wave Data Storage Area 206697b1 (S3). The foregoing sequence is repeated periodically.

This paragraph illustrate(s) Brain Wave Color Data#1 Selecting Software 206697c3 of Communication Device 200, which select(s) the brain wave color data#1. In the present embodiment, CPU 211 (FIG. 1) retrieves the current brain wave data from Current Brain Wave Data Storage Area 206697b1 (S1). CPU 211 (FIG. 1) retrieves the brain wave pattern data#1 from Brain Wave Pattern Data Storage Area 206697b2 (S2). If the current brain wave data retrieved in S1 matches with the brain wave pattern data#1 retrieved in the previous step, CPU 211 (FIG. 1) proceeds to the next step (S3). CPU 211 (FIG. 1) retrieves the brain wave color data#1 from Brain Wave Color Data Storage Area 206697b3 (S4). CPU 211 (FIG. 1) displays the color (e.g., red) indicated by the brain wave color data#1 retrieved in the previous step on LCD 201 (FIG. 1) (S5). CPU 211 (FIG. 1) retrieves the color notice data#1 from Color Notice Data Storage Area 206697b4 (S6). CPU 211 (FIG. 1) outputs the color notice data#1 retrieved in the previous step from Speaker 216 (FIG. 1) and LCD 201 (FIG. 1) (S7). CPU 211 (FIG. 1) retrieves the current location data from Current Location Data Storage Area 206697b5a (S8). CPU 211 (FIG. 1) stores the current location data retrieved in the previous step as the brain wave color data#1 selected location data in Brain Wave Color Data#1 Selected Location Data Storage Area 206697b5b (S9). CPU 211 (FIG. 1) retrieves the map data from Map Data Storage Area 206697b6 (S10). CPU 211 (FIG. 1) displays the map data retrieved in the previous step on LCD 201 (FIG. 1) (S11). CPU 211 (FIG. 1) retrieves the current location data from Current Location Data Storage Area 206697b5a (S12). CPU 211 (FIG. 1) retrieves the current location icon data from Current Location Icon Data Storage Area 206697b7a (S13). CPU 211 (FIG. 1) displays the current location icon data retrieved in the previous step at the location corresponding to the current location data retrieved in S12 on the map data displayed in S11 (S14). The foregoing sequence is repeated periodically.

This paragraph illustrate(s) Brain Wave Color Data#2 Selecting Software 206697c4 of Communication Device 200, which select(s) the brain wave color data#2. In the present embodiment, CPU 211 (FIG. 1) retrieves the current brain wave data from Current Brain Wave Data Storage Area 206697b1 (S1). CPU 211 (FIG. 1) retrieves the brain wave pattern data#2 from Brain Wave Pattern Data Storage Area 206697b2 (S2). If the current brain wave data retrieved in S1 matches with the brain wave pattern data#2 retrieved in the previous step, CPU 211 (FIG. 1) proceeds to the next step (S3). CPU 211 (FIG. 1) retrieves the brain wave color data#2 from Brain Wave Color Data Storage Area 206697b3 (S4). CPU 211 (FIG. 1) displays the color (e.g., green) indicated by the brain wave color data#2 retrieved in the previous step on LCD 201 (FIG. 1) (S5). CPU 211 (FIG. 1) retrieves the color notice data#2 from Color Notice Data Storage Area 206697b4 (S6). CPU 211 (FIG. 1) outputs the color notice data#2 retrieved in the previous step from Speaker 216 (FIG. 1) and LCD 201 (FIG. 1) (S7). CPU 211 (FIG. 1) retrieves the current location data from Current Location Data Storage Area 206697b5a (S8). CPU 211 (FIG. 1) stores the current location data retrieved in the previous step as the brain wave color data#2 selected location data in Brain Wave Color Data#2 Selected Location Data Storage Area 206697b5c (S9). CPU 211 (FIG. 1) retrieves the map data from Map Data Storage Area 206697b6 (S10). CPU 211 (FIG. 1) displays the map data retrieved in the previous step on LCD 201 (FIG. 1) (S11). CPU 211 (FIG. 1) retrieves the current location data from Current Location Data Storage Area 206697b5a (S12). CPU 211 (FIG. 1) retrieves the current location icon data from Current Location Icon Data Storage Area 206697b7a (S13). CPU 211 (FIG. 1) displays the current location icon data retrieved in the previous step at the location corresponding to the current location data retrieved in S12 on the map data displayed in S11 (S14). The foregoing sequence is repeated periodically.

This paragraph illustrate(s) Brain Wave Color Data#3 Selecting Software 206697c5 of Communication Device 200, which select(s) the brain wave color data#3. In the present embodiment, CPU 211 (FIG. 1) retrieves the current brain wave data from Current Brain Wave Data Storage Area 206697b1 (S1). CPU 211 (FIG. 1) retrieves the brain wave pattern data#3 from Brain Wave Pattern Data Storage Area 206697b2 (S2). If the current brain wave data retrieved in S1 matches with the brain wave pattern data#3 retrieved in the previous step, CPU 211 (FIG. 1) proceeds to the next step (S3). CPU 211 (FIG. 1) retrieves the brain wave color data#3 from Brain Wave Color Data Storage Area 206697b3 (S4). CPU 211 (FIG. 1) displays the color (e.g., blue) indicated by the brain wave color data#3 retrieved in the previous step on LCD 201 (FIG. 1) (S5). CPU 211 (FIG. 1) retrieves the color notice data#3 from Color Notice Data Storage Area 206697b4 (S6). CPU 211 (FIG. 1) outputs the color notice data#3 retrieved in the previous step from Speaker 216 (FIG. 1) and LCD 201 (FIG. 1) (S7). CPU 211 (FIG. 1) retrieves the current location data from Current Location Data Storage Area 206697b5a (S8). CPU 211 (FIG. 1) stores the current location data retrieved in the previous step as the brain wave color data#3 selected location data in Brain Wave Color Data#3 Selected Location Data Storage Area 206697b5d (S9). CPU 211 (FIG. 1) retrieves the map data from Map Data Storage Area 206697b6 (S10). CPU 211 (FIG. 1) displays the map data retrieved in the previous step on LCD 201 (FIG. 1) (S11). CPU 211 (FIG. 1) retrieves the current location data from Current Location Data Storage Area 206697b5a (S12). CPU 211 (FIG. 1) retrieves the current location icon data from Current Location Icon Data Storage Area 206697b7a (S13). CPU 211 (FIG. 1) displays the current location icon data retrieved in the previous step at the location corresponding to the current location data retrieved in S12 on the map data displayed in S11 (S14). The foregoing sequence is repeated periodically.

This paragraph illustrate(s) Brain Wave Color Data#4 Selecting Software 206697c6 of Communication Device 200, which select(s) the brain wave color data#4. In the present embodiment, CPU 211 (FIG. 1) retrieves the current brain wave data from Current Brain Wave Data Storage Area 206697b1 (S1). CPU 211 (FIG. 1) retrieves the brain wave pattern data#4 from Brain Wave Pattern Data Storage Area 206697b2 (S2). If the current brain wave data retrieved in S1 matches with the brain wave pattern data#4 retrieved in the previous step, CPU 211 (FIG. 1) proceeds to the next step (S3). CPU 211 (FIG. 1) retrieves the brain wave color data#4 from Brain Wave Color Data Storage Area 206697b3 (S4). CPU 211 (FIG. 1) displays the color (e.g., yellow) indicated by the brain wave color data#4 retrieved in the previous step on LCD 201 (FIG. 1) (S5). CPU 211 (FIG. 1) retrieves the color notice data#4 from Color Notice Data Storage Area 206697b4 (S6). CPU 211 (FIG. 1) outputs the color notice data#4 retrieved in the previous step from Speaker 216 (FIG. 1) and LCD 201 (FIG. 1) (S7). CPU 211 (FIG. 1) retrieves the current location data from Current Location Data Storage Area 206697b5a (S8). CPU 211 (FIG. 1) stores the current location data retrieved in the previous step as the brain wave color data#4 selected location data in Brain Wave Color Data#4 Selected Location Data Storage Area 206697b5e (S9). CPU 211 (FIG. 1) retrieves the map data from Map Data Storage Area 206697b6 (S10). CPU 211 (FIG. 1) displays the map data retrieved in the previous step on LCD 201 (FIG. 1) (S11). CPU 211 (FIG. 1) retrieves the current location data from Current Location Data Storage Area 206697b5a (S12). CPU 211 (FIG. 1) retrieves the current location icon data from Current Location Icon Data Storage Area 206697b7a (S13). CPU 211 (FIG. 1) displays the current location icon data retrieved in the previous step at the location corresponding to the current location data retrieved in S12 on the map data displayed in S11 (S14). The foregoing sequence is repeated periodically.

This paragraph illustrate(s) Entire Location Log Displaying Software 206697c7 of Communication Device 200, which display(s) the entire location log. In the present embodiment, CPU 211 (FIG. 1) retrieves the map data from Map Data Storage Area 206697b6 (S1). CPU 211 (FIG. 1) displays the map data retrieved in the previous step on LCD 201 (FIG. 1) (S2). CPU 211 (FIG. 1) retrieves the current location data from Current Location Data Storage Area 206697b5a (S3). CPU 211 (FIG. 1) retrieves the current location icon data from Current Location Icon Data Storage Area 206697b7a (S4). CPU 211 (FIG. 1) displays the current location icon data retrieved in the previous step at the location corresponding to the current location data retrieved in S3 on the map data displayed in S2 (S5). CPU 211 (FIG. 1) retrieves the brain wave color data#1 selected location data from Brain Wave Color Data#1 Selected Location Data Storage Area 206697b5b (S6). CPU 211 (FIG. 1) retrieves the brain wave color data#1 selected location icon data from Brain Wave Color Data#1 Selected Location Icon Data Storage Area 206697b7b (S7). CPU 211 (FIG. 1) displays the brain wave color data#1 selected location icon data retrieved in the previous step at the location corresponding to the brain wave color data#1 selected location data retrieved in S6 on the map data displayed in S2 (S8). CPU 211 (FIG. 1) retrieves the brain wave color data#2 selected location data from Brain Wave Color Data#2 Selected Location Data Storage Area 206697b5c (S9). CPU 211 (FIG. 1) retrieves the brain wave color data#2 selected location icon data from Brain Wave Color Data#2 Selected Location Icon Data Storage Area 206697b7c (S10). CPU 211 (FIG. 1) displays the brain wave color data#2 selected location icon data retrieved in the previous step at the location corresponding to the brain wave color data#2 selected location data retrieved in S9 on the map data displayed in S2 (S11). CPU 211 (FIG. 1) retrieves the brain wave color data#3 selected location data from Brain Wave Color Data#3 Selected Location Data Storage Area 206697b5d (S12). CPU 211 (FIG. 1) retrieves the brain wave color data#3 selected location icon data from Brain Wave Color Data#3 Selected Location Icon Data Storage Area 206697b7d (S13). CPU 211 (FIG. 1) displays the brain wave color data#3 selected location icon data retrieved in the previous step at the location corresponding to the brain wave color data#3 selected location data retrieved in S12 on the map data displayed in S2 (S14). CPU 211 (FIG. 1) retrieves the brain wave color data#4 selected location data from Brain Wave Color Data#4 Selected Location Data Storage Area 206697b5e (S15). CPU 211 (FIG. 1) retrieves the brain wave color data#4 selected location icon data from Brain Wave Color Data#4 Selected Location Icon Data Storage Area 206697b7e (S16). CPU 211 (FIG. 1) displays the brain wave color data#4 selected location icon data retrieved in the previous step at the location corresponding to the brain wave color data#4 selected location data retrieved in S15 on the map data displayed in S2 (S17). The foregoing sequence is repeated periodically.

<<Brain Wave Font Selecting Function>>

The following paragraphs illustrate the brain wave font selecting function, wherein a current brain wave data which indicates the current brain wave of the user of said communication device is identified, a specific font corresponding to said current brain wave data is identified and a text data decorated with said specific font is displayed on said display, a font notice data indicating that said specific font is selected and said text data decorated with said specific font is displayed is output from said communication device, and a current location data which indicates the current geographic location of said communication device and a specific font selected location data which indicates the geographic location at which said specific font is selected are indicated on said display.

This paragraph illustrates the major element included in Communication Device 200 utilized to implement the present function. In the present embodiment, Brain Wave Retrieving Device BWRD698 is connected to Data Bus 203 (FIG. 1). Brain Wave Retrieving Device BWRD698 is the device utilized to retrieve the current brain wave of the user of Communication Device 200.

This paragraph illustrates the storage area included in Host H. In the present embodiment, Host H includes Brain Wave Font Selecting Info Storage Area H698a of which the data and the software program(s) stored therein are described hereinafter.

This paragraph illustrates the storage area(s) included in Brain Wave Font Selecting Info Storage Area H698a. In the present embodiment, Brain Wave Font Selecting Info Storage Area H698a includes Brain Wave Font Selecting Data Storage Area H698b and Brain Wave Font Selecting Software Storage Area H698c. Brain Wave Font Selecting Data Storage Area H698b stores the data necessary to implement the present function on the side of Host H, such as the one(s) described hereinafter. Brain Wave Font Selecting Software Storage Area H698c stores the software program(s) necessary to implement the present function on the side of Host H, such as the one(s) described hereinafter.

This paragraph illustrates the storage area(s) included in Brain Wave Font Selecting Data Storage Area H698b. In the present embodiment, Brain Wave Font Selecting Data Storage Area H698b includes Original Text Data Storage Area H698b1, Decorated Text Data Storage Area H698b2, Current Brain Wave Data Storage Area H698b3, Brain Wave Pattern Data Storage Area H698b4, Brain Wave Font Data Storage Area H698b5, Font Notice Data Storage Area H698b6, Entire Location Data Storage Area H698b7, Map Data Storage Area H698b8, Entire Location Icon Data Storage Area H698b9, and Work Area H698b10. Original Text Data Storage Area H698b1 stores the original text data which is the alphanumeric data which is not decorated by any font. As another embodiment, the original text data may be the alphanumeric data decorated by a default font (e.g., Arial). Decorated Text Data Storage Area H698b2 stores the decorated text data which is the alphanumeric data which is decorated by a specific font. Current Brain Wave Data Storage Area H698b3 stores the current brain wave data which indicates the current brain wave retrieved from Brain Wave Retrieving Device BWRD698. Brain Wave Pattern Data Storage Area H698b4 stores the data described hereinafter. Brain Wave Font Data Storage Area H698b5 stores the data described hereinafter. Font Notice Data Storage Area H698b6 stores the data described hereinafter. Entire Location Data Storage Area H698b7 stores the data described hereinafter. Map Data Storage Area H698b8 stores the map data which is the image data indicating a map. Entire Location Icon Data Storage Area H698b9 stores the data described hereinafter. Work Area H698b10 is utilized as a work area to perform calculation and temporarily store data to implement the present function.

This paragraph illustrates the data stored in Brain Wave Pattern Data Storage Area H698b4. In the present embodiment, Brain Wave Pattern Data Storage Area H698b4 comprises two columns, i.e., 'Brain Wave Pattern ID' and 'Brain Wave Pattern Data'. Column 'Brain Wave Pattern ID' stores the brain wave pattern IDs, and each brain wave pattern ID is an identification of the corresponding brain wave pattern data stored in column 'Brain Wave Pattern Data'. Column 'Brain Wave Pattern Data' stores the brain wave pattern data, and each brain wave pattern data indicates a specific pattern of brain wave. In the present embodiment, Brain Wave Pattern Data Storage Area H698b4 stores the following data: 'Brain Wave Pattern#1' and the corresponding 'Brain Wave Pattern Data#1; 'Brain Wave Pattern#2' and the corresponding Brain Wave Pattern Data#2'; 'Brain Wave Pattern#3' and the corresponding 'Brain Wave Pattern Data#3'; and 'Brain Wave Pattern#4' and the corresponding 'Brain Wave Pattern Data#4'.

This paragraph illustrates the data stored in Brain Wave Font Data Storage Area H698b5. In the present embodiment, Brain Wave Font Data Storage Area H698b5 comprises two columns, i.e., 'Brain Wave Pattern ID' and 'Brain Wave Font Data'. Column 'Brain Wave Pattern ID' stores the brain wave pattern IDs, and each brain wave pattern ID is an identification of the corresponding brain wave font data stored in column 'Brain Wave Font Data'. The brain wave pattern IDs stored in the present column are identical to the ones described in the previous paragraph. Column 'Brain Wave Font Data' stores the brain wave font data, and each brain wave font data indicates a specific font (e.g., Arial, Century, Courier New, or Times New Roman) In the present embodiment, Brain Wave Font Data Storage Area H698b5 stores the following data: 'Brain Wave Pattern#1' and the corresponding 'Brain Wave Font Data#1'; 'Brain Wave Pattern#2' and the corresponding 'Brain Wave Font Data#2'; 'Brain Wave Pattern#3' and the corresponding 'Brain Wave Font Data#3'; and 'Brain Wave Pattern#4' and the corresponding 'Brain Wave Font Data#4'.

This paragraph illustrates the data stored in Font Notice Data Storage Area H698b6. In the present embodiment, Font Notice Data Storage Area H698b6 comprises two columns, i.e., 'Brain Wave Pattern ID' and 'Font Notice Data'. Column 'Brain Wave Pattern ID' stores the brain wave pattern IDs, and each brain wave pattern ID is an identification of the corresponding font notice data stored in column 'Font Notice Data'. The brain wave pattern IDs stored in the present column are identical to the ones described in the previous two paragraphs. Column 'Font Notice Data' stores the font notice data, and each font notice data is the audiovisual data indicating that the corresponding brain wave font data is selected and displayed. In the present embodiment, Font Notice Data Storage Area H698b6 stores the following data: 'Brain Wave Pattern#1' and the corresponding 'Font Notice Data#1'; 'Brain Wave Pattern#2' and the corresponding 'Font Notice Data#2'; 'Brain Wave Pattern#3' and the corresponding 'Font Notice Data#3'; and 'Brain Wave Pattern#4' and the corresponding 'Font Notice Data#4'.

This paragraph illustrates the storage area(s) included in Entire Location Data Storage Area H698b7. In the present embodiment, Entire Location Data Storage Area H698b7 includes Current Location Data Storage Area H698b7a, Brain Wave Font Data#1 Selected Location Data Storage Area H698b7b, Brain Wave Font Data#2 Selected Location Data Storage Area H698b7c, Brain Wave Font Data#3 Selected Location Data Storage Area H698b7d, and Brain Wave Font Data#4 Selected Location Data Storage Area H698b7e. Current Location Data Storage Area H698b7a stores the current location data which indicates the current geographic location of Communication Device 200 is (x,y,z) format. Brain Wave Font Data#1 Selected Location Data Storage Area H698b7b stores the brain wave font data#1 selected location data which indicates the geographic location of Communication Device 200 at which Brain Wave Font Data#1 is selected by utilizing the brain wave of the user. Brain Wave Font Data#2 Selected Location Data Storage Area H698b7c stores the brain wave font data#2 selected location data which indicates the geographic location of Communication Device 200 at which Brain Wave Font Data#2 is selected by utilizing the brain wave of the user. Brain Wave Font Data#3 Selected Location Data Storage Area H698b7d stores the brain wave font data#3 selected location data which indicates the geographic location of Communication Device 200 at which Brain Wave Font Data#3 is selected by utilizing the brain wave of the user. Brain Wave Font Data#4 Selected Location Data Storage Area H698b7e stores the brain wave font data#4 selected location data which indicates the geographic location of Communication Device 200 at which Brain Wave Font Data#4 is selected by utilizing the brain wave of the user.

This paragraph illustrates the storage area(s) included in Entire Location Icon Data Storage Area H698b9. In the present embodiment, Entire Location Icon Data Storage Area H698b9 includes Current Location Icon Data Storage Area H698b9a, Brain Wave Font Data#1 Selected Location Icon Data Storage Area H698b9b, Brain Wave Font Data#2 Selected Location Icon Data Storage Area H698b9c, Brain Wave Font Data#3 Selected Location Icon Data Storage Area H698b9d, and Brain Wave Font Data#4 Selected Location Icon Data Storage Area H698b9e. Current Location Icon Data Storage Area H698b9a stores the current location icon data which is the image of the icon utilized to indicate the current location data on the map data. Brain Wave Font Data#1 Selected Location Icon Data Storage Area H698b9b stores the brain wave font data#1 selected location icon data which is the image of the icon utilized to indicate the brain wave font data#1 selected location data on the map data. Brain Wave Font Data#2 Selected Location Icon Data Storage Area H698b9c stores the brain wave font data#2 selected location icon data which is the image of the icon utilized to indicate the brain wave font data#2 selected location data on the map data. Brain Wave Font Data#3 Selected Location Icon Data Storage Area H698b9d stores the brain wave font data#3 selected location icon data which is the image of the icon utilized to indicate the brain wave font data#3 selected location data on the map data. Brain Wave Font Data#4 Selected Location Icon Data Storage Area H698b9e stores the brain wave font data#4 selected location icon data which is the image of the icon utilized to indicate the brain wave font data#4 selected location data on the map data.

This paragraph illustrates the software program(s) stored in Brain Wave Font Selecting Software Storage Area H698c. In the present embodiment, Brain Wave Font Selecting Software Storage Area H698c stores Current Location Data Producing Software H698c1, Current Brain Wave Data Producing Software H698c2, Brain Wave Font Data#1 Selecting Software H698c3, Brain Wave Font Data#2 Selecting Software H698c4, Brain Wave Font Data#3 Selecting Software H698c5, Brain Wave Font Data#4 Selecting Software H698c6, and Entire Location Log Displaying Software H698c7. Current Location Data Producing Software H698c1 is the software program described hereinafter. Current Brain Wave Data Producing Software H698c2 is the software program described hereinafter. Brain Wave Font Data#1 Selecting Software H698c3 is the software program described hereinafter. Brain Wave Font Data#2 Selecting Software H698c4 is the software program described hereinafter. Brain Wave Font Data#3 Selecting Software H698c5 is the software program described hereinafter. Brain Wave Font Data#4 Selecting Software H698c6 is the software program described hereinafter. Entire Location Log Displaying Software H698c7 is the software program described hereinafter.

This paragraph illustrates the storage area included in RAM 206 (FIG. 1) of Communication Device 200. In the present embodiment, RAM 206 includes Brain Wave Font Selecting Info Storage Area 206698a of which the data and the software program(s) stored therein are described hereinafter.

The data and/or the software program(s) necessary to implement the present function may be downloaded from Host H to Communication Device 200.

This paragraph illustrates the storage area(s) included in Brain Wave Font Selecting Info Storage Area 206698a. In the present embodiment, Brain Wave Font Selecting Info Storage Area 206698a includes Brain Wave Font Selecting Data Storage Area 206698b and Brain Wave Font Selecting Software Storage Area 206698c. Brain Wave Font Selecting Data Storage Area 206698b stores the data necessary to implement the present function on the side of Communication Device 200, such as the one(s) described hereinafter. Brain Wave Font Selecting Software Storage Area 206698c stores the software program(s) necessary to implement the present function on the side of Communication Device 200, such as the one(s) described hereinafter.

This paragraph illustrates the storage area(s) included in Brain Wave Font Selecting Data Storage Area 206698b. In the present embodiment, Brain Wave Font Selecting Data Storage Area 206698b includes Original Text Data Storage Area 206698b1, Decorated Text Data Storage Area 206698b2, Current Brain Wave Data Storage Area 206698b3, Brain Wave Pattern Data Storage Area 206698b4, Brain Wave Font Data Storage Area 206698b5, Font Notice Data Storage Area 206698b6, Entire Location Data Storage Area 206698b7, Map Data Storage Area 206698b8, Entire Location Icon Data Storage Area 206698b9, and Work Area 206698b10. Original Text Data Storage Area 206698b1 stores the original text data which is the alphanumeric data which is not decorated by any font. As another embodiment, the original text data may be the alphanumeric data decorated by a default font (e.g., Arial). Decorated Text Data Storage Area 206698b2 stores the decorated text data which is the alphanumeric data which is decorated by a specific font. Current Brain Wave Data Storage Area 206698b3 stores the current brain wave data which indicates the current brain wave retrieved from Brain Wave Retrieving Device BWRD698. Brain Wave Pattern Data Storage Area 206698b4 stores the data described hereinafter. Brain Wave Font Data Storage Area 206698b5 stores the data described hereinafter. Font Notice Data Storage Area 206698b6 stores the data described hereinafter. Entire Location Data Storage Area 206698b7 stores the data described hereinafter. Map Data Storage Area 206698b8 stores the map data which is the image data indicating a map. Entire Location Icon Data Storage Area 206698b9 stores the data described hereinafter. Work Area 206698b10 is utilized as a work area to perform calculation and temporarily store data to implement the present function.

This paragraph illustrates the data stored in Brain Wave Pattern Data Storage Area 206698b4. In the present embodiment, Brain Wave Pattern Data Storage Area 206698b4 comprises two columns, i.e., 'Brain Wave Pattern ID' and 'Brain Wave Pattern Data'. Column 'Brain Wave Pattern ID' stores the brain wave pattern IDs, and each brain wave pattern ID is an identification of the corresponding brain wave pattern data stored in column 'Brain Wave Pattern Data'. Column 'Brain Wave Pattern Data' stores the brain wave pattern data, and each brain wave pattern data indicates a specific pattern of brain wave. In the present embodiment, Brain Wave Pattern Data Storage Area 206698b4 stores the following data: 'Brain Wave Pattern#1' and the corresponding 'Brain Wave Pattern Data#1'; 'Brain Wave Pattern#2' and the corresponding Brain Wave Pattern Data#2; 'Brain Wave Pattern#3' and the corresponding 'Brain Wave Pattern Data#3'; and 'Brain Wave Pattern#4' and the corresponding 'Brain Wave Pattern Data#4'.

This paragraph illustrates the data stored in Brain Wave Font Data Storage Area 206698b5. In the present embodiment, Brain Wave Font Data Storage Area 206698b5 comprises two columns, i.e., 'Brain Wave Pattern ID' and 'Brain Wave Font Data'. Column 'Brain Wave Pattern ID' stores the brain wave pattern IDs, and each brain wave pattern ID is an identification of the corresponding brain wave font data stored in column 'Brain Wave Font Data'. The brain wave pattern IDs stored in the present column are identical to the ones described in the previous paragraph. Column 'Brain Wave Font Data' stores the brain wave font data, and each brain wave font data indicates a specific font (e.g., Arial, Century, Courier New, or Times New Roman) In the present embodiment, Brain Wave Font Data Storage Area 206698b5 stores the following data: 'Brain Wave Pattern#1' and the corresponding 'Brain Wave Font Data#1'; 'Brain Wave Pattern#2' and the corresponding 'Brain Wave Font Data#2'; 'Brain Wave Pattern#3' and the corresponding 'Brain Wave Font Data#3'; and 'Brain Wave Pattern#4' and the corresponding Brain Wave Font Data#4'.

This paragraph illustrates the data stored in Font Notice Data Storage Area 206698b6. In the present embodiment, Font Notice Data Storage Area 206698b6 comprises two columns, i.e., 'Brain Wave Pattern ID' and 'Font Notice Data'. Column 'Brain Wave Pattern ID' stores the brain wave pattern IDs, and each brain wave pattern ID is an identification of the corresponding font notice data stored in column 'Font Notice Data'. The brain wave pattern IDs stored in the present column are identical to the ones described in the previous two paragraphs. Column 'Font Notice Data' stores the font notice data, and each font notice data is the audiovisual data indicating that the corresponding brain wave font data is selected and displayed. In the present embodiment, Font Notice Data Storage Area 206698b6 stores the following data: 'Brain Wave Pattern#1' and the corresponding 'Font Notice Data#1'; 'Brain Wave Pattern#2' and the corresponding 'Font Notice Data#2'; 'Brain Wave Pattern#3' and the corresponding 'Font Notice Data#3'; and 'Brain Wave Pattern#4' and the corresponding 'Font Notice Data#4'.

This paragraph illustrates the storage area(s) included in Entire Location Data Storage Area 206698b7. In the present embodiment, Entire Location Data Storage Area 206698b7 includes Current Location Data Storage Area 206698b7a, Brain Wave Font Data#1 Selected Location Data Storage Area 206698b7b, Brain Wave Font Data#2 Selected Location Data Storage Area 206698b7c, Brain Wave Font Data#3 Selected Location Data Storage Area 206698b7d, and Brain Wave Font Data#4 Selected Location Data Storage Area 206698b7e. Current Location Data Storage Area 206698b7a stores the current location data which indicates the current geographic location of Communication Device 200 is (x,y,z) format. Brain Wave Font Data#1 Selected Location Data Storage Area 206698b7b stores the brain wave font data#1 selected location data which indicates the geographic location of Communication Device 200 at which Brain Wave Font Data#1 is selected by utilizing the brain wave of the user. Brain Wave Font Data#2 Selected Location Data Storage Area 206698b7c stores the brain wave font data#2 selected location data which indicates the geographic location of Communication Device 200 at which Brain Wave Font Data#2 is selected by utilizing the brain wave of the user. Brain Wave Font Data#3 Selected Location Data Storage Area 206698b7d stores the brain wave font data#3 selected location data which indicates the geographic location of Communication Device 200 at which Brain Wave Font Data#3 is selected by utilizing the brain wave of the user. Brain Wave Font Data#4 Selected Location Data Storage Area 206698b7e stores the brain wave font data#4 selected location data which indicates the geographic location of Communication Device 200 at which Brain Wave Font Data#4 is selected by utilizing the brain wave of the user.

This paragraph illustrates the storage area(s) included in Entire Location Icon Data Storage Area 206698b9. In the present embodiment, Entire Location Icon Data Storage Area 206698b9 includes Current Location Icon Data Storage Area 206698b9a, Brain Wave Font Data#1 Selected Location Icon Data Storage Area 206698b9b, Brain Wave Font Data#2 Selected Location Icon Data Storage Area 206698b9c, Brain Wave Font Data#3 Selected Location Icon Data Storage Area 206698b9d, and Brain Wave Font Data#4 Selected Location Icon Data Storage Area 206698b9e. Current Location Icon Data Storage Area 206698b9a stores the current location icon data which is the image of the icon utilized to indicate the current location data on the map data. Brain Wave Font Data#1 Selected Location Icon Data Storage Area 206698b9b stores the brain wave font data#1 selected location icon data which is the image of the icon utilized to indicate the brain wave font data#1 selected location data on the map data. Brain Wave Font Data#2 Selected Location Icon Data Storage Area 206698b9c stores the brain wave font data#2 selected location icon data which is the image of the icon utilized to indicate the brain wave font data#2 selected location data on the map data. Brain Wave Font Data#3 Selected Location Icon Data Storage Area 206698b9d stores the brain wave font data#3 selected location icon data which is the image of the icon utilized to indicate the brain wave font data#3 selected location data on the map data. Brain Wave Font Data#4 Selected Location Icon Data Storage Area 206698b9e stores the brain wave font data#4 selected location icon data which is the image of the icon utilized to indicate the brain wave font data#4 selected location data on the map data.

This paragraph illustrates the software program(s) stored in Brain Wave Font Selecting Software Storage Area 206698c. In the present embodiment, Brain Wave Font Selecting Software Storage Area 206698c stores Current Location Data Producing Software 206698c1, Current Brain Wave Data Producing Software 206698c2, Brain Wave Font Data#1 Selecting Software 206698c3, Brain Wave Font Data#2 Selecting Software 206698c4, Brain Wave Font Data#3 Selecting Software 206698c5, Brain Wave Font Data#4 Selecting Software 206698c6, and Entire Location Log Displaying Software 206698c7. Current Location Data Producing Software 206698c1 is the software program described hereinafter. Current Brain Wave Data Producing Software 206698c2 is the software program described hereinafter. Brain Wave Font Data#1 Selecting Software 206698c3 is the software program described hereinafter. Brain Wave Font Data#2 Selecting Software 206698c4 is the software program described hereinafter. Brain Wave Font Data#3 Selecting Software 206698c5 is the software program described hereinafter. Brain Wave Font Data#4 Selecting Software 206698c6 is the software program described hereinafter. Entire Location Log Displaying Software 206698c7 is the software program described hereinafter.

This paragraph illustrate(s) Current Location Data Producing Software H698c1 of Host H and Current Location Data Producing Software 206698c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H698b7a (S3). The foregoing sequence is repeated periodically.

This paragraph illustrate(s) Current Brain Wave Data Producing Software H698c2 of Host H and Current Brain Wave Data Producing Software 206698c2 of Communication Device 200, which produce(s) the current brain wave data. In the present embodiment, CPU 211 (FIG. 1) retrieves the brain wave via Brain Wave Retrieving Device BWRD698 (S1). CPU 211 (FIG. 1) produces the current brain wave data by referring to the brain wave retrieved in the previous step and sends the data to Host H in a wireless fashion (S2). Host H receives the current brain wave data from Communication Device 200 and stores the data in Current Brain Wave Data Storage Area H698b3 (S3). The foregoing sequence is repeated periodically.

This paragraph illustrate(s) Brain Wave Font Data#1 Selecting Software H698c3 of Host H and Brain Wave Font Data#1 Selecting Software 206698c3 of Communication Device 200, which select(s) the brain wave font data#1. In the present embodiment, Host H retrieves the current brain wave data from Current Brain Wave Data Storage Area H698b3 (S1). Host H retrieves the brain wave pattern data#1 from Brain Wave Pattern Data Storage Area H698b4 (S2). If the current brain wave data retrieved in S1 matches with the brain wave pattern data#1 retrieved in the previous step, Host H proceeds to the next step (S3). Host H retrieves the original text data from Original Text Data Storage Area H698b1 (S4). Host H retrieves the brain wave font data#1 from Brain Wave Font Data Storage Area H698b5 (S5). Host H produces the decorated text data by changing the original text data retrieved in S4 to the font indicated by the brain wave font data#1 retrieved in the previous step (S6). Host H stores the decorated text data produced in the previous step in Decorated Text Data Storage Area H698b2 (S7). Host H retrieves the decorated text data from Decorated Text Data Storage Area H698b2 and sends the data to Communication Device 200 (S8). CPU 211 (FIG. 1) receives the decorated text data from Host H in a wireless fashion and displays the data on LCD 201 (FIG. 1) (S9). Host H retrieves the font notice data#1 from Font Notice Data Storage Area H698b6 and sends the data to Communication Device 200 (S10). CPU 211 (FIG. 1) receives the font notice data#1 from Host H in a wireless fashion and outputs the data from Speaker 216 (FIG. 1) and LCD 201 (FIG. 1) (S11). Host H retrieves the current location data from Current Location Data Storage Area H698b7a (S12). Host H stores the current location data retrieved in the previous step as the brain wave font data#1 selected location data in Brain Wave Font Data#1 Selected Location Data Storage Area H698b7b (S13). Host H retrieves the map data from Map Data Storage Area H698b8 and sends the data to Communication Device 200 (S14). CPU 211 (FIG. 1) receives the map data from Host H in a wireless fashion and displays the data on LCD 201 (FIG. 1) (S15). Host H retrieves the current location data from Current Location Data Storage Area H698b7a and sends the data to Communication Device 200 (S16). CPU 211 (FIG. 1) receives the current location data from Host H in a wireless fashion (S17). Host H retrieves the current location icon data from Current Location Icon Data Storage Area H698b9a and sends the data to Communication Device 200 (S18). CPU 211 (FIG. 1) receives the current location icon data from Host H in a wireless fashion (S19). CPU 211 (FIG. 1) displays the current location icon data received in the previous step at the location corresponding to the current location data received in S17 on the map data displayed in S15 (S20). The foregoing sequence is repeated periodically.

This paragraph illustrate(s) Brain Wave Font Data#2 Selecting Software H698c4 of Host H and Brain Wave Font Data#2 Selecting Software 206698c4 of Communication Device 200, which select(s) the brain wave font data#2. In the present embodiment, Host H retrieves the current brain wave data from Current Brain Wave Data Storage Area H698b3 (S1). Host H retrieves the brain wave pattern data#2 from Brain Wave Pattern Data Storage Area H698b4 (S2). If the current brain wave data retrieved in S1 matches with the brain wave pattern data#2 retrieved in the previous step, Host H proceeds to the next step (S3). Host H retrieves the original text data from Original Text Data Storage Area H698b1 (S4). Host H retrieves the brain wave font data#2 from Brain Wave Font Data Storage Area H698b5 (S5). Host H produces the decorated text data by changing the original text data retrieved in S4 to the font indicated by the brain wave font data#2 retrieved in the previous step (S6). Host H stores the decorated text data produced in the previous step in Decorated Text Data Storage Area H698b2 (S7). Host H retrieves the decorated text data from Decorated Text Data Storage Area H698b2 and sends the data to Communication Device 200 (S8). CPU 211 (FIG. 1) receives the decorated text data from Host H in a wireless fashion and displays the data on LCD 201 (FIG. 1) (S9). Host H retrieves the font notice data#2 from Font Notice Data Storage Area H698b6 and sends the data to Communication Device 200 (S10). CPU 211 (FIG. 1) receives the font notice data#2 from Host H in a wireless fashion and outputs the data from Speaker 216 (FIG. 1) and LCD 201 (FIG. 1) (S11). Host H retrieves the current location data from Current Location Data Storage Area H698b7a (S12). Host H stores the current location data retrieved in the previous step as the brain wave font data#2 selected location data in Brain Wave Font Data#2 Selected Location Data Storage Area H698b7c (S13). Host H retrieves the map data from Map Data Storage Area H698b8 and sends the data to Communication Device 200 (S14). CPU 211 (FIG. 1) receives the map data from Host H in a wireless fashion and displays the data on LCD 201 (FIG. 1) (S15). Host H retrieves the current location data from Current Location Data Storage Area H698b7a and sends the data to Communication Device 200 (S16). CPU 211 (FIG. 1) receives the current location data from Host H in a wireless fashion (S17). Host H retrieves the current location icon data from Current Location Icon Data Storage Area H698b9a and sends the data to Communication Device 200 (S18). CPU 211 (FIG. 1) receives the current location icon data from Host H in a wireless fashion (S19). CPU 211 (FIG. 1) displays the current location icon data received in the previous step at the location corresponding to the current location data received in S17 on the map data displayed in S15 (S20). The foregoing sequence is repeated periodically.

This paragraph illustrate(s) Brain Wave Font Data#3 Selecting Software H698c5 of Host H and Brain Wave Font Data#3 Selecting Software 206698c5 of Communication Device 200, which select(s) the brain wave font data#3. In the present embodiment, Host H retrieves the current brain wave data from Current Brain Wave Data Storage Area H698b3 (S1). Host H retrieves the brain wave pattern data#3 from Brain Wave Pattern Data Storage Area H698b4 (S2). If the current brain wave data retrieved in S1 matches with the brain wave pattern data#3 retrieved in the previous step, Host H proceeds to the next step (S3). Host H retrieves the original text data from Original Text Data Storage Area H698b1 (S4). Host H retrieves the brain wave font data#3 from Brain Wave Font Data Storage Area H698b5 (S5). Host H produces the decorated text data by changing the original text data retrieved in S4 to the font indicated by the brain wave font data#3 retrieved in the previous step (S6). Host H stores the decorated text data produced in the previous step in Decorated Text Data Storage Area H698b2 (S7). Host H retrieves the decorated text data from Decorated Text Data Storage Area H698b2 and sends the data to Communication Device 200 (S8). CPU 211 (FIG. 1) receives the decorated text data from Host H in a wireless fashion and displays the data on LCD 201 (FIG. 1) (S9). Host H retrieves the font notice data#3 from Font Notice Data Storage Area H698b6 and sends the data to Communication Device 200 (S10). CPU 211 (FIG. 1) receives the font notice data#3 from Host H in a wireless fashion and outputs the data from Speaker 216 (FIG. 1) and LCD 201 (FIG. 1) (S11). Host H retrieves the current location data from Current Location Data Storage Area H698b7a (S12). Host H stores the current location data retrieved in the previous step as the brain wave font data#3 selected location data in Brain Wave Font Data#3 Selected Location Data Storage Area H698b7d (S13). Host H retrieves the map data from Map Data Storage Area H698b8 and sends the data to Communication Device 200 (S14). CPU 211 (FIG. 1) receives the map data from Host H in a wireless fashion and displays the data on LCD 201 (FIG. 1) (S15). Host H retrieves the current location data from Current Location Data Storage Area H698b7a and sends the data to Communication Device 200 (S16). CPU 211 (FIG. 1) receives the current location data from Host H in a wireless fashion (S17). Host H retrieves the current location icon data from Current Location Icon Data Storage Area H698b9a and sends the data to Communication Device 200 (S18). CPU 211 (FIG. 1) receives the current location icon data from Host H in a wireless fashion (S19). CPU 211 (FIG. 1) displays the current location icon data received in the previous step at the location corresponding to the current location data received in S17 on the map data displayed in S15 (S20). The foregoing sequence is repeated periodically.

This paragraph illustrate(s) Brain Wave Font Data#4 Selecting Software H698c6 of Host H and Brain Wave Font Data#4 Selecting Software 206698c6 of Communication Device 200, which select(s) the brain wave font data#4. In the present embodiment, Host H retrieves the current brain wave data from Current Brain Wave Data Storage Area H698b3 (S1). Host H retrieves the brain wave pattern data#4 from Brain Wave Pattern Data Storage Area H698b4 (S2). If the current brain wave data retrieved in S1 matches with the brain wave pattern data#4 retrieved in the previous step, Host H proceeds to the next step (S3). Host H retrieves the original text data from Original Text Data Storage Area H698b1 (S4). Host H retrieves the brain wave font data#4 from Brain Wave Font Data Storage Area H698b5 (S5). Host H produces the decorated text data by changing the original text data retrieved in S4 to the font indicated by the brain wave font data#4 retrieved in the previous step (S6). Host H stores the decorated text data produced in the previous step in Decorated Text Data Storage Area H698b2 (S7). Host H retrieves the decorated text data from Decorated Text Data Storage Area H698b2 and sends the data to Communication Device 200 (S8). CPU 211 (FIG. 1) receives the decorated text data from Host H in a wireless fashion and displays the data on LCD 201 (FIG. 1) (S9). Host H retrieves the font notice data#4 from Font Notice Data Storage Area H698b6 and sends the data to Communication Device 200 (S10). CPU 211 (FIG. 1) receives the font notice data#4 from Host H in a wireless fashion and outputs the data from Speaker 216 (FIG. 1) and LCD 201 (FIG. 1) (S11). Host H retrieves the current location data from Current Location Data Storage Area H698b7a (S12). Host H stores the current location data retrieved in the previous step as the brain wave font data#4 selected location data in Brain Wave Font Data#4 Selected Location Data Storage Area H698b7e (S13). Host H retrieves the map data from Map Data Storage Area H698b8 and sends the data to Communication Device 200 (S14). CPU 211 (FIG. 1) receives the map data from Host H in a wireless fashion and displays the data on LCD 201 (FIG. 1) (S15). Host H retrieves the current location data from Current Location Data Storage Area H698b7a and sends the data to Communication Device 200 (S16). CPU 211 (FIG. 1) receives the current location data from Host H in a wireless fashion (S17). Host H retrieves the current location icon data from Current Location Icon Data Storage Area H698b9a and sends the data to Communication Device 200 (S18). CPU 211 (FIG. 1) receives the current location icon data from Host H in a wireless fashion (S19). CPU 211 (FIG. 1) displays the current location icon data received in the previous step at the location corresponding to the current location data received in S17 on the map data displayed in S15 (S20). The foregoing sequence is repeated periodically.

This paragraph illustrate(s) Entire Location Log Displaying Software H698c7 of Host H and Entire Location Log Displaying Software 206698c7 of Communication Device 200, which display(s) the entire location log. In the present embodiment, Host H retrieves the map data from Map Data Storage Area H698b8 and sends the data to Communication Device 200 (S1). CPU 211 (FIG. 1) receives the map data from Host H in a wireless fashion and displays the data on LCD 201 (FIG. 1) (S2). Host H retrieves the current location data from Current Location Data Storage Area H698b7a and sends the data to Communication Device 200 (S3). CPU 211 (FIG. 1) receives the current location data from Host H in a wireless fashion (S4). Host H retrieves the current location icon data from Current Location Icon Data Storage Area H698b9a and sends the data to Communication Device 200 (S5). CPU 211 (FIG. 1) receives the current location icon data from Host H in a wireless fashion (S6). CPU 211 (FIG. 1) displays the current location icon data received in the previous step at the location corresponding to the current location data received in S4 on the map data displayed in S2 (S7). Host H retrieves the brain wave font data#1 selected location data from Brain Wave Font Data#1 Selected Location Data Storage Area H698b7b and sends the data to Communication Device 200 (S8). CPU 211 (FIG. 1) receives the brain wave font data#1 selected location data from Host H in a wireless fashion (S9). Host H retrieves the brain wave font data#1 selected location icon data from Brain Wave Font Data#1 Selected Location Icon Data Storage Area H698b9b and sends the data to Communication Device 200 (S10). CPU 211 (FIG. 1) receives the brain wave font data#1 selected location icon data from Host H in a wireless fashion (S11). CPU 211 (FIG. 1) displays the brain wave font data#1 selected location icon data received in the previous step at the location corresponding to the brain wave font data#1 selected location data received in S9 on the map data displayed in S2 (S12). Host H retrieves the brain wave font data#2 selected location data from Brain Wave Font Data#2 Selected Location Data Storage Area H698b7c and sends the data to Communication Device 200 (S13). CPU 211 (FIG. 1) receives the brain wave font data#2 selected location data from Host H in a wireless fashion (S14). Host H retrieves the brain wave font data#2 selected location icon data from Brain Wave Font Data#2 Selected Location Icon Data Storage Area H698b9c and sends the data to Communication Device 200 (S15). CPU 211 (FIG. 1) receives the brain wave font data#2 selected location icon data from Host H in a wireless fashion (S16). CPU 211 (FIG. 1) displays the brain wave font data#2 selected location icon data received in the previous step at the location corresponding to the brain wave font data#2 selected location data received in S14 on the map data displayed in S2 (S17). Host H retrieves the brain wave font data#3 selected location data from Brain Wave Font Data#3 Selected Location Data Storage Area H698b7d and sends the data to Communication Device 200 (S18). CPU 211 (FIG. 1) receives the brain wave font data#3 selected location data from Host H in a wireless fashion (S19). Host H retrieves the brain wave font data#3 selected location icon data from Brain Wave Font Data#3 Selected Location Icon Data Storage Area H698b9d and sends the data to Communication Device 200 (S20). CPU 211 (FIG. 1) receives the brain wave font data#3 selected location icon data from Host H in a wireless fashion (S21). CPU 211 (FIG. 1) displays the brain wave font data#3 selected location icon data received in the previous step at the location corresponding to the brain wave font data#3 selected location data received in S4 on the map data displayed in S2 (S22). Host H retrieves the brain wave font data#4 selected location data from Brain Wave Font Data#4 Selected Location Data Storage Area H698b7e and sends the data to Communication Device 200 (S23). CPU 211 (FIG. 1) receives the brain wave font data#4 selected location data from Host H in a wireless fashion (S24). Host H retrieves the brain wave font data#4 selected location icon data from Brain Wave Font Data#4 Selected Location Icon Data Storage Area H698b9e and sends the data to Communication Device 200 (S25). CPU 211 (FIG. 1) receives the brain wave font data#4 selected location icon data from Host H in a wireless fashion (S26). CPU 211 (FIG. 1) displays the brain wave font data#4 selected location icon data received in the previous step at the location corresponding to the brain wave font data#4 selected location data received in S24 on the map data displayed in S2 (S27). The foregoing sequence is repeated periodically.

The following paragraphs illustrate another embodiment wherein Communication Device 200 plays the major role in implementing the present function.

This paragraph illustrate(s) Current Location Data Producing Software 206698c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206698b7a (S3). The foregoing sequence is repeated periodically.

This paragraph illustrate(s) Current Brain Wave Data Producing Software 206698c2 of Communication Device 200, which produce(s) the current brain wave data. In the present embodiment, CPU 211 (FIG. 1) retrieves the brain wave via Brain Wave Retrieving Device BWRD698 (S1). CPU 211 (FIG. 1) produces the current brain wave data by referring to the brain wave retrieved in the previous step (S2). CPU 211 (FIG. 1) stores the current brain wave data produced in the previous step in Current Brain Wave Data Storage Area 206698b3 (S3). The foregoing sequence is repeated periodically.

This paragraph illustrate(s) Brain Wave Font Data#1 Selecting Software 206698c3 of Communication Device 200, which select(s) the brain wave font data#1. In the present embodiment, CPU 211 (FIG. 1) retrieves the current brain wave data from Current Brain Wave Data Storage Area 206698b3 (S1). CPU 211 (FIG. 1) retrieves the brain wave pattern data#1 from Brain Wave Pattern Data Storage Area 206698b4 (S2). If the current brain wave data retrieved in S1 matches with the brain wave pattern data#1 retrieved in the previous step, CPU 211 (FIG. 1) proceeds to the next step (S3). CPU 211 (FIG. 1) retrieves the original text data from Original Text Data Storage Area 206698b1 (S4). CPU 211 (FIG. 1) retrieves the brain wave font data#1 from Brain Wave Font Data Storage Area 206698b5 (S5). CPU 211 (FIG. 1) produces the decorated text data by changing the original text data retrieved in S4 to the font indicated by the brain wave font data#1 retrieved in the previous step (S6). CPU 211 (FIG. 1) stores the decorated text data produced in the previous step in Decorated Text Data Storage Area 206698b2 (S7). CPU 211 (FIG. 1) retrieves the decorated text data from Decorated Text Data Storage Area 206698b2 (S8). CPU 211 (FIG. 1) displays the decorated text data retrieved in the previous step on LCD 201 (FIG. 1) (S9). CPU 211 (FIG. 1) retrieves the font notice data#1 from Font Notice Data Storage Area 206698b6 (S10). CPU 211 (FIG. 1) outputs the font notice data#1 retrieved in the previous step from Speaker 216 (FIG. 1) and LCD 201 (FIG. 1) (S11). CPU 211 (FIG. 1) retrieves the current location data from Current Location Data Storage Area 206698b7a (S12). CPU 211 (FIG. 1) stores the current location data retrieved in the previous step as the brain wave font data#1 selected location data in Brain Wave Font Data#1 Selected Location Data Storage Area 206698b7b (S13). CPU 211 (FIG. 1) retrieves the map data from Map Data Storage Area 206698b8 (S14). CPU 211 (FIG. 1) displays the map data retrieved in the previous step on LCD 201 (FIG. 1) (S15).

CPU 211 (FIG. 1) retrieves the current location data from Current Location Data Storage Area 206698b7a (S16). CPU 211 (FIG. 1) retrieves the current location icon data from Current Location Icon Data Storage Area 206698b9a (S17). CPU 211 (FIG. 1) displays the current location icon data retrieved in the previous step at the location corresponding to the current location data retrieved in S16 on the map data displayed in S15 (S18). The foregoing sequence is repeated periodically.

This paragraph illustrate(s) Brain Wave Font Data#2 Selecting Software 206698c4 of Communication Device 200, which select(s) the brain wave font data#2. In the present embodiment, CPU 211 (FIG. 1) retrieves the current brain wave data from Current Brain Wave Data Storage Area 206698b3 (S1). CPU 211 (FIG. 1) retrieves the brain wave pattern data#2 from Brain Wave Pattern Data Storage Area 206698b4 (S2). If the current brain wave data retrieved in S1 matches with the brain wave pattern data#2 retrieved in the previous step, CPU 211 (FIG. 1) proceeds to the next step (S3). CPU 211 (FIG. 1) retrieves the original text data from Original Text Data Storage Area 206698b1 (S4). CPU 211 (FIG. 1) retrieves the brain wave font data#2 from Brain Wave Font Data Storage Area 206698b5 (S5). CPU 211 (FIG. 1) produces the decorated text data by changing the original text data retrieved in S4 to the font indicated by the brain wave font data#2 retrieved in the previous step (S6). CPU 211 (FIG. 1) stores the decorated text data produced in the previous step in Decorated Text Data Storage Area 206698b2 (S7). CPU 211 (FIG. 1) retrieves the decorated text data from Decorated Text Data Storage Area 206698b2 (S8). CPU 211 (FIG. 1) displays the decorated text data retrieved in the previous step on LCD 201 (FIG. 1) (S9). CPU 211 (FIG. 1) retrieves the font notice data#2 from Font Notice Data Storage Area 206698b6 (S10). CPU 211 (FIG. 1) outputs the font notice data#2 retrieved in the previous step from Speaker 216 (FIG. 1) and LCD 201 (FIG. 1) (S11). CPU 211 (FIG. 1) retrieves the current location data from Current Location Data Storage Area 206698b7a (S12). CPU 211 (FIG. 1) stores the current location data retrieved in the previous step as the brain wave font data#2 selected location data in Brain Wave Font Data#2 Selected Location Data Storage Area 206698b7c (S13). CPU 211 (FIG. 1) retrieves the map data from Map Data Storage Area 206698b8 (S14). CPU 211 (FIG. 1) displays the map data retrieved in the previous step on LCD 201 (FIG. 1) (S15). CPU 211 (FIG. 1) retrieves the current location data from Current Location Data Storage Area 206698b7a (S16). CPU 211 (FIG. 1) retrieves the current location icon data from Current Location Icon Data Storage Area 206698b9a (S17). CPU 211 (FIG. 1) displays the current location icon data retrieved in the previous step at the location corresponding to the current location data retrieved in S16 on the map data displayed in S15 (S18). The foregoing sequence is repeated periodically.

This paragraph illustrate(s) Brain Wave Font Data#3 Selecting Software 206698c5 of Communication Device 200, which select(s) the brain wave font data#3. In the present embodiment, CPU 211 (FIG. 1) retrieves the current brain wave data from Current Brain Wave Data Storage Area 206698b3 (S1). CPU 211 (FIG. 1) retrieves the brain wave pattern data#3 from Brain Wave Pattern Data Storage Area 206698b4 (S2). If the current brain wave data retrieved in S1 matches with the brain wave pattern data#3 retrieved in the previous step, CPU 211 (FIG. 1) proceeds to the next step (S3). CPU 211 (FIG. 1) retrieves the original text data from Original Text Data Storage Area 206698b1 (S4). CPU 211 (FIG. 1) retrieves the brain wave font data#3 from Brain Wave Font Data Storage Area 206698b5 (S5). CPU 211 (FIG. 1) produces the decorated text data by changing the original text data retrieved in S4 to the font indicated by the brain wave font data#3 retrieved in the previous step (S6). CPU 211 (FIG. 1) stores the decorated text data produced in the previous step in Decorated Text Data Storage Area 206698b2 (S7). CPU 211 (FIG. 1) retrieves the decorated text data from Decorated Text Data Storage Area 206698b2 (S8). CPU 211 (FIG. 1) displays the decorated text data retrieved in the previous step on LCD 201 (FIG. 1) (S9). CPU 211 (FIG. 1) retrieves the font notice data#3 from Font Notice Data Storage Area 206698b6 (S10). CPU 211 (FIG. 1) outputs the font notice data#3 retrieved in the previous step from Speaker 216 (FIG. 1) and LCD 201 (FIG. 1) (S11). CPU 211 (FIG. 1) retrieves the current location data from Current Location Data Storage Area 206698b7a (S12). CPU 211 (FIG. 1) stores the current location data retrieved in the previous step as the brain wave font data#3 selected location data in Brain Wave Font Data#3 Selected Location Data Storage Area 206698b7d (S13). CPU 211 (FIG. 1) retrieves the map data from Map Data Storage Area 206698b8 (S14). CPU 211 (FIG. 1) displays the map data retrieved in the previous step on LCD 201 (FIG. 1) (S15). CPU 211 (FIG. 1) retrieves the current location data from Current Location Data Storage Area 206698b7a (S16). CPU 211 (FIG. 1) retrieves the current location icon data from Current Location Icon Data Storage Area 206698b9a (S17). CPU 211 (FIG. 1) displays the current location icon data retrieved in the previous step at the location corresponding to the current location data retrieved in S16 on the map data displayed in S15 (S18). The foregoing sequence is repeated periodically.

This paragraph illustrate(s) Brain Wave Font Data#4 Selecting Software 206698c6 of Communication Device 200, which select(s) the brain wave font data#4. In the present embodiment, CPU 211 (FIG. 1) retrieves the current brain wave data from Current Brain Wave Data Storage Area 206698b3 (S1). CPU 211 (FIG. 1) retrieves the brain wave pattern data#4 from Brain Wave Pattern Data Storage Area 206698b4 (S2). If the current brain wave data retrieved in S1 matches with the brain wave pattern data#4 retrieved in the previous step, CPU 211 (FIG. 1) proceeds to the next step (S3). CPU 211 (FIG. 1) retrieves the original text data from Original Text Data Storage Area 206698b1 (S4). CPU 211 (FIG. 1) retrieves the brain wave font data#4 from Brain Wave Font Data Storage Area 206698b5 (S5). CPU 211 (FIG. 1) produces the decorated text data by changing the original text data retrieved in S4 to the font indicated by the brain wave font data#4 retrieved in the previous step (S6). CPU 211 (FIG. 1) stores the decorated text data produced in the previous step in Decorated Text Data Storage Area 206698b2 (S7). CPU 211 (FIG. 1) retrieves the decorated text data from Decorated Text Data Storage Area 206698b2 (S8). CPU 211 (FIG. 1) displays the decorated text data retrieved in the previous step on LCD 201 (FIG. 1) (S9). CPU 211 (FIG. 1) retrieves the font notice data#4 from Font Notice Data Storage Area 206698b6 (S10). CPU 211 (FIG. 1) outputs the font notice data#4 retrieved in the previous step from Speaker 216 (FIG. 1) and LCD 201 (FIG. 1) (S11). CPU 211 (FIG. 1) retrieves the current location data from Current Location Data Storage Area 206698b7a (S12). CPU 211 (FIG. 1) stores the current location data retrieved in the previous step as the brain wave font data#4 selected location data in Brain Wave Font Data#4 Selected Location Data Storage Area 206698b7e (S13). CPU 211 (FIG. 1) retrieves the map data from Map Data Storage Area 206698b8 (S14). CPU 211 (FIG. 1) displays the map data retrieved in the previous step on LCD 201 (FIG. 1) (S15). CPU 211 (FIG. 1) retrieves the current location data from Current Location Data Storage Area 206698b7a (S16). CPU

211 (FIG. 1) retrieves the current location icon data from Current Location Icon Data Storage Area 206698b9a (S17). CPU 211 (FIG. 1) displays the current location icon data retrieved in the previous step at the location corresponding to the current location data retrieved in S16 on the map data displayed in S15 (S18). The foregoing sequence is repeated periodically.

This paragraph illustrate(s) Entire Location Log Displaying Software 206698c7 of Communication Device 200, which display(s) the entire location log. In the present embodiment, CPU 211 (FIG. 1) retrieves the map data from Map Data Storage Area 206698b8 (S1). CPU 211 (FIG. 1) displays the map data retrieved in the previous step on LCD 201 (FIG. 1) (S2). CPU 211 (FIG. 1) retrieves the current location data from Current Location Data Storage Area 206698b7a (S3). CPU 211 (FIG. 1) retrieves the current location icon data from Current Location Icon Data Storage Area 206698b9a (S4). CPU 211 (FIG. 1) displays the current location icon data retrieved in the previous step at the location corresponding to the current location data retrieved in S3 on the map data displayed in S2 (S5). CPU 211 (FIG. 1) retrieves the brain wave font data#1 selected location data from Brain Wave Font Data#1 Selected Location Data Storage Area 206698b7b (S6). CPU 211 (FIG. 1) retrieves the brain wave font data#1 selected location icon data from Brain Wave Font Data#1 Selected Location Icon Data Storage Area 206698b9b (S7). CPU 211 (FIG. 1) displays the brain wave font data#1 selected location icon data retrieved in the previous step at the location corresponding to the brain wave font data#1 selected location data retrieved in S6 on the map data displayed in S2 (S8). CPU 211 (FIG. 1) retrieves the brain wave font data#2 selected location data from Brain Wave Font Data#2 Selected Location Data Storage Area 206698b7c (S9). CPU 211 (FIG. 1) retrieves the brain wave font data#2 selected location icon data from Brain Wave Font Data#2 Selected Location Icon Data Storage Area 206698b9c (S10). CPU 211 (FIG. 1) displays the brain wave font data#2 selected location icon data retrieved in the previous step at the location corresponding to the brain wave font data#2 selected location data retrieved in S9 on the map data displayed in S2 (S11). CPU 211 (FIG. 1) retrieves the brain wave font data#3 selected location data from Brain Wave Font Data#3 Selected Location Data Storage Area 206698b7d (S12). CPU 211 (FIG. 1) retrieves the brain wave font data#3 selected location icon data from Brain Wave Font Data#3 Selected Location Icon Data Storage Area 206698b9d (S13). CPU 211 (FIG. 1) displays the brain wave font data#3 selected location icon data retrieved in the previous step at the location corresponding to the brain wave font data#3 selected location data retrieved in S3 on the map data displayed in S2 (S14). CPU 211 (FIG. 1) retrieves the brain wave font data#4 selected location data from Brain Wave Font Data#4 Selected Location Data Storage Area 206698b7e (S15). CPU 211 (FIG. 1) retrieves the brain wave font data#4 selected location icon data from Brain Wave Font Data#4 Selected Location Icon Data Storage Area 206698b9e (S16). CPU 211 (FIG. 1) displays the brain wave font data#4 selected location icon data retrieved in the previous step at the location corresponding to the brain wave font data#4 selected location data retrieved in S15 on the map data displayed in S2 (S17). The foregoing sequence is repeated periodically.

<<Rear Carrier Speed Dependent Ideal Distance Maintaining Function>>

The following paragraphs illustrate the rear carrier speed dependent ideal distance maintaining function, wherein said communication device is installed in a 2nd carrier, when the current distance between said 2nd carrier and a 1st carrier traveling in front of said 2nd carrier is longer than a current ideal distance, the current speed of said 2nd carrier is increased and a speed increased message is output from said communication device, when the current distance between said 2nd carrier and said 1st carrier is shorter than said current ideal distance, the current speed of said 2nd carrier is decreased and a speed decreased message is output from said communication device, wherein said current ideal distance varies depending on said current speed of said 2nd carrier, said current distance, said current speed, said current ideal distance, a 1st current location which indicates the current location of said 1st carrier, and a 2nd current location which indicates the current location of said 2nd carrier are indicated on said display.

This paragraph illustrates the major elements utilized to implement the present function. In the present embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the relationship between Carrier CR700A and Device A. In the present embodiment, Carrier CR700A includes Device A. Here, Carrier CR700A is a carrier which may be any type of carrier or transportation system designed to carry passenger(s), such as an airplane, automobile, motorcycle, railway train, taxi, bus, space ship, or space station.

This paragraph illustrates the relationship between Carrier CR700B and Device B. In the present embodiment, Carrier CR700B includes Device B. Here, Carrier CR700B is a carrier which may be any type of carrier or transportation system designed to carry passenger(s), such as an airplane, automobile, motorcycle, railway train, taxi, bus, space ship, or space station. In the present embodiment, Carrier CR700A is the carrier traveling in front of Carrier CR700B and Carrier CR700B is the carrier traveling behind Carrier CR700A on a highway.

This paragraph illustrates the storage area included in Host H. In the present embodiment, Host H includes Rear Carrier Speed Dependent Ideal Distance Maintaining Info Storage Area H700a of which the data and the software program(s) stored therein are described hereinafter.

This paragraph illustrates the storage area(s) included in Rear Carrier Speed Dependent Ideal Distance Maintaining Info Storage Area H700a. In the present embodiment, Rear Carrier Speed Dependent Ideal Distance Maintaining Info Storage Area H700a includes Rear Carrier Speed Dependent Ideal Distance Maintaining Data Storage Area H700b and Rear Carrier Speed Dependent Ideal Distance Maintaining Software Storage Area H700c. Rear Carrier Speed Dependent Ideal Distance Maintaining Data Storage Area H700b stores the data necessary to implement the present function on the side of Host H, such as the one(s) described hereinafter. Rear Carrier Speed Dependent Ideal Distance Maintaining Software Storage Area H700c stores the software program(s) necessary to implement the present function on the side of Host H, such as the one(s) described hereinafter.

This paragraph illustrates the storage area(s) included in Rear Carrier Speed Dependent Ideal Distance Maintaining Data Storage Area H700b. In the present embodiment, Rear Carrier Speed Dependent Ideal Distance Maintaining Data Storage Area H700b includes Entire Current Location Data Storage Area H700b1, Current Distance Data Storage Area H700b2, Current Speed Data Storage Area H700b3, Speed Dependent Required Distance Data Storage Area H700b4, Current Ideal Distance Data Storage Area H700b5, Entire Speed Message Data Storage Area H700b6, Map Data Storage Area H700b7, Entire Current Location Icon Data Storage Area H700b8, and Work Area H700b9. Entire Current Location Data Storage Area H700b1 stores the data described hereinafter. Current Distance Data Storage Area H700b2 stores the current distance data which indicates the current distance between Carrier CR700A and Carrier CR700B. Current Speed Data Storage Area H700b3 stores the current speed data which indicates the current speed of Carrier CR700B. Speed Dependent Required Distance Data Storage Area H700b4 stores the data described hereinafter. Current Ideal Distance Data Storage Area H700b5 stores the current ideal distance data which indicates the current ideal distance between Carrier CR700A and Carrier CR700B. Entire Speed Message Data Storage Area H700b6 stores the data described hereinafter. Map Data Storage Area H700b7 stores the map data which is the image data indicating a map. Entire Current Location Icon Data Storage Area H700b8 stores the data described hereinafter. Work Area H700b9 is utilized as a work area to perform calculation and temporarily store data to implement the present function.

This paragraph illustrates the storage area(s) included in Entire Current Location Data Storage Area H700b1. In the present embodiment, Entire Current Location Data Storage Area H700b1 includes 1st Current Location Data Storage Area H700b1a and 2nd Current Location Data Storage Area H700b1 b. 1st Current Location Data Storage Area H700b1a stores the 1st current location data which indicates the current geographic location of Carrier CR700A in (x,y,z) format. 2nd Current Location Data Storage Area H700b1b stores the 2nd current location data which indicates the current geographic location of Carrier CR700B in (x,y,z) format.

This paragraph illustrates the storage area(s) included in Speed Dependent Required Distance Data Storage Area H700b4. In the present embodiment, Speed Dependent Required Distance Data Storage Area H700b4 includes First Speed Range Required Distance Data Storage Area H700b4a, Second Speed Range Required Distance Data Storage Area H700b4b, and Third Speed Range Required Distance Data Storage Area H700b4c. First Speed Range Required Distance Data Storage Area H700b4a stores the first speed range required distance data which indicates the ideal distance between Carrier CR700A and Carrier CR700B when Carrier CR700B is proceeding within the first speed range. Second Speed Range Required Distance Data Storage Area H700b4b stores the second speed range required distance data which indicates the ideal distance between Carrier CR700A and Carrier CR700B when Carrier CR700B is proceeding within the second speed range. Third Speed Range Required Distance Data Storage Area H700b4c stores the third speed range required distance data which indicates the ideal distance between Carrier CR700A and Carrier CR700B when Carrier CR700B is proceeding within the third speed range.

This paragraph illustrates the storage area(s) included in Entire Speed Message Data Storage Area H700b6. In the present embodiment, Entire Speed Message Data Storage Area H700b6 includes First Speed Message Data Storage Area H700b6a and Second Speed Message Data Storage Area H700b6b. First Speed Message Data Storage Area H700b6a stores the first speed message data which is the audiovisual data indicating that the current distance between Carrier CR700A and Carrier CR700B is longer than the ideal distance, therefore the speed of Carrier CR700B is increased. Second Speed Message Data Storage Area H700b6b stores the second speed message data which is the audiovisual data indicating that the current distance between Carrier CR700A and Carrier CR700B is shorter than the ideal distance, therefore the speed of Carrier CR700B is decreased.

This paragraph illustrates the storage area(s) included in Entire Current Location Icon Data Storage Area H700b8. In the present embodiment, Entire Current Location Icon Data Storage Area H700b8 includes 1st Current Location Icon Data Storage Area H700b8a and 2nd Current Location Icon Data Storage Area H700b8b. 1st Current Location Icon Data Storage Area H700b8a stores the 1st current location icon data which is the image of the icon utilized to indicate the 1st current location data on the map data. 2nd Current Location Icon Data Storage Area H700b8b stores the 2nd current location icon data which is the image of the icon utilized to indicate the 2nd current location data on the map data.

This paragraph illustrates the software program(s) stored in Rear Carrier Speed Dependent Ideal Distance Maintaining Software Storage Area H700c. In the present embodiment, Rear Carrier Speed Dependent Ideal Distance Maintaining Software Storage Area H700c stores 2nd Current Location Data Producing Software H700c2, 1st Current Location Data Sharing Software H700c3, 2nd Current Location Data Sharing Software H700c4, Current Distance Data Producing Software H700c5, Current Speed Data Producing Software H700c6, Current Ideal Distance Data Producing Software H700c7, Carrier Speed Increasing Software H700c8, Carrier Speed Decreasing Software H700c9, Relevant Data Sharing Software H700c10, and Relevant Data Displaying Software H700c11. 2nd Current Location Data Producing Software H700c2 is the software program described hereinafter. 1st Current Location Data Sharing Software H700c3 is the software program described hereinafter. 2nd Current Location Data Sharing Software H700c4 is the software program described hereinafter. Current Distance Data Producing Software H700c5 is the software program described hereinafter. Current Speed Data Producing Software H700c6 is the software program described hereinafter. Current Ideal Distance Data Producing Software H700c7 is the software program described hereinafter. Carrier Speed Increasing Software H700c8 is the software program described hereinafter. Carrier Speed Decreasing Software H700c9 is the software program described hereinafter. Relevant Data Sharing Software H700c10 is the software program described hereinafter. Relevant Data Displaying Software H700c11 is the software program described hereinafter.

This paragraph illustrates the storage area included in RAM 206 (FIG. 1) of Device A. In the present embodiment, RAM 206 includes Rear Carrier Speed Dependent Ideal Distance Maintaining Info Storage Area 206A700a of which the data and the software program(s) stored therein are described hereinafter.

The data and/or the software program(s) necessary to implement the present function may be downloaded from Host H to Device A in the manner described hereinafter.

This paragraph illustrates the storage area(s) included in Rear Carrier Speed Dependent Ideal Distance Maintaining Info Storage Area 206A700a. In the present embodiment, Rear Carrier Speed Dependent Ideal Distance Maintaining Info Storage Area 206A700a includes Rear Carrier Speed Dependent Ideal Distance Maintaining Data Storage Area 206A700b and Rear Carrier Speed Dependent Ideal Distance Maintaining Software Storage Area 206A700c. Rear Carrier Speed Dependent Ideal Distance Maintaining Data Storage Area 206A700b stores the data necessary to implement the present function on the side of Device A, such as the one(s)

described hereinafter. Rear Carrier Speed Dependent Ideal Distance Maintaining Software Storage Area 206A700c stores the software program(s) necessary to implement the present function on the side of Device A, such as the one(s) described hereinafter.

This paragraph illustrates the storage area(s) included in Rear Carrier Speed Dependent Ideal Distance Maintaining Data Storage Area 206A700b. In the present embodiment, Rear Carrier Speed Dependent Ideal Distance Maintaining Data Storage Area 206A700b includes Entire Current Location Data Storage Area 206A700b1, Current Distance Data Storage Area 206A700b2, Current Speed Data Storage Area 206A700b3, Speed Dependent Required Distance Data Storage Area 206A700b4, Current Ideal Distance Data Storage Area 206A700b5, Entire Speed Message Data Storage Area 206A700b6, Map Data Storage Area 206A700b7, Entire Current Location Icon Data Storage Area 206A700b8, and Work Area 206A700b9. Entire Current Location Data Storage Area 206A700b1 stores the data described hereinafter. Current Distance Data Storage Area 206A700b2 stores the current distance data which indicates the current distance between Carrier CR700A and Carrier CR700B. Current Speed Data Storage Area 206A700b3 stores the current speed data which indicates the current speed of Carrier CR700B. Speed Dependent Required Distance Data Storage Area 206A700b4 stores the data described hereinafter. Current Ideal Distance Data Storage Area 206A700b5 stores the current ideal distance data which indicates the current ideal distance between Carrier CR700A and Carrier CR700B. Entire Speed Message Data Storage Area 206A700b6 stores the data described hereinafter. Map Data Storage Area 206A700b7 stores the map data which is the image data indicating a map. Entire Current Location Icon Data Storage Area 206A700b8 stores the data described hereinafter. Work Area 206A700b9 is utilized as a work area to perform calculation and temporarily store data to implement the present function.

This paragraph illustrates the storage area(s) included in Entire Current Location Data Storage Area 206A700b1. In the present embodiment, Entire Current Location Data Storage Area 206A700b1 includes 1st Current Location Data Storage Area 206A700b1a and 2nd Current Location Data Storage Area 206A700b1b. 1st Current Location Data Storage Area 206A700b1a stores the 1st current location data which indicates the current geographic location of Carrier CR700A in (x,y,z) format. 2nd Current Location Data Storage Area 206A700b1b stores the 2nd current location data which indicates the current geographic location of Carrier CR700B in (x,y,z) format.

This paragraph illustrates the storage area(s) included in Speed Dependent Required Distance Data Storage Area 206A700b4. In the present embodiment, Speed Dependent Required Distance Data Storage Area 206A700b4 includes First Speed Range Required Distance Data Storage Area 206A700b4a, Second Speed Range Required Distance Data Storage Area 206A700b4b, and Third Speed Range Required Distance Data Storage Area 206A700b4c. First Speed Range Required Distance Data Storage Area 206A700b4a stores the first speed range required distance data which indicates the ideal distance between Carrier CR700A and Carrier CR700B when Carrier CR700B is proceeding within the first speed range. Second Speed Range Required Distance Data Storage Area 206A700b4b stores the second speed range required distance data which indicates the ideal distance between Carrier CR700A and Carrier CR700B when Carrier CR700B is proceeding within the second speed range. Third Speed Range Required Distance Data Storage Area 206A700b4c stores the third speed range required distance data which indicates the ideal distance between Carrier CR700A and Carrier CR700B when Carrier CR700B is proceeding within the third speed range.

This paragraph illustrates the storage area(s) included in Entire Speed Message Data Storage Area 206A700b6. In the present embodiment, Entire Speed Message Data Storage Area 206A700b6 includes First Speed Message Data Storage Area 206A700b6a and Second Speed Message Data Storage Area 206A700b6b. First Speed Message Data Storage Area 206A700b6a stores the first speed message data which is the audiovisual data indicating that the current distance between Carrier CR700A and Carrier CR700B is longer than the ideal distance, therefore the speed of Carrier CR700B is increased. Second Speed Message Data Storage Area 206A700b6b stores the second speed message data which is the audiovisual data indicating that the current distance between Carrier CR700A and Carrier CR700B is shorter than the ideal distance, therefore the speed of Carrier CR700B is decreased.

This paragraph illustrates the storage area(s) included in Entire Current Location Icon Data Storage Area 206A700b8. In the present embodiment, Entire Current Location Icon Data Storage Area 206A700b8 includes 1st Current Location Icon Data Storage Area 206A700b8a and 2nd Current Location Icon Data Storage Area 206A700b8b. 1st Current Location Icon Data Storage Area 206A700b8a stores the 1st current location icon data which is the image of the icon utilized to indicate the 1st current location data on the map data. 2nd Current Location Icon Data Storage Area 206A700b8b stores the 2nd current location icon data which is the image of the icon utilized to indicate the 2nd current location data on the map data.

This paragraph illustrates the software program(s) stored in Rear Carrier Speed Dependent Ideal Distance Maintaining Software Storage Area 206A700c. In the present embodiment, Rear Carrier Speed Dependent Ideal Distance Maintaining Software Storage Area 206A700c stores 1st Current Location Data Producing Software 206A700c1, 1st Current Location Data Sharing Software 206A700c3, 2nd Current Location Data Sharing Software 206A700c4, Relevant Data Sharing Software 206A700c10, and Relevant Data Displaying Software 206A700c11. 1st Current Location Data Producing Software 206A700c1 is the software program described hereinafter. 1st Current Location Data Sharing Software 206A700c3 is the software program described hereinafter. 2nd Current Location Data Sharing Software 206A700c4 is the software program described hereinafter. Relevant Data Sharing Software 206A700c10 is the software program described hereinafter. Relevant Data Displaying Software 206A700c11 is the software program described hereinafter.

This paragraph illustrates the storage area included in RAM 206 (FIG. 1) of Device B. In the present embodiment, RAM 206 includes Rear Carrier Speed Dependent Ideal Distance Maintaining Info Storage Area 206B700a of which the data and the software program(s) stored therein are described hereinafter.

The data and/or the software program(s) necessary to implement the present function may be downloaded from Host H to Device B in the manner described hereinafter.

This paragraph illustrates the storage area(s) included in Rear Carrier Speed Dependent Ideal Distance Maintaining Info Storage Area 206B700a. In the present embodiment, Rear Carrier Speed Dependent Ideal Distance Maintaining Info Storage Area 206B700a includes Rear Carrier Speed Dependent Ideal Distance Maintaining Data Storage Area 206B700b and Rear Carrier Speed Dependent Ideal Distance Maintaining Software Storage Area 206B700c. Rear Carrier Speed Dependent Ideal Distance Maintaining Data Storage Area 206B700b stores the data necessary to implement the present function on the side of Device B, such as the one(s) described hereinafter. Rear Carrier Speed Dependent Ideal Distance Maintaining Software Storage Area 206B700c stores the software program(s) necessary to implement the present function on the side of Device B, such as the one(s) described hereinafter.

This paragraph illustrates the storage area(s) included in Rear Carrier Speed Dependent Ideal Distance Maintaining Data Storage Area 206B700b. In the present embodiment, Rear Carrier Speed Dependent Ideal Distance Maintaining Data Storage Area 206B700b includes Entire Current Location Data Storage Area 206B700b1, Current Distance Data Storage Area 206B700b2, Current Speed Data Storage Area 206B700b3, Speed Dependent Required Distance Data Storage Area 206B700b4, Current Ideal Distance Data Storage Area 206B700b5, Entire Speed Message Data Storage Area 206B700b6, Map Data Storage Area 206B700b7, Entire Current Location Icon Data Storage Area 206B700b8, and Work Area 206B700b9. Entire Current Location Data Storage Area 206B700b1 stores the data described hereinafter. Current Distance Data Storage Area 206B700b2 stores the current distance data which indicates the current distance between Carrier CR700A and Carrier CR700B. Current Speed Data Storage Area 206B700b3 stores the current speed data which indicates the current speed of Carrier CR700B. Speed Dependent Required Distance Data Storage Area 206B700b4 stores the data described hereinafter. Current Ideal Distance Data Storage Area 206B700b5 stores the current ideal distance data which indicates the current ideal distance between Carrier CR700A and Carrier CR700B. Entire Speed Message Data Storage Area 206B700b6 stores the data described hereinafter. Map Data Storage Area 206B700b7 stores the map data which is the image data indicating a map. Entire Current Location Icon Data Storage Area 206B700b8 stores the data described hereinafter. Work Area 206B700b9 is utilized as a work area to perform calculation and temporarily store data to implement the present function.

This paragraph illustrates the storage area(s) included in Entire Current Location Data Storage Area 206B700b1. In the present embodiment, Entire Current Location Data Storage Area 206B700b1 includes 1st Current Location Data Storage Area 206B700b1a and 2nd Current Location Data Storage Area 206B700b1b. 1st Current Location Data Storage Area 206B700b1a stores the 1st current location data which indicates the current geographic location of Carrier CR700A in (x,y,z) format. 2nd Current Location Data Storage Area 206B700b1b stores the 2nd current location data which indicates the current geographic location of Carrier CR700B in (x,y,z) format.

This paragraph illustrates the storage area(s) included in Speed Dependent Required Distance Data Storage Area 206B700b4. In the present embodiment, Speed Dependent Required Distance Data Storage Area 206B700b4 includes First Speed Range Required Distance Data Storage Area 206B700b4a, Second Speed Range Required Distance Data Storage Area 206B700b4b, and Third Speed Range Required Distance Data Storage Area 206B700b4c. First Speed Range Required Distance Data Storage Area 206B700b4a stores the first speed range required distance data which indicates the ideal distance between Carrier CR700A and Carrier CR700B when Carrier CR700B is proceeding within the first speed range. Second Speed Range Required Distance Data Storage Area 206B700b4b stores the second speed range required distance data which indicates the ideal distance between Carrier CR700A and Carrier CR700B when Carrier CR700B is proceeding within the second speed range. Third Speed Range Required Distance Data Storage Area 206B700b4c stores the third speed range required distance data which indicates the ideal distance between Carrier CR700A and Carrier CR700B when Carrier CR700B is proceeding within the third speed range.

This paragraph illustrates the storage area(s) included in Entire Speed Message Data Storage Area 206B700b6. In the present embodiment, Entire Speed Message Data Storage Area 206B700b6 includes First Speed Message Data Storage Area 206B700b6a and Second Speed Message Data Storage Area 206B700b6b. First Speed Message Data Storage Area 206B700b6a stores the first speed message data which is the audiovisual data indicating that the current distance between Carrier CR700A and Carrier CR700B is longer than the ideal distance, therefore the speed of Carrier CR700B is increased. Second Speed Message Data Storage Area 206B700b6b stores the second speed message data which is the audiovisual data indicating that the current distance between Carrier CR700A and Carrier CR700B is shorter than the ideal distance, therefore the speed of Carrier CR700B is decreased.

This paragraph illustrates the storage area(s) included in Entire Current Location Icon Data Storage Area 206B700b8. In the present embodiment, Entire Current Location Icon Data Storage Area 206B700b8 includes 1st Current Location Icon Data Storage Area 206B700b8a and 2nd Current Location Icon Data Storage Area 206B700b8b. 1st Current Location Icon Data Storage Area 206B700b8a stores the 1st current location icon data which is the image of the icon utilized to indicate the 1st current location data on the map data. 2nd Current Location Icon Data Storage Area 206B700b8b stores the 2nd current location icon data which is the image of the icon utilized to indicate the 2nd current location data on the map data.

This paragraph illustrates the software program(s) stored in Rear Carrier Speed Dependent Ideal Distance Maintaining Software Storage Area 206B700c. In the present embodiment, Rear Carrier Speed Dependent Ideal Distance Maintaining Software Storage Area 206B700c stores 2nd Current Location Data Producing Software 206B700c2, 1st Current Location Data Sharing Software 206B700c3, 2nd Current Location Data Sharing Software 206B700c4, Current Distance Data Producing Software 206B700c5, Current Speed Data Producing Software 206B700c6, Current Ideal Distance Data Producing Software 206B700c7, Carrier Speed Increasing Software 206B700c8, Carrier Speed Decreasing Software 206B700c9, Relevant Data Sharing Software 206B700c10, and Relevant Data Displaying Software 206B700c11. 2nd Current Location Data Producing Software 206B700c2 is the software program described hereinafter. 1st Current Location Data Sharing Software 206B700c3 is the software program described hereinafter. 2nd Current Location Data Sharing Software 206B700c4 is the software program described hereinafter. Current Distance Data Producing Software 206B700c5 is the software program described hereinafter. Current Speed Data Producing Software 206B700c6 is the software program described hereinafter. Current Ideal Distance Data Producing Software 206B700c7 is the software program described hereinafter. Carrier Speed Increasing Software 206B700c8 is the software program described hereinafter. Carrier Speed Decreasing Software 206B700c9 is the software program described hereinafter. Relevant Data Sharing Software 206B700c10 is the software program described hereinafter. Relevant Data Displaying Software 206B700c11 is the software program described hereinafter.

This paragraph illustrate(s) 1st Current Location Data Producing Software 206A700c1 of Device A, which produce(s)

the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A700b1a (S3). The foregoing sequence is repeated periodically.

This paragraph illustrate(s) 2nd Current Location Data Producing Software H700c2 of Host H and 2nd Current Location Data Producing Software 206B700c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step and sends the data to Host H in a wireless fashion (S2). Host H receives the 2nd current location data from Device B and stores the data in 2nd Current Location Data Storage Area H700b1b (S3). The foregoing sequence is repeated periodically.

This paragraph illustrate(s) 1st Current Location Data Sharing Software H700c3 of Host H and 1st Current Location Data Sharing Software 206A700c3 of Device A, which share(s) the 1st current location data. In the present embodiment, CPU 211 (FIG. 1) of Device A retrieves the 1st current location data from 1st Current Location Data Storage Area 206A700b1a and sends the data to Host H in a wireless fashion (S1). Host H receives the 1st current location data from Device A and stores the data in 1st Current Location Data Storage Area H700b1a (S2). The foregoing sequence is repeated periodically.

This paragraph illustrate(s) 2nd Current Location Data Sharing Software H700c4 of Host H and 2nd Current Location Data Sharing Software 206A700c4 of Device A, which share(s) the 2nd current location data. In the present embodiment, Host H retrieves the 2nd current location data from 2nd Current Location Data Storage Area H700b1b and sends the data to Device A (S1). CPU 211 (FIG. 1) of Device A receives the 2nd current location data from Host H in a wireless fashion and stores the data in 2nd Current Location Data Storage Area 206A700b1b (S2). The foregoing sequence is repeated periodically.

This paragraph illustrate(s) Current Distance Data Producing Software H700c5 of Host H, which produce(s) the current distance data. In the present embodiment, Host H retrieves the 1st current location data from 1st Current Location Data Storage Area H700b1a (S1). Host H retrieves the 2nd current location data from 2nd Current Location Data Storage Area H700b1b (S2). Host H produces the current distance data by referring to the 1st current location data retrieved in S1 and the 2nd current location data retrieved in the previous step (S3). Host H stores the current distance data produced in the previous step in Current Distance Data Storage Area H700b2 (S4). The foregoing sequence is repeated periodically.

This paragraph illustrate(s) Current Speed Data Producing Software H700c6 of Host H and Current Speed Data Producing Software 206B700c6 of Device B, which produce(s) the current speed data. In the present embodiment, CPU 211 (FIG. 1) of Device B identifies the current speed of Carrier CR700B (S1). CPU 211 (FIG. 1) of Device B produces the current speed data by referring to the current speed identified in the previous step and sends the data to Host H in a wireless fashion (S2). Host H receives the current speed data from Device B and stores the data in Current Speed Data Storage Area H700b3 (S3). The foregoing sequence is repeated periodically.

This paragraph illustrate(s) Current Ideal Distance Data Producing Software H700c7 of Host H, which produce(s) the current ideal distance data. In the present embodiment, Host H retrieves the current speed data from Current Speed Data Storage Area H700b3 (S1). If the current speed data retrieved in the previous step is within the first speed range, Host H proceeds to the next step; if the current speed data retrieved in S1 is within the second speed range, Host H proceeds to S5; if the current speed data retrieved in S1 is within the third speed range, Host H proceeds to S7 (S2). Host H retrieves the first speed range required distance data from First Speed Range Required Distance Data Storage Area H700b4a (S3). Host H stores the first speed range required distance data retrieved in the previous step as the current ideal distance data in Current Ideal Distance Data Storage Area H700b5 (S4). Host H retrieves the second speed range required distance data from Second Speed Range Required Distance Data Storage Area H700b4b (S5). Host H stores the second speed range required distance data retrieved in the previous step as the current ideal distance data in Current Ideal Distance Data Storage Area H700b5 (S6). Host H retrieves the third speed range required distance data from Third Speed Range Required Distance Data Storage Area H700b4c (S7). Host H stores the third speed range required distance data retrieved in the previous step as the current ideal distance data in Current Ideal Distance Data Storage Area H700b5 (S8). The foregoing sequence is repeated periodically.

This paragraph illustrate(s) Carrier Speed Increasing Software H700c8 of Host H and Carrier Speed Increasing Software 206B700c8 of Device B, which increase(s) the current traveling speed of Carrier CR700B. In the present embodiment, Host H retrieves the current distance data from Current Distance Data Storage Area H700b2 (S1). Host H retrieves the current ideal distance data from Current Ideal Distance Data Storage Area H700b5 (S2). If the current distance data retrieved in S1 is larger than the current ideal distance data retrieved in the previous step, Host H proceeds to the next step (S3). Host H sends the speed increasing command to Device B (S4). Here, the speed increasing command is the command to increase the current speed of Carrier CR700B. CPU 211 (FIG. 1) of Device B receives the speed increasing command from Host H in a wireless fashion (S5). CPU 211 (FIG. 1) of Device B increases the speed of Carrier CR700B (S6). Host H retrieves the first speed message data from First Speed Message Data Storage Area H700b6a and sends the data to Device B (S7). CPU 211 (FIG. 1) of Device B receives the first speed message data from Host H in a wireless fashion and outputs the data from Speaker 216 (FIG. 1) and LCD 201 (FIG. 1) of Device B (S8). The foregoing sequence is repeated periodically.

This paragraph illustrate(s) Carrier Speed Decreasing Software H700c9 of Host H and Carrier Speed Decreasing Software 206B700c9 of Device B, which decrease(s) the current traveling speed of Carrier CR700B. In the present embodiment, Host H retrieves the current distance data from Current Distance Data Storage Area H700b2 (S1). Host H retrieves the current ideal distance data from Current Ideal Distance Data Storage Area H700b5 (S2). If the current distance data retrieved in S1 is smaller than the current ideal distance data retrieved in the previous step, Host H proceeds to the next step (S3). Host H sends the speed decreasing command to Device B (S4). Here, the speed decreasing command is the command to decrease the current speed of Carrier CR700B. CPU 211 (FIG. 1) of Device B receives the speed decreasing command from Host H in a wireless fashion (S5). CPU 211 (FIG. 1) decreases the speed of Carrier CR700B (S6). Host H retrieves the second speed message data from Second Speed Message Data Storage Area H700b6b and sends the data to Device B (S7). CPU 211 (FIG. 1) of Device B receives the second speed message data from Host H in a wireless fashion and outputs the data from Speaker 216 (FIG. 1) and LCD 201 (FIG. 1) of Device B (S8). The foregoing sequence is repeated periodically.

This paragraph illustrate(s) Relevant Data Sharing Software H700c10 of Host H and Relevant Data Sharing Software 206A700c10 of Device A, which share(s) the data relevant to Carrier CR700B. In the present embodiment, Host H retrieves the current distance data from Current Distance Data Storage Area H700b2 and sends the data to Device A (S1). CPU 211 (FIG. 1) of Device A receives the current distance data from Host H in a wireless fashion and stores the data in Current Distance Data Storage Area 206A700b2 (S2). Host H retrieves the current speed data from Current Speed Data Storage Area H700b3 and sends the data to Device A (S3). CPU 211 (FIG. 1) of Device A receives the current speed data from Host H in a wireless fashion and stores the data in Current Speed Data Storage Area 206A700b3 (S4). Host H retrieves the current ideal distance data from Current Ideal Distance Data Storage Area H700b5 and sends the data to Device A (S5). CPU 211 (FIG. 1) of Device A receives the current ideal distance data from Host H in a wireless fashion and stores the data in Current Ideal Distance Data Storage Area H700b5 (S6). The foregoing sequence is repeated periodically.

This paragraph illustrate(s) Relevant Data Displaying Software 206A700c11 of Device A, which indicate(s) the data relevant to Carrier CR700B. In the present embodiment, CPU 211 (FIG. 1) of Device A retrieves the current distance data from Current Distance Data Storage Area 206A700b2 (S1). CPU 211 (FIG. 1) of Device A displays the current distance data retrieved in the previous step on LCD 201 (FIG. 1) of Device A (S2). CPU 211 (FIG. 1) of Device A retrieves the current speed data from Current Speed Data Storage Area 206A700b3 (S3). CPU 211 (FIG. 1) of Device A displays the current speed data retrieved in the previous step on LCD 201 (FIG. 1) of Device A (S4). CPU 211 (FIG. 1) of Device A retrieves the current ideal distance data from Current Ideal Distance Data Storage Area 206A700b5 (S5). CPU 211 (FIG. 1) of Device A displays the current ideal distance data retrieved in the previous step on LCD 201 (FIG. 1) of Device A (S6). CPU 211 (FIG. 1) of Device A retrieves the map data from Map Data Storage Area 206A700b7 (S7). CPU 211 (FIG. 1) of Device A displays the map data retrieved in the previous step on LCD 201 (FIG. 1) of Device A (S8). CPU 211 (FIG. 1) of Device A retrieves the 1st current location data from 1st Current Location Data Storage Area 206A700b1a (S9). CPU 211 (FIG. 1) of Device A retrieves the 1st current location icon data from 1st Current Location Icon Data Storage Area 206A700b8a (S10). CPU 211 (FIG. 1) of Device A displays the 1st current location icon data retrieved in the previous step at the location corresponding to the 1st current location data retrieved in S9 on the map data displayed in S8 (S11). CPU 211 (FIG. 1) of Device A retrieves the 2nd current location data from 2nd Current Location Data Storage Area 206A700b1b (S12). CPU 211 (FIG. 1) of Device A retrieves the 2nd current location icon data from 2nd Current Location Icon Data Storage Area 206A700b8b (S13). CPU 211 (FIG. 1) of Device A displays the 2nd current location icon data retrieved in the previous step at the location corresponding to the 2nd current location data retrieved in S12 on the map data displayed in S8 (S14). The foregoing sequence is repeated periodically.

This paragraph illustrate(s) Relevant Data Displaying Software H700c11 of Host H and Relevant Data Displaying Software 206B700c11 of Device B, which indicate(s) the data relevant to Carrier CR700B. In the present embodiment, Host H retrieves the current distance data from Current Distance Data Storage Area H700b2 and sends the data to Device B (S1). CPU 211 (FIG. 1) of Device B receives the current distance data from Host H in a wireless fashion and displays the data on LCD 201 (FIG. 1) of Device B (S2). Host H retrieves the current speed data from Current Speed Data Storage Area H700b3 and sends the data to Device B (S3). CPU 211 (FIG. 1) of Device B receives the current speed data from Host H in a wireless fashion and displays the data on LCD 201 (FIG. 1) of Device B (S4). Host H retrieves the current ideal distance data from Current Ideal Distance Data Storage Area H700b5 and sends the data to Device B (S5). CPU 211 (FIG. 1) of Device B receives the current ideal distance data from Host H in a wireless fashion and displays the data on LCD 201 (FIG. 1) of Device B (S6). Host H retrieves the map data from Map Data Storage Area H700b7 and sends the data to Device B (S7). CPU 211 (FIG. 1) of Device B receives the map data from Host H in a wireless fashion and displays the data on LCD 201 (FIG. 1) of Device B (S8). Host H retrieves the 1st current location data from 1st Current Location Data Storage Area H700b1a and sends the data to Device B (S9). CPU 211 (FIG. 1) of Device B receives the 1st current location data from Host H in a wireless fashion (S10). Host H retrieves the 1st current location icon data from 1st Current Location Icon Data Storage Area H700b8a and sends the data to Device B (S11). CPU 211 (FIG. 1) of Device B receives the 1st current location icon data from Host H in a wireless fashion (S12). CPU 211 (FIG. 1) of Device B displays the 1st current location icon data received in the previous step at the location corresponding to the 1st current location data received in S10 on the map data displayed in S8 (S13). Host H retrieves the 2nd current location data from 2nd Current Location Data Storage Area H700b1b and sends the data to Device B (S14). CPU 211 (FIG. 1) of Device B receives the 2nd current location data from Host H in a wireless fashion (S15). Host H retrieves the 2nd current location icon data from 2nd Current Location Icon Data Storage Area H700b8b and sends the data to Device B (S16). CPU 211 (FIG. 1) of Device B receives the 2nd current location icon data from Host H in a wireless fashion (S17). CPU 211 (FIG. 1) of Device B displays the 2nd current location icon data received in the previous step at the location corresponding to the 2nd current location data received in S15 on the map data displayed in S8 (S18). The foregoing sequence is repeated periodically.

The following paragraphs illustrate another embodiment wherein Device B plays the major role in implementing the present function.

This paragraph illustrate(s) 1st Current Location Data Producing Software 206A700c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A700b1a (S3). The foregoing sequence is repeated periodically.

This paragraph illustrate(s) 2nd Current Location Data Producing Software 206B700c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B700b1b (S3). The foregoing sequence is repeated periodically.

This paragraph illustrate(s) 1st Current Location Data Sharing Software 206A700c3 of Device A and 1st Current Location Data Sharing Software 206B700c3 of Device B, which share(s) the 1st current location data. In the present embodiment, CPU 211 (FIG. 1) of Device A retrieves the 1st current location data from 1st Current Location Data Storage Area 206A700b1a and sends the data to Device B in a wireless fashion (S1). CPU 211 (FIG. 1) of Device B receives the 1st current location data from Device A in a wireless fashion and stores the data in 1st Current Location Data Storage Area 206B700b1a (S2). The foregoing sequence is repeated periodically.

This paragraph illustrate(s) 2nd Current Location Data Sharing Software 206A700c4 of Device A and 2nd Current Location Data Sharing Software 206B700c4 of Device B, which share(s) the 2nd current location data. In the present embodiment, CPU 211 (FIG. 1) of Device B retrieves the 2nd current location data from 2nd Current Location Data Storage Area 206B700b1b and sends the data to Device A in a wireless fashion (S1). CPU 211 (FIG. 1) of Device A receives the 2nd current location data from Device B in a wireless fashion and stores the data in 2nd Current Location Data Storage Area 206A700b1b (S2). The foregoing sequence is repeated periodically.

This paragraph illustrate(s) Current Distance Data Producing Software 206B700c5 of Device B, which produce(s) the current distance data. In the present embodiment, CPU 211 (FIG. 1) of Device B retrieves the 1st current location data from 1st Current Location Data Storage Area 206B700b1a (S1). CPU 211 (FIG. 1) of Device B retrieves the 2nd current location data from 2nd Current Location Data Storage Area 206B700b1b (S2). CPU 211 (FIG. 1) of Device B produces the current distance data by referring to the 1st current location data retrieved in S1 and the 2nd current location data retrieved in the previous step (S3). CPU 211 (FIG. 1) of Device B stores the current distance data produced in the previous step in Current Distance Data Storage Area 206B700b2 (S4). The foregoing sequence is repeated periodically.

This paragraph illustrate(s) Current Speed Data Producing Software 206B700c6 of Device B, which produce(s) the current speed data. In the present embodiment, CPU 211 (FIG. 1) of Device B identifies the current speed of Carrier CR700B (S1). CPU 211 (FIG. 1) of Device B produces the current speed data by referring to the current speed identified in the previous step (S2). CPU 211 (FIG. 1) of Device B stores the current speed data produced in the previous step in Current Speed Data Storage Area 206B700b3 (S3). The foregoing sequence is repeated periodically.

This paragraph illustrate(s) Current Ideal Distance Data Producing Software 206B700c7 of Device B, which produce(s) the current ideal distance data. In the present embodiment, CPU 211 (FIG. 1) of Device B retrieves the current speed data from Current Speed Data Storage Area 206B700b3 (S1). If the current speed data retrieved in the previous step is within the first speed range, CPU 211 (FIG. 1) of Device B proceeds to the next step; if the current speed data retrieved in S1 is within the second speed range, CPU 211 (FIG. 1) of Device B proceeds to S5; if the current speed data retrieved in S1 is within the third speed range, CPU 211 (FIG. 1) of Device B proceeds to S7 (S2). CPU 211 (FIG. 1) of Device B retrieves the first speed range required distance data from First Speed Range Required Distance Data Storage Area 206B700b4a (S3). CPU 211 (FIG. 1) of Device B stores the first speed range required distance data retrieved in the previous step as the current ideal distance data in Current Ideal Distance Data Storage Area 206B700b5 (S4). CPU 211 (FIG. 1) of Device B retrieves the second speed range required distance data from Second Speed Range Required Distance Data Storage Area 206B700b4b (S5). CPU 211 (FIG. 1) of Device B stores the second speed range required distance data retrieved in the previous step as the current ideal distance data in Current Ideal Distance Data Storage Area 206B700b5 (S6). CPU 211 (FIG. 1) of Device B retrieves the third speed range required distance data from Third Speed Range Required Distance Data Storage Area 206B700b4c (S7). CPU 211 (FIG. 1) of Device B stores the third speed range required distance data retrieved in the previous step as the current ideal distance data in Current Ideal Distance Data Storage Area 206B700b5 (S8). The foregoing sequence is repeated periodically.

This paragraph illustrate(s) Carrier Speed Increasing Software 206B700c8 of Device B, which increase(s) the current traveling speed of Carrier CR700B. In the present embodiment, CPU 211 (FIG. 1) of Device B retrieves the current distance data from Current Distance Data Storage Area 206B700b2 (S1). CPU 211 (FIG. 1) of Device B retrieves the current ideal distance data from Current Ideal Distance Data Storage Area 206B700b5 (S2). If the current distance data retrieved in S1 is larger than the current ideal distance data retrieved in the previous step, CPU 211 (FIG. 1) of Device B proceeds to the next step (S3). CPU 211 (FIG. 1) of Device B increases the speed of Carrier CR700B (S4). CPU 211 (FIG. 1) of Device B retrieves the first speed message data from First Speed Message Data Storage Area 206B700b6a (S5). CPU 211 (FIG. 1) of Device B outputs the first speed message data retrieved in the previous step from Speaker 216 (FIG. 1) and LCD 201 (FIG. 1) of Device B (S6). The foregoing sequence is repeated periodically.

This paragraph illustrate(s) Carrier Speed Decreasing Software 206B700c9 of Device B, which decrease(s) the current traveling speed of Carrier CR700B. In the present embodiment, CPU 211 (FIG. 1) of Device B retrieves the current distance data from Current Distance Data Storage Area 206B700b2 (S1). CPU 211 (FIG. 1) of Device B retrieves the current ideal distance data from Current Ideal Distance Data Storage Area 206B700b5 (S2). If the current distance data retrieved in S1 is smaller than the current ideal distance data retrieved in the previous step, CPU 211 (FIG. 1) of Device B proceeds to the next step (S3). CPU 211 (FIG. 1) of Device B decreases the speed of Carrier CR700B (S4). CPU 211 (FIG. 1) of Device B retrieves the second speed message data from Second Speed Message Data Storage Area 206B700b6b (S5). CPU 211 (FIG. 1) of Device B outputs the second speed message data retrieved in the previous step from Speaker 216 (FIG. 1) and LCD 201 (FIG. 1) of Device B (S6). The foregoing sequence is repeated periodically.

This paragraph illustrate(s) Relevant Data Sharing Software 206A700c10 of Device A and Relevant Data Sharing Software 206B700c10 of Device B, which share(s) the data relevant to Carrier CR700B. In the present embodiment, CPU 211 (FIG. 1) of Device B retrieves the current distance data from Current Distance Data Storage Area 206B700b2 and sends the data to Device A in a wireless fashion (S1). CPU 211 (FIG. 1) of Device A receives the current distance data from Device B in a wireless fashion and stores the data in Current Distance Data Storage Area 206A700b2 (S2). CPU 211 (FIG. 1) of Device B retrieves the current speed data from Current Speed Data Storage Area 206B700b3 and sends the data to Device A in a wireless fashion (S3). CPU 211 (FIG. 1) of Device A receives the current speed data from Device B in a wireless fashion and stores the data in Current Speed Data Storage Area 206A700b3 (S4). CPU 211 (FIG. 1) of Device B retrieves the current ideal distance data from Current Ideal Distance Data Storage Area 206B700b5 and sends the data to Device A in a wireless fashion (S5). CPU 211 (FIG. 1) of Device A receives the current ideal distance data from Device B in a wireless fashion and stores the data in Current Ideal Distance Data Storage Area 206B700b5 (S6). The foregoing sequence is repeated periodically.

This paragraph illustrate(s) Relevant Data Displaying Software 206A700c11 of Device A, which indicate(s) the data relevant to Carrier CR700B. In the present embodiment, CPU 211 (FIG. 1) of Device A retrieves the current distance data from Current Distance Data Storage Area 206A700b2 (S1). CPU 211 (FIG. 1) of Device A displays the current distance data retrieved in the previous step on LCD 201 (FIG. 1) of Device A (S2). CPU 211 (FIG. 1) of Device A retrieves the current speed data from Current Speed Data Storage Area 206A700b3 (S3). CPU 211 (FIG. 1) of Device A displays the current speed data retrieved in the previous step on LCD 201 (FIG. 1) of Device A (S4). CPU 211 (FIG. 1) of Device A retrieves the current ideal distance data from Current Ideal Distance Data Storage Area 206A700b5 (S5). CPU 211 (FIG. 1) of Device A displays the current ideal distance data retrieved in the previous step on LCD 201 (FIG. 1) of Device A (S6). CPU 211 (FIG. 1) of Device A retrieves the map data from Map Data Storage Area 206A700b7 (S7). CPU 211 (FIG. 1) of Device A displays the map data retrieved in the previous step on LCD 201 (FIG. 1) of Device A (S8). CPU 211 (FIG. 1) of Device A retrieves the 1st current location data from 1st Current Location Data Storage Area 206A700b1a (S9). CPU 211 (FIG. 1) of Device A retrieves the 1st current location icon data from 1st Current Location Icon Data Storage Area 206A700b8a (S10). CPU 211 (FIG. 1) of Device A displays the 1st current location icon data retrieved in the previous step at the location corresponding to the 1st current location data retrieved in S9 on the map data displayed in S8 (S11). CPU 211 (FIG. 1) of Device A retrieves the 2nd current location data from 2nd Current Location Data Storage Area 206A700b1b (S12). CPU 211 (FIG. 1) of Device A retrieves the 2nd current location icon data from 2nd Current Location Icon Data Storage Area 206A700b8b (S13). CPU 211 (FIG. 1) of Device A displays the 2nd current location icon data retrieved in the previous step at the location corresponding to the 2nd current location data retrieved in S12 on the map data displayed in S8 (S14). The foregoing sequence is repeated periodically.

This paragraph illustrate(s) Relevant Data Displaying Software 206B700c11 of Device B, which indicate(s) the data relevant to Carrier CR700B. In the present embodiment, CPU 211 (FIG. 1) of Device B retrieves the current distance data from Current Distance Data Storage Area 206B700b2 (S1). CPU 211 (FIG. 1) of Device B displays the current distance data retrieved in the previous step on LCD 201 (FIG. 1) of Device B (S2). CPU 211 (FIG. 1) of Device B retrieves the current speed data from Current Speed Data Storage Area 206B700b3 (S3). CPU 211 (FIG. 1) of Device B displays the current speed data retrieved in the previous step on LCD 201 (FIG. 1) of Device B (S4). CPU 211 (FIG. 1) of Device B retrieves the current ideal distance data from Current Ideal Distance Data Storage Area 206B700b5 (S5). CPU 211 (FIG. 1) of Device B displays the current ideal distance data retrieved in the previous step on LCD 201 (FIG. 1) of Device B (S6). CPU 211 (FIG. 1) of Device B retrieves the map data from Map Data Storage Area 206B700b7 (S7). CPU 211 (FIG. 1) of Device B displays the map data retrieved in the previous step on LCD 201 (FIG. 1) of Device B (S8). CPU 211 (FIG. 1) of Device B retrieves the 1st current location data from 1st Current Location Data Storage Area 206B700b1a (S9). CPU 211 (FIG. 1) of Device B retrieves the 1st current location icon data from 1st Current Location Icon Data Storage Area 206B700b8a (S10). CPU 211 (FIG. 1) of Device B displays the 1st current location icon data retrieved in the previous step at the location corresponding to the 1st current location data retrieved in S9 on the map data displayed in S8 (S11). CPU 211 (FIG. 1) of Device B retrieves the 2nd current location data from 2nd Current Location Data Storage Area 206B700b1b (S12). CPU 211 (FIG. 1) of Device B retrieves the 2nd current location icon data from 2nd Current Location Icon Data Storage Area 206B700b8b (S13). CPU 211 (FIG. 1) of Device B displays the 2nd current location icon data retrieved in the previous step at the location corresponding to the 2nd current location data retrieved in S12 on the map data displayed in S8 (S14). The foregoing sequence is repeated periodically.

<<Front Carrier Speed Dependent Ideal Distance Maintaining Function>>

The following paragraphs illustrate the front carrier speed dependent ideal distance maintaining function, wherein said communication device is installed in a 1st carrier, when the current distance between said 1st carrier and a 2nd carrier traveling behind said 1st carrier is longer than a current ideal distance, the current speed of said 1st carrier is decreased and a speed decreased message is output from said communication device, when the current distance between said 1st carrier and said 2nd carrier is shorter than said current ideal distance, the current speed of said 1st carrier is increased and a speed increased message is output from said communication device, wherein said current ideal distance varies depending on said current speed of said 1st carrier, said current distance, said current speed, said current ideal distance, a 1st current location which indicates the current location of said 1st carrier, and a 2nd current location which indicates the current location of said 2nd carrier are indicated on said display.

This paragraph illustrates the major elements utilized to implement the present function. In the present embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the relationship between Carrier CR701A and Device A. In the present embodiment, Carrier CR701A includes Device A. Here, Carrier CR701A is a carrier which may be any type of carrier or transportation system designed to carry passenger(s), such as an airplane, automobile, motorcycle, railway train, taxi, bus, space ship, or space station.

This paragraph illustrates the relationship between Carrier CR701B and Device B. In the present embodiment, Carrier CR701B includes Device B. Here, Carrier CR701B is a carrier which may be any type of carrier or transportation system designed to carry passenger(s), such as an airplane, automobile, motorcycle, railway train, taxi, bus, space ship, or space station. In the present embodiment, Carrier CR701A is the carrier traveling in front of Carrier CR701B and Carrier CR701B is the carrier traveling behind Carrier CR701A on a highway.

This paragraph illustrates the storage area included in Host H. In the present embodiment, Host H includes Front Carrier Speed Dependent Ideal Distance Maintaining Info Storage Area H701a of which the data and the software program(s) stored therein are described hereinafter.

This paragraph illustrates the storage area(s) included in Front Carrier Speed Dependent Ideal Distance Maintaining Info Storage Area H701a. In the present embodiment, Front Carrier Speed Dependent Ideal Distance Maintaining Info Storage Area H701a includes Front Carrier Speed Dependent Ideal Distance Maintaining Data Storage Area H701b and Front Carrier Speed Dependent Ideal Distance Maintaining Software Storage Area H701c. Front Carrier Speed Dependent Ideal Distance Maintaining Data Storage Area H701b stores the data necessary to implement the present function on the side of Host H, such as the one(s) described hereinafter. Front Carrier Speed Dependent Ideal Distance Maintaining Software Storage Area H701c stores the software program(s) necessary to implement the present function on the side of Host H, such as the one(s) described hereinafter.

This paragraph illustrates the storage area(s) included in Front Carrier Speed Dependent Ideal Distance Maintaining Data Storage Area H701b. In the present embodiment, Front Carrier Speed Dependent Ideal Distance Maintaining Data Storage Area H701b includes Entire Current Location Data Storage Area H701b1, Current Distance Data Storage Area H701b2, Current Speed Data Storage Area H701b3, Speed Dependent Required Distance Data Storage Area H701b4, Current Ideal Distance Data Storage Area H701b5, Entire Speed Message Data Storage Area H701b6, Map Data Storage Area H701b7, Entire Current Location Icon Data Storage Area H701b8, and Work Area H701b9. Entire Current Location Data Storage Area H701b1 stores the data described hereinafter. Current Distance Data Storage Area H701b2 stores the current distance data which indicates the current distance between Carrier CR701A and Carrier CR701B. Current Speed Data Storage Area H701b3 stores the current speed data which indicates the current speed of Carrier CR701A. Speed Dependent Required Distance Data Storage Area H701b4 stores the data described hereinafter. Current Ideal Distance Data Storage Area H701b5 stores the current ideal distance data which indicates the current ideal distance between Carrier CR701A and Carrier CR701B. Entire Speed Message Data Storage Area H701b6 stores the data described hereinafter. Map Data Storage Area H701b7 stores the map data which is the image data indicating a map. Entire Current Location Icon Data Storage Area H701b8 stores the data described hereinafter. Work Area H701b9 is utilized as a work area to perform calculation and temporarily store data to implement the present function.

This paragraph illustrates the storage area(s) included in Entire Current Location Data Storage Area H701b1. In the present embodiment, Entire Current Location Data Storage Area H701b1 includes 1st Current Location Data Storage Area H701b1a and 2nd Current Location Data Storage Area H701b1b. 1st Current Location Data Storage Area H701b1a stores the 1st current location data which indicates the current geographic location of Carrier CR701A in (x,y,z) format. 2nd Current Location Data Storage Area H701b1b stores the 2nd current location data which indicates the current geographic location of Carrier CR701B in (x,y,z) format.

This paragraph illustrates the storage area(s) included in Speed Dependent Required Distance Data Storage Area H701b4. In the present embodiment, Speed Dependent Required Distance Data Storage Area H701b4 includes First Speed Range Required Distance Data Storage Area H701b4a, Second Speed Range Required Distance Data Storage Area H701b4b, and Third Speed Range Required Distance Data Storage Area H701b4c. First Speed Range Required Distance Data Storage Area H701b4a stores the first speed range required distance data which indicates the ideal distance between Carrier CR701A and Carrier CR701B when Carrier CR701A is proceeding within the first speed range. Second Speed Range Required Distance Data Storage Area H701b4b stores the second speed range required distance data which indicates the ideal distance between Carrier CR701A and Carrier CR701B when Carrier CR701A is proceeding within the second speed range. Third Speed Range Required Distance Data Storage Area H701b4c stores the third speed range required distance data which indicates the ideal distance between Carrier CR701A and Carrier CR701B when Carrier CR701A is proceeding within the third speed range.

This paragraph illustrates the storage area(s) included in Entire Speed Message Data Storage Area H701b6. In the present embodiment, Entire Speed Message Data Storage Area H701b6 includes First Speed Message Data Storage Area H701b6a and Second Speed Message Data Storage Area H701b6b. First Speed Message Data Storage Area H701b6a stores the first speed message data which is the audiovisual data indicating that the current distance between Carrier CR701A and Carrier CR701B is longer than the ideal distance, therefore the speed of Carrier CR701A is decreased. Second Speed Message Data Storage Area H701b6b stores the second speed message data which is the audiovisual data indicating that the current distance between Carrier CR701A and Carrier CR701B is shorter than the ideal distance, therefore the speed of Carrier CR701A is increased.

This paragraph illustrates the storage area(s) included in Entire Current Location Icon Data Storage Area H701b8. In the present embodiment, Entire Current Location Icon Data Storage Area H701b8 includes 1st Current Location Icon Data Storage Area H701b8a and 2nd Current Location Icon Data Storage Area H701b8b. 1st Current Location Icon Data Storage Area H701b8a stores the 1st current location icon data which is the image of the icon utilized to indicate the 1st current location data on the map data. 2nd Current Location Icon Data Storage Area H701b8b stores the 2nd current location icon data which is the image of the icon utilized to indicate the 2nd current location data on the map data.

This paragraph illustrates the software program(s) stored in Front Carrier Speed Dependent Ideal Distance Maintaining Software Storage Area H701c. In the present embodiment, Front Carrier Speed Dependent Ideal Distance Maintaining Software Storage Area H701c stores 1st Current Location Data Producing Software H701c1, 1st Current Location Data Sharing Software H701c3, 2nd Current Location Data Sharing Software H701c4, Current Distance Data Producing Software H701c5, Current Speed Data Producing Software H701c6, Current Ideal Distance Data Producing Software H701c7, Carrier Speed Decreasing Software H701c8, Carrier Speed Increasing Software H701c9, Relevant Data Sharing Software H701c10, and Relevant Data Displaying Software H701c11. 1st Current Location Data Producing Software H701c1 is the software program described hereinafter. 1st Current Location Data Sharing Software H701c3 is the software program described hereinafter. 2nd Current Location Data Sharing Software H701c4 is the software program described hereinafter. Current Distance Data Producing Software H701c5 is the software program described hereinafter. Current Speed Data Producing Software H701c6 is the software program described hereinafter. Current Ideal Distance Data Producing Software H701c7 is the software program described hereinafter. Carrier Speed Decreasing Software H701c8 is the software program described hereinafter. Carrier Speed Increasing Software H701c9 is the software program described hereinafter. Relevant Data Sharing Software H701c10 is the software program described hereinafter. Relevant Data Displaying Software H701c11 is the software program described hereinafter.

This paragraph illustrates the storage area included in RAM 206 (FIG. 1) of Device A. In the present embodiment, RAM 206 includes Front Carrier Speed Dependent Ideal Distance Maintaining Info Storage Area 206A701a of which the data and the software program(s) stored therein are described hereinafter.

The data and/or the software program(s) necessary to implement the present function may be downloaded from Host H to Device A in the manner described hereinafter.

This paragraph illustrates the storage area(s) included in Front Carrier Speed Dependent Ideal Distance Maintaining Info Storage Area 206A701a. In the present embodiment, Front Carrier Speed Dependent Ideal Distance Maintaining Info Storage Area 206A701a includes Front Carrier Speed Dependent Ideal Distance Maintaining Data Storage Area 206A701b and Front Carrier Speed Dependent Ideal Distance Maintaining Software Storage Area 206A701c. Front Carrier Speed Dependent Ideal Distance Maintaining Data Storage Area 206A701b stores the data necessary to implement the present function on the side of Device A, such as the one(s) described hereinafter. Front Carrier Speed Dependent Ideal Distance Maintaining Software Storage Area 206A701c stores the software program(s) necessary to implement the present function on the side of Device A, such as the one(s) described hereinafter.

This paragraph illustrates the storage area(s) included in Front Carrier Speed Dependent Ideal Distance Maintaining Data Storage Area 206A701b. In the present embodiment, Front Carrier Speed Dependent Ideal Distance Maintaining Data Storage Area 206A701b includes Entire Current Location Data Storage Area 206A701b1, Current Distance Data Storage Area 206A701b2, Current Speed Data Storage Area 206A701b3, Speed Dependent Required Distance Data Storage Area 206A701b4, Current Ideal Distance Data Storage Area 206A701b5, Entire Speed Message Data Storage Area 206A701b6, Map Data Storage Area 206A701b7, Entire Current Location Icon Data Storage Area 206A701b8, and Work Area 206A701b9. Entire Current Location Data Storage Area 206A701b1 stores the data described hereinafter. Current Distance Data Storage Area 206A701b2 stores the current distance data which indicates the current distance between Carrier CR701A and Carrier CR701B. Current Speed Data Storage Area 206A701b3 stores the current speed data which indicates the current speed of Carrier CR701A. Speed Dependent Required Distance Data Storage Area 206A701b4 stores the data described hereinafter. Current Ideal Distance Data Storage Area 206A701b5 stores the current ideal distance data which indicates the current ideal distance between Carrier CR701A and Carrier CR701B. Entire Speed Message Data Storage Area 206A701b6 stores the data described hereinafter. Map Data Storage Area 206A701b7 stores the map data which is the image data indicating a map. Entire Current Location Icon Data Storage Area 206A701b8 stores the data described hereinafter. Work Area 206A701b9 is utilized as a work area to perform calculation and temporarily store data to implement the present function.

This paragraph illustrates the storage area(s) included in Entire Current Location Data Storage Area 206A701b1. In the present embodiment, Entire Current Location Data Storage Area 206A701b1 includes 1st Current Location Data Storage Area 206A701b1a and 2nd Current Location Data Storage Area 206A701b1b. 1st Current Location Data Storage Area 206A701b1a stores the 1st current location data which indicates the current geographic location of Carrier CR701A in (x,y,z) format. 2nd Current Location Data Storage Area 206A701b1b stores the 2nd current location data which indicates the current geographic location of Carrier CR701B in (x,y,z) format.

This paragraph illustrates the storage area(s) included in Speed Dependent Required Distance Data Storage Area 206A701b4. In the present embodiment, Speed Dependent Required Distance Data Storage Area 206A701b4 includes First Speed Range Required Distance Data Storage Area 206A701b4a, Second Speed Range Required Distance Data Storage Area 206A701b4b, and Third Speed Range Required Distance Data Storage Area 206A701b4c. First Speed Range Required Distance Data Storage Area 206A701b4a stores the first speed range required distance data which indicates the ideal distance between Carrier CR701A and Carrier CR701B when Carrier CR701A is proceeding within the first speed range. Second Speed Range Required Distance Data Storage Area 206A701b4b stores the second speed range required distance data which indicates the ideal distance between Carrier CR701A and Carrier CR701B when Carrier CR701A is proceeding within the second speed range. Third Speed Range Required Distance Data Storage Area 206A701b4c stores the third speed range required distance data which indicates the ideal distance between Carrier CR701A and Carrier CR701B when Carrier CR701A is proceeding within the third speed range.

This paragraph illustrates the storage area(s) included in Entire Speed Message Data Storage Area 206A701b6. In the present embodiment, Entire Speed Message Data Storage Area 206A701b6 includes First Speed Message Data Storage Area 206A701b6a and Second Speed Message Data Storage Area 206A701b6b. First Speed Message Data Storage Area 206A701b6a stores the first speed message data which is the audiovisual data indicating that the current distance between Carrier CR701A and Carrier CR701B is longer than the ideal distance, therefore the speed of Carrier CR701A is decreased. Second Speed Message Data Storage Area 206A701b6b stores the second speed message data which is the audiovisual data indicating that the current distance between Carrier CR701A and Carrier CR701B is shorter than the ideal distance, therefore the speed of Carrier CR701A is increased.

This paragraph illustrates the storage area(s) included in Entire Current Location Icon Data Storage Area 206A701b8. In the present embodiment, Entire Current Location Icon Data Storage Area 206A701b8 includes 1st Current Location Icon Data Storage Area 206A701b8a and 2nd Current Location Icon Data Storage Area 206A701b8b. 1st Current Location Icon Data Storage Area 206A701b8a stores the 1st current location icon data which is the image of the icon utilized to indicate the 1st current location data on the map data. 2nd Current Location Icon Data Storage Area 206A701b8b stores the 2nd current location icon data which is the image of the icon utilized to indicate the 2nd current location data on the map data.

This paragraph illustrates the software program(s) stored in Front Carrier Speed Dependent Ideal Distance Maintaining Software Storage Area 206A701c. In the present embodiment, Front Carrier Speed Dependent Ideal Distance Maintaining Software Storage Area 206A701c stores 1st Current Location Data Producing Software 206A701c1, 1st Current Location Data Sharing Software 206A701c3, 2nd Current Location Data Sharing Software 206A701c4, Current Distance Data Producing Software 206A701c5, Current Speed Data Producing Software 206A701c6, Current Ideal Distance Data Producing Software 206A701c7, Carrier Speed Decreasing Software 206A701c8, Carrier Speed Increasing Software 206A701c9, Relevant Data Sharing Software 206A701c10, and Relevant Data Displaying Software 206A701c11. 1st Current Location Data Producing Software 206A701c1 is the software program described hereinafter. 1st Current Location Data Sharing Software 206A701c3 is the software program described hereinafter. 2nd Current Location Data Sharing Software 206A701c4 is the software program described hereinafter. Current Distance Data Producing Software 206A701c5 is the software program described hereinafter. Current Speed Data Producing Software 206A701c6 is the software program described hereinafter. Current Ideal Distance Data Producing Software 206A701c7 is the software program described hereinafter. Carrier Speed Decreasing Software 206A701c8 is the software program described hereinafter. Carrier Speed Increasing Software 206A701c9 is the software program described hereinafter. Relevant Data Sharing Software 206A701c10 is the software program described hereinafter. Relevant Data Displaying Software 206A701c11 is the software program described hereinafter.

This paragraph illustrates the storage area included in RAM 206 (FIG. 1) of Device B. In the present embodiment, RAM 206 includes Front Carrier Speed Dependent Ideal Distance Maintaining Info Storage Area 206B701a of which the data and the software program(s) stored therein are described hereinafter.

The data and/or the software program(s) necessary to implement the present function may be downloaded from Host H to Device B in the manner described hereinafter.

This paragraph illustrates the storage area(s) included in Front Carrier Speed Dependent Ideal Distance Maintaining Info Storage Area 206B701a. In the present embodiment, Front Carrier Speed Dependent Ideal Distance Maintaining Info Storage Area 206B701a includes Front Carrier Speed Dependent Ideal Distance Maintaining Data Storage Area 206B701b and Front Carrier Speed Dependent Ideal Distance Maintaining Software Storage Area 206B701c. Front Carrier Speed Dependent Ideal Distance Maintaining Data Storage Area 206B701b stores the data necessary to implement the present function on the side of Device B, such as the one(s) described hereinafter. Front Carrier Speed Dependent Ideal Distance Maintaining Software Storage Area 206B701c stores the software program(s) necessary to implement the present function on the side of Device B, such as the one(s) described hereinafter.

This paragraph illustrates the storage area(s) included in Front Carrier Speed Dependent Ideal Distance Maintaining Data Storage Area 206B701b. In the present embodiment, Front Carrier Speed Dependent Ideal Distance Maintaining Data Storage Area 206B701b includes Entire Current Location Data Storage Area 206B701b1, Current Distance Data Storage Area 206B701b2, Current Speed Data Storage Area 206B701b3, Speed Dependent Required Distance Data Storage Area 206B701b4, Current Ideal Distance Data Storage Area 206B701b5, Entire Speed Message Data Storage Area 206B701b6, Map Data Storage Area 206B701b7, Entire Current Location Icon Data Storage Area 206B701b8, and Work Area 206B701b9. Entire Current Location Data Storage Area 206B701b1 stores the data described hereinafter. Current Distance Data Storage Area 206B701b2 stores the current distance data which indicates the current distance between Carrier CR701A and Carrier CR701B. Current Speed Data Storage Area 206B701b3 stores the current speed data which indicates the current speed of Carrier CR701A. Speed Dependent Required Distance Data Storage Area 206B701b4 stores the data described hereinafter. Current Ideal Distance Data Storage Area 206B701b5 stores the current ideal distance data which indicates the current ideal distance between Carrier CR701A and Carrier CR701B. Entire Speed Message Data Storage Area 206B701b6 stores the data described hereinafter. Map Data Storage Area 206B701b7 stores the map data which is the image data indicating a map. Entire Current Location Icon Data Storage Area 206B701b8 stores the data described hereinafter. Work Area 206B701b9 is utilized as a work area to perform calculation and temporarily store data to implement the present function.

This paragraph illustrates the storage area(s) included in Entire Current Location Data Storage Area 206B701b1. In the present embodiment, Entire Current Location Data Storage Area 206B701b1 includes 1st Current Location Data Storage Area 206B701b1a and 2nd Current Location Data Storage Area 206B701b1b. 1st Current Location Data Storage Area 206B701b1a stores the 1st current location data which indicates the current geographic location of Carrier CR701A in (x,y,z) format. 2nd Current Location Data Storage Area 206B701b1b stores the 2nd current location data which indicates the current geographic location of Carrier CR701B in (x,y,z) format.

This paragraph illustrates the storage area(s) included in Speed Dependent Required Distance Data Storage Area 206B701b4. In the present embodiment, Speed Dependent Required Distance Data Storage Area 206B701b4 includes First Speed Range Required Distance Data Storage Area 206B701b4a, Second Speed Range Required Distance Data Storage Area 206B701b4b, and Third Speed Range Required Distance Data Storage Area 206B701b4c. First Speed Range Required Distance Data Storage Area 206B701b4a stores the first speed range required distance data which indicates the ideal distance between Carrier CR701A and Carrier CR701B when Carrier CR701A is proceeding within the first speed range. Second Speed Range Required Distance Data Storage Area 206B701b4b stores the second speed range required distance data which indicates the ideal distance between Carrier CR701A and Carrier CR701B when Carrier CR701A is proceeding within the second speed range. Third Speed Range Required Distance Data Storage Area 206B701b4c stores the third speed range required distance data which indicates the ideal distance between Carrier CR701A and Carrier CR701B when Carrier CR701A is proceeding within the third speed range.

This paragraph illustrates the storage area(s) included in Entire Speed Message Data Storage Area 206B701b6. In the present embodiment, Entire Speed Message Data Storage Area 206B701b6 includes First Speed Message Data Storage Area 206B701b6a and Second Speed Message Data Storage Area 206B701b6b. First Speed Message Data Storage Area 206B701b6a stores the first speed message data which is the audiovisual data indicating that the current distance between Carrier CR701A and Carrier CR701B is longer than the ideal distance, therefore the speed of Carrier CR701A is decreased. Second Speed Message Data Storage Area 206B701b6b stores the second speed message data which is the audiovisual data indicating that the current distance between Carrier CR701A and Carrier CR701B is shorter than the ideal distance, therefore the speed of Carrier CR701A is increased.

53

This paragraph illustrates the storage area(s) included in Entire Current Location Icon Data Storage Area 206B701b8. In the present embodiment, Entire Current Location Icon Data Storage Area 206B701b8 includes 1st Current Location Icon Data Storage Area 206B701b8a and 2nd Current Location Icon Data Storage Area 206B701b8b. 1st Current Location Icon Data Storage Area 206B701b8a stores the 1st current location icon data which is the image of the icon utilized to indicate the 1st current location data on the map data. 2nd Current Location Icon Data Storage Area 206B701b8b stores the 2nd current location icon data which is the image of the icon utilized to indicate the 2nd current location data on the map data.

This paragraph illustrates the software program(s) stored in Front Carrier Speed Dependent Ideal Distance Maintaining Software Storage Area 206B701c. In the present embodiment, Front Carrier Speed Dependent Ideal Distance Maintaining Software Storage Area 206B701c stores 2nd Current Location Data Producing Software 206B701c2, 1st Current Location Data Sharing Software 206B701c3, 2nd Current Location Data Sharing Software 206B701c4, Relevant Data Sharing Software 206B701c10, and Relevant Data Displaying Software 206B701c11. 2nd Current Location Data Producing Software 206B701c2 is the software program described hereinafter. 1st Current Location Data Sharing Software 206B701c3 is the software program described hereinafter. 2nd Current Location Data Sharing Software 206B701c4 is the software program described hereinafter. Relevant Data Sharing Software 206B701c10 is the software program described hereinafter. Relevant Data Displaying Software 206B701c11 is the software program described hereinafter.

This paragraph illustrate(s) 1st Current Location Data Producing Software H701c1 of Host H and 1st Current Location Data Producing Software 206A701c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step and sends the data to Host H in a wireless fashion (S2). Host H receives the 1st current location data from Device A and stores the data in 1st Current Location Data Storage Area H701b1a (S3). The foregoing sequence is repeated periodically.

This paragraph illustrate(s) 2nd Current Location Data Producing Software 206B701c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B701b1b (S3). The foregoing sequence is repeated periodically.

This paragraph illustrate(s) 1st Current Location Data Sharing Software H701c3 of Host H and 1st Current Location Data Sharing Software 206B701c3 of Device B, which share(s) the 1st current location data. In the present embodiment, Host H retrieves the 1st current location data from 1st Current Location Data Storage Area H701b1a and sends the data to Device B (S1). CPU 211 (FIG. 1) of Device B receives the 1st current location data from Host H in a wireless fashion and stores the data in 1st Current Location Data Storage Area 206B701b1a (S2). The foregoing sequence is repeated periodically.

54

This paragraph illustrate(s) 2nd Current Location Data Sharing Software H701c4 of Host H and 2nd Current Location Data Sharing Software 206B701c4 of Device B, which share(s) the 2nd current location data. In the present embodiment, CPU 211 (FIG. 1) of Device B retrieves the 2nd current location data from 2nd Current Location Data Storage Area 206B701b1b and sends the data to Host H in a wireless fashion (S1). Host H receives the 2nd current location data from Device B and stores the data in 2nd Current Location Data Storage Area H701b1b (S2). The foregoing sequence is repeated periodically.

This paragraph illustrate(s) Current Distance Data Producing Software H701c5 of Host H, which produce(s) the current distance data. In the present embodiment, Host H retrieves the 1st current location data from 1st Current Location Data Storage Area H701b1a (S1). Host H retrieves the 2nd current location data from 2nd Current Location Data Storage Area H701b1b (S2). Host H produces the current distance data by referring to the 1st current location data retrieved in S1 and the 2nd current location data retrieved in the previous step (S3). Host H stores the current distance data produced in the previous step in Current Distance Data Storage Area H701b2 (S4). The foregoing sequence is repeated periodically.

This paragraph illustrate(s) Current Speed Data Producing Software H701c6 of Host H and Current Speed Data Producing Software 206A701c6 of Device A, which produce(s) the current speed data. In the present embodiment, CPU 211 (FIG. 1) of Device A identifies the current speed of Carrier CR701A (S1). CPU 211 (FIG. 1) of Device A produces the current speed data by referring to the current speed identified in the previous step and sends the data to Host H in a wireless fashion (S2). Host H receives the current speed data from Device A and stores the data in Current Speed Data Storage Area H701b3 (S3). The foregoing sequence is repeated periodically.

This paragraph illustrate(s) Current Ideal Distance Data Producing Software H701c7 of Host H, which produce(s) the current ideal distance data. In the present embodiment, Host H retrieves the current speed data from Current Speed Data Storage Area H701b3 (S1). If the current speed data retrieved in the previous step is within the first speed range, Host H proceeds to the next step; if the current speed data retrieved in S1 is within the second speed range, Host H proceeds to S5; if the current speed data retrieved in S1 is within the third speed range, Host H proceeds to S7 (S2). Host H retrieves the first speed range required distance data from First Speed Range Required Distance Data Storage Area H701b4a (S3). Host H stores the first speed range required distance data retrieved in the previous step as the current ideal distance data in Current Ideal Distance Data Storage Area H701b5 (S4). Host H retrieves the second speed range required distance data from Second Speed Range Required Distance Data Storage Area H701b4b (S5). Host H stores the second speed range required distance data retrieved in the previous step as the current ideal distance data in Current Ideal Distance Data Storage Area H701b5 (S6). Host H retrieves the third speed range required distance data from Third Speed Range Required Distance Data Storage Area H701b4c (S7). Host H stores the third speed range required distance data retrieved in the previous step as the current ideal distance data in Current Ideal Distance Data Storage Area H701b5 (S8). The foregoing sequence is repeated periodically.

This paragraph illustrate(s) Carrier Speed Decreasing Software H701c8 of Host H and Carrier Speed Decreasing Software 206A701c8 of Device A, which decrease(s) the current traveling speed of Carrier CR701A. In the present embodiment, Host H retrieves the current distance data from Current Distance Data Storage Area H701b2 (S1). Host H retrieves the current ideal distance data from Current Ideal Distance Data Storage Area H701b5 (S2). If the current distance data retrieved in S1 is larger than the current ideal distance data retrieved in the previous step, Host H proceeds to the next step (S3). Host H sends the speed decreasing command to Device A (S4). Here, the speed decreasing command is the command to decrease the current speed of Carrier CR701A. CPU 211 (FIG. 1) of Device A receives the speed decreasing command from Host H in a wireless fashion (S5). CPU 211 (FIG. 1) of Device A decreases the speed of Carrier CR701A (S6). Host H retrieves the first speed message data from First Speed Message Data Storage Area H701b6a and sends the data to Device A (S7). CPU 211 (FIG. 1) of Device A receives the first speed message data from Host H in a wireless fashion and outputs the data from Speaker 216 (FIG. 1) and LCD 201 (FIG. 1) of Device A (S8). The foregoing sequence is repeated periodically.

This paragraph illustrate(s) Carrier Speed Increasing Software H701c9 of Host H and Carrier Speed Increasing Software 206A701c9 of Device A, which increase(s) the current traveling speed of Carrier CR701A. In the present embodiment, Host H retrieves the current distance data from Current Distance Data Storage Area H701b2 (S1). Host H retrieves the current ideal distance data from Current Ideal Distance Data Storage Area H701b5 (S2). If the current distance data retrieved in S1 is smaller than the current ideal distance data retrieved in the previous step, Host H proceeds to the next step (S3). Host H sends the speed increasing command to Device A (S4). Here, the speed increasing command is the command to increase the current speed of Carrier CR701A. CPU 211 (FIG. 1) of Device A receives the speed increasing command from Host H in a wireless fashion (S5). CPU 211 (FIG. 1) of Device A increases the speed of Carrier CR701A (S6). Host H retrieves the second speed message data from Second Speed Message Data Storage Area H701b6b and sends the data to Device A (S7). CPU 211 (FIG. 1) of Device A receives the second speed message data from Host H in a wireless fashion and outputs the data from Speaker 216 (FIG. 1) and LCD 201 (FIG. 1) of Device A (S8). The foregoing sequence is repeated periodically.

This paragraph illustrate(s) Relevant Data Sharing Software H701c10 of Host H and Relevant Data Sharing Software 206B701c10 of Device B, which share(s) the data relevant to Carrier CR701A. In the present embodiment, Host H retrieves the current distance data from Current Distance Data Storage Area H701b2 and sends the data to Device B (S1). CPU 211 (FIG. 1) of Device B receives the current distance data from Host H in a wireless fashion and stores the data in Current Distance Data Storage Area 206B701b2 (S2). Host H retrieves the current speed data from Current Speed Data Storage Area H701b3 and sends the data to Device B (S3). CPU 211 (FIG. 1) of Device B receives the current speed data from Host H in a wireless fashion and stores the data in Current Speed Data Storage Area 206B701b3 (S4). Host H retrieves the current ideal distance data from Current Ideal Distance Data Storage Area H701b5 and sends the data to Device B (S5). CPU 211 (FIG. 1) of Device B receives the current ideal distance data from Host H in a wireless fashion and stores the data in Current Ideal Distance Data Storage Area H701b5 (S6). The foregoing sequence is repeated periodically.

This paragraph illustrate(s) Relevant Data Displaying Software H701c11 of Host H and Relevant Data Displaying Software 206A701c11 of Device A, which indicate(s) the data relevant to Carrier CR701A. In the present embodiment, Host H retrieves the current distance data from Current Distance Data Storage Area H701b2 and sends the data to Device A (S1). CPU 211 (FIG. 1) of Device A receives the current distance data from Host H in a wireless fashion and displays the data on LCD 201 (FIG. 1) of Device A (S2). Host H retrieves the current speed data from Current Speed Data Storage Area H701b3 and sends the data to Device A (S3). CPU 211 (FIG. 1) of Device A receives the current speed data from Host H in a wireless fashion and displays the data on LCD 201 (FIG. 1) of Device A (S4). Host H retrieves the current ideal distance data from Current Ideal Distance Data Storage Area H701b5 and sends the data to Device A (S5). CPU 211 (FIG. 1) of Device A receives the current ideal distance data from Host H in a wireless fashion and displays the data on LCD 201 (FIG. 1) of Device A (S6). Host H retrieves the map data from Map Data Storage Area H701b7 and sends the data to Device A (S7). CPU 211 (FIG. 1) of Device A receives the map data from Host H in a wireless fashion and displays the data on LCD 201 (FIG. 1) of Device A (S8). Host H retrieves the 1st current location data from 1st Current Location Data Storage Area H701b1a and sends the data to Device A (S9). CPU 211 (FIG. 1) of Device A receives the 1st current location data from Host H in a wireless fashion (S10). Host H retrieves the 1st current location icon data from 1st Current Location Icon Data Storage Area H701b8a and sends the data to Device A (S11). CPU 211 (FIG. 1) of Device A receives the 1st current location icon data from Host H in a wireless fashion (S12). CPU 211 (FIG. 1) of Device A displays the 1st current location icon data received in the previous step at the location corresponding to the 1st current location data received in S10 on the map data displayed in S8 (S13). Host H retrieves the 2nd current location data from 2nd Current Location Data Storage Area H701b1b and sends the data to Device A (S14). CPU 211 (FIG. 1) of Device A receives the 2nd current location data from Host H in a wireless fashion (S15). Host H retrieves the 2nd current location icon data from 2nd Current Location Icon Data Storage Area H701b8b and sends the data to Device A (S16). CPU 211 (FIG. 1) of Device A receives the 2nd current location icon data from Host H in a wireless fashion (S17). CPU 211 (FIG. 1) of Device A displays the 2nd current location icon data received in the previous step at the location corresponding to the 2nd current location data received in S15 on the map data displayed in S8 (S18). The foregoing sequence is repeated periodically.

This paragraph illustrate(s) Relevant Data Displaying Software 206B701c11 of Device B, which indicate(s) the data relevant to Carrier CR701A. In the present embodiment, CPU 211 (FIG. 1) of Device B retrieves the current distance data from Current Distance Data Storage Area 206B701b2 (S1). CPU 211 (FIG. 1) of Device B displays the current distance data retrieved in the previous step on LCD 201 (FIG. 1) of Device B (S2). CPU 211 (FIG. 1) of Device B retrieves the current speed data from Current Speed Data Storage Area 206B701b3 (S3). CPU 211 (FIG. 1) of Device B displays the current speed data retrieved in the previous step on LCD 201 (FIG. 1) of Device B (S4). CPU 211 (FIG. 1) of Device B retrieves the current ideal distance data from Current Ideal Distance Data Storage Area 206B701b5 (S5). CPU 211 (FIG. 1) of Device B displays the current ideal distance data retrieved in the previous step on LCD 201 (FIG. 1) of Device B (S6). CPU 211 (FIG. 1) of Device B retrieves the map data from Map Data Storage Area 206B701b7 (S7). CPU 211 (FIG. 1) of Device B displays the map data retrieved in the previous step on LCD 201 (FIG. 1) of Device B (S8). CPU 211 (FIG. 1) of Device B retrieves the 1st current location data from 1st Current Location Data Storage Area 206B701b1a (S9). CPU 211 (FIG. 1) of Device B retrieves the 1st current location icon data from 1st Current Location Icon Data Storage Area 206B701b8a (S10). CPU 211 (FIG. 1) of Device B displays the 1st current location icon data retrieved in the previous step at the location corresponding to the 1st current location data retrieved in S9 on the map data displayed in S8 (S11). CPU 211 (FIG. 1) of Device B retrieves the 2nd current location data from 2nd Current Location Data Storage Area 206B701b1b (S12). CPU 211 (FIG. 1) of Device B retrieves the 2nd current location icon data from 2nd Current Location Icon Data Storage Area 206B701b8b (S13). CPU 211 (FIG. 1) of Device B displays the 2nd current location icon data retrieved in the previous step at the location corresponding to the 2nd current location data retrieved in S12 on the map data displayed in S8 (S14). The foregoing sequence is repeated periodically.

The following paragraphs illustrate another embodiment wherein Device A plays the major role in implementing the present function.

This paragraph illustrate(s) 1st Current Location Data Producing Software 206A701c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A701b1a (S3). The foregoing sequence is repeated periodically.

This paragraph illustrate(s) 2nd Current Location Data Producing Software 206B701c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B701b1b (S3). The foregoing sequence is repeated periodically.

This paragraph illustrate(s) 1st Current Location Data Sharing Software 206A701c3 of Device A and 1st Current Location Data Sharing Software 206B701c3 of Device B, which share(s) the 1st current location data. In the present embodiment, CPU 211 (FIG. 1) of Device A retrieves the 1st current location data from 1st Current Location Data Storage Area 206A701b1a and sends the data to Device B in a wireless fashion (S1). CPU 211 (FIG. 1) of Device B receives the 1st current location data from Device A in a wireless fashion and stores the data in 1st Current Location Data Storage Area 206B701b1a (S2). The foregoing sequence is repeated periodically.

This paragraph illustrate(s) 2nd Current Location Data Sharing Software 206A701c4 of Device A and 2nd Current Location Data Sharing Software 206B701c4 of Device B, which share(s) the 2nd current location data. In the present embodiment, CPU 211 (FIG. 1) of Device B retrieves the 2nd current location data from 2nd Current Location Data Storage Area 206B701b1b and sends the data to Device A in a wireless fashion (S1). CPU 211 (FIG. 1) of Device A receives the 2nd current location data from Device B in a wireless fashion and stores the data in 2nd Current Location Data Storage Area 206A701b1b (S2). The foregoing sequence is repeated periodically.

This paragraph illustrate(s) Current Distance Data Producing Software 206A701c5 of Device A, which produce(s) the current distance data. In the present embodiment, CPU 211 (FIG. 1) of Device A retrieves the 1st current location data from 1st Current Location Data Storage Area 206A701b1a (S1). CPU 211 (FIG. 1) of Device A retrieves the 2nd current location data from 2nd Current Location Data Storage Area 206A701b1b (S2). CPU 211 (FIG. 1) of Device A produces the current distance data by referring to the 1st current location data retrieved in S1 and the 2nd current location data retrieved in the previous step (S3). CPU 211 (FIG. 1) of Device A stores the current distance data produced in the previous step in Current Distance Data Storage Area 206A701b2 (S4). The foregoing sequence is repeated periodically.

This paragraph illustrate(s) Current Speed Data Producing Software 206A701c6 of Device A, which produce(s) the current speed data. In the present embodiment, CPU 211 (FIG. 1) of Device A identifies the current speed of Carrier CR701A (S1). CPU 211 (FIG. 1) of Device A produces the current speed data by referring to the current speed identified in the previous step (S2). CPU 211 (FIG. 1) of Device A stores the current speed data produced in the previous step in Current Speed Data Storage Area 206A701b3 (S3). The foregoing sequence is repeated periodically.

This paragraph illustrate(s) Current Ideal Distance Data Producing Software 206A701c7 of Device A, which produce(s) the current ideal distance data. In the present embodiment, CPU 211 (FIG. 1) of Device A retrieves the current speed data from Current Speed Data Storage Area 206A701b3 (S1). If the current speed data retrieved in the previous step is within the first speed range, CPU 211 (FIG. 1) of Device A proceeds to the next step; if the current speed data retrieved in S1 is within the second speed range, CPU 211 (FIG. 1) of Device A proceeds to S5; if the current speed data retrieved in S1 is within the third speed range, CPU 211 (FIG. 1) of Device A proceeds to S7 (S2). CPU 211 (FIG. 1) of Device A retrieves the first speed range required distance data from First Speed Range Required Distance Data Storage Area 206A701b4a (S3). CPU 211 (FIG. 1) of Device A stores the first speed range required distance data retrieved in the previous step as the current ideal distance data in Current Ideal Distance Data Storage Area 206A701b5 (S4). CPU 211 (FIG. 1) of Device A retrieves the second speed range required distance data from Second Speed Range Required Distance Data Storage Area 206A701b4b (S5). CPU 211 (FIG. 1) of Device A stores the second speed range required distance data retrieved in the previous step as the current ideal distance data in Current Ideal Distance Data Storage Area 206A701b5 (S6). CPU 211 (FIG. 1) of Device A retrieves the third speed range required distance data from Third Speed Range Required Distance Data Storage Area 206A701b4c (S7). CPU 211 (FIG. 1) of Device A stores the third speed range required distance data retrieved in the previous step as the current ideal distance data in Current Ideal Distance Data Storage Area 206A701b5 (S8). The foregoing sequence is repeated periodically.

This paragraph illustrate(s) Carrier Speed Decreasing Software 206A701c8 of Device A, which decrease(s) the current traveling speed of Carrier CR701A. In the present embodiment, CPU 211 (FIG. 1) of Device A retrieves the current distance data from Current Distance Data Storage Area 206A701b2 (S1). CPU 211 (FIG. 1) of Device A retrieves the current ideal distance data from Current Ideal Distance Data Storage Area 206A701b5 (S2). If the current distance data retrieved in S1 is larger than the current ideal distance data retrieved in the previous step, CPU 211 (FIG. 1) of Device A proceeds to the next step (S3). CPU 211 (FIG. 1) of Device A decreases the speed of Carrier CR701A (S4). CPU 211 (FIG. 1) of Device A retrieves the first speed message data from First Speed Message Data Storage Area 206A701b6a (S5). CPU 211 (FIG. 1) of Device A outputs the first speed message data retrieved in the previous step from Speaker 216 (FIG. 1) and LCD 201 (FIG. 1) of Device A (S6). The foregoing sequence is repeated periodically.

This paragraph illustrate(s) Carrier Speed Increasing Software 206A701c9 of Device A, which increase(s) the current traveling speed of Carrier CR701A. In the present embodiment, CPU 211 (FIG. 1) of Device A retrieves the current distance data from Current Distance Data Storage Area 206A701b2 (S1). CPU 211 (FIG. 1) of Device A retrieves the current ideal distance data from Current Ideal Distance Data Storage Area 206A701b5 (S2). If the current distance data retrieved in S1 is smaller than the current ideal distance data retrieved in the previous step, CPU 211 (FIG. 1) of Device A proceeds to the next step (S3). CPU 211 (FIG. 1) of Device A increases the speed of Carrier CR701A (S4). CPU 211 (FIG. 1) of Device A retrieves the second speed message data from Second Speed Message Data Storage Area 206A701b6b (S5). CPU 211 (FIG. 1) of Device A outputs the second speed message data retrieved in the previous step from Speaker 216 (FIG. 1) and LCD 201 (FIG. 1) of Device A (S6). The foregoing sequence is repeated periodically.

This paragraph illustrate(s) Relevant Data Sharing Software 206A701c10 of Device A and Relevant Data Sharing Software 206B701c10 of Device B, which share(s) the data relevant to Carrier CR701A. In the present embodiment, CPU 211 (FIG. 1) of Device A retrieves the current distance data from Current Distance Data Storage Area 206A701b2 and sends the data to Device B in a wireless fashion (S1). CPU 211 (FIG. 1) of Device B receives the current distance data from Device A in a wireless fashion and stores the data in Current Distance Data Storage Area 206B701b2 (S2). CPU 211 (FIG. 1) of Device A retrieves the current speed data from Current Speed Data Storage Area 206A701b3 and sends the data to Device B in a wireless fashion (S3). CPU 211 (FIG. 1) of Device B receives the current speed data from Device A in a wireless fashion and stores the data in Current Speed Data Storage Area 206B701b3 (S4). CPU 211 (FIG. 1) of Device A retrieves the current ideal distance data from Current Ideal Distance Data Storage Area 206A701b5 and sends the data to Device B in a wireless fashion (S5). CPU 211 (FIG. 1) of Device B receives the current ideal distance data from Device A in a wireless fashion and stores the data in Current Ideal Distance Data Storage Area 206A701b5 (S6). The foregoing sequence is repeated periodically.

This paragraph illustrate(s) Relevant Data Displaying Software 206A701c11 of Device A, which indicate(s) the data relevant to Carrier CR701A. In the present embodiment, CPU 211 (FIG. 1) of Device A retrieves the current distance data from Current Distance Data Storage Area 206A701b2 (S1). CPU 211 (FIG. 1) of Device A displays the current distance data retrieved in the previous step on LCD 201 (FIG. 1) of Device A (S2). CPU 211 (FIG. 1) of Device A retrieves the current speed data from Current Speed Data Storage Area 206A701b3 (S3). CPU 211 (FIG. 1) of Device A displays the current speed data retrieved in the previous step on LCD 201 (FIG. 1) of Device A (S4). CPU 211 (FIG. 1) of Device A retrieves the current ideal distance data from Current Ideal Distance Data Storage Area 206A701b5 (S5). CPU 211 (FIG. 1) of Device A displays the current ideal distance data retrieved in the previous step on LCD 201 (FIG. 1) of Device A (S6). CPU 211 (FIG. 1) of Device A retrieves the map data from Map Data Storage Area 206A701b7 (S7). CPU 211 (FIG. 1) of Device A displays the map data retrieved in the previous step on LCD 201 (FIG. 1) of Device A (S8). CPU 211 (FIG. 1) of Device A retrieves the 1st current location data from 1st Current Location Data Storage Area 206A701b1a (S9). CPU 211 (FIG. 1) of Device A retrieves the 1st current location icon data from 1st Current Location Icon Data Storage Area 206A701b8a (S10). CPU 211 (FIG. 1) of Device A displays the 1st current location icon data retrieved in the previous step at the location corresponding to the 1st current location data retrieved in S9 on the map data displayed in S8 (S11). CPU 211 (FIG. 1) of Device A retrieves the 2nd current location data from 2nd Current Location Data Storage Area 206A701b1b (S12). CPU 211 (FIG. 1) of Device A retrieves the 2nd current location icon data from 2nd Current Location Icon Data Storage Area 206A701b8b (S13). CPU 211 (FIG. 1) of Device A displays the 2nd current location icon data retrieved in the previous step at the location corresponding to the 2nd current location data retrieved in S12 on the map data displayed in S8 (S14). The foregoing sequence is repeated periodically.

This paragraph illustrate(s) Relevant Data Displaying Software 206B701c11 of Device B, which indicate(s) the data relevant to Carrier CR701A. In the present embodiment, CPU 211 (FIG. 1) of Device B retrieves the current distance data from Current Distance Data Storage Area 206B701b2 (S1). CPU 211 (FIG. 1) of Device B displays the current distance data retrieved in the previous step on LCD 201 (FIG. 1) of Device B (S2). CPU 211 (FIG. 1) of Device B retrieves the current speed data from Current Speed Data Storage Area 206B701b3 (S3). CPU 211 (FIG. 1) of Device B displays the current speed data retrieved in the previous step on LCD 201 (FIG. 1) of Device B (S4). CPU 211 (FIG. 1) of Device B retrieves the current ideal distance data from Current Ideal Distance Data Storage Area 206B701b5 (S5). CPU 211 (FIG. 1) of Device B displays the current ideal distance data retrieved in the previous step on LCD 201 (FIG. 1) of Device B (S6). CPU 211 (FIG. 1) of Device B retrieves the map data from Map Data Storage Area 206B701b7 (S7). CPU 211 (FIG. 1) of Device B displays the map data retrieved in the previous step on LCD 201 (FIG. 1) of Device B (S8). CPU 211 (FIG. 1) of Device B retrieves the 1st current location data from 1st Current Location Data Storage Area 206B701b1a (S9). CPU 211 (FIG. 1) of Device B retrieves the 1st current location icon data from 1st Current Location Icon Data Storage Area 206B701b8a (S10). CPU 211 (FIG. 1) of Device B displays the 1st current location icon data retrieved in the previous step at the location corresponding to the 1st current location data retrieved in S9 on the map data displayed in S8 (S11). CPU 211 (FIG. 1) of Device B retrieves the 2nd current location data from 2nd Current Location Data Storage Area 206B701b1b (S12). CPU 211 (FIG. 1) of Device B retrieves the 2nd current location icon data from 2nd Current Location Icon Data Storage Area 206B701b8b (S13). CPU 211 (FIG. 1) of Device B displays the 2nd current location icon data retrieved in the previous step at the location corresponding to the 2nd current location data retrieved in S12 on the map data displayed in S8 (S14). The foregoing sequence is repeated periodically.

<<Inter-Carrier Middle Point Maintaining Function>>

The following paragraphs illustrate the inter-carrier middle point maintaining function, wherein said communication device is installed in a 2nd carrier, said 2nd carrier is a carrier traveling between a 1st carrier and a 3rd carrier, said 1st carrier is the carrier traveling in front of said 2nd carrier, said 3rd carrier is the carrier traveling behind said 2nd carrier, an ideal middle point data which indicates the ideal middle point location between said 1st carrier and said 3rd carrier is produced, when said 2nd carrier is behind said ideal middle point data, the current speed of said 2nd carrier is increased and a first message is output from said 2nd carrier, when said 2nd carrier is in front of said ideal middle point data, the current speed of said 2nd carrier is decreased and a second message is output from said 2nd carrier, and said ideal middle point data, a 1st current distance data which indicates the current distance between said 1st carrier and said 2nd carrier, a 3rd current distance data which indicates the current distance between said 2nd carrier and said 3rd carrier, a total current distance data which indicates the current distance between said 1st carrier and said 3rd carrier, a current speed data which indicates the current speed of said 2nd carrier, a 1st current location data which indicates the current geographic location of said 1st carrier, a 2nd current location data which indicates the current geographic location of said 2nd carrier, and a 3rd current location data which indicates the current geographic location of said 3rd carrier are output from said 1st carrier, said 2nd carrier, and said 3rd carrier respectively.

This paragraph illustrates the major elements utilized to implement the present function. In the present embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Device C, another Communication Device 200, is connected to Network NT (e.g., the Internet) in a wireless fashion. Host H, Device A, Device B, and Device C are capable to communicate with each other via Network NT (e.g., the Internet) to implement the present function. Device A, Device B, and Device C are also capable to communicate with each other directly to implement the present function.

This paragraph illustrates the relationship between Carrier CR702A and Device A. In the present embodiment, Carrier CR702A includes Device A. Here, Carrier CR702A is a carrier which may be any type of carrier or transportation system designed to carry passenger(s), such as an airplane, automobile, motorcycle, railway train, taxi, bus, space ship, or space station.

This paragraph illustrates the relationship between Carrier CR702B and Device B. In the present embodiment, Carrier CR702B includes Device B. Here, Carrier CR702B is a carrier which may be any type of carrier or transportation system designed to carry passenger(s), such as an airplane, automobile, motorcycle, railway train, taxi, bus, space ship, or space station.

This paragraph illustrates the relationship between Carrier CR702C and Device C. In the present embodiment, Carrier CR702C includes Device C. Here, Carrier CR702C is a carrier which may be any type of carrier or transportation system designed to carry passenger(s), such as airplane, automobile, motorcycle, railway train, taxi, bus, space ship, or space station. In the present embodiment, Carrier CR702A is the carrier traveling in front of Carrier CR702B and Carrier CR702C is the carrier traveling behind Carrier CR702B on a highway.

This paragraph illustrates the storage area included in Host H. In the present embodiment, Host H includes Inter-Carrier Middle Point Maintaining Info Storage Area H702a of which the data and the software program(s) stored therein are described hereinafter.

This paragraph illustrates the storage area(s) included in Inter-Carrier Middle Point Maintaining Info Storage Area H702a. In the present embodiment, Inter-Carrier Middle Point Maintaining Info Storage Area H702a includes Inter-Carrier Middle Point Maintaining Data Storage Area H702b and Inter-Carrier Middle Point Maintaining Software Storage Area H702c. Inter-Carrier Middle Point Maintaining Data Storage Area H702b stores the data necessary to implement the present function on the side of Host H, such as the one(s) described hereinafter. Inter-Carrier Middle Point Maintaining Software Storage Area H702c stores the software program(s) necessary to implement the present function on the side of Host H, such as the one(s) described hereinafter.

This paragraph illustrates the storage area(s) included in Inter-Carrier Middle Point Maintaining Data Storage Area H702b. In the present embodiment, Inter-Carrier Middle Point Maintaining Data Storage Area H702b includes Entire Current Location Data Storage Area H702b1, Entire Current Distance Data Storage Area H702b2, Total Current Distance Data Storage Area H702b3, Ideal Middle Point Data Storage Area H702b4, Current Speed Data Storage Area H702b5, Entire Speed Message Data Storage Area H702b6, Map Data Storage Area H702b7, Entire Icon Data Storage Area H702b8, and Work Area H702b9. Entire Current Location Data Storage Area H702b1 stores the data described hereinafter. Entire Current Distance Data Storage Area H702b2 stores the data described hereinafter. Total Current Distance Data Storage Area H702b3 stores the total current distance data which indicates the current distance between Carrier CR702A and Carrier CR702C. Ideal Middle Point Data Storage Area H702b4 stores the ideal middle point data which indicates the ideal middle point location between Carrier CR702A and Carrier CR702C. Current Speed Data Storage Area H702b5 stores the current speed data which indicates the current speed of Carrier CR702B. Entire Speed Message Data Storage Area H702b6 stores the data described hereinafter. Map Data Storage Area H702b7 stores the map data which is the image data indicating a map. Entire Icon Data Storage Area H702b8 stores the data described hereinafter. Work Area H702b9 is utilized as a work area to perform calculation and temporarily store data to implement the present function.

This paragraph illustrates the storage area(s) included in Entire Current Location Data Storage Area H702b1. In the present embodiment, Entire Current Location Data Storage Area H702b1 includes 1st Current Location Data Storage Area H702b1a, 2nd Current Location Data Storage Area H702b1b, and 3rd Current Location Data Storage Area H702b1c. 1st Current Location Data Storage Area H702b1a stores the 1st current location data which indicates the current geographic location of Carrier CR702A in (x,y,z) format. 2nd Current Location Data Storage Area H702b1b stores the 2nd current location data which indicates the current geographic location of Carrier CR702B in (x,y,z) format. 3rd Current Location Data Storage Area H702b1c stores the 3rd current location data which indicates the current geographic location of Carrier CR702C in (x,y,z) format.

This paragraph illustrates the storage area(s) included in Entire Current Distance Data Storage Area H702b2. In the present embodiment, Entire Current Distance Data Storage Area H702b2 includes 1st Current Distance Data Storage Area H702b2a and 3rd Current Distance Data Storage Area H702b2b. 1st Current Distance Data Storage Area H702b2a stores the 1st current distance data which indicates the current distance between Carrier CR702A and Carrier CR702B. 3rd Current Distance Data Storage Area H702b2b stores the 3rd current distance data which indicates the current distance between Carrier CR702B and Carrier CR702C.

This paragraph illustrates the storage area(s) included in Entire Speed Message Data Storage Area H702b6. In the present embodiment, Entire Speed Message Data Storage Area H702b6 includes First Speed Message Data Storage Area H702b6a and Second Speed Message Data Storage Area H702b6b. First Speed Message Data Storage Area H702b6a stores the first speed message data which is the audiovisual data indicating that the current location of Carrier CR702B is behind the ideal middle point location, therefore the speed of Carrier CR702B is increased. Second Speed Message Data Storage Area H702b6b stores the second speed message data which is the audiovisual data indicating that the current location of Carrier CR702B is in front of the ideal middle point location, therefore the speed of Carrier CR702B is decreased.

This paragraph illustrates the storage area(s) included in Entire Icon Data Storage Area H702b8. In the present embodiment, Entire Icon Data Storage Area H702b8 includes 1st Current Location Icon Data Storage Area H702b8a, 2nd Current Location Icon Data Storage Area H702b8b, 3rd Current Location Icon Data Storage Area H702b8c, and Ideal Middle Point Icon Data Storage Area H702b8d. 1st Current Location Icon Data Storage Area H702b8a stores the 1st current location icon data which is the image of the icon utilized to indicate the 1st current location data on the map data. 2nd Current Location Icon Data Storage Area H702b8b stores the 2nd current location icon data which is the image of the icon utilized to indicate the 2nd current location data on the map data. 3rd Current Location Icon Data Storage Area H702b8c stores the 3rd current location icon data which is the image of the icon utilized to indicate the 3rd current location data on the map data. Ideal Middle Point Icon Data Storage Area H702b8d stores the ideal middle point icon data which is the image of the icon utilized to indicate the ideal middle point data on the map data.

This paragraph illustrates the software program(s) stored in Inter-Carrier Middle Point Maintaining Software Storage Area H702c. In the present embodiment, Inter-Carrier Middle Point Maintaining Software Storage Area H702c stores 2nd Current Location Data Producing Software H702c2, 1st Current Location Data Sharing Software H702c4, 2nd Current Location Data Sharing Software H702c5, 3rd Current Location Data Sharing Software H702c6, 1st Current Distance Data Producing Software H702c7, 3rd Current Distance Data Producing Software H702c8, Total Current Distance Data Producing Software H702c9, Ideal Middle Point Data Producing Software H702c10, Current Speed Data Producing Software H702c11, Carrier Speed Increasing Software H702c12, Carrier Speed Decreasing Software H702c13, Relevant Data Sharing Software H702c14, and Relevant Data Indicating Software H702c15. 2nd Current Location Data Producing Software H702c2 is the software program described hereinafter. 1st Current Location Data Sharing Software H702c4 is the software program described hereinafter. 2nd Current Location Data Sharing Software H702c5 is the software program described hereinafter. 3rd Current Location Data Sharing Software H702c6 is the software program described hereinafter. 1st Current Distance Data Producing Software H702c7 is the software program described hereinafter. 3rd Current Distance Data Producing Software H702c8 is the software program described hereinafter. Total Current Distance Data Producing Software H702c9 is the software program described hereinafter. Ideal Middle Point Data Producing Software H702c10 is the software program described hereinafter. Current Speed Data Producing Software H702c11 is the software program described hereinafter. Carrier Speed Increasing Software H702c12 is the software program described hereinafter. Carrier Speed Decreasing Software H702c13 is the software program described hereinafter. Relevant Data Sharing Software H702c14 is the software program described hereinafter. Relevant Data Indicating Software H702c15 is the software program described hereinafter.

This paragraph illustrates the storage area included in RAM 206 (FIG. 1) of Device A. In the present embodiment, RAM 206 includes Inter-Carrier Middle Point Maintaining Info Storage Area 206A702a of which the data and the software program(s) stored therein are described hereinafter.

The data and/or the software program(s) necessary to implement the present function may be downloaded from Host H to Device A in the manner described hereinafter.

This paragraph illustrates the storage area(s) included in Inter-Carrier Middle Point Maintaining Info Storage Area 206A702a. In the present embodiment, Inter-Carrier Middle Point Maintaining Info Storage Area 206A702a includes Inter-Carrier Middle Point Maintaining Data Storage Area 206A702b and Inter-Carrier Middle Point Maintaining Software Storage Area 206A702c. Inter-Carrier Middle Point Maintaining Data Storage Area 206A702b stores the data necessary to implement the present function on the side of Device A, such as the one(s) described hereinafter. Inter-Carrier Middle Point Maintaining Software Storage Area 206A702c stores the software program(s) necessary to implement the present function on the side of Device A, such as the one(s) described hereinafter.

This paragraph illustrates the storage area(s) included in Inter-Carrier Middle Point Maintaining Data Storage Area 206A702b. In the present embodiment, Inter-Carrier Middle Point Maintaining Data Storage Area 206A702b includes Entire Current Location Data Storage Area 206A702b1, Entire Current Distance Data Storage Area 206A702b2, Total Current Distance Data Storage Area 206A702b3, Ideal Middle Point Data Storage Area 206A702b4, Current Speed Data Storage Area 206A702b5, Entire Speed Message Data Storage Area 206A702b6, Map Data Storage Area 206A702b7, Entire Icon Data Storage Area 206A702b8, and Work Area 206A702b9. Entire Current Location Data Storage Area 206A702b1 stores the data described hereinafter. Entire Current Distance Data Storage Area 206A702b2 stores the data described hereinafter. Total Current Distance Data Storage Area 206A702b3 stores the total current distance data which indicates the current distance between Carrier CR702A and Carrier CR702C. Ideal Middle Point Data Storage Area 206A702b4 stores the ideal middle point data which indicates the ideal middle point location between Carrier CR702A and Carrier CR702C. Current Speed Data Storage Area 206A702b5 stores the current speed data which indicates the current speed of Carrier CR702B. Entire Speed Message Data Storage Area 206A702b6 stores the data described hereinafter. Map Data Storage Area 206A702b7 stores the map data which is the image data indicating a map. Entire Icon Data Storage Area 206A702b8 stores the data described hereinafter. Work Area 206A702b9 is utilized as a work area to perform calculation and temporarily store data to implement the present function.

This paragraph illustrates the storage area(s) included in Entire Current Location Data Storage Area 206A702b1. In the present embodiment, Entire Current Location Data Storage Area 206A702b1 includes 1st Current Location Data Storage Area 206A702b1a, 2nd Current Location Data Storage Area 206A702b1b, and 3rd Current Location Data Storage Area 206A702b1c. 1st Current Location Data Storage Area 206A702b1a stores the 1st current location data which indicates the current geographic location of Carrier CR702A in (x,y,z) format. 2nd Current Location Data Storage Area 206A702b1b stores the 2nd current location data which indicates the current geographic location of Carrier CR702B in (x,y,z) format. 3rd Current Location Data Storage Area 206A702b1c stores the 3rd current location data which indicates the current geographic location of Carrier CR702C in (x,y,z) format.

This paragraph illustrates the storage area(s) included in Entire Current Distance Data Storage Area 206A702b2. In the present embodiment, Entire Current Distance Data Storage Area 206A702b2 includes 1st Current Distance Data Storage Area 206A702b2a and 3rd Current Distance Data Storage Area 206A702b2b. 1st Current Distance Data Storage Area 206A702b2a stores the 1st current distance data which indicates the current distance between Carrier CR702A and Carrier CR702B. 3rd Current Distance Data Storage Area 206A702b2b stores the 3rd current distance data which indicates the current distance between Carrier CR702B and Carrier CR702C.

This paragraph illustrates the storage area(s) included in Entire Speed Message Data Storage Area 206A702b6. In the present embodiment, Entire Speed Message Data Storage Area 206A702b6 includes First Speed Message Data Storage Area 206A702b6a and Second Speed Message Data Storage Area 206A702b6b. First Speed Message Data Storage Area 206A702b6a stores the first speed message data which is the audiovisual data indicating that the current location of Carrier CR702B is behind the ideal middle point location, therefore the speed of Carrier CR702B is increased. Second Speed Message Data Storage Area 206A702b6b stores the second speed message data which is the audiovisual data indicating that the current location of Carrier CR702B is in front of the ideal middle point location, therefore the speed of Carrier CR702B is decreased.

This paragraph illustrates the storage area(s) included in Entire Icon Data Storage Area 206A702b8. In the present embodiment, Entire Icon Data Storage Area 206A702b8 includes 1st Current Location Icon Data Storage Area 206A702b8a, 2nd Current Location Icon Data Storage Area 206A702b8b, 3rd Current Location Icon Data Storage Area 206A702b8c, and Ideal Middle Point Icon Data Storage Area 206A702b8d. 1st Current Location Icon Data Storage Area 206A702b8a stores the 1st current location icon data which is the image of the icon utilized to indicate the 1st current location data on the map data. 2nd Current Location Icon Data Storage Area 206A702b8b stores the 2nd current location icon data which is the image of the icon utilized to indicate the 2nd current location data on the map data. 3rd Current Location Icon Data Storage Area 206A702b8c stores the 3rd current location icon data which is the image of the icon utilized to indicate the 3rd current location data on the map data. Ideal Middle Point Icon Data Storage Area 206A702b8d stores the ideal middle point icon data which is the image of the icon utilized to indicate the ideal middle point data on the map data.

This paragraph illustrates the software program(s) stored in Inter-Carrier Middle Point Maintaining Software Storage Area 206A702c. In the present embodiment, Inter-Carrier Middle Point Maintaining Software Storage Area 206A702c stores 1st Current Location Data Producing Software 206A702c1, 1st Current Location Data Sharing Software 206A702c4, 2nd Current Location Data Sharing Software 206A702c5, 3rd Current Location Data Sharing Software 206A702c6, Relevant Data Sharing Software 206A702c14, and Relevant Data Indicating Software 206A702c15. 1st Current Location Data Producing Software 206A702c1 is the software program described hereinafter. 1st Current Location Data Sharing Software 206A702c4 is the software program described hereinafter. 2nd Current Location Data Sharing Software 206A702c5 is the software program described hereinafter. 3rd Current Location Data Sharing Software 206A702c6 is the software program described hereinafter. Relevant Data Sharing Software 206A702c14 is the software program described hereinafter. Relevant Data Indicating Software 206A702c15 is the software program described hereinafter.

This paragraph illustrates the storage area included in RAM 206 (FIG. 1) of Device B. In the present embodiment, RAM 206 includes Inter-Carrier Middle Point Maintaining Info Storage Area 206B702a of which the data and the software program(s) stored therein are described hereinafter.

The data and/or the software program(s) necessary to implement the present function may be downloaded from Host H to Device B in the manner described hereinafter.

This paragraph illustrates the storage area(s) included in Inter-Carrier Middle Point Maintaining Info Storage Area 206B702a. In the present embodiment, Inter-Carrier Middle Point Maintaining Info Storage Area 206B702a includes Inter-Carrier Middle Point Maintaining Data Storage Area 206B702b and Inter-Carrier Middle Point Maintaining Software Storage Area 206B702c. Inter-Carrier Middle Point Maintaining Data Storage Area 206B702b stores the data necessary to implement the present function on the side of Device B, such as the one(s) described hereinafter. Inter-Carrier Middle Point Maintaining Software Storage Area 206B702c stores the software program(s) necessary to implement the present function on the side of Device B, such as the one(s) described hereinafter.

This paragraph illustrates the storage area(s) included in Inter-Carrier Middle Point Maintaining Data Storage Area 206B702b. In the present embodiment, Inter-Carrier Middle Point Maintaining Data Storage Area 206B702b includes Entire Current Location Data Storage Area 206B702b1, Entire Current Distance Data Storage Area 206B702b2, Total Current Distance Data Storage Area 206B702b3, Ideal Middle Point Data Storage Area 206B702b4, Current Speed Data Storage Area 206B702b5, Entire Speed Message Data Storage Area 206B702b6, Map Data Storage Area 206B702b7, Entire Icon Data Storage Area 206B702b8, and Work Area 206B702b9. Entire Current Location Data Storage Area 206B702b1 stores the data described hereinafter. Entire Current Distance Data Storage Area 206B702b2 stores the data described hereinafter. Total Current Distance Data Storage Area 206B702b3 stores the total current distance data which indicates the current distance between Carrier CR702A and Carrier CR702C. Ideal Middle Point Data Storage Area 206B702b4 stores the ideal middle point data which indicates the ideal middle point location between Carrier CR702A and Carrier CR702C. Current Speed Data Storage Area 206B702b5 stores the current speed data which indicates the current speed of Carrier CR702B. Entire Speed Message Data Storage Area 206B702b6 stores the data described hereinafter. Map Data Storage Area 206B702b7 stores the map data which is the image data indicating a map. Entire Icon Data Storage Area 206B702b8 stores the data described hereinafter. Work Area 206B702b9 is utilized as a work area to perform calculation and temporarily store data to implement the present function.

This paragraph illustrates the storage area(s) included in Entire Current Location Data Storage Area 206B702b1. In the present embodiment, Entire Current Location Data Storage Area 206B702b1 includes 1st Current Location Data Storage Area 206B702b1a, 2nd Current Location Data Storage Area 206B702b1b, and 3rd Current Location Data Storage Area 206B702b1c. 1st Current Location Data Storage Area 206B702b1a stores the 1st current location data which indicates the current geographic location of Carrier CR702A in (x,y,z) format. 2nd Current Location Data Storage Area 206B702b1b stores the 2nd current location data which indicates the current geographic location of Carrier CR702B in (x,y,z) format. 3rd Current Location Data Storage Area 206B702b1c stores the 3rd current location data which indicates the current geographic location of Carrier CR702C in (x,y,z) format.

This paragraph illustrates the storage area(s) included in Entire Current Distance Data Storage Area 206B702b2. In the present embodiment, Entire Current Distance Data Storage Area 206B702b2 includes 1st Current Distance Data Storage Area 206B702b2a and 3rd Current Distance Data Storage Area 206B702b2b. 1st Current Distance Data Storage Area 206B702b2a stores the 1st current distance data which indicates the current distance between Carrier CR702A and Carrier CR702B. 3rd Current Distance Data Storage Area 206B702b2b stores the 3rd current distance data which indicates the current distance between Carrier CR702B and Carrier CR702C.

This paragraph illustrates the storage area(s) included in Entire Speed Message Data Storage Area 206B702b6. In the present embodiment, Entire Speed Message Data Storage Area 206B702b6 includes First Speed Message Data Storage Area 206B702b6a and Second Speed Message Data Storage Area 206B702b6b. First Speed Message Data Storage Area 206B702b6a stores the first speed message data which is the audiovisual data indicating that the current location of Carrier CR702B is behind the ideal middle point location, therefore the speed of Carrier CR702B is increased. Second Speed Message Data Storage Area 206B702b6b stores the second speed message data which is the audiovisual data indicating that the current location of Carrier CR702B is in front of the ideal middle point location, therefore the speed of Carrier CR702B is decreased.

This paragraph illustrates the storage area(s) included in Entire Icon Data Storage Area 206B702b8. In the present embodiment, Entire Icon Data Storage Area 206B702b8 includes 1st Current Location Icon Data Storage Area 206B702b8a, 2nd Current Location Icon Data Storage Area 206B702b8b, 3rd Current Location Icon Data Storage Area 206B702b8c, and Ideal Middle Point Icon Data Storage Area 206B702b8d. 1st Current Location Icon Data Storage Area 206B702b8a stores the 1st current location icon data which is the image of the icon utilized to indicate the 1st current location data on the map data. 2nd Current Location Icon Data Storage Area 206B702b8b stores the 2nd current location icon data which is the image of the icon utilized to indicate the 2nd current location data on the map data. 3rd Current Location Icon Data Storage Area 206B702b8c stores the 3rd current location icon data which is the image of the icon utilized to indicate the 3rd current location data on the map data. Ideal Middle Point Icon Data Storage Area 206B702b8d stores the ideal middle point icon data which is the image of the icon utilized to indicate the ideal middle point data on the map data.

This paragraph illustrates the software program(s) stored in Inter-Carrier Middle Point Maintaining Software Storage Area 206B702c. In the present embodiment, Inter-Carrier Middle Point Maintaining Software Storage Area 206B702c stores 2nd Current Location Data Producing Software 206B702c2, 1st Current Location Data Sharing Software 206B702c4, 2nd Current Location Data Sharing Software 206B702c5, 3rd Current Location Data Sharing Software 206B702c6, 1st Current Distance Data Producing Software 206B702c7, 3rd Current Distance Data Producing Software 206B702c8, Total Current Distance Data Producing Software 206B702c9, Ideal Middle Point Data Producing Software 206B702c10, Current Speed Data Producing Software 206B702c11, Carrier Speed Increasing Software 206B702c12, Carrier Speed Decreasing Software 206B702c13, Relevant Data Sharing Software 206B702c14, and Relevant Data Indicating Software 206B702c15. 2nd Current Location Data Producing Software 206B702c2 is the software program described hereinafter. 1st Current Location Data Sharing Software 206B702c4 is the software program described hereinafter. 2nd Current Location Data Sharing Software 206B702c5 is the software program described hereinafter. 3rd Current Location Data Sharing Software 206B702c6 is the software program described hereinafter. 1st Current Distance Data Producing Software 206B702c7 is the software program described hereinafter. 3rd Current Distance Data Producing Software 206B702c8 is the software program described hereinafter. Total Current Distance Data Producing Software 206B702c9 is the software program described hereinafter. Ideal Middle Point Data Producing Software 206B702c10 is the software program described hereinafter. Current Speed Data Producing Software 206B702c11 is the software program described hereinafter. Carrier Speed Increasing Software 206B702c12 is the software program described hereinafter. Carrier Speed Decreasing Software 206B702c13 is the software program described hereinafter. Relevant Data Sharing Software 206B702c14 is the software program described hereinafter. Relevant Data Indicating Software 206B702c15 is the software program described hereinafter.

This paragraph illustrates the storage area included in RAM 206 (FIG. 1) of Device C. In the present embodiment, RAM 206 includes Inter-Carrier Middle Point Maintaining Info Storage Area 206C702a of which the data and the software program(s) stored therein are described hereinafter.

The data and/or the software program(s) necessary to implement the present function may be downloaded from Host H to Device C in the manner described hereinafter.

This paragraph illustrates the storage area(s) included in Inter-Carrier Middle Point Maintaining Info Storage Area 206C702a. In the present embodiment, Inter-Carrier Middle Point Maintaining Info Storage Area 206C702a includes Inter-Carrier Middle Point Maintaining Data Storage Area 206C702b and Inter-Carrier Middle Point Maintaining Software Storage Area 206C702c. Inter-Carrier Middle Point Maintaining Data Storage Area 206C702b stores the data necessary to implement the present function on the side of Device C, such as the one(s) described hereinafter. Inter-Carrier Middle Point Maintaining Software Storage Area 206C702c stores the software program(s) necessary to implement the present function on the side of Device C, such as the one(s) described hereinafter.

This paragraph illustrates the storage area(s) included in Inter-Carrier Middle Point Maintaining Data Storage Area 206C702b. In the present embodiment, Inter-Carrier Middle Point Maintaining Data Storage Area 206C702b includes Entire Current Location Data Storage Area 206C702b1, Entire Current Distance Data Storage Area 206C702b2, Total Current Distance Data Storage Area 206C702b3, Ideal Middle Point Data Storage Area 206C702b4, Current Speed Data Storage Area 206C702b5, Entire Speed Message Data Storage Area 206C702b6, Map Data Storage Area 206C702b7, Entire Icon Data Storage Area 206C702b8, and Work Area 206C702b9. Entire Current Location Data Storage Area 206C702b1 stores the data described hereinafter. Entire Current Distance Data Storage Area 206C702b2 stores the data described hereinafter. Total Current Distance Data Storage Area 206C702b3 stores the total current distance data which indicates the current distance between Carrier CR702A and Carrier CR702C. Ideal Middle Point Data Storage Area 206C702b4 stores the ideal middle point data which indicates the ideal middle point location between Carrier CR702A and Carrier CR702C. Current Speed Data Storage Area 206C702b5 stores the current speed data which indicates the current speed of Carrier CR702B. Entire Speed Message Data Storage Area 206C702b6 stores the data described hereinafter. Map Data Storage Area 206C702b7 stores the map data which is the image data indicating a map. Entire Icon Data Storage Area 206C702b8 stores the data described hereinafter. Work Area 206C702b9 is utilized as a work area to perform calculation and temporarily store data to implement the present function.

This paragraph illustrates the storage area(s) included in Entire Current Location Data Storage Area 206C702b1. In the present embodiment, Entire Current Location Data Storage Area 206C702b1 includes 1st Current Location Data Storage Area 206C702b1a, 2nd Current Location Data Storage Area 206C702b1b, and 3rd Current Location Data Storage Area 206C702b1c. 1st Current Location Data Storage Area 206C702b1a stores the 1st current location data which indicates the current geographic location of Carrier CR702A in (x,y,z) format. 2nd Current Location Data Storage Area 206C702b1b stores the 2nd current location data which indicates the current geographic location of Carrier CR702B in (x,y,z) format. 3rd Current Location Data Storage Area 206C702b1c stores the 3rd current location data which indicates the current geographic location of Carrier CR702C in (x,y,z) format.

This paragraph illustrates the storage area(s) included in Entire Current Distance Data Storage Area 206C702b2. In the present embodiment, Entire Current Distance Data Storage Area 206C702b2 includes 1st Current Distance Data Storage Area 206C702b2a and 3rd Current Distance Data Storage Area 206C702b2b. 1st Current Distance Data Storage Area 206C702b2a stores the 1st current distance data which indicates the current distance between Carrier CR702A and Carrier CR702B. 3rd Current Distance Data Storage Area 206C702b2b stores the 3rd current distance data which indicates the current distance between Carrier CR702B and Carrier CR702C.

This paragraph illustrates the storage area(s) included in Entire Speed Message Data Storage Area 206C702b6. In the present embodiment, Entire Speed Message Data Storage Area 206C702b6 includes First Speed Message Data Storage Area 206C702b6a and Second Speed Message Data Storage Area 206C702b6b. First Speed Message Data Storage Area 206C702b6a stores the first speed message data which is the audiovisual data indicating that the current location of Carrier CR702B is behind the ideal middle point location, therefore the speed of Carrier CR702B is increased. Second Speed Message Data Storage Area 206C702b6b stores the second speed message data which is the audiovisual data indicating that the current location of Carrier CR702B is in front of the ideal middle point location, therefore the speed of Carrier CR702B is decreased.

This paragraph illustrates the storage area(s) included in Entire Icon Data Storage Area 206C702b8. In the present embodiment, Entire Icon Data Storage Area 206C702b8 includes 1st Current Location Icon Data Storage Area 206C702b8a, 2nd Current Location Icon Data Storage Area 206C702b8b, 3rd Current Location Icon Data Storage Area 206C702b8c, and Ideal Middle Point Icon Data Storage Area 206C702b8d. 1st Current Location Icon Data Storage Area 206C702b8a stores the 1st current location icon data which is the image of the icon utilized to indicate the 1st current location data on the map data. 2nd Current Location Icon Data Storage Area 206C702b8b stores the 2nd current location icon data which is the image of the icon utilized to indicate the 2nd current location data on the map data. 3rd Current Location Icon Data Storage Area 206C702b8c stores the 3rd current location icon data which is the image of the icon utilized to indicate the 3rd current location data on the map data. Ideal Middle Point Icon Data Storage Area 206C702b8d stores the ideal middle point icon data which is the image of the icon utilized to indicate the ideal middle point data on the map data.

This paragraph illustrates the software program(s) stored in Inter-Carrier Middle Point Maintaining Software Storage Area 206C702c. In the present embodiment, Inter-Carrier Middle Point Maintaining Software Storage Area 206C702c stores 3rd Current Location Data Producing Software 206C702c3, 1st Current Location Data Sharing Software 206C702c4, 2nd Current Location Data Sharing Software 206C702c5, 3rd Current Location Data Sharing Software 206C702c6, Relevant Data Sharing Software 206C702c14, and Relevant Data Indicating Software 206C702c15. 3rd Current Location Data Producing Software 206C702c3 is the software program described hereinafter. 1st Current Location Data Sharing Software 206C702c4 is the software program described hereinafter. 2nd Current Location Data Sharing Software 206C702c5 is the software program described hereinafter. 3rd Current Location Data Sharing Software 206C702c6 is the software program described hereinafter. Relevant Data Sharing Software 206C702c14 is the software program described hereinafter. Relevant Data Indicating Software 206C702c15 is the software program described hereinafter.

This paragraph illustrate(s) 1st Current Location Data Producing Software 206A702c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A702b1a (S3). The foregoing sequence is repeated periodically.

This paragraph illustrate(s) 2nd Current Location Data Producing Software H702c2 of Host H and 2nd Current Location Data Producing Software 206B702c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step and sends the data to Host H in a wireless fashion (S2). Host H receives the 2nd current location data from Device B and stores the data in 2nd Current Location Data Storage Area H702b1b (S3). The foregoing sequence is repeated periodically.

This paragraph illustrate(s) 3rd Current Location Data Producing Software 206C702c3 of Device C, which produce(s) the 3rd current location data. In the present embodiment, CPU 211 (FIG. 1) of Device C identifies the current location of Device C (S1). CPU 211 (FIG. 1) of Device C produces the 3rd current location data by referring to the current location identified in the previous step (S2). CPU 211 (FIG. 1) of Device C stores the 3rd current location data produced in the previous step in 3rd Current Location Data Storage Area 206C702b1c (S3). The foregoing sequence is repeated periodically.

This paragraph illustrate(s) 1st Current Location Data Sharing Software H702c4 of Host H and 1st Current Location Data Sharing Software 206A702c4 of Device A, which share(s) the 1st current location data. In the present embodiment, CPU 211 (FIG. 1) of Device A retrieves the 1st current location data from 1st Current Location Data Storage Area 206A702b1a and sends the data to Host H in a wireless fashion (S1). Host H receives the 1st current location data from Device A and stores the data in 1st Current Location Data Storage Area H702b1a (S2). The foregoing sequence is repeated periodically.

This paragraph illustrate(s) 1st Current Location Data Sharing Software 206A702c4 of Device A and 1st Current Location Data Sharing Software 206C702c4 of Device C, which share(s) the 1st current location data. In the present embodiment, CPU 211 (FIG. 1) of Device A retrieves the 1st current location data from 1st Current Location Data Storage Area 206A702b1a and sends the data to Device C (S1). CPU 211 (FIG. 1) of Device C receives the 1st current location data from Device A and stores the data in 1st Current Location Data Storage Area 206C702b1a (S2). The foregoing sequence is repeated periodically.

This paragraph illustrate(s) 2nd Current Location Data Sharing Software H702c5 of Host H and 2nd Current Location Data Sharing Software 206A702c5 of Device A, which share(s) the 2nd current location data. In the present embodiment, Host H retrieves the 2nd current location data from 2nd Current Location Data Storage Area H702b1b and sends the data to Device A (S1). CPU 211 (FIG. 1) of Device A receives the 2nd current location data from Host H in a wireless fashion and stores the data in 2nd Current Location Data Storage Area 206A702b1b (S2). The foregoing sequence is repeated periodically.

This paragraph illustrate(s) 2nd Current Location Data Sharing Software H702c5 of Host H and 2nd Current Location Data Sharing Software 206C702c5 of Device C, which share(s) the 2nd current location data. In the present embodiment, Host H retrieves the 2nd current location data from 2nd Current Location Data Storage Area H702b1b and sends the data to Device C (S1). CPU 211 (FIG. 1) of Device C receives the 2nd current location data from Host H in a wireless fashion and stores the data in 2nd Current Location Data Storage Area 206C702b1b (S2). The foregoing sequence is repeated periodically.

This paragraph illustrate(s) 3rd Current Location Data Sharing Software 206A702c6 of Device A and 3rd Current Location Data Sharing Software 206C702c6 of Device C, which share(s) the 3rd current location data. In the present embodiment, CPU 211 (FIG. 1) of Device C retrieves the 3rd current location data from 3rd Current Location Data Storage Area 206C702b1c and sends the data to Device A (S1). CPU 211 (FIG. 1) of Device A receives the 3rd current location data from Device C and stores the data in 3rd Current Location Data Storage Area 206A702b1c (S2). The foregoing sequence is repeated periodically.

This paragraph illustrate(s) 3rd Current Location Data Sharing Software H702c6 of Host H and 3rd Current Location Data Sharing Software 206C702c6 of Device C, which share(s) the 3rd current location data. In the present embodiment, CPU 211 (FIG. 1) of Device C retrieves the 3rd current location data from 3rd Current Location Data Storage Area 206C702b1c and sends the data to Host H in a wireless fashion (S1). Host H receives the 3rd current location data from Device C and stores the data in 3rd Current Location Data Storage Area H702b1c (S2). The foregoing sequence is repeated periodically.

This paragraph illustrate(s) 1st Current Distance Data Producing Software H702c7 of Host H, which produce(s) the 1st current distance data. In the present embodiment, Host H retrieves the 1st current location data from 1st Current Location Data Storage Area H702b1a (S1). Host H retrieves the 2nd current location data from 2nd Current Location Data Storage Area H702b1b (S2). Host H produces the 1st current distance data by referring to the 1st current location data retrieved in S1 and the 2nd current location data retrieved in the previous step (S3). Host H stores the 1st current distance data produced in the previous step in 1st Current Distance Data Storage Area H702b2a (S4). The foregoing sequence is repeated periodically.

This paragraph illustrate(s) 3rd Current Distance Data Producing Software H702c8 of Host H, which produce(s) the 3rd current distance data. In the present embodiment, Host H retrieves the 2nd current location data from 2nd Current Location Data Storage Area H702b1b (S1). Host H retrieves the 3rd current location data from 3rd Current Location Data Storage Area H702b1c (S2). Host H produces the 3rd current distance data by referring to the 2nd current location data retrieved in S1 and the 3rd current location data retrieved in the previous step (S3). Host H stores the 3rd current distance data produced in the previous step in 3rd Current Distance Data Storage Area H702b2b (S4). The foregoing sequence is repeated periodically.

This paragraph illustrate(s) Total Current Distance Data Producing Software H702c9 of Host H, which produce(s) the total current distance data. In the present embodiment, Host H retrieves the 1st current distance data from 1st Current Distance Data Storage Area H702b2a (S1). Host H retrieves the 3rd current distance data from 3rd Current Distance Data Storage Area H702b2b (S2). Host H produces the total current distance data by adding the 1st current distance data retrieved in S1 and the 3rd current distance data retrieved in the previous step (S3). Host H stores the total current distance data produced in the previous step in Total Current Distance Data Storage Area H702b3 (S4). The foregoing sequence is repeated periodically.

This paragraph illustrate(s) Ideal Middle Point Data Producing Software H702c10 of Host H, which produce(s) the ideal middle point data. In the present embodiment, Host H retrieves the total current distance data from Total Current Distance Data Storage Area H702b3 (S1). Host H produces the ideal middle point data by identifying the middle point of the total current distance data retrieved in the previous step (S2). Host H stores the ideal middle point data produced in the previous step in Ideal Middle Point Data Storage Area H702b4 (S3). The foregoing sequence is repeated periodically.

This paragraph illustrate(s) Current Speed Data Producing Software H702c11 of Host H and Current Speed Data Producing Software 206B702c11 of Device B, which produce(s) the current speed data. In the present embodiment, CPU 211 (FIG. 1) of Device B identifies the current speed of Carrier CR702B (S1). CPU 211 (FIG. 1) of Device B produces the current speed data by referring to the current speed identified in the previous step and sends the data to Host H in a wireless fashion (S2). Host H receives the current speed data from Device B and stores the data in Current Speed Data Storage Area H702b5 (S3). The foregoing sequence is repeated periodically.

This paragraph illustrate(s) Carrier Speed Increasing Software H702c12 of Host H and Carrier Speed Increasing Software 206B702c12 of Device B, which increase(s) the current traveling speed of Carrier CR702B. In the present embodiment, Host H retrieves the ideal middle point data from Ideal Middle Point Data Storage Area H702b4 (S1). Host H retrieves the 2nd current location data from 2nd Current Location Data Storage Area H702b1b (S2). If the 2nd current location data retrieved in the previous step indicates that the current location of Carrier CR702B is behind the location indicated by the ideal middle point data retrieved in S1, Host H proceeds to the next step (S3). Host H sends the speed increasing command to Device B (S4). Here, the speed increasing command is the command to increase the current speed of Carrier CR702B. CPU 211 (FIG. 1) of Device B receives the speed increasing command from Host H in a wireless fashion (S5). CPU 211 (FIG. 1) of Device B increases the speed of Carrier CR702B (S6). Host H retrieves the first speed message data from First Speed Message Data Storage Area H702b6a and sends the data to Device B (S7). CPU 211 (FIG. 1) of Device B receives the first speed message data from Host H in a wireless fashion and outputs the data from Speaker 216 (FIG. 1) and LCD 201 (FIG. 1) of Device B (S8). The foregoing sequence is repeated periodically.

This paragraph illustrate(s) Carrier Speed Decreasing Software H702c13 of Host H and Carrier Speed Decreasing Software 206B702c13 of Device B, which decrease(s) the current traveling speed of Carrier CR702B. In the present embodiment, Host H retrieves the ideal middle point data from Ideal Middle Point Data Storage Area H702b4 (S1). Host H retrieves the 2nd current location data from 2nd Current Location Data Storage Area H702b1b (S2). If the 2nd current location data retrieved in the previous step indicates that the current location of Carrier CR702B is in front of the location indicated by the ideal middle point data retrieved in S1, Host H proceeds to the next step (S3). Host H sends the speed decreasing command to Device B (S4). Here, the speed decreasing command is the command to decrease the current speed of Carrier CR702B. CPU 211 (FIG. 1) of Device B receives the speed decreasing command from Host H in a wireless fashion (S5). CPU 211 (FIG. 1) of Device B decreases the speed of Carrier CR702B (S6). Host H retrieves the second speed message data from Second Speed Message Data Storage Area H702b6b and sends the data to Device B (S7). CPU 211 (FIG. 1) of Device B receives the second speed message data from Host H in a wireless fashion and outputs the data from Speaker 216 (FIG. 1) and LCD 201 (FIG. 1) of Device B (S8). The foregoing sequence is repeated periodically.

This paragraph illustrate(s) Relevant Data Sharing Software H702c14 of Host H and Relevant Data Sharing Software 206A702c14 of Device A, which share(s) the data relevant to Carrier CR702B. In the present embodiment, Host H retrieves the 1st current distance data from 1st Current Distance Data Storage Area H702b2a and sends the data to Device A (S1). CPU 211 (FIG. 1) of Device A receives the 1st current distance data from Host H in a wireless fashion and stores the data in 1st Current Distance Data Storage Area 206A702b2a (S2). Host H retrieves the 3rd current distance data from 3rd Current Distance Data Storage Area H702b2b and sends the data to Device A (S3). CPU 211 (FIG. 1) of Device A receives the 3rd current distance data from Host H in a wireless fashion and stores the data in 3rd Current Distance Data Storage Area 206A702b2b (S4). Host H retrieves the total current distance data from Total Current Distance Data Storage Area H702b3 and sends the data to Device A (S5). CPU 211 (FIG. 1) of Device A receives the total current distance data from Host H in a wireless fashion and stores the data in Total Current Distance Data Storage Area 206A702b3 (S6). Host H retrieves the ideal middle point data from Ideal Middle Point Data Storage Area H702b4 and sends the data to Device A (S7). CPU 211 (FIG. 1) of Device A receives the ideal middle point data from Host H in a wireless fashion and stores the data in Ideal Middle Point Data Storage Area 206A702b4 (S8). Host H retrieves the current speed data from Current Speed Data Storage Area H702b5 and sends the data to Device A (S9). CPU 211 (FIG. 1) of Device A receives the current speed data from Host H in a wireless fashion and stores the data in Current Speed Data Storage Area 206A702b5 (S10). The foregoing sequence is repeated periodically.

This paragraph illustrate(s) Relevant Data Sharing Software H702c14 of Host H and Relevant Data Sharing Software 206C702c14 of Device C, which share(s) the data relevant to Carrier CR702B. In the present embodiment, Host H retrieves the 1st current distance data from 1st Current Distance Data Storage Area H702b2a and sends the data to Device C (S1). CPU 211 (FIG. 1) of Device C receives the 1st current distance data from Host H in a wireless fashion and stores the data in 1st Current Distance Data Storage Area 206C702b2a (S2). Host H retrieves the 3rd current distance data from 3rd Current Distance Data Storage Area H702b2b and sends the data to Device C (S3). CPU 211 (FIG. 1) of Device C receives the 3rd current distance data from Host H in a wireless fashion and stores the data in 3rd Current Distance Data Storage Area 206C702b2b (S4). Host H retrieves the total current distance data from Total Current Distance Data Storage Area H702b3 and sends the data to Device C (S5). CPU 211 (FIG. 1) of Device C receives the total current distance data from Host H in a wireless fashion and stores the data in Total Current Distance Data Storage Area 206C702b3 (S6). Host H retrieves the ideal middle point data from Ideal Middle Point Data Storage Area H702b4 and sends the data to Device C (S7). CPU 211 (FIG. 1) of Device C receives the ideal middle point data from Host H in a wireless fashion and stores the data in Ideal Middle Point Data Storage Area 206C702b4 (S8). Host H retrieves the current speed data from Current Speed Data Storage Area H702b5 and sends the data to Device C (S9). CPU 211 (FIG. 1) of Device C receives the current speed data from Host H in a wireless fashion and stores the data in Current Speed Data Storage Area 206C702b5 (S10). The foregoing sequence is repeated periodically.

This paragraph Relevant Data Indicating Software 206A702c15 of Device A, which indicate(s) the data relevant to Carrier CR702B. In the present embodiment, CPU 211 (FIG. 1) of Device A retrieves the 1st current distance data from 1st Current Distance Data Storage Area 206A702b2a (S1). CPU 211 (FIG. 1) of Device A displays the 1st current distance data retrieved in the previous step on LCD 201 (FIG. 1) of Device A (S2). CPU 211 (FIG. 1) of Device A retrieves the 3rd current distance data from 3rd Current Distance Data Storage Area 206A702b2b (S3). CPU 211 (FIG. 1) of Device A displays the 3rd current distance data retrieved in the previous step on LCD 201 (FIG. 1) of Device A (S4). CPU 211 (FIG. 1) of Device A retrieves the total current distance data from Total Current Distance Data Storage Area 206A702b3 (S5). CPU 211 (FIG. 1) of Device A displays the total current distance data retrieved in the previous step on LCD 201 (FIG. 1) of Device A (S6). CPU 211 (FIG. 1) of Device A retrieves the ideal middle point data from Ideal Middle Point Data Storage Area 206A702b4 (S7). CPU 211 (FIG. 1) of Device A displays the ideal middle point data retrieved in the previous step on LCD 201 (FIG. 1) of Device A (S8). CPU 211 (FIG. 1) of Device A retrieves the current speed data from Current Speed Data Storage Area 206A702b5 (S9). CPU 211 (FIG. 1) of Device A displays the ideal middle point data retrieved in the previous step on LCD 201 (FIG. 1) of Device A (S10). CPU 211 (FIG. 1) of Device A retrieves the map data from Map Data Storage Area 206A702b7 (S11). CPU 211 (FIG. 1) of Device A displays the map data retrieved in the previous step on LCD 201 (FIG. 1) of Device A (S12). CPU 211 (FIG. 1) of Device A retrieves the 1st current location data from 1st Current Location Data Storage Area 206A702b1a (S13).

CPU 211 (FIG. 1) of Device A retrieves the 1st current location icon data from 1st Current Location Icon Data Storage Area 206A702b8a (S14). CPU 211 (FIG. 1) of Device A displays the 1st current location data retrieved in the previous step at the location corresponding to the 1st current location data retrieved in S13 on the map data displayed in S12 (S15). CPU 211 (FIG. 1) of Device A retrieves the 2nd current location data from 2nd Current Location Data Storage Area 206A702b1b (S16). CPU 211 (FIG. 1) of Device A retrieves the 2nd current location icon data from 2nd Current Location Icon Data Storage Area 206A702b8b (S17). CPU 211 (FIG. 1) of Device A displays the 2nd current location icon data retrieved in the previous step at the location corresponding to the 2nd current location data retrieved in S16 on the map data displayed in S12 (S18). CPU 211 (FIG. 1) of Device A retrieves the 3rd current location data from 3rd Current Location Data Storage Area 206A702b1c (S19). CPU 211 (FIG. 1) of Device A retrieves the 3rd current location icon data from 3rd Current Location Icon Data Storage Area 206A702b8c (S20). CPU 211 (FIG. 1) of Device A displays the 3rd current location icon data retrieved in the previous step at the location corresponding to the 3rd current location data retrieved in S19 on the map data displayed in S12 (S21). CPU 211 (FIG. 1) of Device A retrieves the ideal middle point data from Ideal Middle Point Data Storage Area 206A702b4 (S22). CPU 211 (FIG. 1) of Device A retrieves the ideal middle point icon data from Ideal Middle Point Icon Data Storage Area 206A702b8d (S23). CPU 211 (FIG. 1) of Device A displays the ideal middle point icon data retrieved in the previous step at the location corresponding to the ideal middle point data retrieved in S22 on the map data displayed in S12 (S24). The foregoing sequence is repeated periodically.

This paragraph Relevant Data Indicating Software H702c15 of Host H and Relevant Data Indicating Software 206B702c15 of Device B, which indicate(s) the data relevant to Carrier CR702B. In the present embodiment, Host H retrieves the 1st current distance data from 1st Current Distance Data Storage Area H702b2a and sends the data to Device B (S1). CPU 211 (FIG. 1) of Device B receives the 1st current distance data from Host H in a wireless fashion and displays the data on LCD 201 (FIG. 1) of Device B (S2). Host H retrieves the 3rd current distance data from 3rd Current Distance Data Storage Area H702b2b and sends the data to Device B (S3). CPU 211 (FIG. 1) of Device B receives the 3rd current distance data from Host H in a wireless fashion and displays the data on LCD 201 (FIG. 1) of Device B (S4). Host H retrieves the total current distance data from Total Current Distance Data Storage Area H702b3 and sends the data to Device B (S5). CPU 211 (FIG. 1) of Device B receives the total current distance data from Host H in a wireless fashion and displays the data on LCD 201 (FIG. 1) of Device B (S6). Host H retrieves the ideal middle point data from Ideal Middle Point Data Storage Area H702b4 and sends the data to Device B (S7). CPU 211 (FIG. 1) of Device B receives the ideal middle point data from Host H in a wireless fashion and displays the data on LCD 201 (FIG. 1) of Device B (S8). Host H retrieves the current speed data from Current Speed Data Storage Area H702b5 and sends the data to Device B (S9). CPU 211 (FIG. 1) of Device B receives the ideal middle point data from Host H in a wireless fashion and displays the data on LCD 201 (FIG. 1) of Device B (S10). Host H retrieves the map data from Map Data Storage Area H702b7 and sends the data to Device B (S11). CPU 211 (FIG. 1) of Device B receives the map data from Host H in a wireless fashion and displays the data on LCD 201 (FIG. 1) of Device B (S12). Host H retrieves the 1st current location data from 1st Current Location Data Storage Area H702b1a and sends the data to Device B (S13). CPU 211 (FIG. 1) of Device B receives the 1st current location data from Host H in a wireless fashion (S14). Host H retrieves the 1st current location icon data from 1st Current Location Icon Data Storage Area H702b8a and sends the data to Device B (S15). CPU 211 (FIG. 1) of Device B receives the 1st current location icon data from Host H in a wireless fashion (S16). Host H displays the 1st current location icon data received in the previous step at the location corresponding to the 1st current location data received in S14 on the map data displayed in S12 (S17). Host H retrieves the 2nd current location data from 2nd Current Location Data Storage Area H702b1b and sends the data to Device B (S18). CPU 211 (FIG. 1) of Device B receives the 2nd current location data from Host H in a wireless fashion (S19). Host H retrieves the 2nd current location icon data from 2nd Current Location Icon Data Storage Area H702b8b and sends the data to Device B (S20). CPU 211 (FIG. 1) of Device B receives the 2nd current location icon data from Host H in a wireless fashion (S21). Host H displays the 2nd current location icon data received in the previous step at the location corresponding to the 2nd current location data received in S19 on the map data displayed in S12 (S22). Host H retrieves the 3rd current location data from 3rd Current Location Data Storage Area H702b1c and sends the data to Device B (S23). CPU 211 (FIG. 1) of Device B receives the 3rd current location data from Host H in a wireless fashion (S24). Host H retrieves the 3rd current location icon data from 3rd Current Location Icon Data Storage Area H702b8c and sends the data to Device B (S25). CPU 211 (FIG. 1) of Device B receives the 3rd current location icon data from Host H in a wireless fashion (S26). Host H displays the 3rd current location icon data received in the previous step at the location corresponding to the 3rd current location data received in S24 on the map data displayed in S12 (S27). Host H retrieves the ideal middle point data from Ideal Middle Point Data Storage Area H702b4 and sends the data to Device B (S28). CPU 211 (FIG. 1) of Device B receives the ideal middle point data from Host H in a wireless fashion (S29). Host H retrieves the ideal middle point icon data from Ideal Middle Point Icon Data Storage Area H702b8d and sends the data to Device B (S30). CPU 211 (FIG. 1) of Device B receives the ideal middle point icon data from Host H in a wireless fashion (S31). Host H displays the ideal middle point icon data received in the previous step at the location corresponding to the ideal middle point data received in S29 on the map data displayed in S12 (S32). The foregoing sequence is repeated periodically.

This paragraph Relevant Data Indicating Software 206C702c15 of Device C, which indicate(s) the data relevant to Carrier CR702B. In the present embodiment, CPU 211 (FIG. 1) of Device C retrieves the 1st current distance data from 1st Current Distance Data Storage Area 206C702b2a (S1). CPU 211 (FIG. 1) of Device C displays the 1st current distance data retrieved in the previous step on LCD 201 (FIG. 1) of Device C (S2). CPU 211 (FIG. 1) of Device C retrieves the 3rd current distance data from 3rd Current Distance Data Storage Area 206C702b2b (S3). CPU 211 (FIG. 1) of Device C displays the 3rd current distance data retrieved in the previous step on LCD 201 (FIG. 1) of Device C (S4). CPU 211 (FIG. 1) of Device C retrieves the total current distance data from Total Current Distance Data Storage Area 206C702b3 (S5). CPU 211 (FIG. 1) of Device C displays the total current distance data retrieved in the previous step on LCD 201 (FIG. 1) of Device C (S6). CPU 211 (FIG. 1) of Device C retrieves the ideal middle point data from Ideal Middle Point Data Storage Area 206C702b4 (S7). CPU 211 (FIG. 1) of Device C displays the ideal middle point data retrieved in the previous step on LCD 201 (FIG. 1) of Device C (S8). CPU 211 (FIG. 1) of Device C retrieves the current speed data from Current Speed Data Storage Area 206C702b5 (S9). CPU 211 (FIG. 1) of Device C displays the ideal middle point data retrieved in the previous step on LCD 201 (FIG. 1) of Device C (S10). CPU 211 (FIG. 1) of Device C retrieves the map data from Map Data Storage Area 206C702b7 (S11). CPU 211 (FIG. 1) of Device C displays the map data retrieved in the previous step on LCD 201 (FIG. 1) of Device C (S12). CPU 211 (FIG. 1) of Device C retrieves the 1st current location data from 1st Current Location Data Storage Area 206C702b1a (S13). CPU 211 (FIG. 1) of Device C retrieves the 1st current location icon data from 1st Current Location Icon Data Storage Area 206C702b8a (S14). CPU 211 (FIG. 1) of Device C displays the 1st current location icon data retrieved in the previous step at the location corresponding to the 1st current location data retrieved in S13 on the map data displayed in S12 (S15). CPU 211 (FIG. 1) of Device C retrieves the 2nd current location data from 2nd Current Location Data Storage Area 206C702b1b (S16). CPU 211 (FIG. 1) of Device C retrieves the 2nd current location icon data from 2nd Current Location Icon Data Storage Area 206C702b8b (S17). CPU 211 (FIG. 1) of Device C displays the 2nd current location icon data retrieved in the previous step at the location corresponding to the 2nd current location data retrieved in S16 on the map data displayed in S12 (S18). CPU 211 (FIG. 1) of Device C retrieves the 3rd current location data from 3rd Current Location Data Storage Area 206C702b1c (S19). CPU 211 (FIG. 1) of Device C retrieves the 3rd current location icon data from 3rd Current Location Icon Data Storage Area 206C702b8c (S20). CPU 211 (FIG. 1) of Device C displays the 3rd current location icon data retrieved in the previous step at the location corresponding to the 3rd current location data retrieved in S19 on the map data displayed in S12 (S21). CPU 211 (FIG. 1) of Device C retrieves the ideal middle point data from Ideal Middle Point Data Storage Area 206C702b4 (S22). CPU 211 (FIG. 1) of Device C retrieves the ideal middle point icon data from Ideal Middle Point Icon Data Storage Area 206C702b8d (S23). CPU 211 (FIG. 1) of Device C displays the ideal middle point icon data retrieved in the previous step at the location corresponding to the ideal middle point data retrieved in S22 on the map data displayed in S12 (S24). The foregoing sequence is repeated periodically.

The following paragraphs illustrate another embodiment wherein Device B plays the major role in implementing the present function.

This paragraph illustrate(s) 1st Current Location Data Producing Software 206A702c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A702b1a (S3). The foregoing sequence is repeated periodically.

This paragraph illustrate(s) 2nd Current Location Data Producing Software 206B702c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B702b1b (S3). The foregoing sequence is repeated periodically.

This paragraph illustrate(s) 3rd Current Location Data Producing Software 206C702c3 of Device C, which produce(s) the 3rd current location data. In the present embodiment, CPU 211 (FIG. 1) of Device C identifies the current location of Device C (S1). CPU 211 (FIG. 1) of Device C produces the 3rd current location data by referring to the current location identified in the previous step (S2). CPU 211 (FIG. 1) of Device C stores the 3rd current location data produced in the previous step in 3rd Current Location Data Storage Area 206C702b1c (S3). The foregoing sequence is repeated periodically.

This paragraph illustrate(s) 1st Current Location Data Sharing Software 206A702c4 of Device A and 1st Current Location Data Sharing Software 206B702c4 of Device B, which share(s) the 1st current location data. In the present embodiment, CPU 211 (FIG. 1) of Device A retrieves the 1st current location data from 1st Current Location Data Storage Area 206A702b1a and sends the data to Device B in a wireless fashion (S1). CPU 211 (FIG. 1) of Device B receives the 1st current location data from Device A in a wireless fashion and stores the data in 1st Current Location Data Storage Area 206B702b1a (S2). The foregoing sequence is repeated periodically.

This paragraph illustrate(s) 1st Current Location Data Sharing Software 206A702c4 of Device A and 1st Current Location Data Sharing Software 206C702c4 of Device C, which share(s) the 1st current location data. In the present embodiment, CPU 211 (FIG. 1) of Device A retrieves the 1st current location data from 1st Current Location Data Storage Area 206A702b1a and sends the data to Device C in a wireless fashion (S1). CPU 211 (FIG. 1) of Device C receives the 1st current location data from Device A in a wireless fashion and stores the data in 1st Current Location Data Storage Area 206C702b1a (S2). The foregoing sequence is repeated periodically.

This paragraph illustrate(s) 2nd Current Location Data Sharing Software 206A702c5 of Device A and 2nd Current Location Data Sharing Software 206B702c5 of Device B, which share(s) the 2nd current location data. In the present embodiment, CPU 211 (FIG. 1) of Device B retrieves the 2nd current location data from 2nd Current Location Data Storage Area 206B702b1b and sends the data to Device A in a wireless fashion (S1). CPU 211 (FIG. 1) of Device A receives the 2nd current location data from Device B in a wireless fashion and stores the data in 2nd Current Location Data Storage Area 206A702b1b (S2). The foregoing sequence is repeated periodically.

This paragraph illustrate(s) 2nd Current Location Data Sharing Software 206B702c5 of Device B and 2nd Current Location Data Sharing Software 206C702c5 of Device C, which share(s) the 2nd current location data. In the present embodiment, CPU 211 (FIG. 1) of Device B retrieves the 2nd current location data from 2nd Current Location Data Storage Area 206B702b1b and sends the data to Device C in a wireless fashion (S1). CPU 211 (FIG. 1) of Device C receives the 2nd current location data from Device B in a wireless fashion and stores the data in 2nd Current Location Data Storage Area 206C702b1b (S2). The foregoing sequence is repeated periodically.

This paragraph illustrate(s) 3rd Current Location Data Sharing Software 206A702c6 of Device A and 3rd Current Location Data Sharing Software 206C702c6 of Device C, which share(s) the 3rd current location data. In the present embodiment, CPU 211 (FIG. 1) of Device C retrieves the 3rd current location data from 3rd Current Location Data Storage Area 206C702b1c and sends the data to Device A in a wireless fashion (S1). CPU 211 (FIG. 1) of Device A receives the 3rd current location data from Device C in a wireless fashion and stores the data in 3rd Current Location Data Storage Area 206A702b1c (S2). The foregoing sequence is repeated periodically.

This paragraph illustrate(s) 3rd Current Location Data Sharing Software 206B702c6 of Device B and 3rd Current Location Data Sharing Software 206C702c6 of Device C, which share(s) the 3rd current location data. In the present embodiment, CPU 211 (FIG. 1) of Device C retrieves the 3rd current location data from 3rd Current Location Data Storage Area 206C702b1c and sends the data to Device B in a wireless fashion (S1). CPU 211 (FIG. 1) of Device B receives the 3rd current location data from Device C in a wireless fashion and stores the data in 3rd Current Location Data Storage Area 206B702b1c (S2). The foregoing sequence is repeated periodically.

This paragraph illustrate(s) 1st Current Distance Data Producing Software 206B702c7 of Device B, which produce(s) the 1st current distance data. In the present embodiment, CPU 211 (FIG. 1) of Device B retrieves the 1st current location data from 1st Current Location Data Storage Area 206B702b1a (S1). CPU 211 (FIG. 1) of Device B retrieves the 2nd current location data from 2nd Current Location Data Storage Area 206B702b1b (S2). CPU 211 (FIG. 1) of Device B produces the 1st current distance data by referring to the 1st current location data retrieved in S1 and the 2nd current location data retrieved in the previous step (S3). CPU 211 (FIG. 1) of Device B stores the 1st current distance data produced in the previous step in 1st Current Distance Data Storage Area 206B702b2a (S4). The foregoing sequence is repeated periodically.

This paragraph illustrate(s) 3rd Current Distance Data Producing Software 206B702c8 of Device B, which produce(s) the 3rd current distance data. In the present embodiment, CPU 211 (FIG. 1) of Device B retrieves the 2nd current location data from 2nd Current Location Data Storage Area 206B702b1b (S1). CPU 211 (FIG. 1) of Device B retrieves the 3rd current location data from 3rd Current Location Data Storage Area 206B702b1c (S2). CPU 211 (FIG. 1) of Device B produces the 3rd current distance data by referring to the 2nd current location data retrieved in S1 and the 3rd current location data retrieved in the previous step (S3). CPU 211 (FIG. 1) of Device B stores the 3rd current distance data produced in the previous step in 3rd Current Distance Data Storage Area 206B702b2b (S4). The foregoing sequence is repeated periodically.

This paragraph illustrate(s) Total Current Distance Data Producing Software 206B702c9 of Device B, which produce(s) the total current distance data. In the present embodiment, CPU 211 (FIG. 1) of Device B retrieves the 1st current distance data from 1st Current Distance Data Storage Area 206B702b2a (S1). CPU 211 (FIG. 1) of Device B retrieves the 3rd current distance data from 3rd Current Distance Data Storage Area 206B702b2b (S2). CPU 211 (FIG. 1) of Device B produces the total current distance data by adding the 1st current distance data retrieved in S1 and the 3rd current distance data retrieved in the previous step (S3). CPU 211 (FIG. 1) of Device B stores the total current distance data produced in the previous step in Total Current Distance Data Storage Area 206B702b3 (S4). The foregoing sequence is repeated periodically.

This paragraph illustrate(s) Ideal Middle Point Data Producing Software 206B702c10 of Device B, which produce(s) the ideal middle point data. In the present embodiment, CPU 211 (FIG. 1) of Device B retrieves the total current distance data from Total Current Distance Data Storage Area 206B702b3 (S1). CPU 211 (FIG. 1) of Device B produces the ideal middle point data by identifying the middle point of the total current distance data retrieved in the previous step (S2). CPU 211 (FIG. 1) of Device B stores the ideal middle point data produced in the previous step in Ideal Middle Point Data Storage Area 206B702b4 (S3). The foregoing sequence is repeated periodically.

This paragraph illustrate(s) Current Speed Data Producing Software 206B702c11 of Device B, which produce(s) the current speed data. In the present embodiment, CPU 211 (FIG. 1) of Device B identifies the current speed of Carrier CR702B (S1). CPU 211 (FIG. 1) of Device B produces the current speed data by referring to the current speed identified in the previous step (S2). CPU 211 (FIG. 1) of Device B stores the current speed data produced in the previous step in Current Speed Data Storage Area 206B702b5 (S3). The foregoing sequence is repeated periodically.

This paragraph illustrate(s) Carrier Speed Increasing Software 206B702c12 of Device B, which increase(s) the current traveling speed of Carrier CR702B. In the present embodiment, CPU 211 (FIG. 1) of Device B retrieves the ideal middle point data from Ideal Middle Point Data Storage Area 206B702b4 (S1). CPU 211 (FIG. 1) of Device B retrieves the 2nd current location data from 2nd Current Location Data Storage Area 206B702b1b (S2). If the 2nd current location data retrieved in the previous step indicates that the current location of Carrier CR702B is behind the location indicated by the ideal middle point data retrieved in S1, CPU 211 (FIG. 1) of Device B proceeds to the next step (S3). CPU 211 (FIG. 1) of Device B increases the speed of Carrier CR702B (S4). CPU 211 (FIG. 1) of Device B retrieves the first speed message data from First Speed Message Data Storage Area 206B702b6a (S5). CPU 211 (FIG. 1) of Device B outputs the first speed message data retrieved in the previous step from Speaker 216 (FIG. 1) and LCD 201 (FIG. 1) of Device B (S6). The foregoing sequence is repeated periodically.

This paragraph illustrate(s) Carrier Speed Decreasing Software 206B702c13 of Device B, which decrease(s) the current traveling speed of Carrier CR702B. In the present embodiment, CPU 211 (FIG. 1) of Device B retrieves the ideal middle point data from Ideal Middle Point Data Storage Area 206B702b4 (S1). CPU 211 (FIG. 1) of Device B retrieves the 2nd current location data from 2nd Current Location Data Storage Area 206B702b1b (S2). If the 2nd current location data retrieved in the previous step indicates that the current location of Carrier CR702B is in front of the location indicated by the ideal middle point data retrieved in S1, CPU 211 (FIG. 1) of Device B proceeds to the next step (S3). CPU 211 (FIG. 1) of Device B decreases the speed of Carrier CR702B (S4). CPU 211 (FIG. 1) of Device B retrieves the second speed message data from Second Speed Message Data Storage Area 206B702b6b (S5). CPU 211 (FIG. 1) of Device B outputs the second speed message data retrieved in the previous step from Speaker 216 (FIG. 1) and LCD 201 (FIG. 1) of Device B (S6). The foregoing sequence is repeated periodically.

This paragraph illustrate(s) Relevant Data Sharing Software 206A702c14 of Device A and Relevant Data Sharing Software 206B702c14 of Device B, which share(s) the data relevant to Carrier CR702B. In the present embodiment, CPU 211 (FIG. 1) of Device B retrieves the 1st current distance data from 1st Current Distance Data Storage Area 206B702b2a and sends the data to Device A in a wireless fashion (S1). CPU 211 (FIG. 1) of Device A receives the 1st current distance data from Device B in a wireless fashion and stores the data in 1st Current Distance Data Storage Area 206A702b2a (S2). CPU 211 (FIG. 1) of Device B retrieves the 3rd current distance data from 3rd Current Distance Data Storage Area 206B702b2b and sends the data to Device A in a wireless fashion (S3). CPU 211 (FIG. 1) of Device A receives the 3rd current distance data from Device B in a wireless fashion and stores the data in 3rd Current Distance Data Storage Area 206A702b2b (S4). CPU 211 (FIG. 1) of Device B retrieves the total current distance data from Total Current Distance Data Storage Area 206B702b3 and sends the data to Device A in a wireless fashion (S5). CPU 211 (FIG. 1) of Device A receives the total current distance data from Device B in a wireless fashion and stores the data in Total Current Distance Data Storage Area 206A702b3 (S6). CPU 211 (FIG. 1) of Device B retrieves the ideal middle point data from Ideal Middle Point Data Storage Area 206B702b4 and sends the data to Device A in a wireless fashion (S7). CPU 211 (FIG. 1) of Device A receives the ideal middle point data from Device B in a wireless fashion and stores the data in Ideal Middle Point Data Storage Area 206A702b4 (S8). CPU 211 (FIG. 1) of Device B retrieves the current speed data from Current Speed Data Storage Area 206B702b5 and sends the data to Device A in a wireless fashion (S9). CPU 211 (FIG. 1) of Device A receives the current speed data from Device B in a wireless fashion and stores the data in Current Speed Data Storage Area 206A702b5 (S10). The foregoing sequence is repeated periodically.

This paragraph illustrate(s) Relevant Data Sharing Software 206B702c14 of Device B and Relevant Data Sharing Software 206C702c14 of Device C, which share(s) the data relevant to Carrier CR702B. In the present embodiment, CPU 211 (FIG. 1) of Device B retrieves the 1st current distance data from 1st Current Distance Data Storage Area 206B702b2a and sends the data to Device C in a wireless fashion (S1). CPU 211 (FIG. 1) of Device C receives the 1st current distance data from Device B in a wireless fashion and stores the data in 1st Current Distance Data Storage Area 206C702b2a (S2). CPU 211 (FIG. 1) of Device B retrieves the 3rd current distance data from 3rd Current Distance Data Storage Area 206B702b2b and sends the data to Device C in a wireless fashion (S3). CPU 211 (FIG. 1) of Device C receives the 3rd current distance data from Device B in a wireless fashion and stores the data in 3rd Current Distance Data Storage Area 206C702b2b (S4). CPU 211 (FIG. 1) of Device B retrieves the total current distance data from Total Current Distance Data Storage Area 206B702b3 and sends the data to Device C in a wireless fashion (S5). CPU 211 (FIG. 1) of Device C receives the total current distance data from Device B in a wireless fashion and stores the data in Total Current Distance Data Storage Area 206C702b3 (S6). CPU 211 (FIG. 1) of Device B retrieves the ideal middle point data from Ideal Middle Point Data Storage Area 206B702b4 and sends the data to Device C in a wireless fashion (S7). CPU 211 (FIG. 1) of Device C receives the ideal middle point data from Device B in a wireless fashion and stores the data in Ideal Middle Point Data Storage Area 206C702b4 (S8). CPU 211 (FIG. 1) of Device B retrieves the current speed data from Current Speed Data Storage Area 206B702b5 and sends the data to Device C in a wireless fashion (S9). CPU 211 (FIG. 1) of Device C receives the current speed data from Device B in a wireless fashion and stores the data in Current Speed Data Storage Area 206C702b5 (S10). The foregoing sequence is repeated periodically.

This paragraph illustrate(s) Relevant Data Indicating Software 206A702c15 of Device A, which indicate(s) the data relevant to Carrier CR702B. In the present embodiment, CPU 211 (FIG. 1) of Device A retrieves the 1st current distance data from 1st Current Distance Data Storage Area 206A702b2a (S1). CPU 211 (FIG. 1) of Device A displays the 1st current distance data retrieved in the previous step on LCD 201 (FIG. 1) of Device A (S2). CPU 211 (FIG. 1) of Device A retrieves the 3rd current distance data from 3rd Current Distance Data Storage Area 206A702b2b (S3). CPU 211 (FIG. 1) of Device A displays the 3rd current distance data retrieved in the previous step on LCD 201 (FIG. 1) of Device A (S4). CPU 211 (FIG. 1) of Device A retrieves the total current distance data from Total Current Distance Data Storage Area 206A702b3 (S5). CPU 211 (FIG. 1) of Device A displays the total current distance data retrieved in the previous step on LCD 201 (FIG. 1) of Device A (S6). CPU 211 (FIG. 1) of Device A retrieves the ideal middle point data from Ideal Middle Point Data Storage Area 206A702b4 (S7). CPU 211 (FIG. 1) of Device A displays the ideal middle point data retrieved in the previous step on LCD 201 (FIG. 1) of Device A (S8). CPU 211 (FIG. 1) of Device A retrieves the current speed data from Current Speed Data Storage Area 206A702b5 (S9). CPU 211 (FIG. 1) of Device A displays the ideal middle point data retrieved in the previous step on LCD 201 (FIG. 1) of Device A (S10). CPU 211 (FIG. 1) of Device A retrieves the map data from Map Data Storage Area 206A702b7 (S11). CPU 211 (FIG. 1) of Device A displays the map data retrieved in the previous step on LCD 201 (FIG. 1) of Device A (S12). CPU 211 (FIG. 1) of Device A retrieves the 1st current location data from 1st Current Location Data Storage Area 206A702b1a (S13). CPU 211 (FIG. 1) of Device A retrieves the 1st current location icon data from 1st Current Location Icon Data Storage Area 206A702b8a (S14). CPU 211 (FIG. 1) of Device A displays the 1st current location icon data retrieved in the previous step at the location corresponding to the 1st current location data retrieved in S13 on the map data displayed in S12 (S15). CPU 211 (FIG. 1) of Device A retrieves the 2nd current location data from 2nd Current Location Data Storage Area 206A702b1b (S16). CPU 211 (FIG. 1) of Device A retrieves the 2nd current location icon data from 2nd Current Location Icon Data Storage Area 206A702b8b (S17). CPU 211 (FIG. 1) of Device A displays the 2nd current location icon data retrieved in the previous step at the location corresponding to the 2nd current location data retrieved in S16 on the map data displayed in S12 (S18). CPU 211 (FIG. 1) of Device A retrieves the 3rd current location data from 3rd Current Location Data Storage Area 206A702b1c (S19). CPU 211 (FIG. 1) of Device A retrieves the 3rd current location icon data from 3rd Current Location Icon Data Storage Area 206A702b8c (S20). CPU 211 (FIG. 1) of Device A displays the 3rd current location icon data retrieved in the previous step at the location corresponding to the 3rd current location data retrieved in S19 on the map data displayed in S12 (S21). CPU 211 (FIG. 1) of Device A retrieves the ideal middle point data from Ideal Middle Point Data Storage Area 206A702b4 (S22). CPU 211 (FIG. 1) of Device A retrieves the ideal middle point icon data from Ideal Middle Point Icon Data Storage Area 206A702b8d (S23). CPU 211 (FIG. 1) of Device A displays the ideal middle point icon data retrieved in the previous step at the location corresponding to the ideal middle point data retrieved in S22 on the map data displayed in S12 (S24). The foregoing sequence is repeated periodically.

This paragraph illustrate(s) Relevant Data Indicating Software 206B702c15 of Device B, which indicate(s) the data relevant to Carrier CR702B. In the present embodiment, CPU 211 (FIG. 1) of Device B retrieves the 1st current distance data from 1st Current Distance Data Storage Area 206B702b2a (S1). CPU 211 (FIG. 1) of Device B displays the 1st current distance data retrieved in the previous step on LCD 201 (FIG. 1) of Device B (S2). CPU 211 (FIG. 1) of Device B retrieves the 3rd current distance data from 3rd Current Distance Data Storage Area 206B702b2b (S3). CPU 211 (FIG. 1) of Device B displays the 3rd current distance data retrieved in the previous step on LCD 201 (FIG. 1) of Device B (S4). CPU 211 (FIG. 1) of Device B retrieves the total current distance data from Total Current Distance Data Storage Area 206B702b3 (S5). CPU 211 (FIG. 1) of Device B displays the total current distance data retrieved in the previous step on LCD 201 (FIG. 1) of Device B (S6). CPU 211 (FIG. 1) of Device B retrieves the ideal middle point data from Ideal Middle Point Data Storage Area 206B702b4 (S7). CPU 211 (FIG. 1) of Device B displays the ideal middle point data retrieved in the previous step on LCD 201 (FIG. 1) of Device B (S8). CPU 211 (FIG. 1) of Device B retrieves the current speed data from Current Speed Data Storage Area 206B702b5 (S9). CPU 211 (FIG. 1) of Device B displays the ideal middle point data retrieved in the previous step on LCD 201 (FIG. 1) of Device B (S10). CPU 211 (FIG. 1) of Device B retrieves the map data from Map Data Storage Area 206B702b7 (S11). CPU 211 (FIG. 1) of Device B displays the map data retrieved in the previous step on LCD 201 (FIG. 1) of Device B (S12). CPU 211 (FIG. 1) of Device B retrieves the 1st current location data from 1st Current Location Data Storage Area 206B702b1a (S13). CPU 211 (FIG. 1) of Device B retrieves the 1st current location icon data from 1st Current Location Icon Data Storage Area 206B702b8a (S14). CPU 211 (FIG. 1) of Device B displays the 1st current location icon data retrieved in the previous step at the location corresponding to the 1st current location data retrieved in S13 on the map data displayed in S12 (S15). CPU 211 (FIG. 1) of Device B retrieves the 2nd current location data from 2nd Current Location Data Storage Area 206B702b1b (S16). CPU 211 (FIG. 1) of Device B retrieves the 2nd current location icon data from 2nd Current Location Icon Data Storage Area 206B702b8b (S17). CPU 211 (FIG. 1) of Device B displays the 2nd current location icon data retrieved in the previous step at the location corresponding to the 2nd current location data retrieved in S16 on the map data displayed in S12 (S18). CPU 211 (FIG. 1) of Device B retrieves the 3rd current location data from 3rd Current Location Data Storage Area 206B702b1c (S19). CPU 211 (FIG. 1) of Device B retrieves the 3rd current location icon data from 3rd Current Location Icon Data Storage Area 206B702b8c (S20). CPU 211 (FIG. 1) of Device B displays the 3rd current location icon data retrieved in the previous step at the location corresponding to the 3rd current location data retrieved in S19 on the map data displayed in S12 (S21). CPU 211 (FIG. 1) of Device B retrieves the ideal middle point data from Ideal Middle Point Data Storage Area 206B702b4 (S22). CPU 211 (FIG. 1) of Device B retrieves the ideal middle point icon data from Ideal Middle Point Icon Data Storage Area 206B702b8d (S23). CPU 211 (FIG. 1) of Device B displays the ideal middle point icon data retrieved in the previous step at the location corresponding to the ideal middle point data retrieved in S22 on the map data displayed in S12 (S24). The foregoing sequence is repeated periodically.

This paragraph illustrate(s) Relevant Data Indicating Software 206C702c15 of Device C, which indicate(s) the data relevant to Carrier CR702B. In the present embodiment, CPU 211 (FIG. 1) of Device C retrieves the 1st current distance data from 1st Current Distance Data Storage Area 206C702b2a (S1). CPU 211 (FIG. 1) of Device C displays the 1st current distance data retrieved in the previous step on LCD 201 (FIG. 1) of Device C (S2). CPU 211 (FIG. 1) of Device C retrieves the 3rd current distance data from 3rd Current Distance Data Storage Area 206C702b2b (S3). CPU 211 (FIG. 1) of Device C displays the 3rd current distance data retrieved in the previous step on LCD 201 (FIG. 1) of Device C (S4). CPU 211 (FIG. 1) of Device C retrieves the total current distance data from Total Current Distance Data Storage Area 206C702b3 (S5). CPU 211 (FIG. 1) of Device C displays the total current distance data retrieved in the previous step on LCD 201 (FIG. 1) of Device C (S6). CPU 211 (FIG. 1) of Device C retrieves the ideal middle point data from Ideal Middle Point Data Storage Area 206C702b4 (S7). CPU 211 (FIG. 1) of Device C displays the ideal middle point data retrieved in the previous step on LCD 201 (FIG. 1) of Device C (S8). CPU 211 (FIG. 1) of Device C retrieves the current speed data from Current Speed Data Storage Area 206C702b5 (S9). CPU 211 (FIG. 1) of Device C displays the ideal middle point data retrieved in the previous step on LCD 201 (FIG. 1) of Device C (S10). CPU 211 (FIG. 1) of Device C retrieves the map data from Map Data Storage Area 206C702b7 (S11). CPU 211 (FIG. 1) of Device C displays the map data retrieved in the previous step on LCD 201 (FIG. 1) of Device C (S12). CPU 211 (FIG. 1) of Device C retrieves the 1st current location data from 1st Current Location Data Storage Area 206C702b1a (S13). CPU 211 (FIG. 1) of Device C retrieves the 1st current location icon data from 1st Current Location Icon Data Storage Area 206C702b8a (S14). CPU 211 (FIG. 1) of Device C displays the 1st current location icon data retrieved in the previous step at the location corresponding to the 1st current location data retrieved in S13 on the map data displayed in S12 (S15). CPU 211 (FIG. 1) of Device C retrieves the 2nd current location data from 2nd Current Location Data Storage Area 206C702b1b (S16). CPU 211 (FIG. 1) of Device C retrieves the 2nd current location icon data from 2nd Current Location Icon Data Storage Area 206C702b8b (S17). CPU 211 (FIG. 1) of Device C displays the 2nd current location icon data retrieved in the previous step at the location corresponding to the 2nd current location data retrieved in S16 on the map data displayed in S12 (S18). CPU 211 (FIG. 1) of Device C retrieves the 3rd current location data from 3rd Current Location Data Storage Area 206C702b1c (S19). CPU 211 (FIG. 1) of Device C retrieves the 3rd current location icon data from 3rd Current Location Icon Data Storage Area 206C702b8c (S20). CPU 211 (FIG. 1) of Device C displays the 3rd current location icon data retrieved in the previous step at the location corresponding to the 3rd current location data retrieved in S19 on the map data displayed in S12 (S21). CPU 211 (FIG. 1) of Device C retrieves the ideal middle point data from Ideal Middle Point Data Storage Area 206C702b4 (S22). CPU 211 (FIG. 1) of Device C retrieves the ideal middle point icon data from Ideal Middle Point Icon Data Storage Area 206C702b8d (S23). CPU 211 (FIG. 1) of Device C displays the ideal middle point icon data retrieved in the previous step at the location corresponding to the ideal middle point data retrieved in S22 on the map data displayed in S12 (S24). The foregoing sequence is repeated periodically.

<<Front Carrier Activity Notifying Function>>

The following paragraphs illustrate the front carrier activity notifying function, wherein said communication device is included in a 2nd carrier, said 2nd carrier is a carrier traveling behind a 1st carrier, a license plate number data which indicates the license plate number of said 1st carrier, a driver's name data which indicates the name of the driver of said 1st carrier, a 1st current location data which indicates the current geographic location of said 1st carrier, a 2nd current location data which indicates the current geographic location of said 2nd carrier, a current distance data which indicates the current distance between said 1st carrier and said 2nd carrier, and a current speed data which indicates the current speed of said 1st carrier are indicated on said communication device, when a left blinker of said 1st carrier is on, a left blinker message data is output from said communication device, when a right blinker of said 1st carrier is on, a right blinker message data is output from said communication device, when a brake pedal of said 1st carrier is stepped on, a brake message data is output from said communication device, when a accelerator pedal of said 1st carrier is stepped on, an accelerator message data is output from said communication device, when a steering wheel of said 1st carrier is turned to left, a left steering wheel message data is output from said communication device, and when a steering wheel of said 1st carrier is turned to right, a right steering wheel message data is output from said communication device.

This paragraph illustrates the major elements utilized to implement the present function. In the present embodiment, Host H is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H, Device A, and Device B are capable to communicate with each other via Network NT (e.g., the Internet) to implement the present function. Device A and Device B are also capable to communicate with each other directly in a wireless fashion to implement the present function.

This paragraph illustrates the relationship between Carrier CR703A and Device A. In the present embodiment, Carrier CR703A includes Device A. Here, Carrier CR703A is a carrier which may be any type of carrier or transportation system designed to carry passenger(s), such as an airplane, automobile, motorcycle, railway train, taxi, bus, space ship, or space station.

This paragraph illustrates the relationship between Carrier CR703B and Device B. In the present embodiment, Carrier CR703B includes Device B. Here, Carrier CR703B is a carrier which may be any type of carrier or transportation system designed to carry passenger(s), such as an airplane, automobile, motorcycle, railway train, taxi, bus, space ship, or space station.

This paragraph illustrates the storage area included in Host H. In the present embodiment, Host H includes Front Carrier Activity Notifying Info Storage Area H703a of which the data and the software program(s) stored therein are described hereinafter.

This paragraph illustrates the storage area(s) included in Front Carrier Activity Notifying Info Storage Area H703a. In the present embodiment, Front Carrier Activity Notifying Info Storage Area H703a includes Front Carrier Activity Notifying Data Storage Area H703b and Front Carrier Activity Notifying Software Storage Area H703c. Front Carrier Activity Notifying Data Storage Area H703b stores the data necessary to implement the present function on the side of Host H, such as the one(s) described hereinafter. Front Carrier Activity Notifying Software Storage Area H703c stores the software program(s) necessary to implement the present function on the side of Host H, such as the one(s) described hereinafter.

This paragraph illustrates the storage area(s) included in Front Carrier Activity Notifying Data Storage Area H703b. In the present embodiment, Front Carrier Activity Notifying Data Storage Area H703b includes Entire License Plate Number Data Storage Area H703b1, Entire Driver's Name Data Storage Area H703b2, Entire Current Location Data Storage Area H703b3, Current Distance Data Storage Area H703b4, Entire Current Speed Data Storage Area H703b5, Entire Blinker Flag Data Storage Area H703b6, Speed Control Flag Data Storage Area H703b7, Entire Steering Wheel Flag Data Storage Area H703b8, Entire Blinker Message Data Storage Area H703b9, Speed Control Message Data Storage Area H703b10, Entire Steering Wheel Message Data Storage Area H703b11, Map Data Storage Area H703b12, Entire Current Location Icon Data Storage Area H703b13, and Work Area H703b14. Entire License Plate Number Data Storage Area H703b1 stores the data described hereinafter. Entire Driver's Name Data Storage Area H703b2 stores the data described hereinafter. Entire Current Location Data Storage Area H703b3 stores the data described hereinafter. Current Distance Data Storage Area H703b4 stores the current distance data which indicates the current distance between Carrier CR703A and Carrier CR703B. Entire Current Speed Data Storage Area H703b5 stores the data described hereinafter. Entire Blinker Flag Data Storage Area H703b6 stores the data described hereinafter. Speed Control Flag Data Storage Area H703b7 stores the data described hereinafter. Entire Steering Wheel Flag Data Storage Area H703b8 stores the data described hereinafter. Entire Blinker Message Data Storage Area H703b9 stores the data described hereinafter. Speed Control Message Data Storage Area H703b10 stores the data described hereinafter. Entire Steering Wheel Message Data Storage Area H703b11 stores the data described hereinafter. Map Data Storage Area H703b12 stores the map data which is the image data indicating a map. Entire Current Location Icon Data Storage Area H703b13 stores the data described hereinafter. Work Area H703b14 is utilized as a work area to perform calculation and temporarily store data to implement the present function.

This paragraph illustrates the storage area(s) included in Entire License Plate Number Data Storage Area H703b1. In the present embodiment, Entire License Plate Number Data Storage Area H703b1 includes 1st License Plate Number Data Storage Area H703b1a and 2nd License Plate Number Data Storage Area H703b1b. 1st License Plate Number Data Storage Area H703b1a stores the 1st license plate number data which indicates the license plate number of Carrier CR703A. 2nd License Plate Number Data Storage Area H703b1b stores the 2nd license plate number data which indicates the license plate number of Carrier CR703B.

This paragraph illustrates the storage area(s) included in Entire Driver's Name Data Storage Area H703b2. In the present embodiment, Entire Driver's Name Data Storage Area H703b2 includes 1st Driver's Name Data Storage Area H703b2a and 2nd Driver's Name Data Storage Area H703b2b. 1st Driver's Name Data Storage Area H703b2a stores the 1st driver's name data which indicates the name of the driver of Carrier CR703A. 2nd Driver's Name Data Storage Area H703b2b stores the 2nd driver's name data which indicates the name of the driver of Carrier CR703B.

This paragraph illustrates the storage area(s) included in Entire Current Location Data Storage Area H703b3. In the present embodiment, Entire Current Location Data Storage Area H703b3 includes 1st Current Location Data Storage Area H703b3a and 2nd Current Location Data Storage Area H703b3b. 1st Current Location Data Storage Area H703b3a stores the 1st current location data which indicates the current geographic location of Carrier CR703A in (x,y,z) format. 2nd Current Location Data Storage Area H703b3b stores the 2nd current location data which indicates the current geographic location of Carrier CR703B in (x,y,z) format.

This paragraph illustrates the storage area(s) included in Entire Current Speed Data Storage Area H703b5. In the present embodiment, Entire Current Speed Data Storage Area H703b5 includes 1st Current Speed Data Storage Area H703b5a and 2nd Current Speed Data Storage Area H703b5b. 1st Current Speed Data Storage Area H703b5a stores the 1st current speed data which indicates the current speed of Carrier CR703A. 2nd Current Speed Data Storage Area H703b5b stores the 2nd current speed data which indicates the current speed of Carrier CR703B.

This paragraph illustrates the storage area(s) included in Entire Blinker Flag Data Storage Area H703b6. In the present embodiment, Entire Blinker Flag Data Storage Area H703b6 includes Left Blinker Flag Data Storage Area H703b6a and Right Blinker Flag Data Storage Area H703b6b. Left Blinker Flag Data Storage Area H703b6a stores the left blinker flag data which is either the left blinker positive flag data or the left blinker negative flag data. The left blinker positive flag data indicates that the left blinker (not shown) of Carrier CR703A is currently on. The right blinker negative flag data indicates that the right blinker (not shown) of Carrier CR703A is currently off. The default data stored therein is the left blinker negative flag data. Right Blinker Flag Data Storage Area H703b6b stores the right blinker flag data which is either the right blinker positive flag data or the right blinker negative flag data. The right blinker positive flag data indicates that the right blinker (not shown) of Carrier CR703A is currently on. The right blinker negative flag data indicates that the right blinker (not shown) of Carrier CR703A is currently off. The default data stored therein is the right blinker negative flag data.

This paragraph illustrates the storage area(s) included in Speed Control Flag Data Storage Area H703b7. In the present embodiment, Speed Control Flag Data Storage Area H703b7 includes Brake Flag Data Storage Area H703b7a and Accelerator Flag Data Storage Area H703b7b. Brake Flag Data Storage Area H703b7a stores the brake flag data which is either the brake positive flag data or the brake negative flag data. The brake positive flag data indicates that the speed of Carrier CR703A is currently decreasing. The brake negative flag data indicates that the speed of Carrier CR703A is not currently decreasing. The default data stored therein is the brake negative flag data. Accelerator Flag Data Storage Area H703b7b stores the accelerator flag data which is either the accelerator positive flag data or the accelerator negative flag data. The accelerator positive flag data indicates that the speed of Carrier CR703A is currently increasing. The accelerator negative flag data indicates that the speed of Carrier CR703A is currently not increasing. The default data stored therein is the accelerator negative flag data.

This paragraph illustrates the storage area(s) included in Entire Steering Wheel Flag Data Storage Area H703b8. In the present embodiment, Entire Steering Wheel Flag Data Storage Area H703b8 includes Left Steering Wheel Flag Data Storage Area H703b8a and Right Steering Wheel Flag Data Storage Area H703b8b. Left Steering Wheel Flag Data Storage Area H703b8a stores the left steering wheel flag data which is either the steering wheel left positive flag data or the steering wheel left negative flag data. The steering wheel left positive flag data indicates that Carrier CR703A is currently turning to the left direction. The steering wheel left negative flag data indicates that Carrier CR703A is currently not turning to the left direction. The default data stored therein is the steering wheel left negative flag data. Right Steering Wheel Flag Data Storage Area H703b8b stores the right steering wheel flag data which is either the steering wheel right positive flag data or the steering wheel right negative flag data. The steering wheel right positive flag data indicates that Carrier CR703A is currently turning to the right direction. The steering wheel right negative flag data indicates that Carrier CR703A is currently not turning to the right direction. The default data stored therein is the steering wheel right negative flag data.

This paragraph illustrates the storage area(s) included in Entire Blinker Message Data Storage Area H703b9. In the present embodiment, Entire Blinker Message Data Storage Area H703b9 includes Left Blinker Message Data Storage Area H703b9a and Right Blinker Message Data Storage Area H703b9b. Left Blinker Message Data Storage Area H703b9a stores the left blinker message data which is the audiovisual data indicating that the left blinker (not shown) of Carrier CR703A is currently on. Right Blinker Message Data Storage Area H703b9b stores the right blinker message data which is the audiovisual data indicating that the right blinker (not shown) of Carrier CR703A is currently on.

This paragraph illustrates the storage area(s) included in Speed Control Message Data Storage Area H703b10. In the present embodiment, Speed Control Message Data Storage Area H703b10 includes Brake Message Data Storage Area H703b10a and Accelerator Message Data Storage Area H703b10b. Brake Message Data Storage Area H703b10a stores the brake message data which is the audiovisual data indicating that the speed of Carrier CR703A is currently decreasing. Accelerator Message Data Storage Area H703b10b stores the accelerator message data which is the audiovisual data indicating that the speed of Carrier CR703A is currently increasing.

This paragraph illustrates the storage area(s) included in Entire Steering Wheel Message Data Storage Area H703b11. In the present embodiment, Entire Steering Wheel Message Data Storage Area H703b11 includes Left Steering Wheel Message Data Storage Area H703b11a and Right Steering Wheel Message Data Storage Area H703b11b. Left Steering Wheel Message Data Storage Area H703b11a stores the left steering wheel message data which is the audiovisual data indicating that Carrier CR703A is currently turning to the left direction. Right Steering Wheel Message Data Storage Area H703b11b stores the right steering wheel message data which is the audiovisual data indicating that Carrier CR703A is currently turning to the right direction.

This paragraph illustrates the storage area(s) included in Entire Current Location Icon Data Storage Area H703b13. In the present embodiment, Entire Current Location Icon Data Storage Area H703b13 includes 1st Current Location Icon Data Storage Area H703b13a and 2nd Current Location Icon Data Storage Area H703b13b. 1st Current Location Icon Data Storage Area H703b13a stores the 1st current location icon data which is the image of the icon indicating the 1st current location data on the map data. 2nd Current Location Icon Data Storage Area H703b13b stores the 2nd current location icon data which is the image of the icon indicating the 2nd current location data on the map data.

This paragraph illustrates the software program(s) stored in Front Carrier Activity Notifying Software Storage Area H703c. In the present embodiment, Front Carrier Activity Notifying Software Storage Area H703c stores 2nd License Plate Number Data Producing Software H703c2, 1st License Plate Number Data Sharing Software H703c3, 2nd Driver's Name Data Producing Software H703c5, 1st Driver's Name Data Sharing Software H703c6, 2nd Current Location Data Producing Software H703c8, 1st Current Location Data Sharing Software H703c9, Current Distance Data Producing Software H703c10, 1st Current Speed Data Sharing Software H703c12, 2nd Current Speed Data Producing Software H703c13, Left Blinker Flag Data Sharing Software H703c15, and Right Blinker Flag Data Sharing Software H703c17. 2nd License Plate Number Data Producing Software H703c2 is the software program described hereinafter. 1st License Plate Number Data Sharing Software H703c3 is the software program described hereinafter. 2nd Driver's Name Data Producing Software H703c5 is the software program described hereinafter. 1st Driver's Name Data Sharing Software H703c6 is the software program described hereinafter. 2nd Current Location Data Producing Software H703c8 is the software program described hereinafter. 1st Current Location Data Sharing Software H703c9 is the software program described hereinafter. Current Distance Data Producing Software H703c10 is the software program described hereinafter. 1st Current Speed Data Sharing Software H703c12 is the software program described hereinafter. 2nd Current Speed Data Producing Software H703c13 is the software program described hereinafter. Left Blinker Flag Data Sharing Software H703c15 is the software program described hereinafter. Right Blinker Flag Data Sharing Software H703c17 is the software program described hereinafter.

This paragraph illustrates the software program(s) stored in Front Carrier Activity Notifying Software Storage Area H703c in addition to the ones described in the previous paragraph. In the present embodiment, Front Carrier Activity Notifying Software Storage Area H703c further stores Brake Flag Data Sharing Software H703c19, Accelerator Flag Data Sharing Software H703c21, Left Steering Wheel Flag Data Sharing Software H703c23, Right Steering Wheel Flag Data Sharing Software H703c25, Left Blinker Message Data Outputting Software H703c26, Right Blinker Message Data Outputting Software H703c27, Brake Message Data Outputting Software H703c28, Accelerator Message Data Outputting Software H703c29, Left Steering Wheel Message Data Outputting Software H703c30, Right Steering Wheel Message Data Outputting Software H703c31, Carrier Location Displaying Software H703c32, License Plate Number Data Displaying Software H703c33, Driver's Name Data Displaying Software H703c34, and Current Speed Data Displaying Software H703c35. Brake Flag Data Sharing Software H703c19 is the software program described hereinafter. Accelerator Flag Data Sharing Software H703c21 is the software program described hereinafter. Left Steering Wheel Flag Data Sharing Software H703c23 is the software program described hereinafter. Right Steering Wheel Flag Data Sharing Software H703c25 is the software program described hereinafter. Left Blinker Message Data Outputting Software H703c26 is the software program described hereinafter. Right Blinker Message Data Outputting Software H703c27 is the software program described hereinafter. Brake Message Data Outputting Software H703c28 is the software program described hereinafter. Accelerator Message Data Outputting Software H703c29 is the software program described hereinafter. Left Steering Wheel Message Data Outputting Software H703c30 is the software program described hereinafter. Right Steering Wheel Message Data Outputting Software H703c31 is the software program described hereinafter. Carrier Location Displaying Software H703c32 is the software program described hereinafter. License Plate Number Data Displaying Software H703c33 is the software program described hereinafter. Driver's Name Data Displaying Software H703c34 is the software program described hereinafter. Current Speed Data Displaying Software H703c35 is the software program described hereinafter.

This paragraph illustrates the storage area included in RAM 206 (FIG. 1) of Device A. In the present embodiment, RAM 206 includes Front Carrier Activity Notifying Info Storage Area 206A703a of which the data and the software program(s) stored therein are described hereinafter.

The data and/or the software program(s) necessary to implement the present function may be downloaded from Host H to Device A in the manner described hereinafter.

This paragraph illustrates the storage area(s) included in Front Carrier Activity Notifying Info Storage Area 206A703a. In the present embodiment, Front Carrier Activity Notifying Info Storage Area 206A703a includes Front Carrier Activity Notifying Data Storage Area 206A703b and Front Carrier Activity Notifying Software Storage Area 206A703c. Front Carrier Activity Notifying Data Storage Area 206A703b stores the data necessary to implement the present function on the side of Device A, such as the one(s) described hereinafter. Front Carrier Activity Notifying Software Storage Area 206A703c stores the software program(s) necessary to implement the present function on the side of Device A, such as the one(s) described hereinafter.

This paragraph illustrates the storage area(s) included in Front Carrier Activity Notifying Data Storage Area 206A703b. In the present embodiment, Front Carrier Activity Notifying Data Storage Area 206A703b includes Entire License Plate Number Data Storage Area 206A703b1, Entire Driver's Name Data Storage Area 206A703b2, Entire Current Location Data Storage Area 206A703b3, Current Distance Data Storage Area 206A703b4, Entire Current Speed Data Storage Area 206A703b5, Entire Blinker Flag Data Storage Area 206A703b6, Speed Control Flag Data Storage Area 206A703b7, Entire Steering Wheel Flag Data Storage Area 206A703b8, Entire Blinker Message Data Storage Area 206A703b9, Speed Control Message Data Storage Area 206A703b10, Entire Steering Wheel Message Data Storage Area 206A703b11, Map Data Storage Area 206A703b12, Entire Current Location Icon Data Storage Area 206A703b13, and Work Area 206A703b14. Entire License Plate Number Data Storage Area 206A703b1 stores the data described hereinafter. Entire Driver's Name Data Storage Area 206A703b2 stores the data described hereinafter. Entire Current Location Data Storage Area 206A703b3 stores the data described hereinafter. Current Distance Data Storage Area 206A703b4 stores the current distance data which indicates the current distance between Carrier CR703A and Carrier CR703B. Entire Current Speed Data Storage Area 206A703b5 stores the data described hereinafter. Entire Blinker Flag Data Storage Area 206A703b6 stores the data described hereinafter. Speed Control Flag Data Storage Area 206A703b7 stores the data described hereinafter. Entire Steering Wheel Flag Data Storage Area 206A703b8 stores the data described hereinafter. Entire Blinker Message Data Storage Area 206A703b9 stores the data described hereinafter. Speed Control Message Data Storage Area 206A703b10 stores the data described hereinafter. Entire Steering Wheel Message Data Storage Area 206A703b11 stores the data described hereinafter. Map Data Storage Area 206A703b12 stores the map data which is the image data indicating a map. Entire Current Location Icon Data Storage Area 206A703b13 stores the data described hereinafter. Work Area 206A703b14 is utilized as a work area to perform calculation and temporarily store data to implement the present function.

This paragraph illustrates the storage area(s) included in Entire License Plate Number Data Storage Area 206A703b1. In the present embodiment, Entire License Plate Number Data Storage Area 206A703b1 includes 1st License Plate Number Data Storage Area 206A703b1a and 2nd License Plate Number Data Storage Area 206A703b1b. 1st License Plate Number Data Storage Area 206A703b1a stores the 1st license plate number data which indicates the license plate number of Carrier CR703A. 2nd License Plate Number Data Storage Area 206A703b1b stores the 2nd license plate number data which indicates the license plate number of Carrier CR703B.

This paragraph illustrates the storage area(s) included in Entire Driver's Name Data Storage Area 206A703b2. In the present embodiment, Entire Driver's Name Data Storage Area 206A703b2 includes 1st Driver's Name Data Storage Area 206A703b2a and 2nd Driver's Name Data Storage Area 206A703b2b. 1st Driver's Name Data Storage Area 206A703b2a stores the 1st driver's name data which indicates the name of the driver of Carrier CR703A. 2nd Driver's Name Data Storage Area 206A703b2b stores the 2nd driver's name data which indicates the name of the driver of Carrier CR703B.

This paragraph illustrates the storage area(s) included in Entire Current Location Data Storage Area 206A703b3. In the present embodiment, Entire Current Location Data Storage Area 206A703b3 includes 1st Current Location Data Storage Area 206A703b3a and 2nd Current Location Data Storage Area 206A703b3b. 1st Current Location Data Storage Area 206A703b3a stores the 1st current location data which indicates the current geographic location of Carrier CR703A in (x,y,z) format. 2nd Current Location Data Storage Area 206A703b3b stores the 2nd current location data which indicates the current geographic location of Carrier CR703B in (x,y,z) format.

This paragraph illustrates the storage area(s) included in Entire Current Speed Data Storage Area 206A703b5. In the present embodiment, Entire Current Speed Data Storage Area 206A703b5 includes 1st Current Speed Data Storage Area 206A703b5a and 2nd Current Speed Data Storage Area 206A703b5b. 1st Current Speed Data Storage Area 206A703b5a stores the 1st current speed data which indicates the current speed of Carrier CR703A. 2nd Current Speed Data Storage Area 206A703b5b stores the 2nd current speed data which indicates the current speed of Carrier CR703B.

This paragraph illustrates the storage area(s) included in Entire Blinker Flag Data Storage Area 206A703b6. In the present embodiment, Entire Blinker Flag Data Storage Area 206A703b6 includes Left Blinker Flag Data Storage Area 206A703b6a and Right Blinker Flag Data Storage Area 206A703b6b. Left Blinker Flag Data Storage Area 206A703b6a stores the left blinker flag data which is either the left blinker positive flag data or the left blinker negative flag data. The left blinker positive flag data indicates that the left blinker (not shown) of Carrier CR703A is currently on. The right blinker negative flag data indicates that the right blinker (not shown) of Carrier CR703A is currently off. The default data stored therein is the left blinker negative flag data. Right Blinker Flag Data Storage Area 206A703b6b stores the right blinker flag data which is either the right blinker positive flag data or the right blinker negative flag data. The right blinker positive flag data indicates that the right blinker (not shown) of Carrier CR703A is currently on. The right blinker negative flag data indicates that the right blinker (not shown) of Carrier CR703A is currently off. The default data stored therein is the right blinker negative flag data.

This paragraph illustrates the storage area(s) included in Speed Control Flag Data Storage Area 206A703b7. In the present embodiment, Speed Control Flag Data Storage Area 206A703b7 includes Brake Flag Data Storage Area 206A703b7a and Accelerator Flag Data Storage Area 206A703b7b. Brake Flag Data Storage Area 206A703b7a stores the brake flag data which is either the brake positive flag data or the brake negative flag data. The brake positive flag data indicates that the speed of Carrier CR703A is currently decreasing. The brake negative flag data indicates that the speed of Carrier CR703A is not currently decreasing. The default data stored therein is the brake negative flag data. Accelerator Flag Data Storage Area 206A703b7b stores the accelerator flag data which is either the accelerator positive flag data or the accelerator negative flag data. The accelerator positive flag data indicates that the speed of Carrier CR703A is currently increasing. The accelerator negative flag data indicates that the speed of Carrier CR703A is currently not increasing. The default data stored therein is the accelerator negative flag data.

This paragraph illustrates the storage area(s) included in Entire Steering Wheel Flag Data Storage Area 206A703b8. In the present embodiment, Entire Steering Wheel Flag Data Storage Area 206A703b8 includes Left Steering Wheel Flag Data Storage Area 206A703b8a and Right Steering Wheel Flag Data Storage Area 206A703b8b. Left Steering Wheel Flag Data Storage Area 206A703b8a stores the left steering wheel flag data which is either the steering wheel left positive flag data or the steering wheel left negative flag data. The steering wheel left positive flag data indicates that Carrier CR703A is currently turning to the left direction. The steering wheel left negative flag data indicates that Carrier CR703A is currently not turning to the left direction. The default data stored therein is the steering wheel left negative flag data. Right Steering Wheel Flag Data Storage Area 206A703b8b stores the right steering wheel flag data which is either the steering wheel right positive flag data or the steering wheel right negative flag data. The steering wheel right positive flag data indicates that Carrier CR703A is currently turning to the right direction. The steering wheel right negative flag data indicates that Carrier CR703A is currently not turning to the right direction. The default data stored therein is the steering wheel right negative flag data.

This paragraph illustrates the storage area(s) included in Entire Blinker Message Data Storage Area 206A703b9. In the present embodiment, Entire Blinker Message Data Storage Area 206A703b9 includes Left Blinker Message Data Storage Area 206A703b9a and Right Blinker Message Data Storage Area 206A703b9b. Left Blinker Message Data Storage Area 206A703b9a stores the left blinker message data which is the audiovisual data indicating that the left blinker (not shown) of Carrier CR703A is currently on. Right Blinker Message Data Storage Area 206A703b9b stores the right blinker message data which is the audiovisual data indicating that the right blinker (not shown) of Carrier CR703A is currently on.

This paragraph illustrates the storage area(s) included in Speed Control Message Data Storage Area 206A703b10. In the present embodiment, Speed Control Message Data Storage Area 206A703b10 includes Brake Message Data Storage Area 206A703b10a and Accelerator Message Data Storage Area 206A703b10b. Brake Message Data Storage Area 206A703b10a stores the brake message data which is the audiovisual data indicating that the speed of Carrier CR703A is currently decreasing. Accelerator Message Data Storage Area 206A703b10b stores the accelerator message data which is the audiovisual data indicating that the speed of Carrier CR703A is currently increasing.

This paragraph illustrates the storage area(s) included in Entire Steering Wheel Message Data Storage Area 206A703b11. In the present embodiment, Entire Steering Wheel Message Data Storage Area 206A703b11 includes Left Steering Wheel Message Data Storage Area 206A703b11a and Right Steering Wheel Message Data Storage Area 206A703b11b. Left Steering Wheel Message Data Storage Area 206A703b11a stores the left steering wheel message data which is the audiovisual data indicating that Carrier CR703A is currently turning to the left direction. Right Steering Wheel Message Data Storage Area 206A703b11b stores the right steering wheel message data which is the audiovisual data indicating that Carrier CR703A is currently turning to the right direction.

This paragraph illustrates the storage area(s) included in Entire Current Location Icon Data Storage Area 206A703b13. In the present embodiment, Entire Current Location Icon Data Storage Area 206A703b13 includes 1st Current Location Icon Data Storage Area 206A703b13a and 2nd Current Location Icon Data Storage Area 206A703b13b. 1st Current Location Icon Data Storage Area 206A703b13a stores the 1st current location icon data which is the image of the icon indicating the 1st current location data on the map data. 2nd Current Location Icon Data Storage Area 206A703b13b stores the 2nd current location icon data which is the image of the icon indicating the 2nd current location data on the map data.

This paragraph illustrates the software program(s) stored in Front Carrier Activity Notifying Software Storage Area 206A703c. In the present embodiment, Front Carrier Activity Notifying Software Storage Area 206A703c stores 1st License Plate Number Data Producing Software 206A703c1, 1st License Plate Number Data Sharing Software 206A703c3, 1st Driver's Name Data Producing Software 206A703c4, 1st Driver's Name Data Sharing Software 206A703c6, 1st Current Location Data Producing Software 206A703c7, 1st Current Location Data Sharing Software 206A703c9, 1st Current Speed Data Producing Software 206A703c11, 1st Current Speed Data Sharing Software 206A703c12, Left Blinker Flag Data Identifying Software 206A703c14, Left Blinker Flag Data Sharing Software 206A703c15, Right Blinker Flag Data Identifying Software 206A703c16, Right Blinker Flag Data Sharing Software 206A703c17, and Brake Flag Data Identifying Software 206A703c18. 1st License Plate Number Data Producing Software 206A703c1 is the software program described hereinafter. 1st License Plate Number Data Sharing Software 206A703c3 is the software program described hereinafter. 1st Driver's Name Data Producing Software 206A703c4 is the software program described hereinafter. 1st Driver's Name Data Sharing Software 206A703c6 is the software program described hereinafter. 1st Current Location Data Producing Software 206A703c7 is the software program described hereinafter. 1st Current Location Data Sharing Software 206A703c9 is the software program described hereinafter. 1st Current Speed Data Producing Software 206A703c11 is the software program described hereinafter. 1st Current Speed Data Sharing Software 206A703c12 is the software program described hereinafter. Left Blinker Flag Data Identifying Software 206A703c14 is the software program described hereinafter. Left Blinker Flag Data Sharing Software 206A703c15 is the software program described hereinafter. Right Blinker Flag Data Identifying Software 206A703c16 is the software program described hereinafter. Right Blinker Flag Data Sharing Software 206A703c17 is the software program described hereinafter. Brake Flag Data Identifying Software 206A703c18 is the software program described hereinafter.

This paragraph illustrates the software program(s) stored in Front Carrier Activity Notifying Software Storage Area 206A703c in addition to the ones described in the previous paragraph. In the present embodiment, Front Carrier Activity Notifying Software Storage Area 206A703c further stores Brake Flag Data Sharing Software 206A703c19, Accelerator Flag Data Identifying Software 206A703c20, Accelerator Flag Data Sharing Software 206A703c21, Left Steering Wheel Flag Data Identifying Software 206A703c22, Left Steering Wheel Flag Data Sharing Software 206A703c23, Right Steering Wheel Flag Data Identifying Software 206A703c24, Right Steering Wheel Flag Data Sharing Software 206A703c25, Left Blinker Message Data Outputting Software 206A703c26, Right Blinker Message Data Outputting Software 206A703c27, Brake Message Data Outputting Software 206A703c28, Accelerator Message Data Outputting Software 206A703c29, Left Steering Wheel Message Data Outputting Software 206A703c30, and Right Steering Wheel Message Data Outputting Software 206A703c31. Brake Flag Data Sharing Software 206A703c19 is the software program described hereinafter. Accelerator Flag Data Identifying Software 206A703c20 is the software program described hereinafter. Accelerator Flag Data Sharing Software 206A703c21 is the software program described hereinafter. Left Steering Wheel Flag Data Identifying Software 206A703c22 is the software program described hereinafter. Left Steering Wheel Flag Data Sharing Software 206A703c23 is the software program described hereinafter. Right Steering Wheel Flag Data Identifying Software 206A703c24 is the software program described hereinafter. Right Steering Wheel Flag Data Sharing Software 206A703c25 is the software program described hereinafter. Left Blinker Message Data Outputting Software 206A703c26 is the software program described hereinafter. Right Blinker Message Data Outputting Software 206A703c27 is the software program described hereinafter. Brake Message Data Outputting Software 206A703c28 is the software program described hereinafter. Accelerator Message Data Outputting Software 206A703c29 is the software program described hereinafter. Left Steering Wheel Message Data Outputting Software 206A703c30 is the software program described hereinafter. Right Steering Wheel Message Data Outputting Software 206A703c31 is the software program described hereinafter.

This paragraph illustrates the storage area included in RAM 206 (FIG. 1) of Device B. In the present embodiment, RAM 206 includes Front Carrier Activity Notifying Info Storage Area 206B703a of which the data and the software program(s) stored therein are described hereinafter.

The data and/or the software program(s) necessary to implement the present function may be downloaded from Host H to Device B in the manner described hereinafter.

This paragraph illustrates the storage area(s) included in Front Carrier Activity Notifying Info Storage Area 206B703a. In the present embodiment, Front Carrier Activity Notifying Info Storage Area 206B703a includes Front Carrier Activity Notifying Data Storage Area 206B703b and Front Carrier Activity Notifying Software Storage Area 206B703c. Front Carrier Activity Notifying Data Storage Area 206B703b stores the data necessary to implement the present function on the side of Device B, such as the one(s) described hereinafter. Front Carrier Activity Notifying Software Storage Area 206B703c stores the software program(s) necessary to implement the present function on the side of Device B, such as the one(s) described hereinafter.

This paragraph illustrates the storage area(s) included in Front Carrier Activity Notifying Data Storage Area 206B703b. In the present embodiment, Front Carrier Activity Notifying Data Storage Area 206B703b includes Entire License Plate Number Data Storage Area 206B703b1, Entire Driver's Name Data Storage Area 206B703b2, Entire Current Location Data Storage Area 206B703b3, Current Distance Data Storage Area 206B703b4, Entire Current Speed Data Storage Area 206B703b5, Entire Blinker Flag Data Storage Area 206B703b6, Speed Control Flag Data Storage Area 206B703b7, Entire Steering Wheel Flag Data Storage Area 206B703b8, Entire Blinker Message Data Storage Area 206B703b9, Speed Control Message Data Storage Area 206B703b10, Entire Steering Wheel Message Data Storage Area 206B703b11, Map Data Storage Area 206B703b12, Entire Current Location Icon Data Storage Area 206B703b13, and Work Area 206B703b14. Entire License Plate Number Data Storage Area 206B703b1 stores the data described hereinafter. Entire Driver's Name Data Storage Area 206B703b2 stores the data described hereinafter. Entire Current Location Data Storage Area 206B703b3 stores the data described hereinafter. Current Distance Data Storage Area 206B703b4 stores the current distance data which indicates the current distance between Carrier CR703A and Carrier CR703B. Entire Current Speed Data Storage Area 206B703b5 stores the data described hereinafter. Entire Blinker Flag Data Storage Area 206B703b6 stores the data described hereinafter. Speed Control Flag Data Storage Area 206B703b7 stores the data described hereinafter. Entire Steering Wheel Flag Data Storage Area 206B703b8 stores the data described hereinafter. Entire Blinker Message Data Storage Area 206B703b9 stores the data described hereinafter. Speed Control Message Data Storage Area 206B703b10 stores the data described hereinafter. Entire Steering Wheel Message Data Storage Area 206B703b11 stores the data described hereinafter. Map Data Storage Area 206B703b12 stores the map data which is the image data indicating a map. Entire Current Location Icon Data Storage Area 206B703b13 stores the data described hereinafter. Work Area 206B703b14 is utilized as a work area to perform calculation and temporarily store data to implement the present function.

This paragraph illustrates the storage area(s) included in Entire License Plate Number Data Storage Area 206B703b1. In the present embodiment, Entire License Plate Number Data Storage Area 206B703b1 includes 1st License Plate Number Data Storage Area 206B703b1a and 2nd License Plate Number Data Storage Area 206B703b1. 1st License Plate Number Data Storage Area 206B703b1a stores the 1st license plate number data which indicates the license plate number of Carrier CR703A. 2nd License Plate Number Data Storage Area 206B703b1b stores the 2nd license plate number data which indicates the license plate number of Carrier CR703B.

This paragraph illustrates the storage area(s) included in Entire Driver's Name Data Storage Area 206B703b2. In the present embodiment, Entire Driver's Name Data Storage Area 206B703b2 includes 1st Driver's Name Data Storage Area 206B703b2a and 2nd Driver's Name Data Storage Area 206B703b2b. 1st Driver's Name Data Storage Area 206B703b2a stores the 1st driver's name data which indicates the name of the driver of Carrier CR703A. 2nd Driver's Name Data Storage Area 206B703b2b stores the 2nd driver's name data which indicates the name of the driver of Carrier CR703B.

This paragraph illustrates the storage area(s) included in Entire Current Location Data Storage Area 206B703b3. In the present embodiment, Entire Current Location Data Storage Area 206B703b3 includes 1st Current Location Data Storage Area 206B703b3a and 2nd Current Location Data Storage Area 206B703b3b. 1st Current Location Data Storage Area 206B703b3a stores the 1st current location data which indicates the current geographic location of Carrier CR703A in (x,y,z) format. 2nd Current Location Data Storage Area 206B703b3b stores the 2nd current location data which indicates the current geographic location of Carrier CR703B in (x,y,z) format.

This paragraph illustrates the storage area(s) included in Entire Current Speed Data Storage Area 206B703b5. In the present embodiment, Entire Current Speed Data Storage Area 206B703b5 includes 1st Current Speed Data Storage Area 206B703b5a and 2nd Current Speed Data Storage Area 206B703b5b. 1st Current Speed Data Storage Area 206B703b5a stores the 1st current speed data which indicates the current speed of Carrier CR703A. 2nd Current Speed Data Storage Area 206B703b5b stores the 2nd current speed data which indicates the current speed of Carrier CR703B.

This paragraph illustrates the storage area(s) included in Entire Blinker Flag Data Storage Area 206B703b6. In the present embodiment, Entire Blinker Flag Data Storage Area 206B703b6 includes Left Blinker Flag Data Storage Area 206B703b6a and Right Blinker Flag Data Storage Area 206B703b6b. Left Blinker Flag Data Storage Area 206B703b6a stores the left blinker flag data which is either the left blinker positive flag data or the left blinker negative flag data. The left blinker positive flag data indicates that the left blinker (not shown) of Carrier CR703A is currently on. The right blinker negative flag data indicates that the right blinker (not shown) of Carrier CR703A is currently off. The default data stored therein is the left blinker negative flag data. Right Blinker Flag Data Storage Area 206B703b6b stores the right blinker flag data which is either the right blinker positive flag data or the right blinker negative flag data. The right blinker positive flag data indicates that the right blinker (not shown) of Carrier CR703A is currently on. The right blinker negative flag data indicates that the right blinker (not shown) of Carrier CR703A is currently off. The default data stored therein is the right blinker negative flag data.

This paragraph illustrates the storage area(s) included in Speed Control Flag Data Storage Area 206B703b7. In the present embodiment, Speed Control Flag Data Storage Area 206B703b7 includes Brake Flag Data Storage Area 206B703b7a and Accelerator Flag Data Storage Area 206B703b7b. Brake Flag Data Storage Area 206B703b7a stores the brake flag data which is either the brake positive flag data or the brake negative flag data. The brake positive flag data indicates that the speed of Carrier CR703A is currently decreasing. The brake negative flag data indicates that the speed of Carrier CR703A is not currently decreasing. The default data stored therein is the brake negative flag data. Accelerator Flag Data Storage Area 206B703b7b stores the accelerator flag data which is either the accelerator positive flag data or the accelerator negative flag data. The accelerator positive flag data indicates that the speed of Carrier CR703A is currently increasing. The accelerator negative flag data indicates that the speed of Carrier CR703A is currently not increasing. The default data stored therein is the accelerator negative flag data.

This paragraph illustrates the storage area(s) included in Entire Steering Wheel Flag Data Storage Area 206B703b8. In the present embodiment, Entire Steering Wheel Flag Data Storage Area 206B703b8 includes Left Steering Wheel Flag Data Storage Area 206B703b8a and Right Steering Wheel Flag Data Storage Area 206B703b8b. Left Steering Wheel Flag Data Storage Area 206B703b8a stores the left steering wheel flag data which is either the steering wheel left positive flag data or the steering wheel left negative flag data. The steering wheel left positive flag data indicates that Carrier CR703A is currently turning to the left direction. The steering wheel left negative flag data indicates that Carrier CR703A is currently not turning to the left direction. The default data stored therein is the steering wheel left negative flag data. Right Steering Wheel Flag Data Storage Area 206B703b8b stores the right steering wheel flag data which is either the steering wheel right positive flag data or the steering wheel right negative flag data. The steering wheel right positive flag data indicates that Carrier CR703A is currently turning to the right direction. The steering wheel right negative flag data indicates that Carrier CR703A is currently not turning to the right direction. The default data stored therein is the steering wheel right negative flag data.

This paragraph illustrates the storage area(s) included in Entire Blinker Message Data Storage Area 206B703b9. In the present embodiment, Entire Blinker Message Data Storage Area 206B703b9 includes Left Blinker Message Data Storage Area 206B703b9a and Right Blinker Message Data Storage Area 206B703b9b. Left Blinker Message Data Storage Area 206B703b9a stores the left blinker message data which is the audiovisual data indicating that the left blinker (not shown) of Carrier CR703A is currently on. Right Blinker Message Data Storage Area 206B703b9b stores the right blinker message data which is the audiovisual data indicating that the right blinker (not shown) of Carrier CR703A is currently on.

This paragraph illustrates the storage area(s) included in Speed Control Message Data Storage Area 206B703b10. In the present embodiment, Speed Control Message Data Storage Area 206B703b10 includes Brake Message Data Storage Area 206B703b10a and Accelerator Message Data Storage Area 206B703b10b. Brake Message Data Storage Area 206B703b10a stores the brake message data which is the audiovisual data indicating that the speed of Carrier CR703A is currently decreasing. Accelerator Message Data Storage Area 206B703b10b stores the accelerator message data which is the audiovisual data indicating that the speed of Carrier CR703A is currently increasing.

This paragraph illustrates the storage area(s) included in Entire Steering Wheel Message Data Storage Area 206B703b11. In the present embodiment, Entire Steering Wheel Message Data Storage Area 206B703b11 includes Left Steering Wheel Message Data Storage Area 206B703b11a and Right Steering Wheel Message Data Storage Area 206B703b11b. Left Steering Wheel Message Data Storage Area 206B703b11a stores the left steering wheel message data which is the audiovisual data indicating that Carrier CR703A is currently turning to the left direction. Right Steering Wheel Message Data Storage Area 206B703b11b stores the right steering wheel message data which is the audiovisual data indicating that Carrier CR703A is currently turning to the right direction.

This paragraph illustrates the storage area(s) included in Entire Current Location Icon Data Storage Area 206B703b13. In the present embodiment, Entire Current Location Icon Data Storage Area 206B703b13 includes 1st Current Location Icon Data Storage Area 206B703b13a and 2nd Current Location Icon Data Storage Area 206B703b13b. 1st Current Location Icon Data Storage Area 206B703b13a stores the 1st current location icon data which is the image of the icon indicating the 1st current location data on the map data. 2nd Current Location Icon Data Storage Area 206B703b13b stores the 2nd current location icon data which is the image of the icon indicating the 2nd current location data on the map data.

This paragraph illustrates the software program(s) stored in Front Carrier Activity Notifying Software Storage Area 206B703c. In the present embodiment, Front Carrier Activity Notifying Software Storage Area 206B703c stores 2nd License Plate Number Data Producing Software 206B703c2, 1st License Plate Number Data Sharing Software 206B703c3, 2nd Driver's Name Data Producing Software 206B703c5, 1st Driver's Name Data Sharing Software 206B703c6, 2nd Current Location Data Producing Software 206B703c8, 1st Current Location Data Sharing Software 206B703c9, Current Distance Data Producing Software 206B703c10, 1st Current Speed Data Sharing Software 206B703c12, 2nd Current Speed Data Producing Software 206B703c13, Left Blinker Flag Data Sharing Software 206B703c15, and Right Blinker Flag Data Sharing Software 206B703c17. 2nd License Plate Number Data Producing Software 206B703c2 is the software program described hereinafter. 1st License Plate Number Data Sharing Software 206B703c3 is the software program described hereinafter. 2nd Driver's Name Data Producing Software 206B703c5 is the software program described hereinafter. 1st Driver's Name Data Sharing Software 206B703c6 is the software program described hereinafter. 2nd Current Location Data Producing Software 206B703c8 is the software program described hereinafter. 1st Current Location Data Sharing Software 206B703c9 is the software program described hereinafter. Current Distance Data Producing Software 206B703c10 is the software program described hereinafter. 1st Current Speed Data Sharing Software 206B703c12 is the software program described hereinafter. 2nd Current Speed Data Producing Software 206B703c13 is the software program described hereinafter. Left Blinker Flag Data Sharing Software 206B703c15 is the software program described hereinafter. Right Blinker Flag Data Sharing Software 206B703c17 is the software program described hereinafter.

This paragraph illustrates the software program(s) stored in Front Carrier Activity Notifying Software Storage Area 206B703c in addition to the ones described in the previous paragraph. In the present embodiment, Front Carrier Activity Notifying Software Storage Area 206B703c further stores Brake Flag Data Sharing Software 206B703c19, Accelerator Flag Data Sharing Software 206B703c21, Left Steering Wheel Flag Data Sharing Software 206B703c23, Right Steering Wheel Flag Data Sharing Software 206B703c25, Left Blinker Message Data Outputting Software 206B703c26, Right Blinker Message Data Outputting Software 206B703c27, Brake Message Data Outputting Software 206B703c28, Accelerator Message Data Outputting Software 206B703c29, Left Steering Wheel Message Data Outputting Software 206B703c30, Right Steering Wheel Message Data Outputting Software 206B703c31, Carrier Location Displaying Software 206B703c32, License Plate Number Data Displaying Software 206B703c33, Driver's Name Data Displaying Software 206B703c34, and Current Speed Data Displaying Software 206B703c35. Brake Flag Data Sharing Software 206B703c19 is the software program described hereinafter. Accelerator Flag Data Sharing Software 206B703c21 is the software program described hereinafter. Left Steering Wheel Flag Data Sharing Software 206B703c23 is the software program described hereinafter. Right Steering Wheel Flag Data Sharing Software 206B703c25 is the software program described hereinafter. Left Blinker Message Data Outputting Software 206B703c26 is the software program described hereinafter. Right Blinker Message Data Outputting Software 206B703c27 is the software program described hereinafter. Brake Message Data Outputting Software 206B703c28 is the software program described hereinafter. Accelerator Message Data Outputting Software 206B703c29 is the software program described hereinafter. Left Steering Wheel Message Data Outputting Software 206B703c30 is the software program described hereinafter. Right Steering Wheel Message Data Outputting Software 206B703c31 is the software program described hereinafter. Carrier Location Displaying Software 206B703c32 is the software program described hereinafter. License Plate Number Data Displaying Software 206B703c33 is the software program described hereinafter. Driver's Name Data Displaying Software 206B703c34 is the software program described hereinafter. Current Speed Data Displaying Software 206B703c35 is the software program described hereinafter.

This paragraph illustrate(s) 1st License Plate Number Data Producing Software 206A703c1 of Device A, which produce(s) the 1st license plate number data. In the present embodiment, the user of Device A inputs, by utilizing Input Device 210 (FIG. 1) or via voice recognition system, alphanumeric data (S1). CPU 211 (FIG. 1) of Device A produces the 1st license plate number data by referring to the alphanumeric data input in the previous step (S2). CPU 211 (FIG. 1) of Device A stores the 1st license plate number data produced in the previous step in 1st License Plate Number Data Storage Area 206A703b1a (S3).

This paragraph illustrate(s) 2nd License Plate Number Data Producing Software H703c2 of Host H and 2nd License Plate Number Data Producing Software 206B703c2 of Device B, which produce(s) the 2nd license plate number data. In the present embodiment, the user of Device B inputs, by utilizing Input Device 210 (FIG. 1) or via voice recognition system, alphanumeric data (S1). CPU 211 (FIG. 1) of Device B produces the 2nd license plate number data by referring to the alphanumeric data input in the previous step and sends the data to Host H in a wireless fashion (S2). Host H receives the 2nd license plate number data from Device B and stores the data in 2nd License Plate Number Data Storage Area H703b1b (S3).

This paragraph illustrate(s) 1st License Plate Number Data Sharing Software H703c3 of Host H and 1st License Plate Number Data Sharing Software 206A703c3 of Device A, which share(s) the 1st license plate number data. In the present embodiment, CPU 211 (FIG. 1) of Device A retrieves the 1st license plate number data from 1st License Plate Number Data Storage Area 206A703b1a and sends the data to Host H in a wireless fashion (S1). Host H receives the 1st license plate number data from Device A and stores the data in 1st License Plate Number Data Storage Area H703b1a (S2). The foregoing sequence is repeated periodically.

This paragraph illustrate(s) 1st Driver's Name Data Producing Software 206A703c4 of Device A, which produce(s) the 1st driver's name data. In the present embodiment, the user of Device A inputs, by utilizing Input Device 210 (FIG. 1) or via voice recognition system, alphanumeric data (S1). CPU 211 (FIG. 1) of Device A produces the 1st driver's name data by referring to the alphanumeric data input in the previous step (S2). CPU 211 (FIG. 1) of Device A stores the 1st driver's name data produced in the previous step in 1st Driver's Name Data Storage Area 206A703b2a (S3).

This paragraph illustrate(s) 2nd Driver's Name Data Producing Software H703c5 of Host H and 2nd Driver's Name Data Producing Software 206B703c5 of Device B, which produce(s) the 2nd driver's name data. In the present embodiment, the user of Device B inputs, by utilizing Input Device 210 (FIG. 1) or via voice recognition system, alphanumeric data (S1). CPU 211 (FIG. 1) of Device B produces the 2nd driver's name data by referring to the alphanumeric data input in the previous step and sends the data to Host H in a wireless fashion (S2). Host H receives the 2nd driver's name data from Device B and stores the data in 2nd Driver's Name Data Storage Area H703b2b (S3).

This paragraph illustrate(s) 1st Driver's Name Data Sharing Software H703c6 of Host H and 1st Driver's Name Data Sharing Software 206A703c6 of Device A, which share(s) the 1st driver's name data. In the present embodiment, CPU 211 (FIG. 1) of Device A retrieves the 1st driver's name data from 1st Driver's Name Data Storage Area 206A703b2a and sends the data to Host H in a wireless fashion (S1). Host H receives the 1st driver's name data from Device A and stores the data in 1st Driver's Name Data Storage Area H703b2a (S2). The foregoing sequence is repeated periodically.

This paragraph illustrate(s) 1st Current Location Data Producing Software 206A703c7 of Device A, which produce(s) the 1st current location data. In the present embodiment, CPU 211 (FIG. 1) of Device A identifies the current location of Carrier CR703A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A703b3a (S3). The foregoing sequence is repeated periodically.

This paragraph illustrate(s) 2nd Current Location Data Producing Software H703c8 of Host H and 2nd Current Location Data Producing Software 206B703c8 of Device B, which produce(s) the 2nd current location data. In the present embodiment, CPU 211 (FIG. 1) of Device B identifies the current location of Carrier CR703B (S1). CPU 211 (FIG. 1) of Device B produces the 2nd current location data by referring to the current location identified in the previous step and sends the data to Host H in a wireless fashion (S2). Host H receives the 2nd current location data from Device B and stores the data in 2nd Current Location Data Storage Area H703b3b (S3). The foregoing sequence is repeated periodically.

This paragraph illustrate(s) 1st Current Location Data Sharing Software H703c9 of Host H and 1st Current Location Data Sharing Software 206A703c9 of Device A, which share(s) the 1st current location data. In the present embodiment, CPU 211 (FIG. 1) of Device A retrieves the 1st current location data from 1st Current Location Data Storage Area 206A703b3a and sends the data to Host H in a wireless fashion (S1). Host H receives the 1st current location data from Device A and stores the data in 1st Current Location Data Storage Area H703b3a (S2). The foregoing sequence is repeated periodically.

This paragraph illustrate(s) Current Distance Data Producing Software H703c10 of Host H, which produce(s) the current distance data. In the present embodiment, Host H retrieves the 1st current location data from 1st Current Location Data Storage Area H703b3a (S1). Host H retrieves the 2nd current location data from 2nd Current Location Data Storage Area H703b3b (S2). Host H produces the current distance data by referring to the 1st current location data retrieved in S1 and the 2nd current location data retrieved in the previous step (S3). Host H stores the current distance data produced in the previous step in Current Distance Data Storage Area H703b4 (S4). The foregoing sequence is repeated periodically.

This paragraph illustrate(s) 1st Current Speed Data Producing Software 206A703c11 of Device A, which produce(s) the 1st current speed data. In the present embodiment, CPU 211 (FIG. 1) of Device A identifies the current speed of Carrier CR703A (S1). CPU 211 (FIG. 1) of Device A produces the 1st current speed data by referring to the current speed identified in the previous step (S2). CPU 211 (FIG. 1) of Device A stores the 1st current speed data produced in the previous step in 1st Current Speed Data Storage Area 206A703b5a (S3). The foregoing sequence is repeated periodically.

This paragraph illustrate(s) 1st Current Speed Data Sharing Software H703c12 of Host H and 1st Current Speed Data Sharing Software 206A703c12 of Device A, which share(s) the 1st current speed data. In the present embodiment, CPU 211 (FIG. 1) of Device A retrieves the 1st current speed data from 1st Current Speed Data Storage Area 206A703b5a and sends the data to Host H in a wireless fashion (S1). Host H receives the 1st current speed data from Device A and stores the data in 1st Current Speed Data Storage Area H703b5a (S2). The foregoing sequence is repeated periodically.

This paragraph illustrate(s) 2nd Current Speed Data Producing Software H703c13 of Host H and 2nd Current Speed Data Producing Software 206B703c13 of Device B, which produce(s) the 2nd current speed data. In the present embodiment, CPU 211 (FIG. 1) of Device B identifies the current speed of Carrier CR703B (S1). CPU 211 (FIG. 1) of Device B produces the 2nd current speed data by referring to the current speed identified in the previous step and sends the data to Host H in a wireless fashion (S2). Host H stores the 2nd current speed data produced in the previous step in 2nd Current Speed Data Storage Area H703b5b (S3). The foregoing sequence is repeated periodically.

This paragraph illustrate(s) Left Blinker Flag Data Identifying Software 206A703c14 of Device A, which identify(ies) the left blinker flag data. In the present embodiment, CPU 211 (FIG. 1) of Device A identifies the current status of the left blinker of Carrier CR703A (S1). If the left blinker of Carrier CR703A is currently on, CPU 211 (FIG. 1) of Device A proceeds to the next step; if not, CPU 211 (FIG. 1) of Device A proceeds to S4 (S2). CPU 211 (FIG. 1) of Device A stores the left blinker positive flag data in Left Blinker Flag Data Storage Area 206A703b6a (S3). CPU 211 (FIG. 1) of Device A stores the left blinker negative flag data in Left Blinker Flag Data Storage Area 206A703b6a (S4). The foregoing sequence is repeated periodically.

This paragraph illustrate(s) Left Blinker Flag Data Sharing Software H703c15 of Host H and Left Blinker Flag Data Sharing Software 206A703c15 of Device A, which share(s) the left blinker flag data. In the present embodiment, CPU 211 (FIG. 1) of Device A retrieves the left blinker flag data from Left Blinker Flag Data Storage Area 206A703b6a and sends the data to Host H in a wireless fashion (S1). Host H receives the left blinker flag data from Device A and stores the data in Left Blinker Flag Data Storage Area H703b6a (S2). The foregoing sequence is repeated periodically.

This paragraph illustrate(s) Right Blinker Flag Data Identifying Software 206A703c16 of Device A, which identify(ies) the right blinker flag data. In the present embodiment, CPU 211 (FIG. 1) of Device A identifies the current status of the right blinker of Carrier CR703A (S1). If the right blinker of Carrier CR703A is currently on, CPU 211 (FIG. 1) of Device A proceeds to the next step; if not, CPU 211 (FIG. 1) of Device A proceeds to S4 (S2). CPU 211 (FIG. 1) of Device A stores the right blinker positive flag data in Right Blinker Flag Data Storage Area 206A703b6b (S3). CPU 211 (FIG. 1) of Device A stores the right blinker negative flag data in Right Blinker Flag Data Storage Area 206A703b6b (S4). The foregoing sequence is repeated periodically.

This paragraph illustrate(s) Right Blinker Flag Data Sharing Software H703c17 of Host H and Right Blinker Flag Data Sharing Software 206A703c17 of Device A, which share(s) the right blinker flag data. In the present embodiment, CPU 211 (FIG. 1) of Device A retrieves the right blinker flag data from Right Blinker Flag Data Storage Area 206A703b6b and sends the data to Host H in a wireless fashion (S1). Host H receives the right blinker flag data from Device A and stores the data in Right Blinker Flag Data Storage Area H703b6b (S2). The foregoing sequence is repeated periodically.

This paragraph illustrate(s) Brake Flag Data Identifying Software 206A703c18 of Device A, which identify(ies) the brake flag data. In the present embodiment, CPU 211 (FIG. 1) of Device A identifies the current status of the brake pedal of Carrier CR703A (S1). If the brake pedal of Carrier CR703A is currently stepped on, CPU 211 (FIG. 1) of Device A proceeds to the next step; if not, CPU 211 (FIG. 1) of Device A proceeds to S4 (S2). CPU 211 (FIG. 1) of Device A stores the brake positive flag data in Brake Flag Data Storage Area 206A703b7a (S3). CPU 211 (FIG. 1) of Device A stores the brake negative flag data in Brake Flag Data Storage Area 206A703b7a (S4). The foregoing sequence is repeated periodically.

This paragraph illustrate(s) Brake Flag Data Sharing Software H703c19 of Host H and Brake Flag Data Sharing Software 206A703c19 of Device A, which share(s) the brake flag data. In the present embodiment, CPU 211 (FIG. 1) of Device A retrieves the brake flag data from Brake Flag Data Storage Area 206A703b7a and sends the data to Host H in a wireless fashion (S1). Host H receives the brake flag data from Device A and stores the data in Brake Flag Data Storage Area H703b7a (S2). The foregoing sequence is repeated periodically.

This paragraph illustrate(s) Accelerator Flag Data Identifying Software 206A703c20 of Device A, which identify(ies) the accelerator flag data. In the present embodiment, CPU 211 (FIG. 1) of Device A identifies the current status of the accelerator pedal of Carrier CR703A (S1). If the accelerator pedal of Carrier CR703A is currently stepped on, CPU 211 (FIG. 1) of Device A proceeds to the next step; if not, CPU 211 (FIG. 1) of Device A proceeds to S4 (S2). CPU 211 (FIG. 1) of Device A stores the accelerator positive flag data in Accelerator Flag Data Storage Area 206A703b7b (S3). CPU 211 (FIG. 1) of Device A stores the accelerator negative flag data in Accelerator Flag Data Storage Area 206A703b7b (S4). The foregoing sequence is repeated periodically.

This paragraph illustrate(s) Accelerator Flag Data Sharing Software H703c21 of Host H and Accelerator Flag Data Sharing Software 206A703c21 of Device A, which share(s) the accelerator flag data. In the present embodiment, CPU 211 (FIG. 1) of Device A retrieves the accelerator flag data from Accelerator Flag Data Storage Area 206A703b7b and sends the data to Host H in a wireless fashion (S1). Host H receives the accelerator flag data from Device A and stores the data in Accelerator Flag Data Storage Area H703b7b (S2). The foregoing sequence is repeated periodically.

This paragraph illustrate(s) Left Steering Wheel Flag Data Identifying Software 206A703c22 of Device A, which identify(ies) the left steering wheel flag data. In the present embodiment, CPU 211 (FIG. 1) of Device A identifies the current status of the steering wheel of Carrier CR703A (S1). If the steering wheel of Carrier CR703A is currently turned to the left, CPU 211 (FIG. 1) of Device A proceeds to the next step; if not, CPU 211 (FIG. 1) of Device A proceeds to S4 (S2). CPU 211 (FIG. 1) of Device A stores the left steering wheel positive flag data in Left Steering Wheel Flag Data Storage Area 206A703b8a (S3). CPU 211 (FIG. 1) of Device A stores the left steering wheel negative flag data in Left Steering Wheel Flag Data Storage Area 206A703b8a (S4). The foregoing sequence is repeated periodically.

This paragraph illustrate(s) Left Steering Wheel Flag Data Sharing Software H703c23 of Host H and Left Steering Wheel Flag Data Sharing Software 206A703c23 of Device A, which share(s) the left steering wheel flag data. In the present embodiment, CPU 211 (FIG. 1) of Device A retrieves the left steering wheel flag data from Left Steering Wheel Flag Data Storage Area 206A703b8a and sends the data to Host H in a wireless fashion (S1). Host H receives the left steering wheel flag data from Device A and stores the data in Left Steering Wheel Flag Data Storage Area H703b8a (S2). The foregoing sequence is repeated periodically.

This paragraph illustrate(s) Right Steering Wheel Flag Data Identifying Software 206A703c24 of Device A, which identify(ies) the right steering wheel flag data. In the present embodiment, CPU 211 (FIG. 1) of Device A identifies the current status of the steering wheel of Carrier CR703A (S1). If the steering wheel of Carrier CR703A is currently turned to the right, CPU 211 (FIG. 1) of Device A proceeds to the next step; if not, CPU 211 (FIG. 1) of Device A proceeds to S4 (S2). CPU 211 (FIG. 1) of Device A stores the right steering wheel positive flag data in Right Steering Wheel Flag Data Storage Area 206A703b8b (S3). CPU 211 (FIG. 1) of Device A stores the right steering wheel negative flag data in Right Steering Wheel Flag Data Storage Area 206A703b8b (S4). The foregoing sequence is repeated periodically.

This paragraph illustrate(s) Right Steering Wheel Flag Data Sharing Software H703c25 of Host H and Right Steering Wheel Flag Data Sharing Software 206A703c25 of Device A, which share(s) the right steering wheel flag data. In the present embodiment, CPU 211 (FIG. 1) of Device A retrieves the right steering wheel flag data from Right Steering Wheel Flag Data Storage Area 206A703b8b and sends the data to Host H in a wireless fashion (S1). Host H receives the right steering wheel flag data from Device A and stores the data in Right Steering Wheel Flag Data Storage Area H703b8b (S2). The foregoing sequence is repeated periodically.

This paragraph illustrate(s) Left Blinker Message Data Outputting Software 206A703c26 of Device A, which output(s) the left blinker message data. In the present embodiment, CPU 211 (FIG. 1) of Device A retrieves the left blinker flag data from Left Blinker Flag Data Storage Area 206A703b6a (S1). If the left blinker flag data retrieved in the previous step is the left blinker positive flag data, CPU 211 (FIG. 1) of Device A proceeds to the next step (S2). CPU 211 (FIG. 1) of Device A retrieves the left blinker message data from Left Blinker Message Data Storage Area 206A703b9a (S3). CPU 211 (FIG. 1) of Device A outputs the left blinker message data retrieved in the previous step from Speaker 216 (FIG. 1) and LCD 201 (FIG. 1) of Device A (S4). The foregoing sequence is repeated periodically.

This paragraph illustrate(s) Left Blinker Message Data Outputting Software H703c26 of Host H and Left Blinker Message Data Outputting Software 206B703c26 of Device B, which output(s) the left blinker message data. In the present embodiment, Host H retrieves the left blinker flag data from Left Blinker Flag Data Storage Area H703b6a (S1). If the left blinker flag data retrieved in the previous step is the left blinker positive flag data, Host H proceeds to the next step (S2). Host H retrieves the left blinker message data from Left Blinker Message Data Storage Area H703b9a and sends the data to Device B (S3). CPU 211 (FIG. 1) of Device B receives the left blinker message data from Host H in a wireless fashion and outputs the data from Speaker 216 (FIG. 1) and LCD 201 (FIG. 1) of Device B (S4). The foregoing sequence is repeated periodically.

This paragraph illustrate(s) Right Blinker Message Data Outputting Software 206A703c27 of Device A, which output(s) the right blinker message data. In the present embodiment, CPU 211 (FIG. 1) of Device A retrieves the right blinker flag data from Right Blinker Flag Data Storage Area 206A703b6b (S1). If the right blinker flag data retrieved in the previous step is the right blinker positive flag data, CPU 211 (FIG. 1) of Device A proceeds to the next step (S2). CPU 211 (FIG. 1) of Device A retrieves the right blinker message data from Right Blinker Message Data Storage Area 206A703b9b (S3). CPU 211 (FIG. 1) of Device A outputs the right blinker message data retrieved in the previous step from Speaker 216 (FIG. 1) and LCD 201 (FIG. 1) of Device A (S4). The foregoing sequence is repeated periodically.

This paragraph illustrate(s) Right Blinker Message Data Outputting Software H703c27 of Host H and Right Blinker Message Data Outputting Software 206B703c27 of Device B, which output(s) the right blinker message data. In the present embodiment, Host H retrieves the right blinker flag data from Right Blinker Flag Data Storage Area H703b6b (S1). If the right blinker flag data retrieved in the previous step is the right blinker positive flag data, Host H proceeds to the next step (S2). Host H retrieves the right blinker message data from Right Blinker Message Data Storage Area H703b9b and sends the data to Device B (S3). CPU 211 (FIG. 1) of Device B receives the right blinker message data from Host H in a wireless fashion and outputs the data from Speaker 216 (FIG. 1) and LCD 201 (FIG. 1) of Device B (S4). The foregoing sequence is repeated periodically.

This paragraph illustrate(s) Brake Message Data Outputting Software 206A703c28 of Device A, which output(s) the brake message data. In the present embodiment, CPU 211 (FIG. 1) of Device A retrieves the brake flag data from Brake Flag Data Storage Area 206A703b7a (S1). If the brake flag data retrieved in the previous step is the brake positive flag data, CPU 211 (FIG. 1) of Device A proceeds to the next step (S2). CPU 211 (FIG. 1) of Device A retrieves the brake message data from Brake Message Data Storage Area 206A703b10a (S3). CPU 211 (FIG. 1) of Device A outputs the brake message data retrieved in the previous step from Speaker 216 (FIG. 1) and LCD 201 (FIG. 1) of Device A (S4). The foregoing sequence is repeated periodically.

This paragraph illustrate(s) Brake Message Data Outputting Software H703c28 of Host H and Brake Message Data Outputting Software 206B703c28 of Device B, which output(s) the brake message data. In the present embodiment, Host H retrieves the brake flag data from Brake Flag Data Storage Area H703b7a (S1). If the brake flag data retrieved in the previous step is the brake positive flag data, Host H proceeds to the next step (S2). Host H retrieves the brake message data from Brake Message Data Storage Area H703b10a and sends the data to Device B (S3). CPU 211 (FIG. 1) of Device B receives the brake message data from Host H in a wireless fashion and outputs the data from Speaker 216 (FIG. 1) and LCD 201 (FIG. 1) of Device B (S4). The foregoing sequence is repeated periodically.

This paragraph illustrate(s) Accelerator Message Data Outputting Software 206A703c29 of Device A, which output(s) the accelerator message data. In the present embodiment, CPU 211 (FIG. 1) of Device A retrieves the accelerator flag data from Accelerator Flag Data Storage Area 206A703b7b (S1). If the accelerator flag data retrieved in the previous step is the accelerator positive flag data, CPU 211 (FIG. 1) of Device A proceeds to the next step (S2). CPU 211 (FIG. 1) of Device A retrieves the accelerator message data from Accelerator Message Data Storage Area 206A703b10b (S3). CPU 211 (FIG. 1) of Device A outputs the accelerator message data retrieved in the previous step from Speaker 216 (FIG. 1) and LCD 201 (FIG. 1) of Device A (S4). The foregoing sequence is repeated periodically.

This paragraph illustrate(s) Accelerator Message Data Outputting Software H703c29 of Host H and Accelerator Message Data Outputting Software 206B703c29 of Device B, which output(s) the accelerator message data. In the present embodiment, Host H retrieves the accelerator flag data from Accelerator Flag Data Storage Area H703b7b (S1). If the accelerator flag data retrieved in the previous step is the accelerator positive flag data, Host H proceeds to the next step (S2). Host H retrieves the accelerator message data from Accelerator Message Data Storage Area H703b10b and sends the data to Device B (S3). CPU 211 (FIG. 1) of Device B receives the accelerator message data from Host H in a wireless fashion and outputs the data from Speaker 216 (FIG. 1) and LCD 201 (FIG. 1) of Device B (S4). The foregoing sequence is repeated periodically.

This paragraph illustrate(s) Left Steering Wheel Message Data Outputting Software 206A703c30 of Device A, which output(s) the left steering wheel message data. In the present embodiment, CPU 211 (FIG. 1) of Device A retrieves the left steering wheel flag data from Left Steering Wheel Flag Data Storage Area 206A703b8a (S1). If the left steering wheel flag data retrieved in the previous step is the left steering wheel positive flag data, CPU 211 (FIG. 1) of Device A proceeds to the next step (S2). CPU 211 (FIG. 1) of Device A retrieves the left steering wheel message data from Left Steering Wheel Message Data Storage Area 206A703b11 a (S3). CPU 211 (FIG. 1) of Device A outputs the left steering wheel message data retrieved in the previous step from Speaker 216 (FIG. 1) and LCD 201 (FIG. 1) of Device A (S4). The foregoing sequence is repeated periodically.

This paragraph illustrate(s) Left Steering Wheel Message Data Outputting Software H703c30 of Host H and Left Steering Wheel Message Data Outputting Software 206B703c30 of Device B, which output(s) the left steering wheel message data. In the present embodiment, Host H retrieves the left steering wheel flag data from Left Steering Wheel Flag Data Storage Area H703b8a (S1). If the left steering wheel flag data retrieved in the previous step is the left steering wheel positive flag data, Host H proceeds to the next step (S2). Host H retrieves the left steering wheel message data from Left Steering Wheel Message Data Storage Area H703b11a and sends the data to Device B (S3). CPU 211 (FIG. 1) of Device B receives the left steering wheel message data from Host H in a wireless fashion and outputs the data from Speaker 216 (FIG. 1) and LCD 201 (FIG. 1) of Device B (S4). The foregoing sequence is repeated periodically.

This paragraph illustrate(s) Right Steering Wheel Message Data Outputting Software 206A703c31 of Device A, which output(s) the right steering wheel message data. In the present embodiment, CPU 211 (FIG. 1) of Device A retrieves the right steering wheel flag data from Right Steering Wheel Flag Data Storage Area 206A703b8b (S1). If the right steering wheel flag data retrieved in the previous step is the right steering wheel positive flag data, CPU 211 (FIG. 1) of Device A proceeds to the next step (S2). CPU 211 (FIG. 1) of Device A retrieves the right steering wheel message data from Right Steering Wheel Message Data Storage Area 206A703b11b (S3). CPU 211 (FIG. 1) of Device A outputs the right steering wheel message data retrieved in the previous step from Speaker 216 (FIG. 1) and LCD 201 (FIG. 1) of Device A (S4). The foregoing sequence is repeated periodically.

This paragraph illustrate(s) Right Steering Wheel Message Data Outputting Software H703c31 of Host H and Right Steering Wheel Message Data Outputting Software 206B703c31 of Device B, which output(s) the right steering wheel message data. In the present embodiment, Host H retrieves the right steering wheel flag data from Right Steering Wheel Flag Data Storage Area H703b8b (S1). If the right steering wheel flag data retrieved in the previous step is the right steering wheel positive flag data, Host H proceeds to the next step (S2). Host H retrieves the right steering wheel message data from Right Steering Wheel Message Data Storage Area H703b11b and sends the data to Device B (S3). CPU 211 (FIG. 1) of Device B receives the right steering wheel message data from Host H in a wireless fashion and outputs the data from Speaker 216 (FIG. 1) and LCD 201 (FIG. 1) of Device B (S4). The foregoing sequence is repeated periodically.

This paragraph illustrate(s) Carrier Location Displaying Software H703c32 of Host H and Carrier Location Displaying Software 206B703c32 of Device B, which display(s) the current locations of Carrier CR703A and Carrier CR703B. In the present embodiment, Host H retrieves the map data from Map Data Storage Area H703b12 and sends the data to Device B (S1). CPU 211 (FIG. 1) of Device B receives the map data from Host H in a wireless fashion and displays the data on LCD 201 (FIG. 1) of Device B (S2). Host H retrieves the 1st current location data from 1st Current Location Data Storage Area H703b3a and sends the data to Device B (S3). CPU 211 (FIG. 1) of Device B receives the 1st current location data from Host H in a wireless fashion (S4). Host H retrieves the 1st current location icon data from 1st Current Location Icon Data Storage Area H703b13a and sends the data to Device B (S5). CPU 211 (FIG. 1) of Device B receives the 1st current location icon data from Host H in a wireless fashion (S6). CPU 211 (FIG. 1) of Device B displays the 1st current location icon data received in the previous step at the location corresponding to the 1st current location data received in S4 on the map data displayed in S2 (S7). Host H retrieves the 2nd current location data from 2nd Current Location Data Storage Area H703b3b and sends the data to Device B (S8). CPU 211 (FIG. 1) of Device B receives the 2nd current location data from Host H in a wireless fashion (S9). Host H retrieves the 2nd current location icon data from 2nd Current Location Icon Data Storage Area H703b13b and sends the data to Device B (S10). CPU 211 (FIG. 1) of Device B receives the 2nd current location icon data from Host H in a wireless fashion (S11). CPU 211 (FIG. 1) of Device B displays the 2nd current location icon data received in the previous step at the location corresponding to the 2nd current location data received in S9 on the map data displayed in S2 (S12). The foregoing sequence is repeated periodically.

This paragraph illustrate(s) License Plate Number Data Displaying Software H703c33 of Host H and License Plate Number Data Displaying Software 206B703c33 of Device B, which display(s) the license plate numbers of Carrier CR703A and Carrier CR703B. In the present embodiment, Host H retrieves the 1st license plate number data from 1st License Plate Number Data Storage Area H703b1a and sends the data to Device B (S1). CPU 211 (FIG. 1) of Device B receives the 1st license plate number data from Host H in a wireless fashion and displays the data on LCD 201 (FIG. 1) of Device B (S2). Host H retrieves the 2nd license plate number data from 2nd License Plate Number Data Storage Area H703b1b and sends the data to Device B (S3). CPU 211 (FIG. 1) of Device B receives the 2nd license plate number data from Host H in a wireless fashion and displays the data on LCD 201 (FIG. 1) of Device B (S4). The foregoing sequence is repeated periodically.

This paragraph illustrate(s) Driver's Name Data Displaying Software H703c34 of Host H and Driver's Name Data Displaying Software 206B703c34 of Device B, which display(s) the names of the drivers of Carrier CR703A and Carrier CR703B. In the present embodiment, Host H retrieves the 1st driver's name data from 1st Driver's Name Data Storage Area H703b2a and sends the data to Device B (S1). CPU 211 (FIG. 1) of Device B receives the 1st driver's name data from Host H in a wireless fashion and displays the data on LCD 201 (FIG. 1) of Device B (S2). Host H retrieves the 2nd driver's name data from 2nd Driver's Name Data Storage Area H703b2b and sends the data to Device B (S3). CPU 211 (FIG. 1) of Device B receives the 2nd driver's name data from Host H in a wireless fashion and displays the data on LCD 201 (FIG. 1) of Device B (S4). The foregoing sequence is repeated periodically.

This paragraph illustrate(s) Current Speed Data Displaying Software H703c35 of Host H and Current Speed Data Displaying Software 206B703c35 of Device B, which display(s) the current speeds of Carrier CR703A and Carrier CR703B. In the present embodiment, Host H retrieves the 1st current speed data from 1st Current Speed Data Storage Area H703b5a and sends the data to Device B (S1). CPU 211 (FIG. 1) of Device B receives the 1st current speed data from Host H in a wireless fashion and displays the data on LCD 201 (FIG. 1) of Device B (S2). Host H retrieves the 2nd current speed data from 2nd Current Speed Data Storage Area H703b5b and sends the data to Device B (S3). CPU 211 (FIG. 1) of Device B receives the 2nd current speed data from Host H in a wireless fashion and displays the data on LCD 201 (FIG. 1) of Device B (S4). The foregoing sequence is repeated periodically.

The following paragraphs illustrate another embodiment wherein Device B plays the major role in implementing the present function.

This paragraph illustrate(s) 1st License Plate Number Data Producing Software 206A703c1 of Device A, which produce(s) the 1st license plate number data. In the present embodiment, the user of Device A inputs, by utilizing Input Device 210 (FIG. 1) or via voice recognition system, alphanumeric data (S1). CPU 211 (FIG. 1) of Device A produces the 1st license plate number data by referring to the alphanumeric data input in the previous step (S2). CPU 211 (FIG. 1) of Device A stores the 1st license plate number data produced in the previous step in 1st License Plate Number Data Storage Area 206A703b1a (S3).

This paragraph illustrate(s) 2nd License Plate Number Data Producing Software 206B703c2 of Device B, which produce(s) the 2nd license plate number data. In the present embodiment, the user of Device B inputs, by utilizing Input Device 210 (FIG. 1) or via voice recognition system, alphanumeric data (S1). CPU 211 (FIG. 1) of Device B produces the 2nd license plate number data by referring to the alphanumeric data input in the previous step (S2). CPU 211 (FIG. 1) of Device B stores the 2nd license plate number data produced in the previous step in 2nd License Plate Number Data Storage Area 206B703b1b (S3).

This paragraph illustrate(s) 1st License Plate Number Data Sharing Software 206A703c3 of Device A and 1st License Plate Number Data Sharing Software 206B703c3 of Device B, which share(s) the 1st license plate number data. In the present embodiment, CPU 211 (FIG. 1) of Device A retrieves the 1st license plate number data from 1st License Plate Number Data Storage Area 206A703b1a and sends the data to Device B in a wireless fashion (S1). CPU 211 (FIG. 1) of Device B receives the 1st license plate number data from Device A in a wireless fashion and stores the data in 1st License Plate Number Data Storage Area 206B703b1a (S2). The foregoing sequence is repeated periodically.

This paragraph illustrate(s) 1st Driver's Name Data Producing Software 206A703c4 of Device A, which produce(s) the 1st driver's name data. In the present embodiment, the user of Device A inputs, by utilizing Input Device 210 (FIG. 1) or via voice recognition system, alphanumeric data (S1). CPU 211 (FIG. 1) of Device A produces the 1st driver's name data by referring to the alphanumeric data input in the previous step (S2). CPU 211 (FIG. 1) of Device A stores the 1st driver's name data produced in the previous step in 1st Driver's Name Data Storage Area 206A703b2a (S3).

This paragraph illustrate(s) 2nd Driver's Name Data Producing Software 206B703c5 of Device B, which produce(s) the 2nd driver's name data. In the present embodiment, the user of Device B inputs, by utilizing Input Device 210 (FIG. 1) or via voice recognition system, alphanumeric data (S1). CPU 211 (FIG. 1) of Device B produces the 2nd driver's name data by referring to the alphanumeric data input in the previous step (S2). CPU 211 (FIG. 1) of Device B stores the 2nd driver's name data produced in the previous step in 2nd Driver's Name Data Storage Area 206B703b2b (S3).

This paragraph illustrate(s) 1st Driver's Name Data Sharing Software 206A703c6 of Device A and 1st Driver's Name Data Sharing Software 206B703c6 of Device B, which share(s) the 1st driver's name data. In the present embodiment, CPU 211 (FIG. 1) of Device A retrieves the 1st driver's name data from 1st Driver's Name Data Storage Area 206A703b2a and sends the data to Device B in a wireless fashion (S1). CPU 211 (FIG. 1) of Device B receives the 1st driver's name data from Device A in a wireless fashion and stores the data in 1st Driver's Name Data Storage Area 206B703b2a (S2). The foregoing sequence is repeated periodically.

This paragraph illustrate(s) 1st Current Location Data Producing Software 206A703c7 of Device A, which produce(s) the 1st current location data. In the present embodiment, CPU 211 (FIG. 1) of Device A identifies the current location of Carrier CR703A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A703b3a (S3). The foregoing sequence is repeated periodically.

This paragraph illustrate(s) 2nd Current Location Data Producing Software 206B703c8 of Device B, which produce(s) the 2nd current location data. In the present embodiment, CPU 211 (FIG. 1) of Device B identifies the current location of Carrier CR703B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B703b3b (S3). The foregoing sequence is repeated periodically.

This paragraph illustrate(s) 1st Current Location Data Sharing Software 206A703c9 of Device A and 1st Current Location Data Sharing Software 206B703c9 of Device B, which share(s) the 1st current location data. In the present embodiment, CPU 211 (FIG. 1) of Device A retrieves the 1st current location data from 1st Current Location Data Storage Area 206A703b3a and sends the data to Device B in a wireless fashion (S1). CPU 211 (FIG. 1) of Device B receives the 1st current location data from Device A in a wireless fashion and stores the data in 1st Current Location Data Storage Area 206B703b3a (S2). The foregoing sequence is repeated periodically.

This paragraph illustrate(s) Current Distance Data Producing Software 206B703c10 of Device B, which produce(s) the current distance data. In the present embodiment, CPU 211 (FIG. 1) of Device B retrieves the 1st current location data from 1st Current Location Data Storage Area 206B703b3a (S1). CPU 211 (FIG. 1) of Device B retrieves the 2nd current location data from 2nd Current Location Data Storage Area 206B703b3b (S2). CPU 211 (FIG. 1) of Device B produces the current distance data by referring to the 1st current location data retrieved in S1 and the 2nd current location data retrieved in the previous step (S3). CPU 211 (FIG. 1) of Device B stores the current distance data produced in the previous step in Current Distance Data Storage Area 206B703b4 (S4). The foregoing sequence is repeated periodically.

This paragraph illustrate(s) 1st Current Speed Data Producing Software 206A703c11 of Device A, which produce(s) the 1st current speed data. In the present embodiment, CPU 211 (FIG. 1) of Device A identifies the current speed of Carrier CR703A (S1). CPU 211 (FIG. 1) of Device A produces the 1st current speed data by referring to the current speed identified in the previous step (S2). CPU 211 (FIG. 1) of Device A stores the 1st current speed data produced in the previous step in 1st Current Speed Data Storage Area 206A703b5a (S3). The foregoing sequence is repeated periodically.

This paragraph illustrate(s) 1st Current Speed Data Sharing Software 206A703c12 of Device A and 1st Current Speed Data Sharing Software 206B703c12 of Device B, which share(s) the 1st current speed data. In the present embodiment, CPU 211 (FIG. 1) of Device A retrieves the 1st current speed data from 1st Current Speed Data Storage Area 206A703b5a and sends the data to Device B in a wireless fashion (S1). CPU 211 (FIG. 1) of Device B receives the 1st current speed data from Device A in a wireless fashion and stores the data in 1st Current Speed Data Storage Area 206B703b5a (S2). The foregoing sequence is repeated periodically.

This paragraph illustrate(s) 2nd Current Speed Data Producing Software 206B703c13 of Device B, which produce(s) the 2nd current speed data. In the present embodiment, CPU 211 (FIG. 1) of Device B identifies the current speed of Carrier CR703B (S1). CPU 211 (FIG. 1) of Device B produces the 2nd current speed data by referring to the current speed identified in the previous step (S2). CPU 211 (FIG. 1) of Device B stores the 2nd current speed data produced in the previous step in 2nd Current Speed Data Storage Area 206B703b5b (S3). The foregoing sequence is repeated periodically.

This paragraph illustrate(s) Left Blinker Flag Data Identifying Software 206A703c14 of Device A, which identify(ies) the left blinker flag data. In the present embodiment, CPU 211 (FIG. 1) of Device A identifies the current status of the left blinker of Carrier CR703A (S1). If the left blinker of Carrier CR703A is currently on, CPU 211 (FIG. 1) of Device A proceeds to the next step; if not, CPU 211 (FIG. 1) of Device A proceeds to S4 (S2). CPU 211 (FIG. 1) of Device A stores the left blinker positive flag data in Left Blinker Flag Data Storage Area 206A703b6a (S3). CPU 211 (FIG. 1) of Device A stores the left blinker negative flag data in Left Blinker Flag Data Storage Area 206A703b6a (S4). The foregoing sequence is repeated periodically.

This paragraph illustrate(s) Left Blinker Flag Data Sharing Software 206A703c15 of Device A and Left Blinker Flag Data Sharing Software 206B703c15 of Device B, which share(s) the left blinker flag data. In the present embodiment, CPU 211 (FIG. 1) of Device A retrieves the left blinker flag data from Left Blinker Flag Data Storage Area 206A703b6a and sends the data to Device B in a wireless fashion (S1). CPU 211 (FIG. 1) of Device B receives the left blinker flag data from Device A in a wireless fashion and stores the data in Left Blinker Flag Data Storage Area 206B703b6a (S2). The foregoing sequence is repeated periodically.

This paragraph illustrate(s) Right Blinker Flag Data Identifying Software 206A703c16 of Device A, which identify(ies) the right blinker flag data. In the present embodiment, CPU 211 (FIG. 1) of Device A identifies the current status of the right blinker of Carrier CR703A (S1). If the right blinker of Carrier CR703A is currently on, CPU 211 (FIG. 1) of Device A proceeds to the next step; if not, CPU 211 (FIG. 1) of Device A proceeds to S4 (S2). CPU 211 (FIG. 1) of Device A stores the right blinker positive flag data in Right Blinker Flag Data Storage Area 206A703b6b (S3). CPU 211 (FIG. 1) of Device A stores the right blinker negative flag data in Right Blinker Flag Data Storage Area 206A703b6b (S4). The foregoing sequence is repeated periodically.

This paragraph illustrate(s) Right Blinker Flag Data Sharing Software 206A703c17 of Device A and Right Blinker Flag Data Sharing Software 206B703c17 of Device B, which share(s) the right blinker flag data. In the present embodiment, CPU 211 (FIG. 1) of Device A retrieves the right blinker flag data from Right Blinker Flag Data Storage Area 206A703b6b and sends the data to Device B in a wireless fashion (S1). CPU 211 (FIG. 1) of Device B receives the right blinker flag data from Device A in a wireless fashion and stores the data in Right Blinker Flag Data Storage Area 206B703b6b (S2). The foregoing sequence is repeated periodically.

This paragraph illustrate(s) Brake Flag Data Identifying Software 206A703c18 of Device A, which identify(ies) the brake flag data. In the present embodiment, CPU 211 (FIG. 1) of Device A identifies the current status of the brake pedal of Carrier CR703A (S1). If the brake pedal of Carrier CR703A is currently stepped on, CPU 211 (FIG. 1) of Device A proceeds to the next step; if not, CPU 211 (FIG. 1) of Device A proceeds to S4 (S2). CPU 211 (FIG. 1) of Device A stores the brake positive flag data in Brake Flag Data Storage Area 206A703b7a (S3). CPU 211 (FIG. 1) of Device A stores the brake negative flag data in Brake Flag Data Storage Area 206A703b7a (S4). The foregoing sequence is repeated periodically.

This paragraph illustrate(s) Brake Flag Data Sharing Software 206A703c19 of Device A and Brake Flag Data Sharing Software 206B703c19 of Device B, which share(s) the brake flag data. In the present embodiment, CPU 211 (FIG. 1) of Device A retrieves the brake flag data from Brake Flag Data Storage Area 206A703b7a and sends the data to Device B in a wireless fashion (S1). CPU 211 (FIG. 1) of Device B receives the brake flag data from Device A in a wireless fashion and stores the data in Brake Flag Data Storage Area 206B703b7a (S2). The foregoing sequence is repeated periodically.

This paragraph illustrate(s) Accelerator Flag Data Identifying Software 206A703c20 of Device A, which identify(ies) the accelerator flag data. In the present embodiment, CPU 211 (FIG. 1) of Device A identifies the current status of the accelerator pedal of Carrier CR703A (S1). If the accelerator pedal of Carrier CR703A is currently stepped on, CPU 211 (FIG. 1) of Device A proceeds to the next step; if not, CPU 211 (FIG. 1) of Device A proceeds to S4 (S2). CPU 211 (FIG. 1) of Device A stores the accelerator positive flag data in Accelerator Flag Data Storage Area 206A703b7b (S3). CPU 211 (FIG. 1) of Device A stores the accelerator negative flag data in Accelerator Flag Data Storage Area 206A703b7b (S4). The foregoing sequence is repeated periodically.

This paragraph illustrate(s) Accelerator Flag Data Sharing Software 206A703c21 of Device A and Accelerator Flag Data Sharing Software 206B703c21 of Device B, which share(s) the accelerator flag data. In the present embodiment, CPU 211 (FIG. 1) of Device A retrieves the accelerator flag data from Accelerator Flag Data Storage Area 206A703b7b and sends the data to Device B in a wireless fashion (S1). CPU 211 (FIG. 1) of Device B receives the accelerator flag data from Device A in a wireless fashion and stores the data in Accelerator Flag Data Storage Area 206B703b7b (S2). The foregoing sequence is repeated periodically.

This paragraph illustrate(s) Left Steering Wheel Flag Data Identifying Software 206A703c22 of Device A, which identify(ies) the left steering wheel flag data. In the present embodiment, CPU 211 (FIG. 1) of Device A identifies the current status of the steering wheel of Carrier CR703A (S1). If the steering wheel of Carrier CR703A is currently turned to the left, CPU 211 (FIG. 1) of Device A proceeds to the next step; if not, CPU 211 (FIG. 1) of Device A proceeds to S4 (S2). CPU 211 (FIG. 1) of Device A stores the left steering wheel positive flag data in Left Steering Wheel Flag Data Storage Area 206A703b8 a (S3). CPU 211 (FIG. 1) of Device A stores the left steering wheel negative flag data in Left Steering Wheel Flag Data Storage Area 206A703b8a (S4). The foregoing sequence is repeated periodically.

This paragraph illustrate(s) Left Steering Wheel Flag Data Sharing Software 206A703c23 of Device A and Left Steering Wheel Flag Data Sharing Software 206B703c23 of Device B, which share(s) the left steering wheel flag data. In the present embodiment, CPU 211 (FIG. 1) of Device A retrieves the left steering wheel flag data from Left Steering Wheel Flag Data Storage Area 206A703b8a and sends the data to Device B in a wireless fashion (S1). CPU 211 (FIG. 1) of Device B receives the left steering wheel flag data from Device A in a wireless fashion and stores the data in Left Steering Wheel Flag Data Storage Area 206B703b8a (S2). The foregoing sequence is repeated periodically.

This paragraph illustrate(s) Right Steering Wheel Flag Data Identifying Software 206A703c24 of Device A, which identify(ies) the right steering wheel flag data. In the present embodiment, CPU 211 (FIG. 1) of Device A identifies the current status of the steering wheel of Carrier CR703A (S1). If the steering wheel of Carrier CR703A is currently turned to the right, CPU 211 (FIG. 1) of Device A proceeds to the next step; if not, CPU 211 (FIG. 1) of Device A proceeds to S4 (S2). CPU 211 (FIG. 1) of Device A stores the right steering wheel positive flag data in Right Steering Wheel Flag Data Storage Area 206A703b8b (S3). CPU 211 (FIG. 1) of Device A stores the right steering wheel negative flag data in Right Steering Wheel Flag Data Storage Area 206A703b8b (S4). The foregoing sequence is repeated periodically.

This paragraph illustrate(s) Right Steering Wheel Flag Data Sharing Software 206A703c25 of Device A and Right Steering Wheel Flag Data Sharing Software 206B703c25 of Device B, which share(s) the right steering wheel flag data. In the present embodiment, CPU 211 (FIG. 1) of Device A retrieves the right steering wheel flag data from Right Steering Wheel Flag Data Storage Area 206A703b8b and sends the data to Device B in a wireless fashion (S1). CPU 211 (FIG. 1) of Device B receives the right steering wheel flag data from Device A in a wireless fashion and stores the data in Right Steering Wheel Flag Data Storage Area 206B703b8b (S2). The foregoing sequence is repeated periodically.

This paragraph illustrate(s) Left Blinker Message Data Outputting Software 206A703c26 of Device A, which output(s) the left blinker message data. In the present embodiment, CPU 211 (FIG. 1) of Device A retrieves the left blinker flag data from Left Blinker Flag Data Storage Area 206A703b6a (S1). If the left blinker flag data retrieved in the previous step is the left blinker positive flag data, CPU 211 (FIG. 1) of Device A proceeds to the next step (S2). CPU 211 (FIG. 1) of Device A retrieves the left blinker message data from Left Blinker Message Data Storage Area 206A703b9a (S3). CPU 211 (FIG. 1) of Device A outputs the left blinker message data retrieved in the previous step from Speaker 216 (FIG. 1) and LCD 201 (FIG. 1) of Device A (S4). The foregoing sequence is repeated periodically.

This paragraph illustrate(s) Left Blinker Message Data Outputting Software 206B703c26 of Device B, which output(s) the left blinker message data. In the present embodiment, CPU 211 (FIG. 1) of Device B retrieves the left blinker flag data from Left Blinker Flag Data Storage Area 206B703b6a (S1). If the left blinker flag data retrieved in the previous step is the left blinker positive flag data, CPU 211 (FIG. 1) of Device B proceeds to the next step (S2). CPU 211 (FIG. 1) of Device B retrieves the left blinker message data from Left Blinker Message Data Storage Area 206B703b9a (S3). CPU 211 (FIG. 1) of Device B outputs the left blinker message data retrieved in the previous step from Speaker 216 (FIG. 1) and LCD 201 (FIG. 1) of Device B (S4). The foregoing sequence is repeated periodically.

This paragraph illustrate(s) Right Blinker Message Data Outputting Software 206A703c27 of Device A, which output(s) the right blinker message data. In the present embodiment, CPU 211 (FIG. 1) of Device A retrieves the right blinker flag data from Right Blinker Flag Data Storage Area 206A703b6b (S1). If the right blinker flag data retrieved in the previous step is the right blinker positive flag data, CPU 211 (FIG. 1) of Device A proceeds to the next step (S2). CPU 211 (FIG. 1) of Device A retrieves the right blinker message data from Right Blinker Message Data Storage Area 206A703b9b (S3). CPU 211 (FIG. 1) of Device A outputs the right blinker message data retrieved in the previous step from Speaker 216 (FIG. 1) and LCD 201 (FIG. 1) of Device A (S4). The foregoing sequence is repeated periodically.

This paragraph illustrate(s) Right Blinker Message Data Outputting Software 206B703c27 of Device B, which output(s) the right blinker message data. In the present embodiment, CPU 211 (FIG. 1) of Device B retrieves the right blinker flag data from Right Blinker Flag Data Storage Area 206B703b6b (S1). If the right blinker flag data retrieved in the previous step is the right blinker positive flag data, CPU 211 (FIG. 1) of Device B proceeds to the next step (S2). CPU 211 (FIG. 1) of Device B retrieves the right blinker message data from Right Blinker Message Data Storage Area 206B703b9b (S3). CPU 211 (FIG. 1) of Device B outputs the right blinker message data retrieved in the previous step from Speaker 216 (FIG. 1) and LCD 201 (FIG. 1) of Device B (S4). The foregoing sequence is repeated periodically.

This paragraph illustrate(s) Brake Message Data Outputting Software 206A703c28 of Device A, which output(s) the brake message data. In the present embodiment, CPU 211 (FIG. 1) of Device A retrieves the brake flag data from Brake Flag Data Storage Area 206A703b7a (S1). If the brake flag data retrieved in the previous step is the brake positive flag data, CPU 211 (FIG. 1) of Device A proceeds to the next step (S2). CPU 211 (FIG. 1) of Device A retrieves the brake message data from Brake Message Data Storage Area 206A703b10a (S3). CPU 211 (FIG. 1) of Device A outputs the brake message data retrieved in the previous step from Speaker 216 (FIG. 1) and LCD 201 (FIG. 1) of Device A (S4). The foregoing sequence is repeated periodically.

This paragraph illustrate(s) Brake Message Data Outputting Software 206B703c28 of Device B, which output(s) the brake message data. In the present embodiment, CPU 211 (FIG. 1) of Device B retrieves the brake flag data from Brake Flag Data Storage Area 206B703b7a (S1). If the brake flag data retrieved in the previous step is the brake positive flag data, CPU 211 (FIG. 1) of Device B proceeds to the next step (S2). CPU 211 (FIG. 1) of Device B retrieves the brake message data from Brake Message Data Storage Area 206B703b10a (S3). CPU 211 (FIG. 1) of Device B outputs the brake message data retrieved in the previous step from Speaker 216 (FIG. 1) and LCD 201 (FIG. 1) of Device B (S4). The foregoing sequence is repeated periodically.

This paragraph illustrate(s) Accelerator Message Data Outputting Software 206A703c29 of Device A, which output(s) the accelerator message data. In the present embodiment, CPU 211 (FIG. 1) of Device A retrieves the accelerator flag data from Accelerator Flag Data Storage Area 206A703b7b (S1). If the accelerator flag data retrieved in the previous step is the accelerator positive flag data, CPU 211 (FIG. 1) of Device A proceeds to the next step (S2). CPU 211 (FIG. 1) of Device A retrieves the accelerator message data from Accelerator Message Data Storage Area 206A703b10b (S3). CPU 211 (FIG. 1) of Device A outputs the accelerator message data retrieved in the previous step from Speaker 216 (FIG. 1) and LCD 201 (FIG. 1) of Device A (S4). The foregoing sequence is repeated periodically.

This paragraph illustrate(s) Accelerator Message Data Outputting Software 206B703c29 of Device B, which output(s) the accelerator message data. In the present embodiment, CPU 211 (FIG. 1) of Device B retrieves the accelerator flag data from Accelerator Flag Data Storage Area 206B703b7b (S1). If the accelerator flag data retrieved in the previous step is the accelerator positive flag data, CPU 211 (FIG. 1) of Device B proceeds to the next step (S2). CPU 211 (FIG. 1) of Device B retrieves the accelerator message data from Accelerator Message Data Storage Area 206B703b10b (S3). CPU 211 (FIG. 1) of Device B outputs the accelerator message data retrieved in the previous step from Speaker 216 (FIG. 1) and LCD 201 (FIG. 1) of Device B (S4). The foregoing sequence is repeated periodically.

This paragraph illustrate(s) Left Steering Wheel Message Data Outputting Software 206A703c30 of Device A, which output(s) the left steering wheel message data. In the present embodiment, CPU 211 (FIG. 1) of Device A retrieves the left steering wheel flag data from Left Steering Wheel Flag Data Storage Area 206A703b8a (S1). If the left steering wheel flag data retrieved in the previous step is the left steering wheel positive flag data, CPU 211 (FIG. 1) of Device A proceeds to the next step (S2). CPU 211 (FIG. 1) of Device A retrieves the left steering wheel message data from Left Steering Wheel Message Data Storage Area 206A703b11a (S3). CPU 211 (FIG. 1) of Device A outputs the left steering wheel message data retrieved in the previous step from Speaker 216 (FIG. 1) and LCD 201 (FIG. 1) of Device A (S4). The foregoing sequence is repeated periodically.

This paragraph illustrate(s) Left Steering Wheel Message Data Outputting Software 206B703c30 of Device B, which output(s) the left steering wheel message data. In the present embodiment, CPU 211 (FIG. 1) of Device B retrieves the left steering wheel flag data from Left Steering Wheel Flag Data Storage Area 206B703b8a (S1). If the left steering wheel flag data retrieved in the previous step is the left steering wheel positive flag data, CPU 211 (FIG. 1) of Device B proceeds to the next step (S2). CPU 211 (FIG. 1) of Device B retrieves the left steering wheel message data from Left Steering Wheel Message Data Storage Area 206B703b11a (S3). CPU 211 (FIG. 1) of Device B outputs the left steering wheel message data retrieved in the previous step from Speaker 216 (FIG. 1) and LCD 201 (FIG. 1) of Device B (S4). The foregoing sequence is repeated periodically.

This paragraph illustrate(s) Right Steering Wheel Message Data Outputting Software 206A703c31 of Device A, which output(s) the right steering wheel message data. In the present embodiment, CPU 211 (FIG. 1) of Device A retrieves the right steering wheel flag data from Right Steering Wheel Flag Data Storage Area 206A703b8b (S1). If the right steering wheel flag data retrieved in the previous step is the right steering wheel positive flag data, CPU 211 (FIG. 1) of Device A proceeds to the next step (S2). CPU 211 (FIG. 1) of Device A retrieves the right steering wheel message data from Right Steering Wheel Message Data Storage Area 206A703b11b (S3). CPU 211 (FIG. 1) of Device A outputs the right steering wheel message data retrieved in the previous step from Speaker 216 (FIG. 1) and LCD 201 (FIG. 1) of Device A (S4). The foregoing sequence is repeated periodically.

This paragraph illustrate(s) Right Steering Wheel Message Data Outputting Software 206B703c31 of Device B, which output(s) the right steering wheel message data. In the present embodiment, CPU 211 (FIG. 1) of Device B retrieves the right steering wheel flag data from Right Steering Wheel Flag Data Storage Area 206B703b8b (S1). If the right steering wheel flag data retrieved in the previous step is the right steering wheel positive flag data, CPU 211 (FIG. 1) of Device B proceeds to the next step (S2). CPU 211 (FIG. 1) of Device B retrieves the right steering wheel message data from Right Steering Wheel Message Data Storage Area 206B703b11b (S3). CPU 211 (FIG. 1) of Device B outputs the right steering wheel message data retrieved in the previous step from Speaker 216 (FIG. 1) and LCD 201 (FIG. 1) of Device B (S4). The foregoing sequence is repeated periodically.

This paragraph illustrate(s) Carrier Location Displaying Software 206B703c32 of Device B, which display(s) the current locations of Carrier CR703A and Carrier CR703B. In the present embodiment, CPU 211 (FIG. 1) of Device B retrieves the map data from Map Data Storage Area 206B703b12 (S1). CPU 211 (FIG. 1) of Device B displays the map data retrieved in the previous step on LCD 201 (FIG. 1) of Device B (S2). CPU 211 (FIG. 1) of Device B retrieves the 1st current location data from 1st Current Location Data Storage Area 206B703b3a (S3). CPU 211 (FIG. 1) of Device B retrieves the 1st current location icon data from 1st Current Location Icon Data Storage Area 206B703b13a (S4). CPU 211 (FIG. 1) of Device B displays the 1st current location icon data retrieved in the previous step at the location corresponding to the 1st current location data retrieved in S3 on the map data displayed in S2 (S5). CPU 211 (FIG. 1) of Device B retrieves the 2nd current location data from 2nd Current Location Data Storage Area 206B703b3b (S6). CPU 211 (FIG. 1) of Device B retrieves the 2nd current location icon data from 2nd Current Location Icon Data Storage Area 206B703b13b (S7). CPU 211 (FIG. 1) of Device B displays the 2nd current location icon data retrieved in the previous step at the location corresponding to the 2nd current location data retrieved in S6 on the map data displayed in S2 (S8). The foregoing sequence is repeated periodically.

This paragraph illustrate(s) License Plate Number Data Displaying Software 206B703c33 of Device B, which display(s) the license plate numbers of Carrier CR703A and Carrier CR703B. In the present embodiment, CPU 211 (FIG. 1) of Device B retrieves the 1st license plate number data from 1st License Plate Number Data Storage Area 206B703b1a (S1). CPU 211 (FIG. 1) of Device B displays the 1st license plate number data retrieved in the previous step on LCD 201 (FIG. 1) of Device B (S2). CPU 211 (FIG. 1) of Device B retrieves the 2nd license plate number data from 2nd License Plate Number Data Storage Area 206B703b1b (S3). CPU 211 (FIG. 1) of Device B displays the 2nd license plate number data retrieved in the previous step on LCD 201 (FIG. 1) of Device B (S4). The foregoing sequence is repeated periodically.

This paragraph illustrate(s) Driver's Name Data Displaying Software 206B703c34 of Device B, which display(s) the names of the drivers of Carrier CR703A and Carrier CR703B.

In the present embodiment, CPU 211 (FIG. 1) of Device B retrieves the 1st driver's name data from 1st Driver's Name Data Storage Area 206B703b2a (S1). CPU 211 (FIG. 1) of Device B displays the 1st driver's name data retrieved in the previous step on LCD 201 (FIG. 1) of Device B (S2). CPU 211 (FIG. 1) of Device B retrieves the 2nd driver's name data from 2nd Driver's Name Data Storage Area 206B703b2b (S3). CPU 211 (FIG. 1) of Device B displays the 2nd driver's name data retrieved in the previous step on LCD 201 (FIG. 1) of Device B (S4). The foregoing sequence is repeated periodically.

This paragraph illustrate(s) Current Speed Data Displaying Software 206B703c35 of Device B, which display(s) the current speeds of Carrier CR703A and Carrier CR703B. In the present embodiment, CPU 211 (FIG. 1) of Device B retrieves the 1st current speed data from 1st Current Speed Data Storage Area 206B703b5a (S1). CPU 211 (FIG. 1) of Device B displays the 1st current speed data retrieved in the previous step on LCD 201 (FIG. 1) of Device B (S2). CPU 211 (FIG. 1) of Device B retrieves the 2nd current speed data from 2nd Current Speed Data Storage Area 206B703b5b (S3). CPU 211 (FIG. 1) of Device B displays the 2nd current speed data retrieved in the previous step on LCD 201 (FIG. 1) of Device B (S4). The foregoing sequence is repeated periodically.

<<Past Accident Occurred Spot Auto Speed Decreasing Function>>

The following paragraphs illustrate the past accident occurred spot auto speed decreasing function, wherein a current location which indicates the current location of a carrier is identified, when said current location is within a certain distance from a past accident occurred location which indicates the geographic location at which an accident occurred in the past, a past accident occurred message data which is the audiovisual data indicating that said carrier is about to approach the location at which accident occurred in the past and a past accident relating data which indicates the data relating to the accident occurred in the past are output from said communication device, and the current speed of said carrier is decreased to a predetermined speed.

This paragraph illustrates the relationship between Carrier CR704 and Communication Device 200. In the present embodiment, Carrier CR704 includes Communication Device 200. Here, Carrier CR704 is a carrier which may be any type of carrier or transportation system designed to carry passenger(s), such as an airplane, automobile, motorcycle, railway train, taxi, bus, space ship, or space station.

This paragraph illustrates the storage area included in Host H. In the present embodiment, Host H includes Past Accident Occurred Spot Auto Speed Decreasing Info Storage Area H704a of which the data and the software program(s) stored therein are described hereinafter.

This paragraph illustrates the storage area(s) included in Past Accident Occurred Spot Auto Speed Decreasing Info Storage Area H704a. In the present embodiment, Past Accident Occurred Spot Auto Speed Decreasing Info Storage Area H704a includes Past Accident Occurred Spot Auto Speed Decreasing Data Storage Area H704b and Past Accident Occurred Spot Auto Speed Decreasing Software Storage Area H704c. Past Accident Occurred Spot Auto Speed Decreasing Data Storage Area H704b stores the data necessary to implement the present function on the side of Host H, such as the one(s) described hereinafter. Past Accident Occurred Spot Auto Speed Decreasing Software Storage Area H704c stores the software program(s) necessary to implement the present function on the side of Host H, such as the one(s) described hereinafter.

This paragraph illustrates the storage area(s) included in Past Accident Occurred Spot Auto Speed Decreasing Data Storage Area H704b. In the present embodiment, Past Accident Occurred Spot Auto Speed Decreasing Data Storage Area H704b includes Current Location Data Storage Area H704b1, Entire Past Accident Occurred Location Data Storage Area H704b2, Past Accident Occurred Message Data Storage Area H704b3, Entire Past Accident Relating Data Storage Area H704b4, Low Speed Data Storage Area H704b5, Map Data Storage Area H704b6, Entire Location Icon Data Storage Area H704b7, and Work Area H704b8. Current Location Data Storage Area H704b1 stores the current location data which indicates the current geographic location of Carrier CR704. Entire Past Accident Occurred Location Data Storage Area H704b2 stores the data described hereinafter. Past Accident Occurred Message Data Storage Area H704b3 stores the past accident occurred message data which is the audiovisual data indicating that Carrier CR704 is about to approach the location at which an accident occurred in the past. Entire Past Accident Relating Data Storage Area H704b4 stores the data described hereinafter. Low Speed Data Storage Area H704b5 stores the low speed data which indicates the speed of Carrier CR704 when approaching the location at which the accident occurred in the past. Map Data Storage Area H704b6 stores the map data which is the image data indicating a map. Entire Location Icon Data Storage Area H704b7 stores the data described hereinafter. Work Area H704b8 is utilized as a work area to perform calculation and temporarily store data to implement the present function.

This paragraph illustrates the storage area(s) included in Entire Past Accident Occurred Location Data Storage Area H704b2. In the present embodiment, Entire Past Accident Occurred Location Data Storage Area H704b2 includes 1st Past Accident Occurred Location Data Storage Area H704b2a and 2nd Past Accident Occurred Location Data Storage Area H704b2b. 1st Past Accident Occurred Location Data Storage Area H704b2a stores the 1st past accident occurred location data which indicates the geographic location at which a 1st accident occurred in the past. 2nd Past Accident Occurred Location Data Storage Area H704b2b stores the 2nd past accident occurred location data which indicates the geographic location at which a 2nd accident occurred in the past.

This paragraph illustrates the storage area(s) included in Entire Past Accident Relating Data Storage Area H704b4. In the present embodiment, Entire Past Accident Relating Data Storage Area H704b4 includes 1st Past Accident Relating Data Storage Area H704b4a and 2nd Past Accident Relating Data Storage Area H704b4b. 1st Past Accident Relating Data Storage Area H704b4a stores the 1st past accident relating data which indicates the data relating to the 1st accident occurred in the past, such as the date/time at which the accident occurred, the number of casualties, the manner the accident occurred, and the weather when the accident occurred. 2nd Past Accident Relating Data Storage Area H704b4b stores the 2nd past accident relating data which indicates the data relating to the 2nd accident occurred in the past, such as the date/time at which the accident occurred, the number of casualties, the manner the accident occurred, and the weather when the accident occurred.

This paragraph illustrates the storage area(s) included in Entire Location Icon Data Storage Area H704b7. In the present embodiment, Entire Location Icon Data Storage Area H704b7 includes Current Location Icon Data Storage Area H704b7a, 1st Past Accident Occurred Location Icon Data Storage Area H704b7b, and 2nd Past Accident Occurred Location Icon Data Storage Area H704b7c. Current Location Icon Data Storage Area H704b7a stores the current location icon data which is the image of the icon utilized to indicate the current location data on the map data. 1st Past Accident Occurred Location Icon Data Storage Area H704b7b stores the 1st past accident occurred location icon data which is the image of the icon utilized to indicate the 1st past accident occurred location data on the map data. 2nd Past Accident Occurred Location Icon Data Storage Area H704b7c stores the 2nd past accident occurred location icon data which is the image of the icon utilized to indicate the 2nd past accident occurred location data on the map data.

This paragraph illustrates the software program(s) stored in Past Accident Occurred Spot Auto Speed Decreasing Software Storage Area H704c. In the present embodiment, Past Accident Occurred Spot Auto Speed Decreasing Software Storage Area H704c stores Current Location Data Producing Software H704c1, 1st Past Accident Relating Data Displaying Software H704c2, and 2nd Past Accident Relating Data Displaying Software H704c3. Current Location Data Producing Software H704c1 is the software program described hereinafter. 1st Past Accident Relating Data Displaying Software H704c2 is the software program described hereinafter. 2nd Past Accident Relating Data Displaying Software H704c3 is the software program described hereinafter.

This paragraph illustrates the storage area included in RAM 206 (FIG. 1) of Communication Device 200. In the present embodiment, RAM 206 includes Past Accident Occurred Spot Auto Speed Decreasing Info Storage Area 206704a of which the data and the software program(s) stored therein are described hereinafter.

The data and/or the software program(s) necessary to implement the present function may be downloaded from Host H to Communication Device 200.

This paragraph illustrates the storage area(s) included in Past Accident Occurred Spot Auto Speed Decreasing Info Storage Area 206704a. In the present embodiment, Past Accident Occurred Spot Auto Speed Decreasing Info Storage Area 206704a includes Past Accident Occurred Spot Auto Speed Decreasing Data Storage Area 206704b and Past Accident Occurred Spot Auto Speed Decreasing Software Storage Area 206704c. Past Accident Occurred Spot Auto Speed Decreasing Data Storage Area 206704b stores the data necessary to implement the present function on the side of Communication Device 200, such as the one(s) described hereinafter. Past Accident Occurred Spot Auto Speed Decreasing Software Storage Area 206704c stores the software program(s) necessary to implement the present function on the side of Communication Device 200, such as the one(s) described hereinafter.

This paragraph illustrates the storage area(s) included in Past Accident Occurred Spot Auto Speed Decreasing Data Storage Area 206704b. In the present embodiment, Past Accident Occurred Spot Auto Speed Decreasing Data Storage Area 206704b includes Current Location Data Storage Area 206704b1, Entire Past Accident Occurred Location Data Storage Area 206704b2, Past Accident Occurred Message Data Storage Area 206704b3, Entire Past Accident Relating Data Storage Area 206704b4, Low Speed Data Storage Area 206704b5, Map Data Storage Area 206704b6, Entire Location Icon Data Storage Area 206704b7, and Work Area 206704b8. Current Location Data Storage Area 206704b1 stores the current location data which indicates the current geographic location of Carrier CR704. Entire Past Accident Occurred Location Data Storage Area 206704b2 stores the data described hereinafter. Past Accident Occurred Message Data Storage Area 206704b3 stores the past accident occurred message data which is the audiovisual data indicating that Carrier CR704 is about to approach the location at which an accident occurred in the past. Entire Past Accident Relating Data Storage Area 206704b4 stores the data described hereinafter. Low Speed Data Storage Area 206704b5 stores the low speed data which indicates the speed of Carrier CR704 when approaching the location at which the accident occurred in the past. Map Data Storage Area 206704b6 stores the map data which is the image data indicating a map. Entire Location Icon Data Storage Area 206704b7 stores the data described hereinafter. Work Area 206704b8 is utilized as a work area to perform calculation and temporarily store data to implement the present function.

This paragraph illustrates the storage area(s) included in Entire Past Accident Occurred Location Data Storage Area 206704b2. In the present embodiment, Entire Past Accident Occurred Location Data Storage Area 206704b2 includes 1st Past Accident Occurred Location Data Storage Area 206704b2a and 2nd Past Accident Occurred Location Data Storage Area 206704b2b. 1st Past Accident Occurred Location Data Storage Area 206704b2a stores the 1st past accident occurred location data which indicates the geographic location at which a 1st accident occurred in the past. 2nd Past Accident Occurred Location Data Storage Area 206704b2b stores the 2nd past accident occurred location data which indicates the geographic location at which a 2nd accident occurred in the past.

This paragraph illustrates the storage area(s) included in Entire Past Accident Relating Data Storage Area 206704b4. In the present embodiment, Entire Past Accident Relating Data Storage Area 206704b4 includes 1st Past Accident Relating Data Storage Area 206704b4a and 2nd Past Accident Relating Data Storage Area 206704b4b. 1st Past Accident Relating Data Storage Area 206704b4a stores the 1st past accident relating data which indicates the data relating to the 1st accident occurred in the past, such as the date/time at which the accident occurred, the number of casualties, the manner the accident occurred, and the weather when the accident occurred. 2nd Past Accident Relating Data Storage Area 206704b4b stores the 2nd past accident relating data which indicates the data relating to the 2nd accident occurred in the past, such as the date/time at which the accident occurred, the number of casualties, the manner the accident occurred, and the weather when the accident occurred.

This paragraph illustrates the storage area(s) included in Entire Location Icon Data Storage Area 206704b7. In the present embodiment, Entire Location Icon Data Storage Area 206704b7 includes Current Location Icon Data Storage Area 206704b7a, 1st Past Accident Occurred Location Icon Data Storage Area 206704b7b, and 2nd Past Accident Occurred Location Icon Data Storage Area 206704b7c. Current Location Icon Data Storage Area 206704b7a stores the current location icon data which is the image of the icon utilized to indicate the current location data on the map data. 1st Past Accident Occurred Location Icon Data Storage Area 206704b7b stores the 1st past accident occurred location icon data which is the image of the icon utilized to indicate the 1st past accident occurred location data on the map data. 2nd Past Accident Occurred Location Icon Data Storage Area 206704b7c stores the 2nd past accident occurred location icon data which is the image of the icon utilized to indicate the 2nd past accident occurred location data on the map data.

This paragraph illustrates the software program(s) stored in Past Accident Occurred Spot Auto Speed Decreasing Software Storage Area 206704c. In the present embodiment, Past Accident Occurred Spot Auto Speed Decreasing Software Storage Area 206704c stores Current Location Data Producing Software 206704c1, 1st Past Accident Relating Data Displaying Software 206704c2, and 2nd Past Accident Relating Data Displaying Software 206704c3. Current Location Data Producing Software 206704c1 is the software program described hereinafter. 1st Past Accident Relating Data Displaying Software 206704c2 is the software program described hereinafter. 2nd Past Accident Relating Data Displaying Software 206704c3 is the software program described hereinafter.

This paragraph illustrate(s) Current Location Data Producing Software H704c1 of Host H and Current Location Data Producing Software 206704c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H704b1 (S3). The foregoing sequence is repeated periodically.

This paragraph illustrate(s) 1st Past Accident Relating Data Displaying Software H704c2 of Host H and 1st Past Accident Relating Data Displaying Software 206704c2 of Communication Device 200, which display(s) the 1st past accident relating data. In the present embodiment, Host H retrieves the current location data from Current Location Data Storage Area H704b1 (S1). Host H retrieves the 1st past accident occurred location data from 1st Past Accident Occurred Location Data Storage Area H704b2a (S2). If the current location data retrieved in S1 is within a certain distance from the 1st past accident occurred location data retrieved in the previous step, Host H proceeds to the next step (S3). Host H retrieves the past accident occurred message data from Past Accident Occurred Message Data Storage Area H704b3 and sends the data to Communication Device 200 (S4). CPU 211 (FIG. 1) receives the past accident occurred message data from Host H in a wireless fashion and outputs the data from Speaker 216 (FIG. 1) and LCD 201 (FIG. 1) (S5). Host H retrieves the 1st past accident relating data from 1st Past Accident Relating Data Storage Area H704b4a and sends the data to Communication Device 200 (S6). CPU 211 (FIG. 1) receives the 1st past accident relating data from Host H in a wireless fashion and displays the data on LCD 201 (FIG. 1) (S7). Host H retrieves the map data from Map Data Storage Area H704b6 and sends the data to Communication Device 200 (S8). CPU 211 (FIG. 1) receives the map data from Host H in a wireless fashion and displays the data on LCD 201 (FIG. 1) (S9). Host H retrieves the current location data from Current Location Data Storage Area H704b1 and sends the data to Communication Device 200 (S10). CPU 211 (FIG. 1) receives the current location data from Host H in a wireless fashion (S11). Host H retrieves the current location icon data from Current Location Icon Data Storage Area H704b7a and sends the data to Communication Device 200 (S12). CPU 211 (FIG. 1) receives the current location icon data from Host H in a wireless fashion (S13). CPU 211 (FIG. 1) displays the current location icon data received in the previous step at the location corresponding to the current location data received in S11 on the map data displayed in S9 (S14). Host H retrieves the 1st past accident occurred location data from 1st Past Accident Occurred Location Data Storage Area H704b2a and sends the data to Communication Device 200 (S15). CPU 211 (FIG. 1) receives the 1st past accident occurred location data from Host H in a wireless fashion (S16). Host H retrieves the 1st past accident occurred location icon data from 1st Past Accident Occurred Location Icon Data Storage Area H704b7b and sends the data to Communication Device 200 (S17). CPU 211 (FIG. 1) receives the 1st past accident occurred location icon data from Host H in a wireless fashion (S18). CPU 211 (FIG. 1) displays the 1st past accident occurred location icon data received in the previous step at the location corresponding to the 1st past accident occurred location data received in S16 on the map data displayed in S9 (S19). Host H retrieves the low speed data from Low Speed Data Storage Area H704b5 and sends the data to Communication Device 200 (S20). CPU 211 (FIG. 1) receives the low speed data from Host H in a wireless fashion (S21). CPU 211 (FIG. 1) controls the current speed of Carrier CR704 so as to decrease to the speed indicated by the low speed data received in the previous step (S22). The foregoing sequence is repeated periodically.

This paragraph illustrate(s) 2nd Past Accident Relating Data Displaying Software H704c3 of Host H and 2nd Past Accident Relating Data Displaying Software 206704c3 of Communication Device 200, which display(s) the 2nd past accident relating data. In the present embodiment, Host H retrieves the current location data from Current Location Data Storage Area H704b1 (S1). Host H retrieves the 2nd past accident occurred location data from 2nd Past Accident Occurred Location Data Storage Area H704b2b (S2). If the current location data retrieved in S1 is within a certain distance from the 2nd past accident occurred location data retrieved in the previous step, Host H proceeds to the next step (S3). Host H retrieves the past accident occurred message data from Past Accident Occurred Message Data Storage Area H704b3 and sends the data to Communication Device 200 (S4). CPU 211 (FIG. 1) receives the past accident occurred message data from Host H in a wireless fashion and outputs the data from Speaker 216 (FIG. 1) and LCD 201 (FIG. 1) (S5). Host H retrieves the 2nd past accident relating data from 2nd Past Accident Relating Data Storage Area H704b4b and sends the data to Communication Device 200 (S6). CPU 211 (FIG. 1) receives the 2nd past accident relating data from Host H in a wireless fashion and displays the data on LCD 201 (FIG. 1) (S7). Host H retrieves the map data from Map Data Storage Area H704b6 and sends the data to Communication Device 200 (S8). CPU 211 (FIG. 1) receives the map data from Host H in a wireless fashion and displays the data on LCD 201 (FIG. 1) (S9). Host H retrieves the current location data from Current Location Data Storage Area H704b1 and sends the data to Communication Device 200 (S10). CPU 211 (FIG. 1) receives the current location data from Host H in a wireless fashion (S11). Host H retrieves the current location icon data from Current Location Icon Data Storage Area H704b7a and sends the data to Communication Device 200 (S12). CPU 211 (FIG. 1) receives the current location icon data from Host H in a wireless fashion (S13). CPU 211 (FIG. 1) displays the current location icon data received in the previous step at the location corresponding to the current location data received in S11 on the map data displayed in S9 (S14). Host H retrieves the 2nd past accident occurred location data from 2nd Past Accident Occurred Location Data Storage Area H704b2b and sends the data to Communication Device 200 (S15). CPU 211 (FIG. 1) receives the 2nd past accident occurred location data from Host H in a wireless fashion (S16). Host H retrieves the 2nd past accident occurred location icon data from 2nd Past Accident Occurred Location Icon Data Storage Area H704b7c and sends the data to Communication Device 200 (S17). CPU 211 (FIG. 1) receives the 2nd past accident occurred location icon data from Host H in a wireless fashion (S18). CPU 211 (FIG. 1) displays the 2nd past accident occurred location icon data received in the previous step at the location corresponding to the 2nd past accident occurred location data received in S16 on the map data displayed in S9 (S19). Host H retrieves the low speed data from Low Speed Data Storage Area H704b5 and sends the data to Communication Device 200 (S20). CPU 211 (FIG. 1) receives the low speed data from Host H in a wireless fashion (S21). CPU 211 (FIG. 1) controls the current speed of Carrier CR704 so as to decrease to the speed indicated by the low speed data received in the previous step (S22). The foregoing sequence is repeated periodically.

The following paragraphs illustrate another embodiment wherein Communication Device 200 plays the major role in implementing the present function.

This paragraph illustrate(s) Current Location Data Producing Software 206704c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206704b1 (S3). The foregoing sequence is repeated periodically.

This paragraph illustrate(s) 1st Past Accident Relating Data Displaying Software 206704c2 of Communication Device 200, which display(s) the 1st past accident relating data. In the present embodiment, CPU 211 (FIG. 1) retrieves the current location data from Current Location Data Storage Area 206704b1 (S1). CPU 211 (FIG. 1) retrieves the 1st past accident occurred location data from 1st Past Accident Occurred Location Data Storage Area 206704b2a (S2). If the current location data retrieved in S1 is within a certain distance from the 1st past accident occurred location data retrieved in the previous step, CPU 211 (FIG. 1) proceeds to the next step (S3). CPU 211 (FIG. 1) retrieves the past accident occurred message data from Past Accident Occurred Message Data Storage Area 206704b3 (S4). CPU 211 (FIG. 1) outputs the past accident occurred message data retrieved in the previous step from Speaker 216 (FIG. 1) and LCD 201 (FIG. 1) (S5). CPU 211 (FIG. 1) retrieves the 1st past accident relating data from 1st Past Accident Relating Data Storage Area 206704b4a (S6). CPU 211 (FIG. 1) displays the 1st past accident relating data retrieved in the previous step on LCD 201 (FIG. 1) (S7). CPU 211 (FIG. 1) retrieves the map data from Map Data Storage Area 206704b6 (S8). CPU 211 (FIG. 1) displays the map data retrieved in the previous step on LCD 201 (FIG. 1) (S9). CPU 211 (FIG. 1) retrieves the current location data from Current Location Data Storage Area 206704b1 (S10). CPU 211 (FIG. 1) retrieves the current location icon data from Current Location Icon Data Storage Area 206704b7a (S11). CPU 211 (FIG. 1) displays the current location icon data retrieved in the previous step at the location corresponding to the current location data retrieved in S10 on the map data displayed in S9 (S12). CPU 211 (FIG. 1) retrieves the 1st past accident occurred location data from 1st Past Accident Occurred Location Data Storage Area 206704b2a (S13). CPU 211 (FIG. 1) retrieves the 1st past accident occurred location icon data from 1st Past Accident Occurred Location Icon Data Storage Area 206704b7b (S14). CPU 211 (FIG. 1) displays the 1st past accident occurred location icon data retrieved in the previous step at the location corresponding to the 1st past accident occurred location data retrieved in S13 on the map data displayed in S9 (S15). CPU 211 (FIG. 1) retrieves the low speed data from Low Speed Data Storage Area 206704b5 (S16). CPU 211 (FIG. 1) controls the current speed of Carrier CR704 so as to decrease to the speed indicated by the low speed data retrieved in the previous step (S17). The foregoing sequence is repeated periodically.

This paragraph illustrate(s) 2nd Past Accident Relating Data Displaying Software 206704c3 of Communication Device 200, which display(s) the 2nd past accident relating data. In the present embodiment, CPU 211 (FIG. 1) retrieves the current location data from Current Location Data Storage Area 206704b1 (S1). CPU 211 (FIG. 1) retrieves the 2nd past accident occurred location data from 2nd Past Accident Occurred Location Data Storage Area 206704b2b (S2). If the current location data retrieved in S1 is within a certain distance from the 2nd past accident occurred location data retrieved in the previous step, CPU 211 (FIG. 1) proceeds to the next step (S3). CPU 211 (FIG. 1) retrieves the past accident occurred message data from Past Accident Occurred Message Data Storage Area 206704b3 (S4). CPU 211 (FIG. 1) outputs the past accident occurred message data retrieved in the previous step from Speaker 216 (FIG. 1) and LCD 201 (FIG. 1) (S5). CPU 211 (FIG. 1) retrieves the 2nd past accident relating data from 2nd Past Accident Relating Data Storage Area 206704b4b (S6). CPU 211 (FIG. 1) displays the 2nd past accident relating data retrieved in the previous step on LCD 201 (FIG. 1) (S7). CPU 211 (FIG. 1) retrieves the map data from Map Data Storage Area 206704b6 (S8). CPU 211 (FIG. 1) displays the map data retrieved in the previous step on LCD 201 (FIG. 1) (S9). CPU 211 (FIG. 1) retrieves the current location data from Current Location Data Storage Area 206704b1 (S10). CPU 211 (FIG. 1) retrieves the current location icon data from Current Location Icon Data Storage Area 206704b7a (S11). CPU 211 (FIG. 1) displays the current location icon data retrieved in the previous step at the location corresponding to the current location data retrieved in S10 on the map data displayed in S9 (S12). CPU 211 (FIG. 1) retrieves the 2nd past accident occurred location data from 2nd Past Accident Occurred Location Data Storage Area 206704b2b (S13). CPU 211 (FIG. 1) retrieves the 2nd past accident occurred location icon data from 2nd Past Accident Occurred Location Icon Data Storage Area 206704b7c (S14). CPU 211 (FIG. 1) displays the 2nd past accident occurred location icon data retrieved in the previous step at the location corresponding to the 2nd past accident occurred location data retrieved in S13 on the map data displayed in S9 (S15). CPU 211 (FIG. 1) retrieves the low speed data from Low Speed Data Storage Area 206704b5 (S16). CPU 211 (FIG. 1) controls the current speed of Carrier CR704 so as to decrease to the speed indicated by the low speed data retrieved in the previous step (S17). The foregoing sequence is repeated periodically.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). In the present embodiment, RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. In the present embodiment, CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. In the present embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. In the present embodiment, CPU 211 (FIG. 1), under the command of Mode Activating Software 20690e, activates the mode, function, or, system selected in S2 hereinbefore. CPU 211 thereafter implements the activated mode, function, or system as described in the relevant paragraphs in this specification.

This paragraph illustrates the sequence of Mode Implementation Repeater 20690f. In the present embodiment, the user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. In the present embodiment, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant paragraphs in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Incorporation By Reference>>

All paragraphs and drawings described in U.S. Ser. No. 11/964,990, filed 2007 Dec. 27, are incorporated to this application by reference, particularly the following: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIGS. 8a through FIG. 10); Emergency Landing System described in (FIGS. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through

[5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 throug 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647c); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs

[5009.7134] through [5009.7157] (FIGS. 6917 through 6932b); Audiovisual Data Downloading Function described in paragraphs [5009.7158] through [5009.7218](FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensoring Function described in paragraphs [5009.9292] through [5009.9345] (FIGS. 8517 through 8557); Drawer Status Sensoring Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680]

through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586cPush-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 rough FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 18149f); 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18693b FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); Music Property Setting Function described in paragraphs [5009.22277] through [5009.22302] (FIG. 19207 through FIG. 19226b); Fore/Background Audio Recording Function described in paragraphs [5009.22303] through [5009.22334] (FIGS. 19227 through 19248); Email Address Phone Calling Function described in paragraphs [5009.22335] through [5009.22392] (FIGS. 19249 through 19295c); Night Vision Displaying Carrier Function described in paragraphs [5009.22393] through [5009.22501] (FIGS. 19296 through 19386b); Phone Number Email Function described in paragraphs [5009.22502] through [5009.22561] (FIGS. 19387 through 19436c); No-Answer Auto Emailing Function described in paragraphs [5009.22562] through [5009.22634] (FIGS. 19437 through 19499e); Linked Page Auto Downloading Function described in paragraphs [5009.22635] through [5009.22662] (FIGS. 19500 through 19519); Folder Auto Hiding Function described in paragraphs [5009.22663] through [5009.22692] (FIGS. 19520 through 19543); Folder Time Defined Hiding Function described in paragraphs [5009.22693] through [5009.22746] (FIGS. 19544 through 19591); Folder Time Defined Revealing Function described in paragraphs [5009.22747] through [5009.22800] (FIGS. 19592 through 19639); Common Phone Number Changing Function described in paragraphs [5009.22801] through [5009.22829]

(FIGS. 19640 through 19658c); Common Email Address Changing Function described in paragraphs [5009.22830] through [5009.22858] (FIGS. 19659 through 19677c); Multiple Incrementing Counter Function described in paragraphs [5009.22859] through [5009.22896] (FIGS. 19678 through 19709); Multiple Decrementing Counter Function described in paragraphs [5009.22897] through [5009.22934] (FIGS. 19710 through 19741); Multiple Alarm Clock Function described in paragraphs [5009.22935] through [5009.22984] (FIGS. 19742 through 19783); Alarm Clock Current Location Notifying Function described in paragraphs [5009.22985] through [5009.23022] (FIG. 19784 through FIG. 19815b); Camcorder Auto Time Adjusting Function described in paragraphs [5009.23023] through [5009.23047] (FIG. 19816 through FIG. 19833b); Location Identified Device Information Displaying Function described in paragraphs [5009.23048] through [5009.23098] (FIG. 19834 through FIG. 19875b); Folder Message Displaying Function described in paragraphs [5009.23099] through [5009.23126] (FIG. 19876 through FIG. 19897); Folder Audiovisual Outputting Function described in paragraphs [5009.23127] through [5009.23154] (FIG. 19898 through FIG. 19919); Pistol Monitoring Function described in paragraphs [5009.23155] through [5009.23226] (FIG. 19920 through FIG. 19983b); Earthquake Auto Locking Function described in paragraphs [5009.23227] through [5009.23264] (FIG. 19984 through FIG. 20013); Television Resolution Auto Changing Function described in paragraphs [5009.23265] through [5009.23290] (FIG. 20014 through FIG. 20033); Shortcut Auto Creating Function described in paragraphs [5009.23291] through [5009.23312] (FIG. 20034 through FIG. 20049); Auto Zooming Function described in paragraphs [5009.23313] through [5009.23332] (FIG. 20050 through FIG. 20063b); Oxygen Tank Function described in paragraphs [5009.23333] through [5009.23384] (FIG. 20064 through FIG. 20107); In Carrier Server Function described in paragraphs [5009.23385] through [5009.23430] (FIG. 20108 through FIG. 20146); Silent Mode Auto Subtitle Displaying Function described in paragraphs [5009.23431] through [5009.23454] (FIG. 20147 through FIG. 20164b); Silent Mode Auto Answerphone Message Displaying Function described in paragraphs [5009.23455] through [5009.23476] (FIG. 20165 through FIG. 20180b); Midnight Auto Downloading Function described in paragraphs [5009.23477] through [5009.23498] (FIG. 20181 through FIG. 20196); Shortcut Link Auto Updating Function described in paragraphs [5009.23499] through [5009.23522] (FIG. 20197 through FIG. 20214); Web Page Auto Refreshing Function described in paragraphs [5009.23523] through [5009.23560] (FIG. 20215 through FIG. 20246); Vibrator Remote Activation Function described in paragraphs [5009.23561] through [5009.23584] (FIG. 20247through FIG. 20263b); Scenario Accordance Vibrating Function described in paragraphs [5009.23585] through [5009.23608] (FIG. 20264 through FIG. 20281); Location Dependent Message Outputting Function described in paragraphs [5009.23609] through [5009.23640] (FIG. 20282 through FIG. 20307c); Location Dependent Program Activating Function described in paragraphs [5009.23641] through [5009.23670] (FIG. 20308 through FIG. 20333c); Multiple Answering Machine Function described in paragraphs [5009.23671] through [5009.23716] (FIG. 20334 through FIG. 20373b); Time Dependent Answering Machine Function described in paragraphs [5009.23717] through [5009.23750] (FIG. 20374 through FIG. 20401b); Television Program Data Storage Area Selecting Function described in paragraphs [5009.23751] through [5009.23799] (FIG. 20402 through FIG. 20444c); Street Address Icon Displaying Function described in paragraphs [5009.23800] through [5009.23829] (FIG. 20445 through FIG. 20468c); Audiovisual Multiple Recording/Replaying Function described in paragraphs [5009.23830] through [5009.23867] (FIG. 20469 through FIG. 20500d); Map Editing Function described in paragraphs [5009.23868] through [5009.23901] (FIG. 20501 through FIG. 20528); Enhanced Television Tuner Remote Controlling Function described in paragraphs [5009.23902] through [5009.23940] (FIG. 20529 through FIG. 20560b); Enhanced DVD Player Remote Controlling Function described in paragraphs [5009.23941] through [5009.24002] (FIG. 20561 through FIG. 20615b); Monetary Value Data Auto Charging Function described in paragraphs [5009.24003] through [5009.24030] (FIG. 20616 through FIG. 20637c); Site Viewing Remotely Prohibiting Function described in paragraphs [5009.24031] through [5009.24062] (FIG. 20638 through FIG. 20662d); Remotely Controlled Device Auto Selecting Function described in paragraphs [5009.24063] through [5009.24110] (FIG. 20663 through FIG. 20702d); Driver Alerting Function described in paragraphs [5009.24111] through [5009.24150] (FIG. 20703 through FIG. 20735b); Robot Controlling Macro Function described in paragraphs [5009.24151] through [5009.24224] (FIG. 20736 through FIG. 20799b); Robot Predetermined Location Proceeding Function described in paragraphs [5009.24225] through [5009.24290] (FIG. 20800 through FIG. 20858); Message Leaving Function described in paragraphs [5009.24291] through [5009.24350] (FIG. 20859 through FIG. 20911c); Unique Folder Icon Attaching Function described in paragraphs [5009.24351] through [5009.24380] (FIG. 20912 through FIG. 20935d); Unique File Icon Attaching Function described in paragraphs [5009.24381] through [5009.24410] (FIG. 20936 through FIG. 20959d); Unique Email Icon Attaching Function described in paragraphs [5009.24411] through [5009.24440] (FIG. 20960 through FIG. 20983d); Device Current Condition Notifying Function described in paragraphs [5009.24441] through [5009.24536] (FIG. 20984 through FIG. 21072d); Device Bulk Duplicating Function described in paragraphs [5009.24537] through [5009.24613] (FIG. 21073 through FIG. 21142c); Program Related Audiovisual Data Auto Downloading Function described in paragraphs [5009.24614] through [5009.24643] (FIG. 21143 through FIG. 21166c); Weather Dependent Program Executing Function described in paragraphs [5009.24644] through [5009.24702] (FIG. 21167 through FIG. 21218d); Audiovisual Outputting Function described in paragraphs [5009.24703] through [5009.24745] (FIG. 21219 through FIG. 21254e); Email Outputting Function described in paragraphs [5009.24746] through [5009.24788] (FIG. 21255 through FIG. 21290e); Document Outputting Function described in paragraphs [5009.24789] through [5009.24831] (FIG. 21291 through FIG. 21326e); Program Executing Function described in paragraphs [5009.24832] through [5009.24874] (FIG. 21327 through FIG. 21362e); Electronic Postit Function described in paragraphs [5009.24875] through [5009.24945] (FIG. 21363 through FIG. 21426d); Time Dependent Game Function described in paragraphs [5009.24946] through [5009.24965] (FIG. 21427 through FIG. 21440); Season Dependent Game Function described in paragraphs [5009.24966] through [5009.24985] (FIG. 21441 through FIG. 21454); Location Dependent Game Function described in paragraphs [5009.24986] through [5009.25007] (FIG. 21455 through FIG. 21470); Enhanced Time Dependent Game Function described in paragraphs [5009.25008] through [5009.25035] (FIG. 21471 through FIG. 21492); Enhanced Season Dependent Game Function described in paragraphs [5009.25036] through [5009.25063] (FIG. 21493 through FIG. 21514); Enhanced Location Dependent Game Function described in paragraphs [5009.25064] through [5009.25093] (FIG. 21515 through FIG. 21538); Specific Game Download Prohibiting Function described in paragraphs [5009.25094] through [5009.25141] (FIG. 21539 through FIG. 21579c); Location Dependent Phone Number Function described in paragraphs [5009.25142] through [5009.25206] (FIG. 21580 through FIG. 21637e); Location Dependent Answering Machine Function described in paragraphs [5009.25207] through [5009.25228] (FIG. 21638 through FIG. 21653c); Auto Speaker Phone Function described in paragraphs [5009.25229] through [5009.25266] (FIG. 21654 through FIG. 21684); Object Location Identifying Function described in paragraphs [5009.25267] through [5009.25312] (FIG. 21685 through FIG. 21724c); Area Dependent Answering Machine Function described in paragraphs [5009.25313] through [5009.25332] (FIG. 21725 through FIG. 21738c); Area Dependent Call Receiving Function described in paragraphs [5009.25333] through [5009.25359] (FIG. 21739 through FIG. 21760c); Device Component Distance Searching Function described in paragraphs [5009.25360] through [5009.25377] (FIG. 21761 through FIG. 21772d); Device Component Location Searching Function described in paragraphs [5009.25378] through [5009.25422] (FIG. 21773 through FIG. 21810f); Component Connection Notifying Function described in paragraphs [5009.25423] through [5009.25446] (FIG. 21811 through FIG. 21828); Multiple Phone Number Busy Notifying Function described in paragraphs [5009.25447] through [5009.25478] (FIG. 21829 through FIG. 21854b); Time Identified Incoming Call Refusing Function described in paragraphs [5009.25479] through [5009.25504] (FIG. 21855 through FIG. 21874c); Email Location Log Recording Function described in paragraphs [5009.25505] through [5009.25540] (FIG. 21875 through FIG. 21904e); Rough Location Notifying Function described in paragraphs [5009.25541] through [5009.25598] (FIG. 21905 through FIG. 21955b); Stalker Detecting Function described in paragraphs [5009.25599] through [5009.25638] (FIG. 21956 through FIG. 21989b); Location Indicating Scheduler Function described in paragraphs [5009.25639] through [5009.25742] (FIG. 21990 through FIG. 22086i); Device Program Sync Activating Function described in paragraphs [5009.25743] through [5009.25803] (FIG. 22087 through FIG. 22140c); User Dictionary Sync Function described in paragraphs [5009.25804] through [5009.25866] (FIG. 22141 through FIG. 22196d); Update Synchronizing Function described in paragraphs [5009.25867] through [5009.25916] (FIG. 22197 through FIG. 22241c); Material Viewing Location Notifying Function described in paragraphs [5009.25917] through [5009.25942] (FIG. 22242 through FIG. 22261b); Digital Data Edited Location Notifying Function described in paragraphs [5009.25943] through [5009.25982] (FIG. 22262 through FIG. 22295e); Remote Money Transferring Function described in paragraphs [5009.25983] through [5009.26046] (FIG. 22296 through FIG. 22352c); Remote Device Diagnosing Function described in paragraphs [5009.26047] through [5009.26180] (FIG. 22353 through FIG. 22479c); User Related Data Backuping Function described in paragraphs [5009.26181] through [5009.26249] (FIG. 22480 through FIG. 22542b); User Related Data Sharing Function described in paragraphs [5009.26250] through [5009.26319] (FIG. 22543 through FIG. 22605b); Location Dependent Pistol Controlling Function described in paragraphs [5009.26320] through [5009.26354] (FIG. 22606 through FIG. 22634); Direction Dependent Pistol Controlling Function described in paragraphs [5009.26355] through [5009.26429] (FIG. 22635 through FIG. 22702b); Dual Number Batch Switching Over Function described in paragraphs [5009.26430] through [5009.26485] (FIG. 22703 through FIG. 22752d); Dual Number Auto Switching Over Function described in paragraphs [5009.26486] through [5009.26553] (FIG. 22753 through FIG. 22814c); Audiovisual Text Retrieving Function described in paragraphs [5009.26554] through [5009.26591] (FIG. 22815 through FIG. 22846b); Prepaid Currency Auto Converting Function described in paragraphs [5009.26592] through [5009.26623] (FIG. 22847 through FIG. 22872d); Stereo Odor Sensing Function described in paragraphs [5009.26624] through [5009.26663] (FIG. 22873 through FIG. 22907c); Bone-Conduction Headphone Function described in paragraphs [5009.26664] through [5009.26763] (FIG. 22908 through FIG. 23000); Remote Sound Volume Controlling Function described in paragraphs [5009.26764] through [5009.26803] (FIG. 23000a through FIG. 23032c); Personal Belonging Notifying Function described in paragraphs [5009.26804] through [5009.26839] (FIG. 23033 through FIG. 23061b); Secondary Personal Belonging Notifying Function described in paragraphs [5009.26840] through [5009.26898] (FIG. 23062 through FIG. 23112c); Headphone Auto Content Replaying Function described in paragraphs [5009.26899] through [5009.26948] (FIG. 23113 through FIG. 23155b); Alternative Device Using Function described in paragraphs [5009.26949] through [5009.26987] (FIG. 23156 through FIG. 23188d); Brain Wave Color Selecting Function described in paragraphs [5009.26988] through [5009.27026] (FIG. 23189 through FIG. 23221d); Brain Wave Font Selecting Function described in paragraphs [5009.27027] through [5009.27065] (FIG. 23222 through FIG. 23254d); Another Device Location Dependent Auto Answering Function described in paragraphs [5009.27066] through [5009.27104] (FIG. 23255 through FIG. 23286d); Rear Carrier Speed Dependent Ideal Distance Maintaining Function described in paragraphs [5009.27105] through [5009.27162] (FIG. 23287 through FIG. 23337c); Front Carrier Speed Dependent Ideal Distance Maintaining Function described in paragraphs [5009.27163] through [5009.27220] (FIG. 23338 through FIG. 23388c); Inter-Carrier Middle Point Maintaining Function described in paragraphs [5009.27221] through [5009.27306] (FIG. 23389 through FIG. 23466e); Front Carrier Activity Notifying Function described in paragraphs [5009.27307] through [5009.27446] (FIG. 23467 through FIG. 23599); Past Accident Occurred Spot Auto Speed Decreasing Function described in paragraphs [5009.27447] through [5009.27473] (FIG. 23600 through FIG. 23620d); Shock Sensored Auto Backing Up Function described in paragraphs [5009.27474] through [5009.27524] (FIG. 23621 through FIG. 23664e); Redialing Data Sharing Function described in paragraphs [5009.27525] through [5009.27589] (FIG. 23665 through FIG. 23722d); Phone Call History Sharing Function described in paragraphs [5009.27590] through [5009.27696] (FIG. 23723 through FIG. 23822h); Specific Sound-Wave Triggered Program Function described in paragraphs [5009.27697] through [5009.27735] (FIG. 23823 through FIG. 23856d); Time Dependent False Location Notifying Function described in paragraphs [5009.27736] through [5009.27779] (FIG. 23857 through FIG. 23894e); Area Dependent False Location Notifying Function described in paragraphs [5009.27780] through [5009.27823] (FIG. 23895 through FIG. 23932e); Area Dependent False Location Notifying Function described in paragraphs [5009.27824] through [5009.27867] (FIG. 23933 through FIG. 23970e); Device Dependent False Location Notifying Function described in paragraphs [5009.27868] through [5009.27911] (FIG. 23971 through FIG. 24008e); Specific Image Triggered Program Function described in paragraphs [5009.27912] through [5009.27942] (FIG. 24009 through FIG. 24034c); Warning Sharing Function described in paragraphs [5009.27943] through [5009.27988] (FIG. 24035 through FIG. 24073c); Incoming Call Rejection Password Nullifying Function described in paragraphs [5009.27989] through [5009.28039] (FIG. 24074 through FIG. 24117c); Incoming Call Rejection Voice Print Nullifying Function described in paragraphs [5009.28040] through [5009.28090] (FIG. 24118 through FIG. 24161c); Incoming Call Rejection Finger Print Nullifying Function described in paragraphs [5009.28091] through [5009.28141] (FIG. 24162 through FIG. 24205c); Facedown Phone Silent Mode Implementing Function described in paragraphs [5009.28142] through [5009.28172] (FIG. 24206 through FIG. 24230c); Facedown Email Silent Mode Implementing Function described in paragraphs [5009.28173] through [5009.28203] (FIG. 24231 through FIG. 24255c); and Facedown Auto Answering Mode Implementing Function described in paragraphs [5009.28204] through [5009.28234] (FIG. 24256 through FIG. 24280c).

The invention claimed is:

1. A vehicle comprising:
an input device;
a display;
a rear vehicle speed dependent ideal distance maintaining implementer, wherein when a 1st current distance which is the current distance between said vehicle and a 1st vehicle which is the vehicle traveling in front of said vehicle is identified to be longer than a 1st ideal distance, the current speed of said vehicle is increased and a speed increased message is provided in audio and/or visual form, and when said 1st current distance is identified to be shorter than said 1st ideal distance, the current speed of said vehicle is decreased and a speed decreased message is provided in audio and/or visual form, wherein said 1st ideal distance varies depending on said current speed of said vehicle and said 1st current distance, and wherein said 1st ideal distance, a 1st current location which indicates the current location of said 1st vehicle, and a vehicle current location which indicates the current location of said vehicle are indicated on said display;
a front vehicle speed dependent ideal distance maintaining implementer, wherein when a 2nd current distance which is the current distance between said vehicle and a 2nd vehicle which is the vehicle traveling behind said vehicle is identified to be longer than a 2nd ideal distance, the current speed of said vehicle is decreased and a speed decreased message is provided in audio and/or visual form, and when said 2nd current distance is identified to be shorter than said 2nd ideal distance, the current speed of said vehicle is increased and a speed increased message is provided in audio and/or visual form, wherein said 2nd ideal distance varies depending on said current speed of said vehicle and said 2nd current distance, and wherein said 2nd ideal distance, said vehicle current location which indicates the current location of said vehicle and a 2nd current location which indicates the current location of said 2nd vehicle are indicated on said display;
an inter-vehicle middle point maintaining implementer, wherein an ideal middle point which indicates the ideal middle point location between said 1st vehicle and said 2nd vehicle is identified, when said vehicle is identified to be behind said ideal middle point, the current speed of said vehicle is increased and a speed increased message is provided in audio and/or visual form, and when said vehicle is identified to be beyond said ideal middle point, the current speed of said vehicle is decreased and a speed decreased message is provided in audio and/or visual form, and wherein said ideal middle point, said 1st current distance which indicates the current distance between said 1st vehicle and said vehicle, said 2nd current distance which indicates the current distance between said vehicle and said 2nd vehicle, a total current distance which indicates the current distance between said 1st vehicle and said 2nd vehicle, the current speed which indicates the current speed of said vehicle, said 1st current location which indicates the current location of said 1st vehicle, said vehicle current location which indicates the current location of said vehicle, and said 2nd current location which indicates the current location of said 2nd vehicle are indicated on said display;
a front vehicle activity notifying implementer, wherein a 1st license plate number which indicates the license plate number of said 1st vehicle, a 1st driver's name which indicates the name of the driver of said 1st vehicle, said 1st current location which indicates the current location of said 1st vehicle, said vehicle current location which indicates the current location of said vehicle, said 1st current distance which indicates the current distance between said 1st vehicle and said vehicle, and/or a 1st current speed which indicates the current speed of said 1st vehicle are indicated on said display, wherein when a left blinker of said 1st vehicle is identified to be on, a left blinker message is provided in audio and/or visual form, when a right blinker of said 1st vehicle is identified to be on, a right blinker message is provided in audio and/or visual form, when a brake pedal of said 1st vehicle is identified to be stepped on, a brake message is provided in audio and/or visual form, when an accelerator pedal of said 1st vehicle is identified to be stepped on, an accelerator message is provided in audio and/or visual form, when a steering wheel of said 1st vehicle is identified to be turned to left, a left steering wheel message is provided in audio and/or visual form, and when a steering wheel of said 1st vehicle is identified to be turned to right, a right steering wheel message is provided in audio and/or visual form; and
a past accident occurred spot auto speed decreasing implementer, wherein when said vehicle current location is identified to be within a certain distance from a past accident occurred location which indicates the geographic location at which an accident occurred in the past, a past accident occurred message which indicates that said vehicle is about to approach the location at which accident occurred in the past and a past accident relating information which indicates the data relating to the accident occurred in the past are provided in audio and/or visual form, and the current speed of said vehicle is decreased to a predetermined speed.

2. A vehicle comprising:
an input device;
a display;
a rear vehicle speed dependent ideal distance maintaining implementer, wherein when a 1st current distance which is the current distance between said vehicle and a 1st vehicle which is the vehicle traveling in front of said vehicle is identified to be longer than a 1st ideal distance, the current speed of said vehicle is increased and a speed increased message is provided in audio and/or visual form, and when said 1st current distance is identified to be shorter than said 1st ideal distance, the current speed of said vehicle is decreased and a speed decreased message is provided in audio and/or visual form, wherein said 1st ideal distance varies depending on said current speed of said vehicle and said 1st current distance, and wherein said 1st ideal distance, a 1st current location which indicates the current location of said 1st vehicle, and a vehicle current location which indicates the current location of said vehicle are indicated on said display;

a front vehicle speed dependent ideal distance maintaining implementer, wherein when a 2nd current distance which is the current distance between said vehicle and a 2nd vehicle which is the vehicle traveling behind said vehicle is identified to be longer than a 2nd ideal distance, the current speed of said vehicle is decreased and a speed decreased message is provided in audio and/or visual form, and when said 2nd current distance is identified to be shorter than said 2nd ideal distance, the current speed of said vehicle is increased and a speed increased message is provided in audio and/or visual form, wherein said 2nd ideal distance varies depending on said current speed of said vehicle and said 2nd current distance, and wherein said 2nd ideal distance, said vehicle current location which indicates the current location of said vehicle and a 2nd current location which indicates the current location of said 2nd vehicle are indicated on said display;

an inter-vehicle middle point maintaining implementer, wherein an ideal middle point which indicates the ideal middle point location between said 1st vehicle and said 2nd vehicle is identified, when said vehicle is identified to be behind said ideal middle point, the current speed of said vehicle is increased and a speed increased message is provided in audio and/or visual form, and when said vehicle is identified to be beyond said ideal middle point, the current speed of said vehicle is decreased and a speed decreased message is provided in audio and/or visual form, and wherein said ideal middle point, said 1st current distance which indicates the current distance between said 1st vehicle and said vehicle, said 2nd current distance which indicates the current distance between said vehicle and said 2nd vehicle, a total current distance which indicates the current distance between said 1st vehicle and said 2nd vehicle, the current speed which indicates the current speed of said vehicle, said 1st current location which indicates the current location of said 1st vehicle, said vehicle current location which indicates the current location of said vehicle, and said 2nd current location which indicates the current location of said 2nd vehicle are indicated on said display; and a front vehicle activity notifying implementer, wherein a 1st license plate number which indicates the license plate number of said 1st vehicle, a 1st driver's name which indicates the name of the driver of said 1st vehicle, said 1st current location which indicates the current location of said 1st vehicle, said vehicle current location which indicates the current location of said vehicle, said 1st current distance which indicates the current distance between said 1st vehicle and said vehicle, and/or a 1st current speed which indicates the current speed of said 1st vehicle are indicated on said display, wherein when a left blinker of said 1st vehicle is identified to be on, a left blinker message is provided in audio and/or visual form, when a right blinker of said 1st vehicle is identified to be on, a right blinker message is provided in audio and/or visual form, when a brake pedal of said 1st vehicle is identified to be stepped on, a brake message is provided in audio and/or visual form, when an accelerator pedal of said 1st vehicle is identified to be stepped on, an accelerator message is provided in audio and/or visual form, when a steering wheel of said 1st vehicle is identified to be turned to left, a left steering wheel message is provided in audio and/or visual form, and when a steering wheel of said 1st vehicle is identified to be turned to right, a right steering wheel message is provided in audio and/or visual form.

3. A vehicle comprising:

an input device;

a display;

a rear vehicle speed dependent ideal distance maintaining implementer, wherein when a 1st current distance which is the current distance between said vehicle and a 1st vehicle which is the vehicle traveling in front of said vehicle is identified to be longer than a 1st ideal distance, the current speed of said vehicle is increased and a speed increased message is provided in audio and/or visual form, and when said 1st current distance is identified to be shorter than said 1st ideal distance, the current speed of said vehicle is decreased and a speed decreased message is provided in audio and/or visual form, wherein said 1st ideal distance varies depending on said current speed of said vehicle and said 1st current distance, and wherein said 1st ideal distance, a 1st current location which indicates the current location of said 1st vehicle, and a vehicle current location which indicates the current location of said vehicle are indicated on said display;

a front vehicle speed dependent ideal distance maintaining implementer, wherein when a 2nd current distance which is the current distance between said vehicle and a 2nd vehicle which is the vehicle traveling behind said vehicle is identified to be longer than a 2nd ideal distance, the current speed of said vehicle is decreased and a speed decreased message is provided in audio and/or visual form, and when said 2nd current distance is identified to be shorter than said 2nd ideal distance, the current speed of said vehicle is increased and a speed increased message is provided in audio and/or visual form, wherein said 2nd ideal distance varies depending on said current speed of said vehicle and said 2nd current distance, and wherein said 2nd ideal distance, said vehicle current location which indicates the current location of said vehicle and a 2nd current location which indicates the current location of said 2nd vehicle are indicated on said display;

an inter-vehicle middle point maintaining implementer, wherein an ideal middle point which indicates the ideal middle point location between said 1st vehicle and said 2nd vehicle is identified, when said vehicle is identified to be behind said ideal middle point, the current speed of said vehicle is increased and a speed increased message is provided in audio and/or visual form, and when said vehicle is identified to be beyond said ideal middle point, the current speed of said vehicle is decreased and a speed decreased message is provided in audio and/or visual form, and wherein said ideal middle point, said 1st current distance which indicates the current distance between said 1st vehicle and said vehicle, said 2nd current distance which indicates the current distance between said vehicle and said 2nd vehicle, a total current distance which indicates the current distance between said 1st vehicle and said 2nd vehicle, the current speed which indicates the current speed of said vehicle, said 1st current location which indicates the current location of said 1st vehicle, said vehicle current location which indicates the current location of said vehicle, and said 2nd current location which indicates the current location of said 2nd vehicle are indicated on said display.

* * * * *